US007857188B2

(12) United States Patent  (10) Patent No.: US 7,857,188 B2
Liu  (45) Date of Patent: Dec. 28, 2010

(54) HIGH-PERFORMANCE FRICTION STIR WELDING TOOLS

(75) Inventor: Shaiw-Rong Scott Liu, Arcadia, CA (US)

(73) Assignee: Worldwide Strategy Holding Limited, Hong Kong (HK)

(*) Notice: Subject to any disclaimer, the term of this patent is extended or adjusted under 35 U.S.C. 154(b) by 722 days.

(21) Appl. No.: 11/669,791

(22) Filed: Jan. 31, 2007

(65) Prior Publication Data

US 2007/0119276 A1 May 31, 2007

Related U.S. Application Data

(63) Continuation-in-part of application No. 11/507,928, filed on Aug. 21, 2006, application No. 11/669,791, which is a continuation-in-part of application No. 11/081,928, filed on Mar. 15, 2005, and a continuation-in-part of application No. PCT/US2006/032654, filed on Aug. 21, 2006.

(60) Provisional application No. 60/764,003, filed on Jan. 31, 2006, provisional application No. 60/710,016, filed on Aug. 19, 2005.

(51) Int. Cl.
B23K 20/12 (2006.01)
C22C 9/00 (2006.01)
(52) U.S. Cl. .................... 228/2.1; 75/236; 75/244
(58) Field of Classification Search .............. 75/236, 75/244; 228/2.1, 2.3
See application file for complete search history.

(56) References Cited

U.S. PATENT DOCUMENTS

| | | |
|---|---|---|
| 2,823,988 A | 2/1958 | Grant et al. |
| 3,409,416 A | 11/1968 | Yates |
| 3,409,418 A | 11/1968 | Yates |
| 3,672,849 A | 6/1972 | Bredzs et al. |
| 3,814,635 A | 6/1974 | Cornetto et al. |
| 3,865,586 A | 2/1975 | Volin et al. |
| 3,916,497 A | 11/1975 | Doi et al. |
| 4,013,453 A | 3/1977 | Patel |
| 4,067,742 A | 1/1978 | Fletcher et al. |
| 4,194,910 A | 3/1980 | Mal et al. |
| 4,246,027 A | 1/1981 | Watanabe et al. |
| 4,249,913 A | 2/1981 | Johnson et al. |
| 4,265,662 A | 5/1981 | Miyake et al. |
| 4,284,430 A | 8/1981 | Henry |
| 4,330,333 A | 5/1982 | Gibbs |
| 4,432,794 A | 2/1984 | Holleck |
| 4,574,607 A | 3/1986 | Akino et al. |
| 4,589,937 A | 5/1986 | Jackson et al. |
| 4,639,352 A | 1/1987 | Kodama et al. |
| 4,735,656 A | 4/1988 | Schaefer et al. |
| 4,744,943 A | 5/1988 | Timm |
| 4,861,735 A | 8/1989 | Birchall et al. |
| 4,963,183 A | 10/1990 | Hong |
| 5,151,249 A * | 9/1992 | Austin et al. .............. 420/445 |
| 5,213,612 A | 5/1993 | Minnear et al. |
| 5,273,712 A | 12/1993 | Czech et al. |
| 5,328,763 A | 7/1994 | Terry |
| 5,462,901 A | 10/1995 | Egami et al. |
| 5,470,371 A | 11/1995 | Darolia |
| 5,476,531 A | 12/1995 | Timm et al. |
| 5,647,920 A | 7/1997 | Sasaki et al. |
| 5,778,301 A | 7/1998 | Hong |
| 5,780,116 A | 7/1998 | Sileo et al. |
| 5,802,955 A | 9/1998 | Stoll et al. |
| 6,024,776 A | 2/2000 | Heinrich et al. |
| 6,124,040 A | 9/2000 | Kolaska et al. |
| 6,214,247 B1 | 4/2001 | Leverenz et al. |
| 6,346,132 B1 | 2/2002 | Huber et al. |
| 6,355,086 B2 | 3/2002 | Brown et al. |
| 6,368,377 B1 | 4/2002 | Bryant et al. |
| 6,432,855 B1 | 8/2002 | Cook et al. |
| 6,514,456 B1 | 2/2003 | Lackner et al. |
| 6,648,206 B2 | 11/2003 | Nelson et al. |
| 6,663,688 B2 | 12/2003 | Findeisen et al. |
| 6,729,526 B2 | 5/2004 | Okamoto et al. |
| 6,773,663 B2 | 8/2004 | Adams |
| 6,776,328 B2 * | 8/2004 | Rice et al. .............. 228/112.1 |
| 6,779,704 B2 | 8/2004 | Nelson et al. |
| 6,911,063 B2 | 6/2005 | Liu |
| 7,354,548 B2 | 4/2008 | Liu |
| 7,357,292 B2 * | 4/2008 | Tolle et al. .............. 228/112.1 |
| 2002/0078794 A1 | 6/2002 | Bredthauer et al. |
| 2002/0194955 A1 | 12/2002 | Fang et al. |
| 2003/0206824 A1 | 11/2003 | Adams |
| 2003/0207142 A1 | 11/2003 | Giesler et al. |
| 2004/0134309 A1 | 7/2004 | Liu |

(Continued)

FOREIGN PATENT DOCUMENTS

CA 2454098 A1 7/2004

(Continued)

OTHER PUBLICATIONS

"Cermets and Cemented Carbides", *ASM Handbook* vol. 7 *Powder Metal Technologies and Applications*, pp. 922-930, (1998).

(Continued)

*Primary Examiner*—Roy King
*Assistant Examiner*—Ngoclan T Mai

(57) ABSTRACT

Friction stir welding tools made of a hardmetal including hard particles having a first material and a binder matrix having a second, different material.

34 Claims, 8 Drawing Sheets

U.S. PATENT DOCUMENTS

| | | |
|---|---|---|
| 2004/0134972 A1 | 7/2004 | Nelson et al. |
| 2004/0238599 A1 | 12/2004 | Subramanian et al. |
| 2005/0117984 A1 | 6/2005 | Eason et al. |
| 2005/0129565 A1 | 6/2005 | Ohriner et al. |
| 2005/0191482 A1 | 9/2005 | Liu |
| 2005/0249978 A1 | 11/2005 | Yao |
| 2007/0034048 A1 | 2/2007 | Liu |
| 2008/0008616 A1 | 1/2008 | Liu |

FOREIGN PATENT DOCUMENTS

| | | |
|---|---|---|
| CN | 1592795 | 3/2005 |
| FR | 2 350 403 | 12/1977 |
| JP | 61-194146 | 8/1986 |
| JP | 61-201752 | 9/1986 |
| JP | 02-111823 | 4/1990 |
| JP | 07-503997 | 4/1995 |
| JP | 11-502260 | 2/1999 |
| JP | 11-504074 | 4/1999 |
| JP | 2001-181775 | 7/2001 |
| JP | 2001-198710 | 7/2001 |
| JP | 2001-303233 | 10/2001 |
| JP | 2002-180175 | 6/2002 |
| JP | 2002-322505 | 11/2002 |
| TW | I279445 | 4/2007 |
| WO | 93/17141 | 9/1993 |
| WO | 96/27687 | 9/1996 |
| WO | WO98/22631 | 5/1998 |
| WO | 2004/065645 | 8/2004 |

OTHER PUBLICATIONS

Bhadeshia, H.K.D.H., "Joining of Commercial Aluminium Alloys", *Proceedings of International Conference on Aluminium (INCAL '03)*, pp. 195-204, (2003).

Brooks, K., *World Directory and Handbook of Hardmetals and Hard Materials*, 6th ed., pp. 61-70, (1996).

Hulyal, R., et al., "Sintering of WC-10 Co Hard Metals Containing Vanadium Carbonitride and Rhenium—Part II: Rhenium Addition", *Refractory Metals & Hard Materials*, 10(1):9-13, (1991).

Klingensmith, S., et al., "Microstructural Characterization of a Double-Sided Friction Stir Weld on a Superaustenitic Stainless Steel", *Welding Journal*, 84:77s-85s, May 2005.

Knight, R., et al., "Thermal Spray Forming of Materials", *ASM Handbook* vol. 7 Powder Metal Technologies and Applications, pp. 408-419, (1998).

Lawley, A., et al., "Spray Forming", *ASM Handbook* vol. 7 Powder Metal Technologies and Applications, pp. 396-407, (1998).

Lisovsky, A.F., et al., "Structure of a Binding Phase in Re-Alloyed WC-Co Cemented Carbides", *Refractory Metals & Hard Materials*, 10(1):33-36, (1991).

*Nickel Base Alloys*, published by The International Nickel Company, Tables 1 & 11, pp. 4-5 & 16-17.

Warren, R., et al., "Indentation Testing of a Broad Range of Cemented Carbides", *Proceedings of the International Conference on Science of Hard Materials*, pp. 563-582, Aug. 1981.

Carlen, J.-C., et al., "Rhenium—A Unique Rare Metal," *Materials and Manufacturing Processes*, 9(6):1087-1104, Jan. 1994.

Ettmayer, P., "Hardmetals and Cermets," *Annual Review of Materials Science*, 19:145-164, Aug. 1989.

Hulyal, R., et al., "Sintering of WC-10 Co Hard Metals Containing Vanadium Carbonitride and Rhenium—Part I: Vanadium Carbonitride Addition", *Refractory Metals & Hard Materials*, 10(1):1-7, (1991).

Office Action dated Apr. 1, 2009 for Australia Patent Application No. 2006280936 based on related International Application No. PCT/US2006/032654 (15 pages).

Office Action dated Mar. 20, 2009 for Canadian Patent Application No. 2,454,098 based on related International Application No. PCT/US03/21332 (3 pages).

Office Action dated Mar. 20, 2009 for Chinese Patent Application No. 200710084138.4 based on related International Application No. PCT/US03/21332 (12 pages).

Supplementary Partial European Search Report dated Feb. 16, 2009 for European Application No. 05729193.2 based on related International Application No. PCT/US2005/08872 (9 pages).

Supplementary Partial European Search Report dated Feb. 2, 2009 for European Application No. 06813610.0 based on related International Application No. PCT/US2006/032654 (14 pages).

Office Action dated Aug. 7, 2009 for Chinese Patent Application No. 200710084138.4 based on related International Application No. PCT/US03/21332 (5 pages).

Office Action dated Sep. 25, 2009 for Chinese Patent Application No. 200680038569.0 based on related International Application No. PCT/US2006/032654 (9 pages).

European Search Report dated Sep. 25, 2009 for European Application No. 07717159.3 based on related International Application No. PCT/US2007/002719 (5 pages).

Office Action dated May 1, 2010 for Korean Patent Application No. 10-2008-7006457 (12 pages).

Office Action dated May 6, 2010 for Canadian Patent Application No. 2,617,945 (3 pages).

* cited by examiner

HIGH-PERFORMANCE FRICTION STIR WELDING TOOLS

This application claims the benefit of U.S. Provisional Application No. 60/764,003 entitled "HIGH-PERFORMANCE FRICTION STIR WELDING TOOLS" and filed Jan. 31, 2006.

This application further claims the benefits of and is a continuation-in-part application of the following Patent Applications:

Ser. No. 11/507,928 entitled "Hardmetal Materials for High-Temperature Applications" and filed Aug. 21, 2006, which claims the benefit of U.S. Provisional Application No. 60/710,016 entitled "HARDMETAL MATERIALS FOR HIGH-TEMPERATURE APPLICATIONS" and filed on Aug. 19, 2005;

No. PCT/US2006/032654 entitled "Hardmetal Materials for High-Temperature Applications" and filed Aug. 21, 2006; and Ser. No. 11/081,928 entitled "High-Performance Hardmetal Materials" and filed Mar. 15, 2005, which is published as U.S. Publication No. US 2005-0191482-A1.

The disclosures of the above patent applications and patent publications are incorporated by reference as part of the specification of this application.

BACKGROUND

This application relates to hardmetal compositions, their fabrication techniques, and associated applications.

Hardmetals include various composite materials and are specially designed to be hard and refractory, and exhibit strong resistance to wear. Examples of widely-used hardmetals include sintered or cemented carbides or carbonitrides, or a combination of such materials. Some hardmetals, called cermets, have compositions that may include processed ceramic particles (e.g., TiC) bonded with binder metal particles. Certain compositions of hardmetals have been documented in the technical literature. For example, a comprehensive compilation of hardmetal compositions is published in Brookes' World Dictionary and Handbook of Hardmetals, sixth edition, International Carbide Data, United Kingdom (1996).

Hardmetals may be used in a variety of applications. Exemplary applications include cutting tools for cutting metals, stones, and other hard materials, wire-drawing dies, knives, mining tools for cutting coals and various ores and rocks, and drilling tools for oil and other drilling applications. In addition, such hardmetals also may be used to construct housing and exterior surfaces or layers for various devices to meet specific needs of the operations of the devices or the environmental conditions under which the devices operate.

Many hardmetals may be formed by first dispersing hard, refractory particles of carbides or carbonitrides in a binder matrix and then pressing and sintering the mixture. The sintering process allows the binder matrix to bind the particles and to condense the mixture to form the resulting hardmetals. The hard particles primarily contribute to the hard and refractory properties of the resulting hardmetals.

SUMMARY

This application describes designs of friction stir welding (FSW) heads and associated FSW systems that use such heads. In various implementations, a FSW head can include a pin and a shoulder to which the pin is engaged. The head is engaged to a shank which is in turn fixed to a rotor. The rotor rotates the shank which spins the head during welding. In operation, the spinning head is pressed to the interface of two metal pieces to be welded together and is moved along the interface. The pin and the shoulder are in direct contact with the two pieces to weld them together. In some implementations, the pin and the shoulder are made of a hardmetal material described in this application. In other implementations, the surfaces of the pin and shoulder may be made of a material described in this application while the inner parts of the pin and shoulder may be made of a different material. Various materials described here exhibit high hardness and toughness under a high temperature experienced by the pin and shoulder during the friction stir welding and thus can be used for constructing the head.

For example, a friction stir welding tool head described in this application includes a shoulder and a pin engaged to the shoulder. At least one part of each of the shoulder and the pin includes a material described in this application. This material can include, at least, (1) a first material which includes at least one of or a combination of at least one carbide, at least one nitride, at least one boride, and at least one silicide, and (2) a second material that binds the first material and includes rhenium, a mixture of rhenium and cobalt, a nickel-based superalloy, a mixture of a nickel-based superalloy and rhenium, or a mixture of a nickel-based superalloy, rhenium and cobalt. The second material may also include Mo, W, Ta, or Cr. In implementating the above examples, the first material may include at least at least one carbide selected from at least one of TaC, HfC, NbC, ZrC, TiC, WC, VC, $Al_4C_3$, $ThC_2$, $Mo_2C$, SiC and $B_4C$, or at least one nitride selected from at least one of HfN, TaN, BN, ZrN, and TiN, or at least one boride selected from at least one of $HfB_2$, $ZrB_2$, $TaB_2$, $TiB_2$, $NbB_2$, and WB.

The hardmetal materials described below include materials comprising hard particles having a first material, and a binder matrix having a second, different material. The hard particles are spatially dispersed in the binder matrix in a substantially uniform manner. The first material for the hard particles may include, for example, materials based on tungsten carbide, materials based on titanium carbide, materials based on a mixture of tungsten carbide and titanium carbide, other carbides, nitrides, borides, silicides, and combinations of these materials. The second material for the binder matrix may include, among others, rhenium, a mixture of rhenium and cobalt, a nickel-based superalloy, a mixture of a nickel-based superalloy and rhenium, a mixture of a nickel-based superalloy, rhenium and cobalt, and these materials mixed with other materials. Tungsten may also be used as a binder matrix material in hardmetal materials. The nickel-based superalloy may be in the $\gamma$-$\gamma'$ metallurgic phase.

In various implementations, for example, the volume of the second material may be from about 3% to about 40% of a total volume of the material. For some applications, the binder matrix may comprise rhenium in an amount at or greater than 25% of a total weight of the binder matrix of the final material. For other applications, the second material may include a Ni-based superalloy. The Ni-based superalloy may include Ni and other elements such as Re for certain applications.

Fabrication of the hardmetal materials of this application may be carried out by, according to one implementation, sintering the material mixture under a vacuum condition and performing a solid-phase sintering under a pressure applied through a gas medium. Such hardmetals may also be coated on surfaces using thermal spray methods to form either hardmetal coatings and hardmetal structures.

Advantages arising from various implementations of the described hardmetal materials may include one or more of the following: superior hardness in general, enhanced hardness at high temperatures, and improved resistance to corrosion and oxidation.

Various specific implementations described in this application are summarized as follows. The first group of 265 specific implementations is as follows.

1. A material comprising:
hard particles having a first material; and
a binder matrix having a second, different material, a volume of said second material being from about 3% to about 40% of a total volume of the material, said binder matrix comprising rhenium in an amount greater than 25% of a total weight of the material, wherein said hard particles are spatially dispersed in said binder matrix in a substantially uniform manner.

2. The material as in the above item no. 1 or below item no. 14, wherein said first material includes a carbide comprising tungsten.

3. The material as in the above item no. 2, wherein said carbide comprises mono tungsten carbide (WC).

4. The material as in the above item no. 2, wherein said first material further includes another carbide having a metal element different from tungsten.

5. The material as in the above item no. 4, wherein said metal element is titanium (Ti).

6. The material as in the above item no. 4, wherein said metal element is tantalum (Ta).

7. The material as in the above item no. 4, wherein said metal element is niobium (Nb).

8. The material as in the above item no. 4, wherein said metal element is vanadium (V).

9. The material as in the above item no. 4, wherein said metal element is chromium (Cr).

10. The material as in the above item no. 4, wherein said metal element is hafnium (Hf).

11. The material as in the above item no. 4, wherein said metal element is molybdenum (Mo).

12. The material as in the above item no. 2, wherein said first material further includes a nitride.

13. The material as in the above item no. 2 or 12, wherein said nitride includes TiN, ZrN, VN, NbN, TaN or HfN.

14. A material, comprising:
hard particles comprising a first material which comprises a nitride; and
a binder matrix comprising a second, different material, a volume of said second material being from about 3% to about 40% of a total volume of the material, said binder matrix comprising rhenium, wherein said hard particles are spatially dispersed in said binder matrix in a substantially uniform manner.

15. The material as in the above item no. 14, wherein said nitride includes TiN, ZrN, VN, NbN, TaN or HfN.

16. The material as in the above item no. 1, wherein said binder matrix further includes cobalt (Co).

17. A material comprising:
hard particles comprising a first material; and
a binder matrix comprising a second, different material, a volume of said second material being from about 3% to about 40% of a total volume of the material, said binder matrix comprising rhenium and nickel (Ni), wherein said hard particles are spatially dispersed in said binder matrix in a substantially uniform manner.

18. A material comprising:
hard particles comprising a first material; and
a binder matrix comprising a second, different material, a volume of said second material being from about 3% to about 40% of a total volume of the material, said binder matrix comprising rhenium and molybdenum (Mo), wherein said hard particles are spatially dispersed in said binder matrix in a substantially uniform manner.

19. A material comprising:
hard particles comprising a first material; and
a binder matrix comprising a second, different material, a volume of said second material being from about 3% to about 40% of a total volume of the material, said binder matrix comprising rhenium and iron (Fe), wherein said hard particles are spatially dispersed in said binder matrix in a substantially uniform manner.

20. A material comprising:
hard particles comprising a first material; and
a binder matrix comprising a second, different material, a volume of said second material being from about 3% to about 40% of a total volume of the material, said binder matrix comprising rhenium and chromium (Cr), wherein said hard particles are spatially dispersed in said binder matrix in a substantially uniform manner.

21. A material comprising:
hard particles comprising a first material; and
a binder matrix comprising a second, different material, a volume of said second material being from about 3% to about 40% of a total volume of the material, said binder matrix comprising rhenium and a Ni-based superalloy, wherein said hard particles are spatially dispersed in said binder matrix in a substantially uniform manner.

22. The material as in the above item no. 21, wherein said binder material further includes cobalt.

23. A material comprising:
hard particles having a first material having a mixture selected from at least one from a group consisting of (1) a mixture of WC, TiC, and TaC, (2) a mixture of WC, TiC, and NbC, (3) a mixture of WC, TiC, and at least one of TaC and NbC, and (4) a mixture of WC, TiC, and at least one of HfC and NbC; and
a binder matrix having a second, different material, a volume of said binder matrix being from about 3% to about 40% of a total volume of the material, said binder matrix comprising rhenium, wherein said hard particles are spatially dispersed in said binder matrix in a substantially uniform manner.

24. A material comprising:
hard particles having a first material comprising a material selected from at least one from a group consisting of (1) WC, TiC, and TaC, (2) WC, TiC, and NbC, (3) WC, TiC, and at least one of TaC and NbC, and (4) WC, TiC, and at least one of HfC and NbC; and
a binder matrix comprising a second, different material, a volume of said binder matrix being from about 3% to about 40% of a total volume of the material, said binder matrix comprising rhenium and
a Ni-based superalloy, wherein said hard particles are spatially dispersed in said binder matrix in a substantially uniform manner.

25. A material comprising:
hard particles having a first material having a mixture of $Mo_2C$ and TiC; and
a binder matrix having a second, different material, a volume of said binder matrix being from about 3% to about 40% of a total volume of the material, said binder matrix comprising rhenium, wherein said hard particles are spatially dispersed in said binder matrix in a substantially uniform manner.

26. A material, comprising:
hard particles comprising a first material which comprises TiN, $Mo_2C$ and TiC; and
a binder matrix comprising a second, different material, a volume of said binder matrix being from about 3% to about 40% of a total volume of the material, said binder matrix comprising rhenium, wherein said hard particles are spatially dispersed in said binder matrix in a substantially uniform manner.

27. A material, comprising:
hard particles comprising a first material comprising $Mo_2C$ and TiC; and
a binder matrix comprising a second, different material, a volume of said binder matrix being from about 3% to about 40% of a total volume of the material, said binder matrix comprising rhenium and a Ni-based superalloy, wherein said hard particles are spatially dispersed in said binder matrix in a substantially uniform manner.

28. A method comprising:
forming a grade power by mixing a powder of hard particles with a binder matrix material comprising rhenium;
processing the grade powder to use the binder matrix material to bind the hard particles to produce a solid hard-metal material, wherein the processing includes (1) sintering the grade powder in a solid phase under a vacuum condition, and (2) sintering the grade power in a solid phase under a pressure in an inert gas medium.

29. The method as in the above item no. 28, wherein the binder matrix material further includes a Ni-based superalloy.

30. The method as in the above item no. 29, wherein the binder matrix material further includes cobalt.

31. The method as in the above item no. 28, wherein the binder matrix material further includes cobalt.

32. The method as in the above item no. 28, wherein each sintering is performed a temperature below an eutectic temperature of the hard particles and the binder matrix material.

33. A material comprising:
hard particles having a first material; and
a binder matrix having a second, different material comprising a nickel-based superalloy, wherein said hard particles are spatially dispersed in said binder matrix in a substantially uniform manner.

34. The material as in the above item no. 33 or 47, wherein said first material includes a carbide comprising tungsten.

35. The material as in the above item no. 34, wherein said carbide comprises mono tungsten carbide (WC).

36. The material as in the above item no. 34, wherein said first material further includes another carbide having a metal element different from tungsten.

37. The material as in the above item no. 36, wherein said metal element is titanium (Ti).

38. The material as in the above item no. 36, wherein said metal element is tantalum (Ta).

39. The material as in the above item no. 36, wherein said metal element is niobium (Nb).

40. The material as in the above item no. 36, wherein said metal element is vanadium (V).

41. The material as in the above item no. 36, wherein said metal element is chromium (Cr).

42. The material as in the above item no. 36, wherein said metal element is hafnium (Hf).

43. The material as in the above item no. 36, wherein said metal element is molybdenum (Mo).

44. The material as in the above item no. 34, wherein said first material further includes a nitride.

45. The material as in the above item no. 34 or 44, wherein said nitride includes at least one of ZrN, HfN, VN, NbN, TaN and TiN.

46. The material as in the above item no. 34 or 44, wherein said first material includes a carbide.

47. A material, comprising:
hard particles comprising a first material which comprises a nitride; and
a binder matrix comprising a second, different material comprising a nickel-based superalloy, wherein said hard particles are spatially dispersed in said binder matrix in a substantially uniform manner.

48. The material as in the above item no. 47, wherein said nitride includes at least one of ZrN, VN, NbN, TaN TiN and HfN.

49. The material as in the above item no. 33 or 47, wherein said nickel-based superalloy comprises primarily nickel and also comprises other elements.

50. The material as in the above item no. 49, wherein said other elements include Co, Cr, Al, Ti, Mo, Nb, W, and Zr.

51. A material, comprising:
hard particles comprising a first material; and
a binder matrix comprising a second, different material which comprises a nickel-based superalloy and a second, different nickel-based superalloy, wherein said hard particles are spatially dispersed in said binder matrix in a substantially uniform manner.

52. The material as in the above item no. 51, wherein said binder matrix further comprises rhenium.

53. The material as in the above item no. 52, wherein said binder matrix further comprises cobalt.

54. The material as in the above item no. 33, wherein said binder matrix further comprises rhenium.

55. A material, comprising:
hard particles comprising a first material; and
a binder matrix comprising a second, different material which comprises a nickel-based superalloy, rhenium and cobalt, wherein said hard particles are spatially dispersed in said binder matrix in a substantially uniform manner.

56. A material comprising:
hard particles comprising a first material; and
a binder matrix comprising a second, different material which comprises a nickel-based superalloy and cobalt, wherein said hard particles are spatially dispersed in said binder matrix in a substantially uniform manner.

57. A material, comprising:
hard particles comprising a first material; and
a binder matrix comprising a second, different material which comprises a nickel-based superalloy and nickel, wherein said hard particles are spatially dispersed in said binder matrix in a substantially uniform manner.

58. A material, comprising:
hard particles comprising a first material; and
a binder matrix comprising a second, different material which comprises a nickel-based superalloy and iron, wherein said hard particles are spatially dispersed in said binder matrix in a substantially uniform manner.

59. A material, comprising:
hard particles comprising a first material; and
a binder matrix comprising a second, different material which comprises a nickel-based superalloy molybdenum, wherein said hard particles are spatially dispersed in said binder matrix in a substantially uniform manner.

60. A material, comprising:
hard particles comprising a first material; and
a binder matrix comprising a second, different material which comprises a nickel-based superalloy and chromium, wherein said hard particles are spatially dispersed in said binder matrix in a substantially uniform manner.

61. The material as in the above item no. 33, wherein said binder matrix further comprises another alloy that is not a nickel-based alloy.

62. A material, comprising:
hard particles having a first material comprising TiC and TiN; and
a binder matrix having a second, different material comprising at least one of Ni, Mo, and Mo2C, wherein said hard particles are spatially dispersed in said binder matrix in a substantially uniform manner.

63. A material, comprising:
hard particles comprising a first material which comprises TiC and TiN; and
a binder matrix comprising a second, different material which comprises Re and at least one of Ni, Mo, and $Mo_2C$, wherein said hard particles are spatially dispersed in said binder matrix in a substantially uniform manner.

64. The material as in the above item no. 63, wherein said binder matrix further includes Co.

65. The material as in the above item no. 64, wherein said binder matrix further includes a Ni-based superalloy.

66. The material as in the above item no. 63, wherein said binder matrix further includes a Ni-based superalloy.

67. A material, comprising:
hard particles comprising a first material comprising TiC and TiN; and
a binder matrix comprising a second, different material which comprises a Ni-based superalloy, and at least one of Ni, Mo, and $Mo_2C$, wherein said hard particles are spatially dispersed in said binder matrix in a substantially uniform manner.

68. A method comprising:
forming a grade powder by mixing a powder of hard particles with a binder matrix material comprising a nickel-based superalloy;
processing the grade powder to produce a solid hardmetal material by using the binder matrix material to bind the hard particles.

69. The method as in the above item no. 68, wherein said processing includes sequentially performing a pressing operation, a first sintering operation, a shaping operation, and a second sintering operation.

70. (The method as in the above item no. 68, further comprising: prior to the mixing, preparing the binder matrix material to further include rhenium.

71. The method as in the above item no. 68, further comprising: prior to the mixing, preparing the binder matrix material to further include cobalt.

72. The method as in the above item no. 68, wherein the processing includes a solid phase sintering in a hot isostatic pressing process.

73. The method as in the above item no. 68, wherein the processing includes (1) sintering the grade powder in a solid phase under a vacuum condition, and (2) sintering the grade power in a solid phase under a pressure in an inert gas medium.

74. The method as in the above item no. 68, further comprising: prior to the mixing, preparing the hard particles with a particle dimension less than 0.5 micron to reduce a temperature of the sintering operations.

75. A device, comprising a wear part that removes material from an object, said wear part having a material which comprises:
hard particles having a first material; and
a binder matrix having a second, different material comprising rhenium and a Ni-based super alloy, wherein said hard particles are spatially dispersed in said binder matrix in a substantially uniform manner.

76. The device as in the above item no. 75, wherein said binder matrix further includes a cobalt.

77. A device, comprising a wear part having a material which comprises:
hard particles having a first material; and
a binder matrix of a second, different material comprising a nickel-based superalloy, wherein said hard particles are spatially dispersed in said binder matrix in a substantially uniform manner.

78. A material comprising:
hard particles having a first material selected from at least one from a group consisting of (1) a solid solution of WC, TiC, and TaC, (2) a solid solution of WC, TiC, and NbC, (3) a solid solution of WC, TiC, and at least one of TaC and NbC, and (4) a solid solution of WC, TiC, and at least one of HfC and NbC; and
a binder matrix having a second, different material, a volume of said binder matrix being from about 3% to about 40% of a total volume of the material, said binder matrix comprising rhenium, wherein said hard particles are spatially dispersed in said binder matrix in a substantially uniform manner.

79. The material as in the above item no. 78 or 87, wherein the hard particles comprise WC, TiC, and TaC, and the binder matrix is formed of pure Re.

80. The material as in the above item no. 79, wherein the hard particles are about 72% of and the Re is about 28% of the total weight of the material.

81. The material as in the above item no. 79, wherein the hard particles are about 85% of and the Re is about 15% of the total weight of the material.

82. The material as in the above item no. 79, wherein TiC and TaC are approximately equal in quantity and have a total quantity less than a quantity of the WC.

83. The material as in the above item no. 24, wherein the hard particles comprise WC, TiC, and TaC.

84. The material as in the above item no. 83, wherein each of TiC and TaC is from about 3% to less than about 6% in a total weight of the material, and WC is above 78% and below 89% in the total weight of the material.

85. The material as in the above item no. 83, wherein the binder matrix further includes Co.

86. The material as in the above item no. 83, wherein the Ni-based superalloy comprises mainly Ni and other elements including Co, Cr, Al, Ti, Mo, Nb, W, Zr, B, C, and V.

87. A material, comprising:
hard particles comprising a first material selected from at least one from a group consisting of (1) WC, TiC, and TaC, (2) WC, TiC, and NbC, (3) WC, TiC, and at least one of TaC and NbC, and (4) WC, TiC, and at least one of HfC and NbC; and
a binder matrix comprising a second, different material, a volume of said binder matrix being from about 3% to about 40% of a total volume of the material, said binder matrix comprising rhenium, wherein said hard particles are spatially dispersed in said binder matrix in a substantially uniform manner,
wherein the binder matrix includes Re and a Ni-based superalloy which includes Re.
88. The material as in the above item no. 21, wherein said Ni-based superalloy includes Re.
89. The material as in the above item no. 24, wherein said Ni-based superalloy includes Re.
90. The material as in the above item no. 21 or 47, wherein said Ni-based superalloy includes Re.
91. A material comprising:
hard particles comprising a first material; and
a binder matrix comprising a second, different material which comprises a nickel-based superalloy, wherein said hard particles are spatially dispersed in said binder matrix in a substantially uniform manner,
wherein said Ni-based superalloy includes Re.
92. A material, comprising:
hard particles comprising a first material; and
a binder matrix comprising a second, different material which comprises a nickel-based superalloy, wherein said hard particles are spatially dispersed in said binder matrix in a substantially uniform manner,
wherein said Ni-based superalloy is in a γ-γ' phase.
93. A material, comprising:
hard particles comprising a first material; and
a binder matrix comprising a second, different material which comprises a nickel-based superalloy which comprises nickel and other elements, said other elements comprising Co, Cr, Al, Ti, Mo, Nb, W, Zr, and Re, wherein said hard particles are spatially dispersed in said binder matrix in a substantially uniform manner.
94. The material as in the above item no. 17, wherein said first material comprises a boride.
95. The material as in the above item no. 95, wherein said boride is one of $TiB_2$, $ZrB_2$, $HfB_2$, $TaB_2$, $VB_2$, $MoB_2$, WB, and $W_2B$.
96. The material as in the above item no. 17, wherein said first material comprises a silicide.
97. The material as in the above item no. 96, wherein said silicide is one of $TaSi_2$, $Wsi_2$, $NbSi_2$, and $MoSi_2$.
98. The material as in the above item no. 17, wherein said first material comprises a carbide.
99. The material as in the above item no. 98, wherein said carbide comprises at least one of TiC, ZrC, HfC, VC, NbC, TaC, $Cr_2C_3$, $Mo_2C$, and WC.
100. The material as in the above item no. 17, wherein said first material further comprises a nitride.
101. The material as in the above item no. 100, wherein said nitride comprises at least one of TiN, ZrN, HfN, VN, NbN, and TaN.
102. The material as in the above item no. 100, wherein said first material further comprises a carbide.
103. The material as in the above item no. 102, wherein said carbide comprises at least one of TiC, ZrC, HfC, VC, NbC, TaC, $Cr_2C_3$, $Mo_2C$, and WC.
104. The material as in the above item no. 102, wherein said nitride comprises at least one of TiN, ZrN, HfN, VN, NbN, and TaN.
105. The material as in the above item no. 18, wherein said first material comprises a boride.
106. The material as in the above item no. 105, wherein said boride is one of $TiB_2$, $ZrB_2$, $HfB_2$, $TaB_2$, $VB_2$, $MoB_2$, WB, and $W_2B$.
107. The material as in the above item no. 18, wherein said first material comprises a silicide.
108. The material as in the above item no. 107, wherein said silicide is one of $TaSi_2$, $Wsi_2$, $NbSi_2$, and $MoSi_2$.
109. The material as in the above item no. 18, wherein said first material comprises a carbide.
110. The material as in the above item no. 109, wherein said carbide comprises at least one of TiC, ZrC, HfC, VC, NbC, TaC, $Cr_2C_3$, $Mo_2C$, and WC.
111. The material as in the above item no. 18, wherein said first material further comprises a nitride.
112. The material as in the above item no. 111, wherein said nitride comprises at least one of TiN, ZrN, HfN, VN, NbN, and TaN.
113. The material as in the above item no. 111, wherein said first material further comprises a carbide.
114. The material as in the above item no. 113, wherein said carbide comprises at least one of TiC, ZrC, HfC, VC, NbC, TaC, $Cr_2C_3$, $Mo_2C$, and WC.
115. The material as in the above item no. 113, wherein said nitride comprises at least one of TiN, ZrN, HfN, VN, NbN, and TaN.
116. The material as in the above item no. 19, wherein said first material comprises a carbide.
117. The material as in the above item no. 116, wherein said carbide comprises at least one of TiC, ZrC, HfC, VC, NbC, TaC, $Cr_2C_3$, $Mo_2C$, and WC.
118. The material as in the above item no. 19, wherein said first material comprises a boride.
119. The material as in the above item no. 118, wherein said boride is one of $TiB_2$, $ZrB_2$, $HfB_2$, $TaB_2$, $VB_2$, $MoB_2$, WB, and $W_2B$.
120. The material as in the above item no. 19, wherein said first material comprises a silicide.
121. The material as in the above item no. 120, wherein said silicide is one of $TaSi_2$, $Wsi_2$, $NbSi_2$, and $MoSi_2$.
122. The material as in the above item no. 19, wherein said first material further comprises a nitride.
123. The material as in the above item no. 122, wherein said nitride comprises at least one of TiN, ZrN, HfN, VN, NbN, and TaN.
124. The material as in the above item no. 122, wherein said first material further comprises a carbide.
125. The material as in the above item no. 124, wherein said carbide comprises at least one of TiC, ZrC, HfC, VC, NbC, TaC, $Cr_2C_3$, $Mo_2C$, and WC.
126. The material as in the above item no. 125, wherein said nitride comprises at least one of TiN, ZrN, HfN, VN, NbN, and TaN.
127. The material as in the above item no. 20, wherein said first material comprises a boride.
128. The material as in the above item no. 127, wherein said boride is one of $TiB_2$, $ZrB_2$, $HfB_2$, $TaB_2$, $VB_2$, $MoB_2$, WB, and $W_2B$.
129. The material as in the above item no. 20, wherein said first material comprises a silicide.
130. The material as in the above item no. 129, wherein said silicide is one of $TaSi_2$, $Wsi_2$, $NbSi_2$, and $MoSi_2$.
131. The material as in the above item no. 20, wherein said first material comprises a carbide.
132. The material as in the above item no. 131, wherein said carbide comprises at least one of TiC, ZrC, HfC, VC, NbC, TaC, $Cr_2C_3$, $Mo_2C$, and WC.
133. The material as in the above item no. 20, wherein said first material further comprises a nitride.
134. The material as in the above item no. 133, wherein said nitride comprises at least one of TiN, ZrN, HfN, VN, NbN, and TaN.

135. The material as in the above item no. 133, wherein said first material further comprises a carbide.
136. The material as in the above item no. 135, wherein said carbide comprises at least one of TiC, ZrC, HfC, VC, NbC, TaC, $Cr_2C_3$, $Mo_2C$, and WC.
137. The material as in the above item no. 135, wherein said nitride comprises at least one of TiN, ZrN, HfN, VN, NbN, and TaN.
138. The material as in the above item no. 21, wherein said first material comprises a carbide.
139. The material as in the above item no. 138, wherein said carbide comprises at least one of TiC, ZrC, HfC, VC, NbC, TaC, $Cr_2C_3$, $Mo_2C$, and WC.
140. The material as in the above item no. 21, wherein said first material comprises a boride.
141. The material as in the above item no. 140, wherein said boride is one of $TiB_2$, $ZrB_2$, $HfB_2$, $TaB_2$, $VB_2$, $MoB_2$, WB, and $W_2B$.
142. The material as in the above item no. 21, wherein said first material comprises a silicide.
143. The material as in the above item no. 142, wherein said silicide is one of $TaSi_2$, $WSi_2$, $NbSi_2$, and $MoSi_2$.
144. The material as in the above item no. 21, wherein said first material comprises a nitride.
145. The material as in the above item no. 144, wherein said nitride comprises at least one of TiN, ZrN, HfN, VN, NbN, and TaN.
146. The material as in the above item no. 144, wherein said first material further comprises a carbide.
147. The material as in the above item no. 146, wherein said carbide comprises at least one of TiC, ZrC, HfC, VC, NbC, TaC, $Cr_2C_3$, $Mo_2C$, and WC.
148. The material as in the above item no. 147, wherein said nitride comprises at least one of TiN, ZrN, HfN, VN, NbN, and TaN.
149. The material as in the above item no. 22, wherein said first material comprises a boride.
150. The material as in the above item no. 149, wherein said boride is one of $TiB_2$, $ZrB_2$, $HfB_2$, $TaB_2$, $VB_2$, $MoB_2$, WB, and $W_2B$.
151. The material as in the above item no. 22, wherein said first material comprises a silicide.
152. The material as in the above item no. 151, wherein said silicide is one of $TaSi_2$, $WSi_2$, $NbSi_2$, and $MoSi_2$.
153. The material as in the above item no. 22, wherein said first material comprises a carbide.
154. The material as in the above item no. 153, wherein said carbide comprises at least one of TiC, ZrC, HfC, VC, NbC, TaC, $Cr_2C_3$, $Mo_2C$, and WC.
155. The material as in the above item no. 22, wherein said first material further comprises a nitride.
156. The material as in the above item no. 155, wherein said nitride includes at least one of TiN, ZrN, HfN, VN, NbN, and TaN.
157. The material as in the above item no. 155, wherein said first material further comprises a carbide.
158. The material as in the above item no. 157, wherein said carbide comprises at least one of TiC, ZrC, HfC, VC, NbC, TaC, $Cr_2C_3$, $Mo_2C$, and WC.
159. The material as in the above item no. 157, wherein said nitride comprises at least one of TiN, ZrN, HfN, VN, NbN, and TaN.
160. The material as in the above item no. 24, wherein said first material further comprises a nitride.
161. The material as in the above item no. 160, wherein said nitride comprises at least one of TiN, ZrN, HfN, VN, NbN, and TaN.
162. The material as in the above item no. 24, wherein said binder matrix further comprises cobalt(Co).
163. The material as in the above item no. 24, wherein Re is from about 1.5% to about 24.4% of the total weight of the material, and said Ni-based superalloy is from about 0.86% to about 4.88% of the total weight of the material, and
wherein the first material comprises TiC which is from about 3% to about 14.7% of the total weight of the material, TaC which is from about 3% to about 6.2% of the total weight of the material, and WC which is above about 64% and below about 88% of the total weight of the material.
164. The material as in the above item no. 26, wherein said binder matrix further comprises a Ni-based superalloy.
165. The material as in the above item no. 164, wherein said binder matrix further comprises Co.
166. The material as in the above item no. 27, wherein said binder matrix further comprises Co.
167. The material as in the above item no. 27, wherein said Re is from about 8.8% to about 23.8% of the total weight of the material, and said Ni-based superalloy is from about 3.0% to about 10.3% of the total weight of the material, and wherein said $Mo_2C$ is from about 13.8% to about 15.2% of the total weight of the material, and said TiC is from about 59.4% to about 65.7% of the total weight of the material.
168. The material as in the above item no. 47, wherein said first material further comprises a carbide.
169. The material as in the above item no. 168, wherein said carbide comprises at least one of TiC, ZrC, HfC, VC, NbC, TaC, $Cr_2C_3$, $Mo_2C$, and WC.
170. The material as in the above item no. 168, wherein said nitride comprises at least one of TiN, ZrN, HfN, VN, NbN, and TaN.
171. The material as in the above item no. 49, wherein said other elements comprise Cr, Co, Fe, Al, Ti, Mo, W, Nb, Ta, Hf, Zr, B, C, Re.
172. The material as in the above item no. 51, wherein said first material comprises a carbide.
173. The material as in the above item no. 172, wherein said first material further comprises a nitride.
174. The material as in the above item no. 50, wherein said other elements further comprise Fe, Ta, Hf, C, and Re.
175. The material as in the above item no. 51, wherein said first material comprises a nitride.
176. The material as in the above item no. 55, wherein Re is from about 0.4% to about 1.8% of the total weight of the material, said Ni-based superalloy from about 2.7% to about 4.5% of the total weight of the material, and said cobalt from about 3% to about 4.8% of the total weight of the material, and
wherein said first material comprises WC which is from about 90.4% to about 91.5% of the total weight of the material, and VC which is from about 0.3% to about 0.6% of the total weight of the material.
177. The material as in the above item no. 55, wherein said first material further comprises a nitride.
178. The material as in the above item no. 55, wherein said first material further comprises a carbide.
179. The material as in the above item no. 56, wherein said first material further comprises a nitride.
180. The material as in the above item no. 179, wherein said first material further comprises a carbide.
181. The material as in the above item no. 56, wherein said first material further comprises a carbide.

182. The material as in the above item no. 57, wherein said first material further comprises a nitride.
183. The material as in the above item no. 182, wherein said first material further comprises a carbide.
184. The material as in the above item no. 57, wherein said first material further comprises a carbide.
185. The material as in the above item no. 58, wherein said first material further comprises a nitride.
186. The material as in the above item no. 185, wherein said first material further comprises a carbide.
187. The material as in the above item no. 58, wherein said first material further comprises a carbide.
188. The material as in the above item no. 59, wherein said first material further comprises a nitride.
189. The material as in the above item no. 188, wherein said first material further comprises a carbide.
190. The material as in the above item no. 59, wherein said first material further comprises a carbide.
191. The material as in the above item no. 60, wherein said first material further comprises a nitride.
192. The material as in the above item no. 191, wherein said first material further comprises a carbide.
193. The material as in the above item no. 60, wherein said first material further comprises a carbide.
194. The device as in the above item no. 75, wherein said first material comprises a carbide.
195. The device as in the above item no. 194, wherein said carbide comprises at least one of TiC, ZrC, HfC, VC, NbC, TaC, $Cr_2C_3$, $Mo_2C$, and WC.
196. The device as in the above item no. 75, wherein said first material further comprises a nitride.
197. The device as in the above item no. 196, wherein said nitride comprises at least one of TiN, ZrN, HfN, VN, NbN, and TaN.
198. The device as in the above item no. 196, wherein said first material further comprises a carbide.
199. The device as in the above item no. 198, wherein said first material comprises WC, TiC, TaC and $Mo_2C$.
200. The device as in the above item no. 198, wherein said carbide comprises at least one of TiC, ZrC, HfC, VC, NbC, TaC, $Cr_2C_3$, $Mo_2C$, and WC.
201. The device as in the above item no. 198, wherein said nitride comprises at least one of TiN, ZrN, HfN, VN, NbN, and TaN.
202. The device as in the above item no. 75, wherein said first material further comprises a boride.
203. The device as in the above item no. 202, wherein said first material comprises at least one of $TiB_2$, $ZrB_2$, $HfB_2$, $TaB_2$, $VB_2$, $MoB_2$, WB, and $W_2B$.
204. The device as in the above item no. 75, wherein said first material further comprises at least one boride and at least one carbide.
205. The device as in the above item no. 204, wherein said first material comprises WC, TiC, TaC, and $B_4C$.
206. The device as in the above item no. 75, wherein said first material comprises a silicide.
207. the device as in the above item no. 75, wherein said first material comprises at least one of $TaSi_2$, $WSi_2$, $NbSi_2$, and $MoSi_2$.
208. The device as in the above item no. 75, wherein said Re is from about 9.04% to about 9.32% of the total weight of the material, and said Ni-based superalloy is from about 3.53% to about 3.64% of the total weight of the material, and
wherein said first material comprises WC from about 67.24% to about 69.40% of the total weight of the material, TiC from about 6.35% to about 6.55% of the total weight of the material, TaC from about 6.24% to about 6.44% of, $TiB_2$ from about 0.40% to about 7.39% of the total weight of the material, and $B_4C$ from about 0.22% to about 4.25% of the total weight of the material.
209. The device as in the above item no. 75, wherein said Re is from about 8.96% to about 9.37% of the total weight of the material, and said Ni-based superalloy is from about 3.50% to about 3.66% of the total weight of the material, and
wherein said first material comprises WC from about 58.61% to about 66.67% of the total weight of the material, TiC from about 14.69% to about 15.37% of the total weight of the material, TaC from about 6.19% to about 6.47% of the total weight of the material, and $Mo_2C$ from 0 to about 6.51% of the total weight of the material.
210. The device as in the above item no. 75, wherein said binder matrix further comprises Ni.
211. The device as in the above item no. 75, wherein said binder matrix further comprises Fe.
212. The device as in the above item no. 75, wherein said binder matrix further comprises Mo.
213. The device as in the above item no. 75, wherein said binder matrix further comprises Cr.
214. The material as in the above item no. 83, wherein the Ni-based superalloy comprises mainly Ni and other elements which comprise Cr, Co, Fe, Al, Ti, Mo, W, Nb, Ta, Hf, Zr, B, C, Re.
215. The material as in the above item no. 91, wherein said first material comprises a carbide.
216. The material as in the above item no. 215, wherein said carbide comprises at least one of TiC, ZrC, HfC, VC, NbC, TaC, $Cr_2C_3$, $Mo_2C$, and WC.
217. The material as in the above item no. 91, wherein said first material further comprises a nitride.
218. The material as in the above item no. 217, wherein said nitride comprises at least one of TiN, ZrN, HfN, VN, NbN, and TaN.
219. The material as in the above item no. 217, wherein said first material further comprises a carbide.
220. The material as in the above item no. 219, wherein said carbide comprises at least one of TiC, ZrC, HfC, VC, NbC, TaC, $Cr_2C_3$, $Mo_2C$, and WC.
221. The material as in the above item no. 91, wherein said first material further comprises a boride.
222. The material as in the above item no. 221, wherein said first material comprises at least one of $TiB_2$, $ZrB_2$, $HfB_2$, $TaB_2$, $VB_2$, $MoB_2$, WB, and $W_2B$.
223. The material as in the above item no. 91, wherein said first material further comprises at least one boride and at least one carbide.
224. The material as in the above item no. 223, wherein said first material comprises WC, TiC, TaC, and $B_4C$.
225. The material as in the above item no. 91, wherein said first material comprises a silicide.
226. The material as in the above item no. 225, wherein said silicide comprises at least one of $TaSi_2$, $WSi_2$, $NbSi_2$, and $MoSi_2$.
227. The material as in the above item no. 91, wherein said binder matrix further comprises Ni.
228. The material as in the above item no. 91, wherein said binder matrix further comprises Fe.
229. The material as in the above item no. 91, wherein said binder matrix further comprises Mo.
230. The material as in the above item no. 91, wherein said binder matrix further comprises Cr.
231. The material as in the above item no. 92, wherein said first material comprises a carbide.

232. The material as in the above item no. 231, wherein said carbide comprises at least one of TiC, ZrC, HfC, VC, NbC, TaC, $Cr_2C_3$, $Mo_2C$, and WC.

233. The material as in the above item no. 92, wherein said first material further comprises a nitride.

234. The material as in the above item no. 233, wherein said nitride comprises at least one of TiN, ZrN, HfN, VN, NbN, and TaN.

235. The material as in the above item no. 233, wherein said first material further comprises a carbide.

236. The material as in the above item no. 235, wherein said carbide comprises at least one of TiC, ZrC, HfC, VC, NbC, TaC, $Cr_2C_3$, $Mo_2C$, and WC.

237. The material as in the above item no. 235, wherein said nitride comprises at least one of TiN, ZrN, HfN, VN, NbN, and TaN.

238. The material as in the above item no. 92, wherein said first material further comprises a boride.

239. The material as in the above item no. 238, wherein said first material comprises at least one of $TiB_2$, $ZrB_2$, $HfB_2$, $TaB_2$, $VB_2$, $MoB_2$, WB, and $W_2B$.

240. The material as in the above item no. 92, wherein said first material comprises a silicide.

241. The material as in the above item no. 92, wherein said first material comprises at least one of $TaSi_2$, $WSi_2$, $NbSi_2$, and $MoSi_2$.

242. The material as in the above item no. 92, wherein said second material further comprises at least one of Re, Ni, Co, Fe, Mo, and Cr.

243. The material as in the above item no. 92, wherein said second material further comprises at least another different Ni-based superalloy.

244. The material as in the above item no. 92, wherein said first material comprises WC from about 91.9% to about 92.5% of the total weight of the material, and VC from about 0.3% to about 0.6% of the total weight of the material, and wherein said Ni-based superalloy is from about 7.2% to about 7.5% of the total weight of the material.

245. The material as in the above item no. 92, wherein said first material comprises TiC and $Mo_2C$ which are about 69.44% and 16.09% of the total weight of the material, respectively, and wherein said Ni-based superalloy is about 14.47% of the total weight of the material.

246. The material as in the above item no. 93, wherein said first material comprises a carbide.

247. The material as in the above item no. 246, wherein said carbide comprises at least one of TiC, ZrC, HfC, VC, NbC, TaC, $Cr_2C_3$, $Mo_2C$, and WC.

248. The material as in the above item no. 93, wherein said first material further comprises a nitride.

249. The material as in the above item no. 248, wherein said nitride comprises at least one of TiN, ZrN, HfN, VN, NbN, and TaN.

250. The material as in the above item no. 249, wherein said first material further comprises a carbide.

251. The material as in the above item no. 250, wherein said carbide comprises at least one of TiC, ZrC, HfC, VC, NbC, TaC, $Cr_2C_3$, $Mo_2C$, and WC.

252. The material as in the above item no. 250, wherein said nitride comprises at least one of TiN, ZrN, HfN, VN, NbN, and TaN.

253. The material as in the above item no. 93, wherein said first material further comprises a boride.

254. The material as in the above item no. 253, wherein said first material comprises at least one of $TiB_2$, $ZrB_2$, $HfB_2$, $TaB_2$, $VB_2$, $MoB_2$, WB, and $W_2B$.

255. The material as in the above item no. 93, wherein said first material comprises a silicide.

256. The material as in the above item no. 93, wherein said first material comprises at least one of $TaSi_2$, $WSi_2$, $NbSi_2$, and $MoSi_2$.

257. The material as in the above item no. 93, wherein said second material further comprises at least one of Re, Ni, Co, Fe, Mo, and Cr.

258. The material as in the above item no. 93, wherein said second material further comprises at least another different Ni-based superalloy.

259. The material as in the above item no. 93, wherein said other elements in said nickel-based superalloy further comprise Fe, Ta, Hf, B, and C.

260. A method, comprising:
preparing a metal surface for a thermal spray process; and
performing the thermal spray process to coat a layer of a hardmetal layer over the metal surface,
wherein the hard metal layer comprises:
hard particles having a first material, and
a binder matrix having a second, different material, a volume of said second material being from about 3% to about 40% of a total volume of the material, said binder matrix comprising rhenium in an amount greater than 25% of a total weight of the material, wherein said hard particles are spatially dispersed in said binder matrix in a substantially uniform manner.

261. A method, comprising:
preparing a metal surface for a thermal spray process; and
performing the thermal spray process to coat a layer of a hardmetal layer over the metal surface,
wherein the hard metal layer comprises:
hard particles having a first material having a mixture selected from at least one from a group consisting of (1) a mixture of WC, TiC, and TaC, (2) a mixture of WC, TiC, and NbC, (3) a mixture of WC, TiC, and at least one of TaC and NbC, and (4) a mixture of WC, TiC, and at least one of HfC and NbC; and
a binder matrix having a second, different material, a volume of said binder matrix being from about 3% to about 40% of a total volume of the material, said binder matrix comprising rhenium, wherein said hard particles are spatially dispersed in said binder matrix in a substantially uniform manner.

262. A method, comprising:
preparing a metal surface for a thermal spray process; and
performing the thermal spray process to coat a layer of a hardmetal layer over the metal surface,
wherein the hard metal layer comprises:
hard particles having a first material having a mixture of Mo2C and TiC; and
a binder matrix having a second, different material, a volume of said binder matrix being from about 3% to about 40% of a total volume of the material, said binder matrix comprising rhenium, wherein said hard particles are spatially dispersed in said binder matrix in a substantially uniform manner.

263. A method, comprising:
preparing a metal surface for a thermal spray process; and
performing the thermal spray process to coat a layer of a hardmetal layer over the metal surface,
wherein the hard metal layer comprises:
hard particles having a first material; and
a binder matrix having a second, different material comprising a nickel-based superalloy, wherein said hard particles are spatially dispersed in said binder matrix in a substantially uniform manner.

264. A method, comprising:
preparing a metal surface for a thermal spray process; and
performing the thermal spray process to coat a layer of a hardmetal layer over the metal surface,
wherein the hard metal layer comprises:
hard particles having a first material comprising TiC and TiN; and
a binder matrix having a second, different material comprising at least one of Ni, Mo, and Mo2C, wherein said hard particles are spatially dispersed in said binder matrix in a substantially uniform manner.

265. A method, comprising:
preparing a metal surface for a thermal spray process; and
performing the thermal spray process to coat a layer of a hardmetal layer over the metal surface,
wherein the hard metal layer comprises:
hard particles having a first material selected from at least one from a group consisting of (1) a solid solution of WC, TiC, and TaC, (2) a solid solution of WC, TiC, and NbC, (3) a solid solution of WC, TiC, and at least one of TaC and NbC, and (4) a solid solution of WC, TiC, and at least one of HfC and NbC; and
a binder matrix having a second, different material, a volume of said binder matrix being from about 3% to about 40% of a total volume of the material, said binder matrix comprising rhenium, wherein said hard particles are spatially dispersed in said binder matrix in a substantially uniform manner.

In addition, a second group of 288 specific implementations described in this application is as follows.

1. A material, comprising:
hard particles comprising at least one carbide selected from at least one of WC, TiC, and HfC; and
a binder matrix that binds the hard particles and comprises rhenium,
wherein the hard particles are less than 75% of a total weight of the material and rhenium is greater than 25% of the total weight of the material.

2. The material as in above item no. 1, wherein the at least one carbide is TiC which is greater than about 26% of the total weight of the material and the rhenium is less than about 74% of the total weight of the material.

3. The material as in above item no. 1, wherein the at least one carbide is WC which is greater than about 53% of the total weight of the material, and the rhenium is less than about 47% of the total weight of the material.

4. The material as in above item no. 1, wherein the at least one carbide is HfC which is greater than about 48% of the total weight of the material, and the rhenium is less than about 52% of the total weight of the material.

5. A material, comprising:
hard particles comprising at least one carbide selected from carbides that are formed from elements in IVb, Vb, and VIb columns of the periodic table of elements, exclusive of WC, TiC, and HfC; and
a binder matrix that binds the hard particles and comprises rhenium,
wherein the hard particles are less than 75% of a total weight of the material and rhenium is between about 4% to 72% of the total weight of the material.

6. The material as in above item no. 5, wherein the at least one carbide is ZrC which is greater than about 32% of the total weight of the material, and the rhenium is less than about 68% of the total weight of the material.

7. The material as in above item no. 5, wherein the at least one carbide is VC which is greater than about 28% of the total weight of the material, and the rhenium is less than about 72% of the total weight of the material.

8. The material as in above item no. 5, wherein the at least one carbide is NbC which is greater than about 36% of the total weight of the material, and the rhenium is less than about 64% of the total weight of the material.

9. The material as in above item no. 5, wherein the at least one carbide is TaC which is greater than about 51% of the total weight of the material, and the rhenium is less than about 49% of the total weight of the material.

10. The material as in above item no. 5, wherein the at least one carbide is $Cr_2C_3$ which is greater than about 32% of the total weight of the material, and the rhenium is less than about 68% of the total weight of the material.

11. The material as in above item no. 5, wherein the at least one carbide is $Mo_2C$ which is greater than about 39% of the total weight of the material, and the rhenium is less than about 61% of the total weight of the material.

12. A material, comprising:
hard particles comprising at least one nitride from nitrides of IVB and Vb columns in the periodic table; and
a binder matrix that binds the hard particles and comprises rhenium, wherein the rhenium is between about 4% to about 72% of the total weight of the material.

13. The material as in above item no. 12, wherein the at least one nitride is TiN which is between about 28% to about 89% of the total weight of the material.

14. The material as in above item no. 12, wherein the at least one nitride is ZrN which is between about 34% to about 92% of the total weight of the material, and the rhenium is between about 8% to about 66% of the total weight of the material.

15. The material as in above item no. 12, wherein the at least one nitride is HfN which is between about 50% to about 96% of the total weight of the material, and the rhenium is between about 4% to about 50% of the total weight of the material.

16. The material as in above item no. 12, wherein the at least one nitride is VN which is between about 30% to about 91% of the total weight of the material, and the rhenium is between about 9% to about 70% of the total weight of the material.

17. The material as in above item no. 12, wherein the at least one nitride is NbN which is between about 34% to about 92% of the total weight of the material, and the rhenium is between about 8% to about 66% of the total weight of the material.

18. The material as in above item no. 12, wherein the at least one nitride is TaN which is between about 51% to about 96% of the total weight of the material, and the rhenium is between about 4% to about 49% of the total weight of the material.

19. A material, comprising:
hard particles comprising at least one nitride from nitrides of IVB and Vb columns in the periodic table; and
a binder matrix that binds the hard particles and comprises a Ni-based superalloy which is between about 1.7% to about 50% of a total weight of the material.

20. The material as in above item no. 19, wherein the at least one nitride is TiN between about 50% to about 96% of the total weight of the material and the Ni-based superalloy which is between about 4% to about 50% of the total weight of the material.

21. The material as in above item no. 19, wherein the at least one nitride is ZrN between about 58% to about 97% of the total weight of the material and the Ni-based superalloy which is between about 3% to about 42% of the total weight of the material.

22. The material as in above item no. 19, wherein the at least one nitride is HfN between about 72% to about 98.2% of the total weight of the material and the Ni-based superalloy which is between about 1.8% to about 28% of the total weight of the material.

23. The material as in above item no. 19, wherein the at least one nitride is VN between about 53% to about 96% of the total weight of the material and the Ni-based superalloy which is between about 4% to about 47% of the total weight of the material.

24. The material as in above item no. 19, wherein the at least one nitride is NbN between about 52% to about 97% of the total weight of the material and the Ni-based superalloy which is between about 3% to about 42% of the total weight of the material.

25. The material as in above item no. 19, wherein the at least one nitride is TaN between about 73% to about 98.3% of the total weight of the material and the Ni-based superalloy which is between about 1.7% to about 27% of the total weight of the material.

26. A material, comprising:
hard particles comprising at least one carbide from carbides of IVb, Vb, and VIb columns in the periodic table; and
a binder matrix that binds the hard particles and comprises rhenium and a Ni-based superalloy,
wherein the hard particles are between about 26.1% to about 98.4% of a total weight of the material.

27. The material as in above item no. 26, wherein the at least one carbide is TiC between about 26.1% to about 95.1% of the total weight of the material, the rhenium is not greater than about 73.6% of the total weight of the material, and the Ni-based superalloy is not greater than about 51.1% of the total weight of the material.

28. The material as in above item no. 26, wherein the at least one carbide is ZrC between about 32% to about 96% of the total weight of the material, the rhenium is not greater than about 67.7% of the total weight of the material, and the Ni-based superalloy is not greater than about 44.1% of the total weight of the material.

29. The material as in above item no. 26, wherein the at least one carbide is HfC between about 47.7% to about 98.1% of the total weight of the material, the rhenium is not greater about 52.1% of the total weight of the material, and the Ni-based superalloy is not greater about 29.2% of the total weight of the material.

30. The material as in above item no. 26, wherein the at least one carbide is VC between about 28.3% to about 95.6% of the total weight of the material, the rhenium does not exceed about 71.5% of the total weight of the material, and the Ni-based superalloy does exceed about 48.4% of the total weight of the material.

31. The material as in above item no. 26, wherein the at least one carbide is NbC between about 36% to about 96.9% of the total weight of the material, the rhenium is equal to or less than about 63.8% of the total weight of the material, and the Ni-based superalloy is equal to or less than about 39.9% of the total weight of the material.

32. The material as in above item no. 26, wherein the at least one carbide is TaC between about 51% to about 98.3% of the total weight of the material, the rhenium is equal to or less than about 48.8% of the total weight of the material, and the Ni-based superalloy is equal to or less than about 26.5% of the total weight of the material.

33. The material as in above item no. 26, wherein the at least one carbide is $Cr_2C_3$ between about 32.4% to about 96.4% of the total weight of the material, the rhenium is equal to or less than about 67.3% of the total weight of the material, and the Ni-based superalloy is equal to or less than about 43.6% of the total weight of the material.

34. The material as in above item no. 26, wherein the at least one carbide is $Mo_2C$ between about 39.6% to about 97.3% of the total weight of the material, the rhenium is equal to or less than about 60.2% of the total weight of the material, and the Ni-based superalloy is equal to or less than about 36.3% of the total weight of the material.

35. The material as in above item no. 26, wherein the at least one carbide is WC between about 52.9% to about 98.4% of the total weight of the material, the rhenium is equal to or less than about 46.9% of the total weight of the material, and the Ni-based superalloy is equal to or less than about 25% of the total weight of the material.

36. A material, comprising:
hard particles comprising at least one nitride from nitrides of IVb and Vb columns in the periodic table; and
a binder matrix that binds the hard particles and comprises rhenium and a Ni-based superalloy,
wherein the hard particles are between about 28% to about 98.3% of a total weight of the material.

37. The material as in above item no. 36, wherein the at least one nitride is TiN between about 28% to about 95.6% of the total weight of the material, the rhenium is equal to or less than about 71.7% of the total weight of the material, and the Ni-based superalloy is equal to or less than about 48.7% of the total weight of the material.

38. The material as in above item no. 36, wherein the at least one nitride is ZrN between about 34.5% to about 96.7% of the total weight of the material, the rhenium is equal to or less than about 65.3% of the total weight of the material, and the Ni-based superalloy is equal to or less than about 41.4% of the total weight of the material.

39. The material as in above item no. 36, wherein the at least one nitride is HfN between about 49.8% to about 98.2% of the total weight of the material, the rhenium is equal to or less than about 50% of the total weight of the material, and the Ni-based superalloy is equal to or less than about 27.5% of the total weight of the material.

40. The material as in above item no. 36, wherein the at least one nitride is VN between about 30% to about 96% of the total weight of the material, the rhenium is equal to or less than about 69.6% of the total weight of the material, and the Ni-based superalloy is equal to or less than about 46.2% of the total weight of the material.

41. The material as in above item no. 36, wherein the at least one nitride is NbN between about 34.4% to about 96.7% of the total weight of the material, the rhenium is equal to or less than about 65.3% of the total weight of the material, and the Ni-based superalloy is equal to or less than about 41.5% of the total weight of the material.

42. The material as in above item no. 36, wherein the at least one nitride is TaN between about 50.7% to about 98.3% of the total weight of the material, the rhenium is equal to or less than about 49.1% of the total weight of the material, and the Ni-based superalloy is equal to or less than about 26.8% of the total weight of the material.

43. A material, comprising:
hard particles comprising at least one carbide from carbides of IVb, Vb, and VIb columns in the periodic table; and
a binder matrix that binds the hard particles and comprises rhenium and cobalt, wherein the hard particles are between about 26.1% to about 98.2% of a total weight of the material.

44. The material as in above item no. 43, wherein the at least one carbide is TiC between about 26.1% to about 94.6% of the total weight of the material, the rhenium is equal to or less than about 73.6% of the total weight of the material, and the cobalt is equal to or less than about 54.1% of the total weight of the material.

45. The material as in above item no. 43, wherein the at least one carbide is ZrC between about 32% to about 96% of the total weight of the material, the rhenium is equal to or less than about 67.7% of the total weight of the material, and cobalt is equal to or less than about 47.1% of the total weight of the material.

46. The material as in above item no. 43, wherein the at least one carbide is HfC between about 47.6% to about 97.8% of the total weight of the material, the rhenium is equal to or less than about 52.1% of the total weight of the material, and the cobalt is equal to or less than about 31.8% of the total weight of the material.

47. The material as in above item no. 43, wherein the at least one carbide is VC between about 28.3% to about 95.1% of the total weight of the material, the rhenium is equal to or less than about 71.4% of the total weight of the material, and the cobalt is equal to or less than about 51.5% of the total weight of the material.

48. The material as in above item no. 43, wherein the at least one carbide is NbC between about 36% to about 96.5% of the total weight of the material, the rhenium is equal to or less than about 63.8% of the total weight of the material, and the cobalt is equal to or less than about 42.8% of the total weight of the material.

49. The material as in above item no. 43, wherein the at least one carbide is TaC between about 51% to about 98% of the total weight of the material, the rhenium is equal to or less than about 48.8% of the total weight of the material, and the cobalt is equal to or less than about 28.9% of the total weight of the material.

50. The material as in above item no. 43, wherein the at least one carbide is $Cr_2C_3$ between about 32.4% to about 96% of the total weight of the material, the rhenium is equal to or less than about 67.3% of the total weight of the material, and the cobalt is equal to or less than about 46.6% of the total weight of the material.

51. The material as in above item no. 43, wherein the at least one carbide is $Mo_2C$ between about 39.6% to about 97% of the total weight of the material, the rhenium is equal to or less than about 60.2% of the total weight of the material, and the cobalt is equal to or less than about 39.2% of the total weight of the material.

52. The material as in above item no. 43, wherein the at least one carbide is WC between about 52.9% to about 98.2% of the total weight of the material, the rhenium is equal to or less than about 46.9% of the total weight of the material, and the cobalt is equal to or less than about 27.4% of the total weight of the material.

53. A material, comprising:
hard particles comprising at least one nitride from nitrides of IVb and Vb columns in the periodic table; and
a binder matrix that binds the hard particles and comprises rhenium and cobalt,
wherein the hard particles are between about 28% to about 98% of a total weight of the material.

54. The material as in above item no. 53, wherein the at least one nitride is TiN between about 28% to about 95% of the total weight of the material, the rhenium is up to about 71.6% of the total weight of the material, and the cobalt is up to about 51.7% of the total weight of the material.

55. The material as in above item no. 53, wherein the at least one nitride is ZrN between about 34.5% to about 96.3% of the total weight of the material, the rhenium is up to about 65.3% of the total weight of the material, and the cobalt is up to about 44.4% of the total weight of the material.

56. The material as in above item no. 53, wherein the at least one nitride is HfN between about 49.8% to about 98% of the total weight of the material, the rhenium is up to about 50% of the total weight of the material, and the cobalt is up to about 30% of the total weight of the material.

57. The material as in above item no. 53, wherein the at least one nitride is VN between about 30% to about 95.5% of the total weight of the material, the rhenium is up to about 69.6% of the total weight of the material, and the cobalt is up to about 49.3% of the total weight of the material.

58. The material as in above item no. 53, wherein the at least one nitride is NbN between about 34.4% to about 96.3% of the total weight of the material, the rhenium is up to about 65.3% of the total weight of the material, and the cobalt is up to about 44.5% of the total weight of the material.

59. The material as in above item no. 53, wherein the at least one nitride is TaN between about 50.7% to about 98% of the total weight of the material, the rhenium is up to d about 49.1% of the total weight of the material, and the cobalt is up to about 29.2% of the total weight of the material.

60. A material, comprising:
hard particles comprising at least one carbide from carbides of IVb, Vb, and VIb columns in the periodic table; and
a binder matrix that binds the hard particles and comprises a Ni-based superalloy and cobalt,
wherein the hard particles are between about 45% to about 98% of a total weight of the material.

61. The material as in above item no. 60, wherein the at least one carbide is TiC between about 45% to about 95% of the total weight of the material, the Ni-based superalloy is up to about 51.5% of the total weight of the material, and the cobalt is up to about 54.5% of the total weight of the material.

62. The material as in above item no. 60, wherein the at least one carbide is ZrC between about 52% to about 96% of the total weight of the material, the Ni-based superalloy is up to about 44.4% of the total weight of the material, and cobalt is up to about 47.4% of the total weight of the material.

63. The material as in above item no. 60, wherein the at least one carbide is HfC between about 68% to about 98% of the total weight of the material, the Ni-based superalloy is up to about 29% of the total weight of the material, and the cobalt is up to about 32% of the total weight of the material.

64. The material as in above item no. 60, wherein the at least one carbide is VC between about 48% to about 96% of the total weight of the material, the Ni-based superalloy is up to about 49% of the total weight of the material, and the cobalt is up to about 52% of the total weight of the material.

65. The material as in above item no. 60, wherein the at least one carbide is NbC between about 57% to about 97% of the total weight of the material, the Ni-based superalloy is up to about 40% of the total weight of the material, and the cobalt is up to about 43% of the total weight of the material.

66. The material as in above item no. 60, wherein the at least one carbide is TaC between about 71% to about 98% of the total weight of the material, the Ni-based superalloy is up to about 27% of the total weight of the material, and the cobalt is up to about 29% of the total weight of the material.

67. The material as in above item no. 60, wherein the at least one carbide is $Cr_2C_3$ between about 53% to about 96% of the total weight of the material, the Ni-based superalloy is up to about 67.3% of the total weight of the material, and the cobalt is up to about 44% of the total weight of the material.

68. The material as in above item no. 60, wherein the at least one carbide is $Mo_2C$ between about 60% to about 97% of the total weight of the material, the Ni-based superalloy is up to about 36.5% of the total weight of the material, and the cobalt is up to about 39% of the total weight of the material.

69. The material as in above item no. 60, wherein the at least one carbide is WC between about 72% to about 98% of the total weight of the material, the Ni-based superalloy is up to about 46.9% of the total weight of the material, and the cobalt is up to about 27.5% of the total weight of the material.

70. A material, comprising:
hard particles comprising at least one nitride from nitrides of IVb and Vb columns in the periodic table; and
a binder matrix that binds the hard particles and comprises a Ni-based superalloy and cobalt,
wherein the hard particles are between about 47% to about 98% of a total weight of the material.

71. The material as in above item no. 70, wherein the at least one nitride is TiN between about 47% to about 96% of the total weight of the material, the Ni-based superalloy is up to about 49% of the total weight of the material, and the cobalt is up to about 52% of the total weight of the material.

72. The material as in above item no. 70, wherein the at least one nitride is ZrN between about 55% to about 97% of the total weight of the material, the Ni-based superalloy is up to about 42% of the total weight of the material, and the cobalt is up to about 45% of the total weight of the material.

73. The material as in above item no. 70, wherein the at least one nitride is HfN between about 70% to about 98% of the total weight of the material, the Ni-based superalloy is up to about 31% of the total weight of the material, and the cobalt is up to about 27% of the total weight of the material.

74. The material as in above item no. 70, wherein the at least one nitride is VN between about 50% to about 96% of the total weight of the material, the Ni-based superalloy is up to about 53% of the total weight of the material, and the cobalt is up to about 44% of the total weight of the material.

75. The material as in above item no. 70, wherein the at least one nitride is NbN between about 55% to about 97% of the total weight of the material, the Ni-based superalloy is up to about 47% of the total weight of the material, and the cobalt is up to about 40% of the total weight of the material.

76. The material as in above item no. 70, wherein the at least one nitride is TaN between about 70% to about 98% of the total weight of the material, the Ni-based superalloy is up to about 30% of the total weight of the material, and the cobalt is up to about 26% of the total weight of the material.

77. A material, comprising:
hard particles comprising at least one carbide from carbides of IVb, Vb, and VIb columns in the periodic table; and
a binder matrix that binds the hard particles and comprises rhenium, a Ni-based superalloy and cobalt,
wherein the hard particles are between about 26% to about 98.3% of a total weight of the material.

78. The material as in above item no. 77, wherein the at least one carbide is TiC between about 26% to about 95% of the total weight of the material, the rhenium is up to about 73.6% of the total weight of the material, the Ni-based superalloy is up to about 51.3% of the total weight of the material, and the cobalt is up to about 54.3% of the total weight of the material.

79. The material as in above item no. 77, wherein the at least one carbide is ZrC between about 32% to about 96% of the total weight of the material, the rhenium is up to about 67.7% of the total weight of the material, the Ni-based superalloy is up to about 44.2% of the total weight of the material, and the cobalt is up to about 47.2% of the total weight of the material.

80. The material as in above item no. 77, wherein the at least one carbide is HfC between about 48% to about 98% of the total weight of the material, the rhenium is up to about 52.1% of the total weight of the material, the Ni-based superalloy is up to about 29.3% of the total weight of the material, and the cobalt is up to about 31.8% of the total weight of the material.

81. The material as in above item no. 77, wherein the at least one carbide is VC between about 28% to about 96% of the total weight of the material, the rhenium is up to about 71.5% of the total weight of the material, the Ni-based superalloy is up to about 48.6% of the total weight of the material, and the cobalt is up to about 51.7% of the total weight of the material.

82. The material as in above item no. 77, wherein the at least one carbide is NbC between about 36% to about 97% of the total weight of the material, the rhenium is up to about 63.8% of the total weight of the material, the Ni-based superalloy is up to about 40% of the total weight of the material, and the cobalt is up to about 43% of the total weight of the material.

83. The material as in above item no. 77, wherein the at least one carbide is TaC between about 51% to about 98.3% of the total weight of the material, the rhenium is up to about 48.8% of the total weight of the material, the Ni-based superalloy is up to about 26.6% of the total weight of the material, and the cobalt is up to about 29% of the total weight of the material.

84. The material as in above item no. 77, wherein the at least one carbide is $Cr_2C_3$ between about 32% to about 96% of the total weight of the material, the rhenium is up to about 67.3% of the total weight of the material, the Ni-based superalloy is up to about 43.8% of the total weight of the material, and the cobalt is up to about 46.8% of the total weight of the material.

85. The material as in above item no. 77, wherein the at least one carbide is $Mo_2C$ between about 39% to about 97% of the total weight of the material, the rhenium is up to about 60.2% of the total weight of the material, the Ni-based superalloy is up to about 36.4% of the total weight of the material, and the cobalt is up to about 39.3% of the total weight of the material.

86. The material as in above item no. 77, wherein the at least one carbide is WC between about 53% to about 98% of the total weight of the material, the rhenium is up to about 46.9% of the total weight of the material, the Ni-based superalloy is up to about 25.1% of the total weight of the material, and the cobalt is up to about 27.5% of the total weight of the material.

87. A material, comprising:
hard particles comprising at least one nitride from nitrides of IVb and Vb columns in the periodic table; and
a binder matrix that binds the hard particles and comprises rhenium, a Ni-based superalloy, and cobalt,
wherein the hard particles are between about 28% to about 98.3% of a total weight of the material.

88. The material as in above item no. 87, wherein the at least one nitride is TiN between about 28% to about 96% of the total weight of the material, the rhenium is up to about 71.6% of the total weight of the material, the Ni-based superalloy is up to about 48.8% of the total weight of the material, and the cobalt is up to about 51.9% of the total weight of the material.

89. The material as in above item no. 87, wherein the at least one nitride is ZrN between about 34% to about 97% of the total weight of the material, the rhenium is up to about 65.3% of the total weight of the material, the Ni-based superalloy is up to about 41.6% of the total weight of the material, and the cobalt is up to about 44.6% of the total weight of the material.

90. The material as in above item no. 87, wherein the at least one nitride is HfN between about 50% to about 98% of the total weight of the material, the rhenium is up to about 50% of the total weight of the material, the Ni-based superalloy is up to about 27.5% of the total weight of the material, and the cobalt is up to about 30% of the total weight of the material.

91. The material as in above item no. 87, wherein the at least one nitride is VN between about 30% to about 96% of the total weight of the material, the rhenium is up to about 60% of the total weight of the material, the Ni-based superalloy is up to about 46.4% of the total weight of the material, and the cobalt is up to about 49% of the total weight of the material.

92. The material as in above item no. 87, wherein the at least one nitride is NbN between about 34% to about 97% of the total weight of the material, the rhenium is up to about 65% of the total weight of the material, the Ni-based superalloy is up to about 42% of the total weight of the material, and the cobalt is up to about 45% of the total weight of the material.

93. The material as in above item no. 87, wherein the at least one nitride is TaN between about 51% to about 98.3% of the total weight of the material, the rhenium is up to about 49% of the total weight of the material, the Ni-based superalloy is up to about 27% of the total weight of the material, and the cobalt is up to about 29% of the total weight of the material.

94. A material, comprising:
hard particles comprising WC and TiC which are between about 40% to about 96% and between about 0.3% to about 21% of a total weight of the material, respectively; and
a binder matrix that binds the hard particles and comprises rhenium which is between about 4% to about 54% of the total weight of the material.

95. A material, comprising:
hard particles comprising WC between about 44% to about 96% and TaC up to about 21% of a total weight of the material, respectively; and
a binder matrix that binds the hard particles and comprises rhenium which is between about 4% to about 48% of the total weight of the material.

96. A material, comprising:
hard particles comprising WC, TiC and TaC which are between about 36% to about 95%, up to about 22%, and up to about 25% of a total weight of the material, respectively; and
a binder matrix that binds the hard particles and comprises rhenium which is between about 4% to about 48% of a total weight of the material.

97. A material, comprising:
hard particles comprising WC and TiC which are between about 60% to about 98%, and up to about 25% of a total weight of the material, respectively; and
a binder matrix that binds the hard particles and comprises a Nickel-based superalloy which is between about 1.5% to about 31% of the total weight of the material.

98. A material, comprising:
hard particles comprising WC and TaC which are between about 63% to about 98%, and up to about 26% of a total weight of the material, respectively; and
a binder matrix that binds the hard particles and comprises a Nickel-based superalloy which is between about 1.5% to about 26% of the total weight of the material.

99. A material, comprising:
hard particles comprising WC, Tic and TaC which are between about 51% to about 98%, up to about 23%, and up to about 26% of a total weight of the material, respectively; and
a binder matrix that binds the hard particles and comprises a Nickel-based superalloy which is between about 1.5% to about 26% of the total weight of the material.

100. A material, comprising:
hard particles comprising WC and TiC which are between about 40% to about 98%, and up to about 24% of a total weight of the material, respectively; and
a binder matrix that binds the hard particles and comprises rhenium and a Nickel-based superalloy which are up to about 52% and 29% of the total weight of the material, respectively.

101. A material, comprising:
hard particles comprising WC and TaC which are between about 44% to about 98%, and up to about 24% of a total weight of the material, respectively; and
a binder matrix that binds the hard particles and comprises rhenium and a Nickel-based superalloy which are up to about 47% and about 25% of the total weight of the material, respectively.

102. A material, comprising:
hard particles comprising WC, TiC and TaC which are between about 40% to about 98%, up to about 23%, and up about 26% of a total weight of the material, respectively; and
a binder matrix that binds the hard particles and comprises rhenium and a Nickel-based superalloy which are up to about 53% and about 30% of the total weight of the material, respectively.

103. A material, comprising:
hard particles comprising WC and TiC which are between about 40% to about 98%, and up to about 23% of a total weight of the material, respectively; and a binder matrix that binds the hard particles and comprises rhenium and cobalt which are up to about 53% and about 31% of the total weight of the material, respectively.

104. A material, comprising:
hard particles comprising WC and TaC which are between about 44% to about 98%, and up to about 24% of a total weight of the material, respectively; and
a binder matrix that binds the hard particles and comprises rhenium and cobalt which are up to about 47% and about 28% of the total weight of the material, respectively.

105. A material, comprising:
hard particles comprising WC, Tic and TaC which are between about 40% to about 98%, up to about 23%, and up to about 26% of a total weight of the material, respectively; and
a binder matrix that binds the hard particles and comprises rhenium and cobalt which are up to about 53% and about 33% of the total weight of the material, respectively.

106. A material, comprising:
hard particles comprising WC and TiC which are between about 58% to about 98%, and up to about 24% of a total weight of the material, respectively; and
a binder matrix that binds the hard particles and comprises cobalt and a nickel-based superalloy which are up to about 33% and about 29% of the total weight of the material, respectively.

107. A material, comprising:
hard particles comprising WC and TaC which are between about 61% to about 98%, and up to about 24% of a total weight of the material, respectively; and
a binder matrix that binds the hard particles and comprises cobalt and a nickel-based superalloy which are up to about 28% and about 25% of the total weight of the material, respectively.

108. A material, comprising:
hard particles comprising WC, TiC and TaC which are between about 57% to about 98%, up to about 23%, and up to about 26% of a total weight of the material, respectively; and
a binder matrix that binds the hard particles and comprises cobalt and a nickel-based superalloy which are up to about 33% and about 30% of the total weight of the material, respectively.

109. A material, comprising:
hard particles comprising WC and TiC which are between about 40% to about 98%, and up to about 24% of a total weight of the material, respectively; and
a binder matrix that binds the hard particles and comprises cobalt up to about 32% of the total weight of the material, rhenium and a nickel-based superalloy which are up to about 54% and about 29% of the total weight of the material, respectively.

110. A material, comprising:
hard particles comprising WC and TaC which are between about 45% to about 98%, and up to about 24% of a total weight of the material, respectively; and
a binder matrix that binds the hard particles and comprises cobalt up to about 28% of the total weight of the material, rhenium and a nickel-based superalloy which are up to about 47% and about 26% of the total weight of the material, respectively.

111. A material, comprising:
hard particles comprising WC, TiC and TaC which are between about 35% to about 93%, up to about 25%, and up to about 26% of a total weight of the material, respectively; and a binder matrix that binds the hard particles and comprises cobalt up to about 44% of the total weight of the material, rhenium and a nickel-based superalloy which are up to about 65% and about 41% of the total weight of the material, respectively.

112. A material, comprising:
hard particles comprising TiC between about 19% to about 88% of a total weight of the material and $Mo_2C$ up to about 38% of the total weight of the material; and
a binder matrix that binds the hard particles and comprises rhenium between about 9.5% to about 65% of the total weight of the material.

113. A material, comprising:
hard particles comprising TiN between about 21% to about 89% of a total weight of the material and $Mo_2C$ up to about 36% of the total weight of the material; and
a binder matrix that binds the hard particles and comprises rhenium between about 9% to about 63% of the total weight of the material.

114. A material, comprising:
hard particles comprising TiC up to about 84% of a total weight of the material, TiN up to about 85% of the total weight of the material, and $Mo_2C$ up to about 36% of the total weight of the material; and
a binder matrix that binds the hard particles and comprises rhenium between about 9% to about 64% of the total weight of the material.

115. A material, comprising:
hard particles comprising TiC up to about 83% of a total weight of the material, TiN up to about 85% of the total weight of the material, $Mo_2C$ up to about 25% of the total weight of the material, WC up to about 39% of the total weight of the material, TaC up to about 30% of the total weight of the material, VC up to about 11% of the total weight of the material, and $Cr_2C_3$ up to about 16% of the total weight of the material; and
a binder matrix that binds the hard particles and comprises rhenium between about 6% to about 65% of the total weight of the material.

116. A material, comprising:
hard particles comprising TiC and $Mo_2C$ which are between about 30% to about 90% and up to about 40% of a total weight of the material, respectively; and
a binder matrix that binds the hard particles and comprises a nickel based superalloy which is between about 4% to about 41% of the total weight of the material.

117. A material, comprising:
hard particles comprising TiN and $Mo_2C$ which are up to about 91% and up to about 38% of a total weight of the material, respectively; and
a binder matrix that binds the hard particles and comprises a nickel based superalloy which is between about 4% to about 38% of the total weight of the material.

118. A material, comprising:
hard particles comprising TiC, TiN and $Mo_2C$ which are up to about 90%, about 91% and about 38% of a total weight of the material, respectively; and
a binder matrix that binds the hard particles and comprises a nickel based superalloy which is between about 4% to about 40% of the total weight of the material.

119. A material, comprising:
hard particles comprising TiC, TiN, $Mo_2C$, WC, and TaC which are up to about 90%, about 90%, about 25%, about 42%, and about 36% of a total weight of the material, respectively, the hard particles further comprising VC and $Cr_2C_3$ up to about 14% and 18% of the total weight of the material, respectively; and a binder matrix that binds the hard particles and comprises a nickel based superalloy which is between about 2% to about 40% of the total weight of the material.

120. A material, comprising:
hard particles comprising TiC, TiN and $Mo_2C$ which are up to about 90%, about 91% and about 38% of a total weight of the material, respectively; and
a binder matrix that binds the hard particles and comprises rhenium and a nickel based superalloy which are up to about 64% and about 40% of the total weight of the material, respectively.

121. A material, comprising:
hard particles comprising TiC, TiN, $Mo_2C$, WC, and TaC which are up to about 89%, about 90%, about 26%, about 42%, and about 33% of a total weight of the material, respectively, the hard particles further comprising VC and $Cr_2C_3$ up to about 16% and 18% of the total weight of the material, respectively; and
a binder matrix that binds the hard particles and comprises rhenium and a nickel based superalloy which are up to about 64% and about 40% of the total weight of the material, respectively.

122. A material, comprising:
hard particles comprising TiC, TiN and $Mo_2C$ which are up to about 90%, about 91% and about 38% of a total weight of the material, respectively; and
a binder matrix that binds the hard particles and comprises rhenium and nickel which are up to about 64% and about 42% of the total weight of the material, respectively.

123. A material, comprising:
hard particles comprising TiC, TiN, $Mo_2C$, WC, and TaC which are up to about 89%, about 90%, about 26%, about 42%, and about 33% of a total weight of the material, respectively, the hard particles further comprising VC and $Cr_2C_3$ up to about 16% and 18% of the total weight of the material, respectively; and
a binder matrix that binds the hard particles and comprises rhenium and nickel which are up to about 64% and about 42% of the total weight of the material, respectively.

124. A material, comprising:
hard particles comprising TiC, TiN and $Mo_2C$ which are up to about 90%, about 91% and about 38% of a total weight of the material, respectively; and
a binder matrix that binds the hard particles and comprises rhenium and cobalt which are up to about 64% and about 43% of the total weight of the material, respectively.

125. A material, comprising:
hard particles comprising TiC, TiN, $Mo_2C$, WC, and TaC which are up to about 89%, about 90%, about 26%, about 42%, and about 32% of a total weight of the material, respectively, the hard particles further comprising VC and $Cr_2C_3$ up to about 16% and 18% of the total weight of the material, respectively; and
a binder matrix that binds the hard particles and comprises rhenium and cobalt which are up to about 64% and about 43% of the total weight of the material, respectively.

126. A material, comprising:
hard particles comprising TiC, TiN and $Mo_2C$ which are up to about 90%, about 91% and about 38% of a total weight of the material, respectively; and
a binder matrix that binds the hard particles and comprises a nickel-based superalloy and cobalt which are up to about 40% and about 43% of the total weight of the material, respectively.

127. A material, comprising:
hard particles comprising TiC, TiN, $Mo_2C$, WC, and TaC which are up to about 89%, about 90%, about 26%, between about 42%, and about 33% of a total weight of the material, respectively, the hard particles further comprising VC and $Cr_2C_3$ up to about 16% and 18% of the total weight of the material, respectively; and
a binder matrix that binds the hard particles and comprises a nickel-based superalloy and cobalt which are up to about 40% and about 43% of the total weight of the material, respectively.

128. A material, comprising:
hard particles comprising TiC, TiN and $Mo_2C$ which are up to about 90%, about 91% and about 38% of a total weight of the material, respectively; and
a binder matrix that binds the hard particles and comprises a nickel-based superalloy and nickel which are up to about 40% and about 43% of the total weight of the material, respectively.

129. A material, comprising:
hard particles comprising TiC, TiN, $Mo_2C$, WC, and TaC which are up to about 89%, about 90%, about 26%, about 42%, and about 33% of a total weight of the material, respectively, the hard particles further comprising VC and $Cr_2C_3$ up to about 16% and 18% of the total weight of the material, respectively; and
a binder matrix that binds the hard particles and comprises a nickel-based superalloy and nickel which are up to about 40% and about 43% of the total weight of the material, respectively.

130. A material, comprising:
hard particles comprising TiC, TiN and $Mo_2C$ which are up to about 90%, about 91% and about 38% of a total weight of the material, respectively; and
a binder matrix that binds the hard particles and comprises rhenium, a nickel-based superalloy and cobalt which are up to about 64%, about 40% and about 42% of the total weight of the material, respectively.

131. A material, comprising:
hard particles comprising TiC, TiN, $Mo_2C$, WC, and TaC which are up to about 89%, about 90%, about 26%, about 42%, and about 33% of a total weight of the material, respectively, the hard particles further comprising VC and $Cr_2C_3$ up to about 16% and 18% of the total weight of the material, respectively; and
a binder matrix that binds the hard particles and comprises rhenium, a nickel-based superalloy and cobalt which are up to about 63%, about 39% and about 42% of the total weight of the material, respectively.

132. A material, comprising:
hard particles comprising TiC, TiN and $Mo_2C$ which are up to about 90%, about 91% and about 38% of a total weight of the material, respectively; and
a binder matrix that binds the hard particles and comprises rhenium, a nickel-based superalloy and nickel which are up to about 63%, about 40% and about 42% of the total weight of the material, respectively.

133. A material, comprising:
hard particles comprising TiC, TiN, $Mo_2C$, WC, and TaC which are up to about 89%, about 90%, about 26%, about 42%, and about 33% of a total weight of the material, respectively, the hard particles further comprising VC and $Cr_2C_3$ up to about 16% and 18% of the total weight of the material, respectively; and
a binder matrix that binds the hard particles and comprises rhenium, a nickel-based superalloy and nickel which are up to about 63%, about 39% and about 42% of the total weight of the material, respectively.

134. A material, comprising:
hard particles comprising TiC, TiN and Mo$_2$C which are up to about 90%, about 91% and about 38% of a total weight of the material, respectively; and
a binder matrix that binds the hard particles and comprises rhenium, nickel and cobalt which are up to about 63%, about 42% and about 42% of the total weight of the material, respectively.

135. A material, comprising:
hard particles comprising TiC, TiN, Mo$_2$C, WC, and TaC which are up to about 89%, about 90%, about 26%, about 42%, and about 33% of a total weight of the material, respectively, the hard particles further comprising VC and Cr$_2$C$_3$ up to about 16% and 18% of the total weight of the material, respectively; and
a binder matrix that binds the hard particles and comprises rhenium, a nickel and cobalt which are up to about 63%, about 42% and about 42% of the total weight of the material, respectively . . .

136. A material, comprising:
hard particles comprising TiC, TiN and Mo$_2$C which are up to about 90%, about 91% and about 38% of a total weight of the material, respectively; and
a binder matrix that binds the hard particles and comprises a nickel-based superalloy, nickel and cobalt which are up to about 40%, about 42% and about 43% of the total weight of the material, respectively.

137. A material, comprising:
hard particles comprising TiC, TiN, Mo$_2$C, WC, and TaC which are up to about 89%, about 90%, about 26%, about 42%, and about 33% of a total weight of the material, respectively, the hard particles further comprising VC and Cr$_2$C$_3$ up to about 16% and 18% of the total weight of the material, respectively; and
a binder matrix that binds the hard particles and comprises a nickel-based superalloy, nickel and cobalt which are up to about 40%, about 42% and about 42% of the total weight of the material, respectively.

138. A material, comprising:
hard particles comprising TiC, TiN and Mo$_2$C which are up to about 90%, about 91% and about 38% of a total weight of the material, respectively; and
a binder matrix that binds the hard particles and comprises rhenium, a nickel-based superalloy, nickel and cobalt which are up to about 63%, about 39%, about 42% and about 42% of the total weight of the material, respectively.

139. A material, comprising:
hard particles comprising TiC, TiN, Mo$_2$C, WC, and TaC which are up to about 89%, about 90%, about 26%, about 42%, and about 33% of a total weight of the material, respectively, the hard particles further comprising VC and Cr$_2$C$_3$ up to about 16% and 18% of the total weight of the material, respectively; and
a binder matrix that binds the hard particles and comprises rhenium, a nickel-based superalloy, nickel and cobalt which are up to about 63%, about 39%, about 42% and about 42% of the total weight of the material, respectively.

140. A material, comprising:
hard particles comprising at least one boride from borides of IVB, VB and VIB columns in the periodic table; and
a binder matrix that binds the hard particles and comprises rhenium, wherein the rhenium is between about 4% to about 76% of the total weight of the material.

141. The material as in above item no. 140, wherein the at least one boride is TiB$_2$ which is between about 24% to about 87.5% of the total weight of the material, and the rhenium is between about 12.5% to about 76% of the total weight of the material.

142. The material as in above item no. 140, wherein the at least one boride is ZrB$_2$ which is between about 30% to about 90.5% of the total weight of the material, and the rhenium is between about 9.5% to about 70% of the total weight of the material.

143. The material as in above item no. 140, wherein the at least one boride is HfB$_2$ which is between about 44.5% to about 94.5% of the total weight of the material, and the rhenium is between about 5.5% to about 55.5% of the total weight of the material.

144. The material as in above item no. 140, wherein the at least one boride is VB$_2$ which is between about 27% to about 89% of the total weight of the material, and the rhenium is between about 11% to about 73% of the total weight of the material.

145. The material as in above item no. 140, wherein the at least one boride is NbB$_2$ which is between about 34% to about 92% of the total weight of the material, and the rhenium is between about 8% to about 66% of the total weight of the material.

146. The material as in above item no. 140, wherein the at least one boride is TaB$_2$ which is between about 47% to about 95% of the total weight of the material, and the rhenium is between about 5% to about 53% of the total weight of the material.

147. The material as in above item no. 140, wherein the at least one boride is Cr$_3$B$_2$ which is between about 30.5% to about 90.5% of the total weight of the material, and the rhenium is between about 9.5% to about 69.5% of the total weight of the material.

148. The material as in above item no. 140, wherein the at least one boride is MoB$_2$ which is between about 36% to about 92.5% of the total weight of the material, and the rhenium is between about 7.5% to about 64% of the total weight of the material.

149. The material as in above item no. 140, wherein the at least one boride is WB which is between about 53% to about 96% of the total weight of the material, and the rhenium is between about 4% to about 47% of the total weight of the material.

150. The material as in above item no. 140, wherein the at least one boride is W$_2$B which is between about 53% to about 96% of the total weight of the material, and the rhenium is between about 4% to about 47% of the total weight of the material.

151. A material, comprising:
hard particles comprising at least one silicide from silicides of IVB, VB and VIB columns in the periodic table; and
a binder matrix that binds the hard particles and comprises rhenium, wherein the rhenium is between about 6% to about 77% of the total weight of the material.

152. The material as in above item no. 151, wherein the at least one silicide is Ti$_5$Si$_3$ which is between about 23% to about 87% of the total weight of the material, and the rhenium is between about 13% to about 77% of the total weight of the material.

153. The material as in above item no. 151, wherein the at least one silicide is Zr$_6$Si$_5$ which is between about 28% to about 90% of the total weight of the material, and the rhenium is between about 10% to about 72% of the total weight of the material.

154. The material as in above item no. 151, wherein the at least one silicide is NbSi$_2$ which is between about 31% to about 91% of the total weight of the material, and the rhenium is between about 9% to about 69% of the total weight of the material.

155. The material as in above item no. 151, wherein the at least one silicide is TaSi$_2$ which is between about 38% to about 93% of the total weight of the material, and the rhenium is between about 7% to about 62% of the total weight of the material.

156. The material as in above item no. 151, wherein the at least one silicide is MoSi$_2$ which is between about 31% to about 91% of the total weight of the material, and the rhenium is between about 9% to about 69% of the total weight of the material.

157. The material as in above item no. 151, wherein the at least one silicide is WSi$_2$ which is between about 40% to about 94% of the total weight of the material, and the rhenium is between about 6% to about 60% of the total weight of the material.

158. A material, comprising:
hard particles; and
a binder matrix that binds the hard particles and comprises tungsten.

159. The material as in above item no. 158, wherein the hard particles comprise at least one carbide from carbides of IVB, VB and VIB columns in the periodic table and the tungsten is between about 4% to about 72% of the total weight of the material.

160. The material as in above item no. 159, wherein the at least one carbide is TiC which is between about 28% and about 89% of the total weight of the material, and the tungsten is between about 11% and about 72% of the total weight of the material.

161. The material as in above item no. 159, wherein the at least one carbide is ZrC which is between about 34% and about 92% of the total weight of the material, and the tungsten is between about 8% and about 66% of the total weight of the material.

162. The material as in above item no. 159, wherein the at least one carbide is HfC which is between about 50% and about 96% of the total weight of the material, and the tungsten is between about 4% and about 50% of the total weight of the material.

163. The material as in above item no. 159, wherein the at least one carbide is VC which is between about 30% and about 90% of the total weight of the material, and the tungsten is between about 10% and about 70% of the total weight of the material.

164. The material as in above item no. 159, wherein the at least one carbide is NbC which is between about 38% and about 93% of the total weight of the material, and the tungsten is between about 7% and about 62% of the total weight of the material.

165. The material as in above item no. 159, wherein the at least one carbide is TaC which is between about 53% and about 96% of the total weight of the material, and the tungsten is between about 4% and about 47% of the total weight of the material.

166. The material as in above item no. 159, wherein the at least one carbide is Cr$_2$C$_3$ which is between about 34% and about 92% of the total weight of the material, and the tungsten is between about 8% and about 66% of the total weight of the material.

167. The material as in above item no. 159, wherein the at least one carbide is Mo$_2$C which is between about 41% and about 94% of the total weight of the material, and the tungsten is between about 6% and about 59% of the total weight of the material.

168. The material as in above item no. 159, wherein the at least one carbide is WC which is between about 55% and about 96% of the total weight of the material, and the tungsten is between about 4% and about 45% of the total weight of the material.

169. The material as in above item no. 158, wherein the hard particles comprise at least one nitride from nitrides of IVB and VB columns in the periodic table and the tungsten is between about 4% and about 72% of the total weight of the material.

170. The material as in above item no. 169, wherein the at least one nitride is TiN which is between about 28% and about 89% of the total weight of the material, and the tungsten is between about 11% and about 72% of the total weight of the material.

171. The material as in above item no. 169, wherein the at least one nitride is ZrN which is between about 36% and about 92% of the total weight of the material, and the tungsten is between about 8% and about 64% of the total weight of the material.

172. The material as in above item no. 169, wherein the at least one nitride is HfN which is between about 52% and about 96% of the total weight of the material, and the tungsten is between about 4% and about 48% of the total weight of the material.

173. The material as in above item no. 169, wherein the at least one nitride is VN which is between about 32% and about 91% of the total weight of the material, and the tungsten is between about 9% and about 68% of the total weight of the material.

174. The material as in above item no. 169, wherein the at least one nitride is NbN which is between about 36% and about 92% of the total weight of the material, and the tungsten is between about 8% and about 64% of the total weight of the material.

175. The material as in above item no. 169, wherein the at least one nitride is TaN which is between about 53% and about 96% of the total weight of the material, and the tungsten is between about 4% and about 47% of the total weight of the material.

176. The material as in above item no. 158, wherein the hard particles comprise at least one boride from borides of IVB, VB and VIB columns in the periodic table and the tungsten is between about 3% and about 74% of the total weight of the material.

177. The material as in above item no. 176, wherein the at least one boride is TiB$_2$ which is between about 26% and about 88% of the total weight of the material, and the tungsten is between about 12% and about 74% of the total weight of the material.

178. The material as in above item no. 176, wherein the at least one boride is ZrB$_2$ which is between about 32% and about 91% of the total weight of the material, and the tungsten is between about 9% and about 68% of the total weight of the material.

179. The material as in above item no. 176, wherein the at least one boride is HfB$_2$ which is between about 46% and about 95% of the total weight of the material, and the tungsten is between about 5% and about 54% of the total weight of the material.

180. The material as in above item no. 176, wherein the at least one boride is VB$_2$ which is between about 28% and about 90% of the total weight of the material, and the tungsten is between about 10% and about 72% of the total weight of the material.

181. The material as in above item no. 176, wherein the at least one boride is NbB$_2$ which is between about 36% and about 92% of the total weight of the material, and the tungsten is between about 8% and about 64% of the total weight of the material.

182. The material as in above item no. 176, wherein the at least one boride is $TaB_2$ which is between about 49% and about 95% of the total weight of the material, and the tungsten is between about 5% and about 51% of the total weight of the material.

183. The material as in above item no. 176, wherein the at least one boride is $Cr_3B_2$ which is between about 32% and about 91% of the total weight of the material, and the tungsten is between about 9% and about 68% of the total weight of the material.

184. The material as in above item no. 176, wherein the at least one boride is $MoB_2$ which is between about 38% and about 93% of the total weight of the material, and the tungsten is between about 7% and about 62% of the total weight of the material.

185. The material as in above item no. 176, wherein the at least one boride is WB which is between about 55% and about 96% of the total weight of the material, and the tungsten is between about 4% and about 45% of the total weight of the material.

186. The material as in above item no. 176, wherein the at least one boride is $W_2B$ which is between about 56% and about 97% of the total weight of the material, and the tungsten is between about 3% and about 44% of the total weight of the material.

187. The material as in above item no. 158, wherein the hard particles comprise at least one silicide from silicides of IVB, VB and VIB columns in the periodic table and the tungsten is between about 6% and about 75% of the total weight of the material.

188. The material as in above item no. 187, wherein the at least one silicide is $Ti_5Si_3$ which is between about 25% and about 88% of the total weight of the material, and the tungsten is between about 12% and about 75% of the total weight of the material.

189. The material as in above item no. 187, wherein the at least one silicide is $Zr_6Si_5$ which is between about 30% and about 90% of the total weight of the material, and the tungsten is between about 10% and about 70% of the total weight of the material.

190. The material as in above item no. 187, wherein the at least one silicide is $NbSi_2$ which is between about 33% and about 91% of the total weight of the material, and the tungsten is between about 9% and about 67% of the total weight of the material.

191. The material as in above item no. 187, wherein the at least one silicide is $TaSi_2$ which is between about 40% and about 93% of the total weight of the material, and the tungsten is between about 7% and about 60% of the total weight of the material.

192. The material as in above item no. 187, wherein the at least one silicide is $MoSi_2$ which is between about 31% and about 91% of the total weight of the material, and the tungsten is between about 9% and about 67% of the total weight of the material.

193. The material as in above item no. 187, wherein the at least one silicide is $WSi_2$ which is between about 42% and about 94% of the total weight of the material, and the tungsten is between about 6% and about 58% of the total weight of the material.

194. The material as in above item no. 158, wherein the binder matrix material further comprises rhenium in addition to tungsten.

195. The material as in above item no. 194, wherein the hard particles comprise at least one carbide from carbides of IVB, VB and VIB columns in the periodic table, and
wherein the rhenium is less than about 73% and tungsten is less than about 72% of the total weight of the material.

196. The material as in above item no. 195, wherein the at least one carbide is TiC which is between about 26% and about 89% of the total weight of the material.

197. The material as in above item no. 195, wherein the at least one carbide is ZrC which is between about 32% and about 92% of the total weight of the material.

198. The material as in above item no. 195, wherein the at least one carbide is HfC which is between about 48% and about 95% of the total weight of the material.

199. The material as in above item no. 195, wherein the at least one carbide is VC which is between about 28% and about 90% of the total weight of the material.

200. The material as in above item no. 195, wherein the at least one carbide is NbC which is between about 36% and about 93% of the total weight of the material.

201. The material as in above item no. 195, wherein the at least one carbide is TaC which is between about 51% and about 96% of the total weight of the material.

202. The material as in above item no. 195, wherein the at least one carbide is $Cr_2C_3$ which is between about 32% and about 92% of the total weight of the material.

203. The material as in above item no. 195, wherein the at least one carbide is $Mo_2C$ which is between about 39% and about 94% of the total weight of the material.

204. The material as in above item no. 195, wherein the at least one carbide is WC which is between about 53% and about 96% of the total weight of the material.

205. The material as in above item no. 194, wherein the hard particles comprise at least one nitride from nitrides of IVB and VB columns in the periodic table, and
wherein the rhenium is less than about 71% and tungsten is less than about 70% of the total weight of the material.

206. The material as in above item no. 205, wherein the at least one nitride is TiN which is between about 28% and about 90% of the total weight of the material.

207. The material as in above item no. 205, wherein the at least one nitride is ZrN which is between about 34% and about 92% of the total weight of the material.

208. The material as in above item no. 205, wherein the at least one nitride is HfN which is between about 50% and about 96% of the total weight of the material.

209. The material as in above item no. 205, wherein the at least one nitride is VN which is between about 30% and about 91% of the total weight of the material.

210. The material as in above item no. 205, wherein the at least one nitride is NbN which is between about 35% and about 92% of the total weight of the material.

211. The material as in above item no. 205, wherein the at least one nitride is TaN which is between about 51% and about 96% of the total weight of the material.

212. The material as in above item no. 194, wherein the hard particles comprise at least one boride from borides of IVB, VB and VIB columns in the periodic table, and
wherein the rhenium is less than about 75% and tungsten is less than about 73% of the total weight of the material.

213. The material as in above item no. 212, wherein the at least one boride is $TiB_2$ which is between about 24% and about 88% of the total weight of the material.

214. The material as in above item no. 212, wherein the at least one boride is $ZrB_2$ which is between about 30% and about 91% of the total weight of the material.

215. The material as in above item no. 212, wherein the at least one boride is HfB$_2$ which is between about 44% and about 95% of the total weight of the material.
215A. The material as in above item no. 212, wherein the at least one boride is VB$_2$ which is between about 27% and about 90% of the total weight of the material.
216. The material as in above item no. 212, wherein the at least one boride is NbrB$_2$ which is between about 34% and about 92% of the total weight of the material.
217. The material as in above item no. 212, wherein the at least one boride is TaB$_2$ which is between about 47% and about 96% of the total weight of the material.
218. The material as in above item no. 212, wherein the at least one boride is Cr$_3$B$_2$ which is between about 32% and about 91% of the total weight of the material.
219. The material as in above item no. 212, wherein the at least one boride is MoB$_2$ which is between about 36% and about 93% of the total weight of the material.
220. The material as in above item no. 212, wherein the at least one boride is WB which is between about 53% and about 96% of the total weight of the material.
221. The material as in above item no. 212, wherein the at least one boride is W$_2$B which is between about 54% and about 97% of the total weight of the material.
223. The material as in above item no. 194, wherein the hard particles comprise at least one silicide from silicides of IVB, VB and VIB columns in the periodic table, and
wherein the rhenium is less than about 76% and tungsten is less than about 74% of the total weight of the material.
224. The material as in above item no. 223, wherein the at least one silicide is Ti$_5$Si$_3$ which is between about 24% and about 88% of the total weight of the material.
225. The material as in above item no. 223, wherein the at least one silicide is Zr$_6$Si$_5$ which is between about 28% and about 90% of the total weight of the material.
226. The material as in above item no. 223, wherein the at least one silicide is NbSi$_2$ which is between about 31% and about 91% of the total weight of the material.
227. The material as in above item no. 223, wherein the at least one silicide is TaSi$_2$ which is between about 38% and about 93% of the total weight of the material.
228. The material as in above item no. 223, wherein the at least one silicide is MoSi$_2$ which is between about 31% and about 91% of the total weight of the material.
229. The material as in above item no. 223, wherein the at least one silicide is WSi$_2$ which is between about 40% and about 94% of the total weight of the material.
230. A material, comprising:
hard particles comprising at least one nitride from nitrides of IVB and VB columns in the periodic table; and
a binder matrix that binds the hard particles and comprises rhenium which is less than 71% of a total weight of the material and cobalt which is less than 52% of the total weight of the material.
231. The material as in above item no. 230, wherein the at least one nitride is TiN which is between about 28% and about 95% of the total weight of the material.
232. The material as in above item no. 230, wherein the at least one nitride is ZrN which is between about 34% and about 96% of the total weight of the material.
233. The material as in above item no. 230, wherein the at least one nitride is HfN which is between about 50% and about 98% of the total weight of the material.
234. The material as in above item no. 230, wherein the at least one nitride is VN which is between about 30% and about 96% of the total weight of the material.
235. The material as in above item no. 230, wherein the at least one nitride is NbN which is between about 34% and about 96% of the total weight of the material.
236. The material as in above item no. 230, wherein the at least one nitride is TaN which is between about 51% and about 98% of the total weight of the material.
237. A material, comprising:
hard particles comprising at least one boride from borides of IVB, VB and VIB columns in the periodic table; and
a binder matrix that binds the hard particles and comprises rhenium which is less than 75% of a total weight of the material and cobalt which is less than 56% of the total weight of the material.
238. The material as in above item no. 237, wherein the at least one boride is TiB$_2$ which is between about 24% and about 34% of the total weight of the material.
239. The material as in above item no. 237, wherein the at least one boride is ZrB$_2$ which is between about 30% and about 96% of the total weight of the material.
240. The material as in above item no. 237, wherein the at least one boride is HfB$_2$ which is between about 45% and about 98% of the total weight of the material.
241. The material as in above item no. 237, wherein the at least one boride is VB$_2$ which is between about 27% and about 95% of the total weight of the material.
242. The material as in above item no. 237, wherein the at least one boride is NbB$_2$ which is between about 34% and about 96% of the total weight of the material.
243. The material as in above item no. 237, wherein the at least one boride is TaB$_2$ which is between about 48% and about 98% of the total weight of the material.
244. The material as in above item no. 237, wherein the at least one boride is Cr$_3$B$_2$ which is between about 30% and about 96% of the total weight of the material.
245. The material as in above item no. 237, wherein the at least one boride is MoB$_2$ which is between about 36% and about 97% of the total weight of the material.
246. The material as in above item no. 237, wherein the at least one boride is WB which is between about 53% and about 98% of the total weight of the material.
247. The material as in above item no. 237, wherein the at least one boride is W$_2$B which is between about 55% and about 98% of the total weight of the material.
248. A material, comprising:
hard particles comprising at least one silicide from silicides of IVB and VB columns in the periodic table; and
a binder matrix that binds the hard particles and comprises rhenium which is less than 76% of a total weight of the material and cobalt which is less than 57% of the total weight of the material.
249. The material as in above item no. 248, wherein the at least one silicide is Ti$_5$Si$_3$ which is between about 24% and about 94% of the total weight of the material.
250. The material as in above item no. 248, wherein the at least one silicide is Zr$_6$Si$_3$ which is between about 28% and about 95% of the total weight of the material.
251. The material as in above item no. 248, wherein the at least one silicide is NbSi$_2$ which is between about 31% and about 96% of the total weight of the material.
252. The material as in above item no. 248, wherein the at least one silicide is TaSi$_2$ which is between about 38% and about 97% of the total weight of the material.
253. The material as in above item no. 248, wherein the at least one silicide is MoSi$_2$ which is between about 31% and about 96% of the total weight of the material.

254. The material as in above item no. 248, wherein the at least one silicide is $WSi_2$ which is between about 40% and about 97% of the total weight of the material.

255. A material, comprising:
hard particles comprising at least one carbide from carbides of IVB, VB and VIB columns in the periodic table; and
a binder matrix that binds the hard particles and comprises rhenium which is less than 74% of a total weight of the material and molybdenum which is less than 57% of the total weight of the material.

256. The material as in above item no. 255, wherein the at least one carbide is TiC which is between about 26% and about 94% of the total weight of the material.

257. The material as in above item no. 255, wherein the at least one carbide is ZrC which is between about 32% and about 95% of the total weight of the material.

258. The material as in above item no. 255, wherein the at least one carbide is HfC which is between about 48% and about 98% of the total weight of the material.

259. The material as in above item no. 255, wherein the at least one carbide is VC which is between about 28% and about 95% of the total weight of the material.

260. The material as in above item no. 255, wherein the at least one carbide is NbC which is between about 36% and about 98% of the total weight of the material.

261. The material as in above item no. 255, wherein the at least one carbide is TaC which is between about 51% and about 98% of the total weight of the material.

262. The material as in above item no. 255, wherein the at least one carbide is $Cr_2C_3$ which is between about 32% and about 95% of the total weight of the material.

263. The material as in above item no. 255, wherein the at least one carbide is $Mo_2C$ which is between about 40% and about 97% of the total weight of the material.

264. The material as in above item no. 255, wherein the at least one carbide is WC which is between about 53% and about 98% of the total weight of the material.

265. A material, comprising:
hard particles comprising at least one carbide from carbides of IVB, VB and VIB columns in the periodic table; and
a binder matrix that binds the hard particles and comprises rhenium which is less than 74% of a total weight of the material and nickel which is less than 54% of the total weight of the material.

266. The material as in above item no. 265, wherein the at least one carbide is TiC which is between about 26% and about 95% of the total weight of the material.

267. The material as in above item no. 265, wherein the at least one carbide is ZrC which is between about 32% and about 96% of the total weight of the material.

268. The material as in above item no. 265, wherein the at least one carbide is HfC which is between about 48% and about 98% of the total weight of the material.

269. The material as in above item no. 265, wherein the at least one carbide is VC which is between about 28% and about 95% of the total weight of the material.

270. The material as in above item no. 265, wherein the at least one carbide is NbC which is between about 36% and about 97% of the total weight of the material.

271. The material as in above item no. 265, wherein the at least one carbide is TaC which is between about 51% and about 98% of the total weight of the material.

272. The material as in above item no. 265, wherein the at least one carbide is $Cr_2C_3$ which is between about 32% and about 96% of the total weight of the material.

273. The material as in above item no. 265, wherein the at least one carbide is $Mo_2C$ which is between about 40% and about 97% of the total weight of the material.

274. The material as in above item no. 265, wherein the at least one carbide is WC which is between about 53% and about 98% of the total weight of the material.

275. A material, comprising:
hard particles comprising at least one carbide from carbides of IVB, VB and VIB columns in the periodic table; and
a binder matrix that binds the hard particles and comprises rhenium which is less than 74% of a total weight of the material and chromium which is less than 48% of the total weight of the material.

276. The material as in above item no. 275, wherein the at least one carbide is TiC which is between about 26% and about 96% of the total weight of the material.

277. The material as in above item no. 275, wherein the at least one carbide is ZrC which is between about 32% and about 97% of the total weight of the material.

278. The material as in above item no. 275, wherein the at least one carbide is HfC which is between about 48% and about 98% of the total weight of the material.

279. The material as in above item no. 275, wherein the at least one carbide is VC which is between about 28% and about 95% of the total weight of the material.

280. The material as in above item no. 275, wherein the at least one carbide is NbC which is between about 36% and about 97% of the total weight of the material.

281. The material as in above item no. 275, wherein the at least one carbide is TaC which is between about 51% and about 98% of the total weight of the material.

282. The material as in above item no. 275, wherein the at least one carbide is $Cr_2C_3$ which is between about 32% and about 97% of the total weight of the material.

283. The material as in above item no. 275, wherein the at least one carbide is $Mo_2C$ which is between about 40% and about 98% of the total weight of the material.

284. The material as in above item no. 275, wherein the at least one carbide is WC which is between about 53% and about 98.6% of the total weight of the material.

285. A method, comprising:
preparing a metal surface for a thermal spray process; and
performing the thermal spray process to deposit a hard-metal over the metal surface,
wherein the hard metal comprises:
hard particles comprising at least a material made of a carbide, nitride, boride, or silicide; and
a binder matrix to bind the hard particles and comprising at least rhenium.

286. A method, comprising:
preparing a metal surface for a thermal spray process; and
performing the thermal spray process to deposit a hard-metal over the metal surface,
wherein the hard metal comprises:
hard particles comprising at least a material made of a carbide, nitride, boride, or silicide; and
a binder matrix to bind the hard particles and comprising at least a Ni-based superalloy.

287. A method, comprising:
preparing a metal surface for a thermal spray process; and
performing the thermal spray process to deposit a hard-metal over the metal surface,
wherein the hard metal comprises:
hard particles comprising at least a material made of a carbide, nitride, boride, or silicide; and a binder matrix to bind the hard particles and comprising at least tungsten.

These and other features, implementations, and advantages are now described in details with respect to the drawings, the detailed description, and the claims.

DRAWING DESCRIPTION

FIGS. 3, 4, 5, 6, 7, and 8 show various measured properties of selected exemplary hardmetals.

Figure 9:
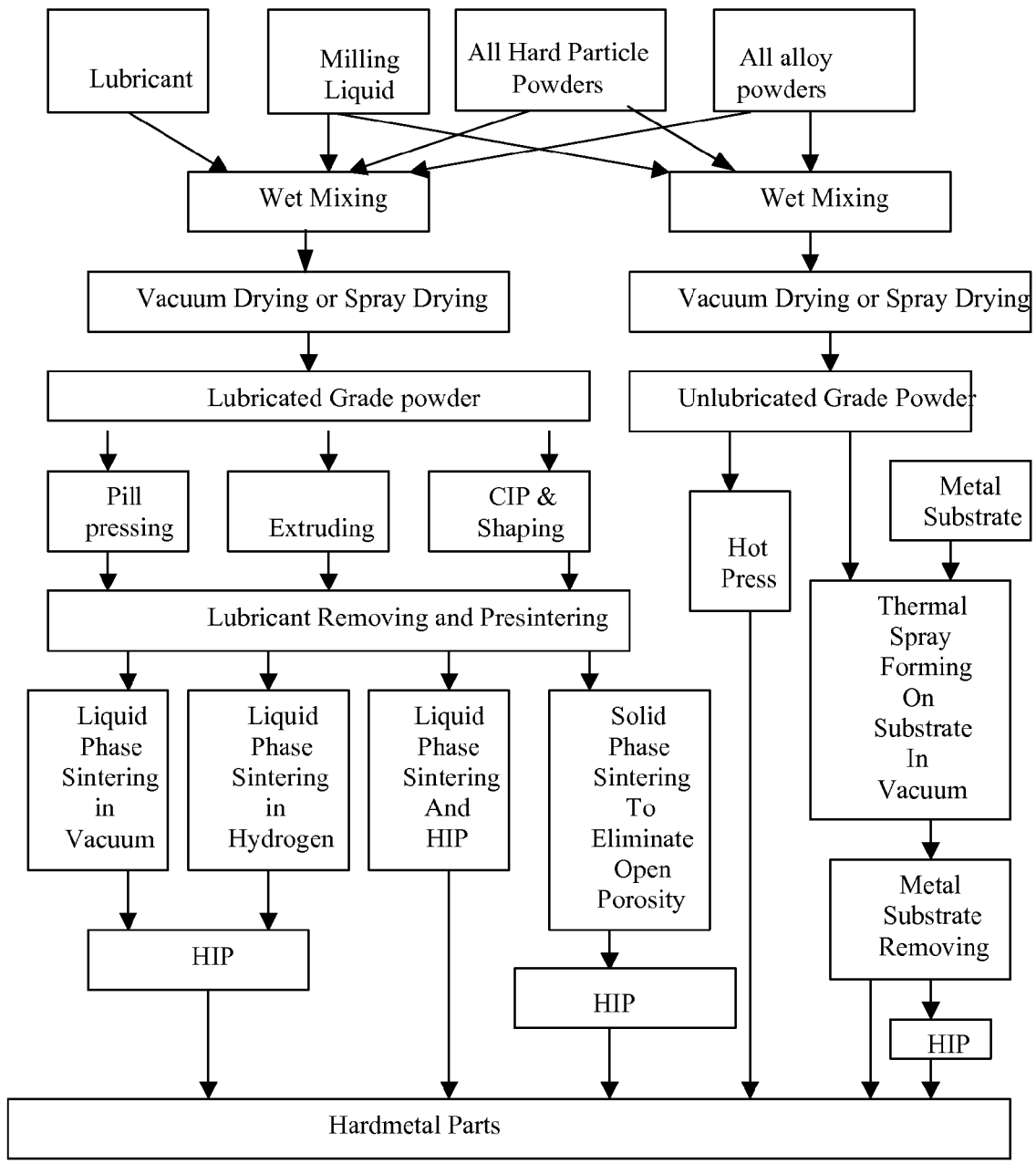
Figure 10:
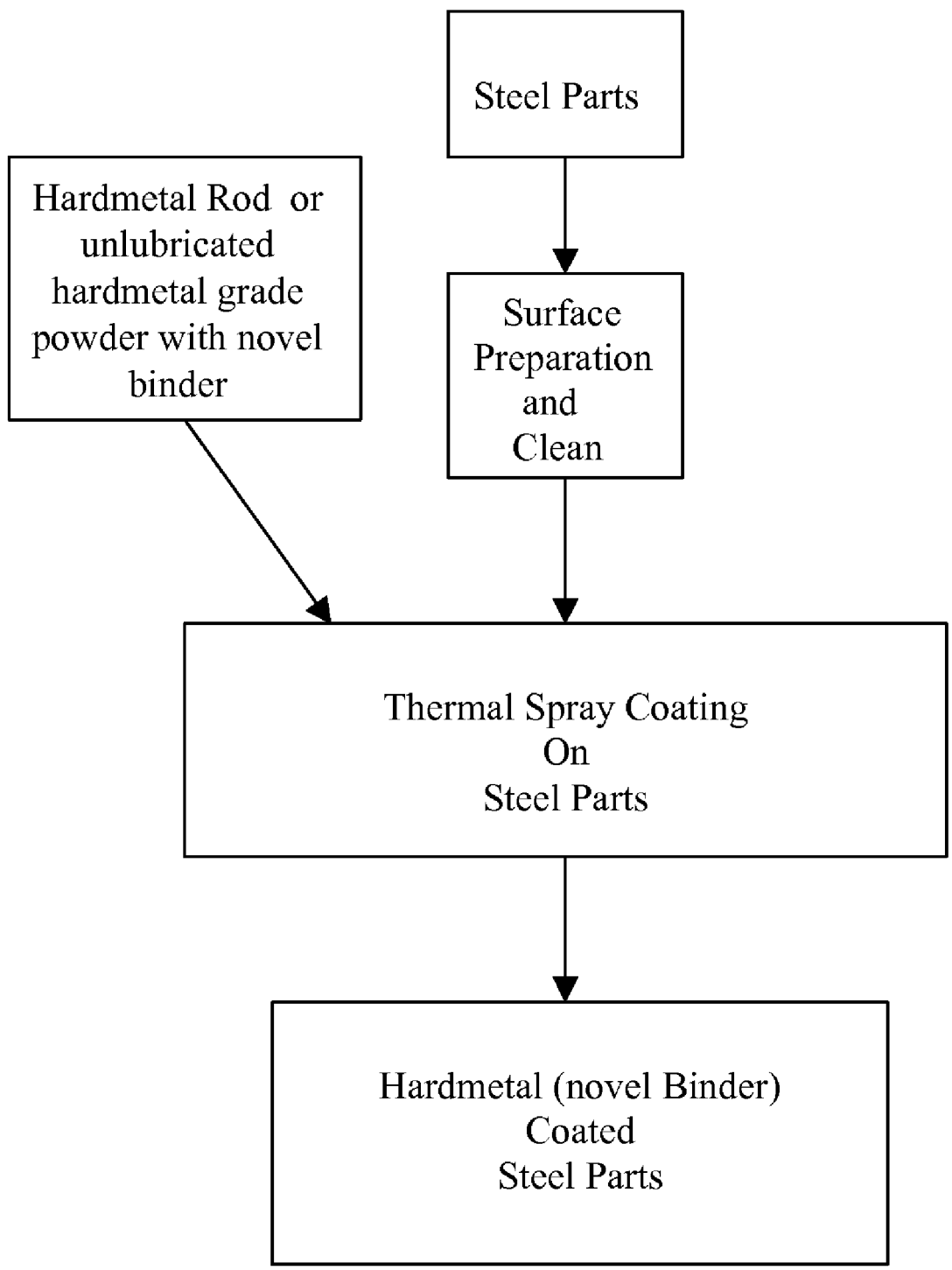

FIGS. 9 and 10 illustrate examples of the thermal spray methods.

Figure 11:
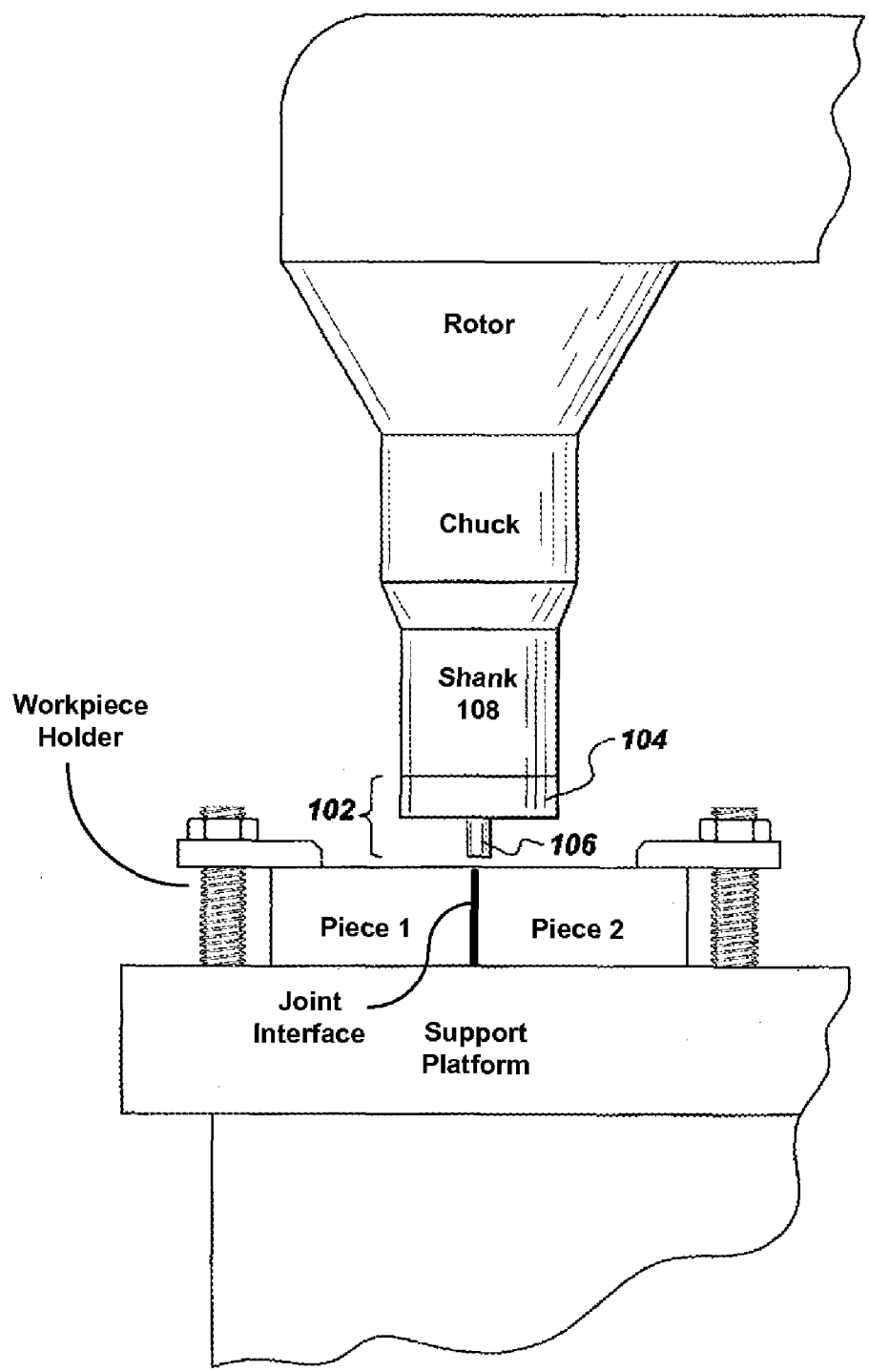

FIG. 11 shows one example of a friction stir welding tool system with a friction stir welding head that uses a material described in this application.

DETAILED DESCRIPTION

Friction stir welding is a solid-state welding process to join metal components without melting and to avoid various adverse effects associated with traditional welding techniques that melt the metal pieces. Notably, the friction stir welding can be used to produce large welds in a variety of geometric configurations, where a rotating cylindrical tool head is plunged into a rigidly clamped workpiece, and then traversed along the joint between two metal pieces to be welded. The tool is specially designed to provide a combination of frictional heat and thermo-mechanical working to the workpiece material as the tool traverses along the joint. A strong, solid-state bond is formed in the wake of the tool.

FIG. 11 illustrates one example of a FSW system. A FSW head 102 is engaged to a shank 108 which is in turn fixed to a rotor can include a pin and a shoulder to which the pin is engaged. A chuck may be used to hold the shank so that the rotor rotates the shank 108 which spins the head 102 during welding. In operation, the spinning head is pressed to the interface of two metal pieces 1 and 2 to be welded together and is moved along the joint interface. The head 102 includes a shoulder 104 that is engaged to the shank 108 and a pin 106 that is engaged to the shoulder 104. The pin 106 and the shoulder 104 are in direct contact with the two pieces to weld them together. In some implementations, the pin 106 and the shoulder 104 are made of a hardmetal material described in this application. In other implementations, the surfaces of the pin and shoulder may be made of a material described in this application while the inner parts of the pin and shoulder may be made of a different material. Various materials described here exhibit high hardness and toughness under a high temperature experienced by the pin and shoulder during the friction stir welding and thus can be used for constructing the head.

Examples of the FSW head designs are also described in U.S. Pat. No. 6,648,206 entitled "Frication stir welding using a superabrasive tool" and U.S. Patent Publication No. US2004/0238599(A1) entitled "Apparatus and method for friction stir welding of high strength materials and articles made therefrom." The above two U.S. patent documents are incorporated by reference as part of the specification of this application.

In some implementations, the whole FSW tool or pin and shoulder of the FSW tool may be made from a material such as a cermet described in this application. For example, a cermet may a metal bound ceramic particles from at least one ceramic material. Examples of the ceramics include Carbides, Nitrides, Borides, and Silicides. Carbide may include at least one of TiC, ZrC, HfC, VC, NbC, TaC, $Cr_3C_2$, MoC, $Mo_2C$, WC, $W_2C$. The nitride may include at least one of TiN, ZrN, HfN, VN, NbN. The boride may include at least one of $TiB_2$, $ZrB_2$, $HfB_2$, $VB_2$, $NbB_2$, $TaB_2$, $Cr_3C_2$, $CrB_2$, $Mo_2C$, MoB, $MoB_2$, $W_2C$, WB. The silicide may include at least one of $Ti_5Si_3$, $Zr_6Si_5$, $Zr_3Si_2$, $Zr_4Si_3$, ZrSi, $HfSi_2$, $NbSi_2$, $TaSi_2$, $Mo_3Si_2$, $MoSi_2$, $W_3Si_2$, $WSi_2$. At least one or more metal binder materials may be used to bind the particles, e.g., Re, a Ni based superalloy, Re—Ni based superalloy, Re—Co, Re—Ni, Re—Fe, Re—Cr, Re—Mo, Ni based superalloy-Fe, Ni based superalloy-Ni, Ni based superalloy-Co, Ni based superalloy-Cr, Ni based superalloy-Mo, Ni based superalloy-Ni based superalloy, Re—Ni based superalloy-Ni, Re—Ni based superalloy-Co, Re—Ni based superalloy-Fe, Re—Ni based superalloy-Cr, and Re—Ni based superalloy-Mo.

More examples of the materials for the shoulder and the pin are described below.

Compositions of hardmetals are important in that they directly affect the technical performance of the hardmetals in their intended applications, and processing conditions and equipment used during fabrication of such hardmetals. The hardmetal compositions also can directly affect the cost of the raw materials for the hardmetals, and the costs associated with the fabrication processes. For these and other reasons, extensive efforts have been made in the hardmetal industry to develop technically superior and economically feasible compositions for hardmetals. This application describes, among other features, material compositions for hardmetals with selected binder matrix materials that, together, provide performance advantages.

Material compositions for hardmetals of interest include various hard particles and various binder matrix materials. In general, the hard particles may be formed from carbides of the metals in columns IVB (e.g., TiC, ZrC, HfC), VB (e.g., VC, NbC, TaC), and VIB (e.g., $Cr_3C_2$, $Mo_2C$, WC) in the Periodic Table of Elements. In addition, nitrides formed by metals elements in columns IVB (e.g., TiN, ZrN, HfN) and VB (e.g., VN, NbN, and TaN) in the Periodic Table of Elements may also be used. For example, one material composition for hard particles that is widely used for many hardmetals is a tungsten carbide, e.g., the mono tungsten carbide (WC). Various nitrides may be mixed with carbides to form the hard particles. Two or more of the above and other carbides and nitrides may be combined to form WC-based hardmetals or WC-free hardmetals. Examples of mixtures of different carbides include but are not limited to a mixture of WC and TiC, and a mixture of WC, TiC, and TaC. In addition to various carbides, nitrides, carbonitrides, borides, and silicides may also be used as hard particles for hardmetals. Examples of various suitable hard particles are described in this application.

The material composition of the binder matrix, in addition to providing a matrix for bonding the hard particles together, can significantly affect the hard and refractory properties of the resulting hardmetals. In general, the binder matrix may include one or more transition metals in the eighth column of the Periodic Table of Elements, such as cobalt (Co), nickel (Ni), and iron (Fe), and the metals in the 6B column such as molybdenum (Mo) and chromium (Cr). Two or more of such and other binder metals may be mixed together to form desired binder matrices for bonding suitable hard particles. Some binder matrices, for example, use combinations of Co, Ni, and Mo with different relative weights.

The hardmetal compositions described here were developed in part based on a recognition that the material composition of the binder matrix may be specially configured and tailored to provide high-performance hardmetals to meet specific needs of various applications. In particular, the material composition of the binder matrix has significant effects on other material properties of the resulting hardmetals, such as the elasticity, the rigidity, and the strength parameters (including the transverse rupture strength, the tensile strength, and the impact strength). Hence, the inventor recognized that it was desirable to provide the proper material composition for the binder matrix to better match the material composition of the hard particles and other components of the hardmetals in order to enhance the material properties and the performance of the resulting hardmetals.

More specifically, these hardmetal compositions use binder matrices that include rhenium, a nickel-based superalloy or a combination of at least one nickel-based superalloy and other binder materials. Other suitable binder materials may include, among others, rhenium (Re) or cobalt. A Ni-based superalloy exhibits a high material strength at a relatively high temperature. The resulting hardmetal formed with such a binder material can benefit from the high material strength at high temperatures of rhenium and Ni-superalloy and exhibit enhanced performance at high temperatures. In addition, a Ni-based superalloy also exhibits superior resistance to corrosion and oxidation, and thus, when used as a binder material, can improve the corresponding resistance of the hardmetals.

The compositions of the hardmetals described in this application may include the binder matrix material from about 3% to about 40% by volume of the total materials in the hardmetals so that the corresponding volume percentage of the hard particles is about from 97% to about 60%, respectively. Within the above volume percentage range, the binder matrix material in certain implementations may be from about 4% to about 35% by volume out of the volume of the total hardmetal materials. More preferably, some compositions of the hardmetals may have from about 5% to about 30% of the binder matrix material by volume out of the volume of the total hardmetal materials. The weight percentage of the binder matrix material in the total weight of the resulting hardmetals may be derived from the specific compositions of the hardmetals.

In various implementations, the binder matrices may be formed primarily by a nickel-based superalloy, and by various combinations of the nickel-based superalloy with other elements such as Re, Co, Ni, Fe, Mo, and Cr. A Ni-based superalloy of interest may comprise, in addition to Ni, elements Co, Cr, Al, Ti, Mo, W, and other elements such as Ta, Nb, B, Zr and C. For example, Ni-based superalloys may include the following constituent metals in weight percentage of the total weight of the superalloy: Ni from about 30% to about 70%, Cr from about 10% to about 30%, Co from about 0% to about 25%, a total of Al and Ti from about 4% to about 12%, Mo from about 0% to about 10%, W from about 0% to about 10%, Ta from about 0% to about 10%, Nb from about 0% to about 5%, and Hf from about 0% to about 5%. Ni-based superalloys may also include either or both of Re and Hf. e.g., Re from 0% to about 10%, and Hf from 0% to about 5%. Ni-based superalloy with Re may be used in applications under high temperatures. A Ni-based super alloy may further include other elements, such as B, Zr, and C, in small amounts.

Compounds TaC and NbC have similar properties to a certain extent and may be used to partially or completely substitute or replace each other in hardmetal compositions in some implementations. Either one or both of HfC and NbC also may be used to substitute or replace a part or all of TaC in hardmetal designs. Compounds WC, TiC, TaC may be produced individually and then mixed to form a mixture or may be produced in a form of a solid solution. When a mixture is used, the mixture may be selected from at least one from a group consisting of (1) a mixture of WC, TiC, and TaC, (2) a mixture of WC, TiC, and NbC, (3) a mixture of WC, TiC, and at least one of TaC and NbC, and (4) a mixture of WC, TiC, and at least one of HfC and NbC. A solid solution of multiple carbides may exhibit better properties and performances than a mixture of several carbides. Hence, hard particles may be selected from at least one from a group consisting of (1) a solid solution of WC, TiC, and TaC, (2) a solid solution of WC, TiC, and NbC, (3) a solid solution of WC, TiC, and at least one of TaC and NbC, and (4) a solid solution of WC, TiC, and at least one of HfC and NbC.

The nickel-based superalloy as a binder material may be in a γ-γ' phase where the γ' phase with a FCC structure mixes with the γ phase. The strength increases with temperature within a certain extent. Another desirable property of such a Ni-based superalloy is its high resistance to oxidation and corrosion. The nickel-based superalloy may be used to either partially or entirely replace Co in various Co-based binder compositions. As demonstrated by examples disclosed in this application, the inclusion of both of rhenium and a nickel-based superalloy in a binder matrix of a hardmetal can significantly improve the performance of the resulting hardmetal by benefiting from the superior performance at high temperatures from presence of Re while utilizing the relatively low-sintering temperature of the Ni-based superalloy to maintain a reasonably low sintering temperature for ease of fabrication. In addition, the relatively low content of Re in such binder compositions allows for reduced cost of the binder materials so that such materials be economically feasible.

Such a nickel-based superalloy may have a percentage weight from several percent to 100% with respect to the total weight of all material components in the binder matrix based on the specific composition of the binder matrix. A typical nickel-based superalloy may primarily comprise nickel and other metal components in a γ-γ' phase strengthened state so that it exhibits an enhanced strength which increases as temperature rises.

Various nickel-based superalloys may have a melting point lower than the common binder material cobalt, such as alloys under the trade names Rene-95, Udimet-700, Udimet-720 from Special Metals which comprise primarily Ni in combination with Co, Cr, Al, Ti, Mo, Nb, W, B, and Zr. Hence, using such a nickel-based superalloy alone as a binder material may not increase the melting point of the resulting hardmetals in comparison with hardmetals using binders with Co.

However, in one implementation, the nickel-based superalloy can be used in the binder to provide a high material strength and to improve the material hardness of the resulting hardmetals, at high temperatures near or above 500° C. Tests of some fabricated samples have demonstrated that the material hardness and strength for hardmetals with a Ni-based superalloy in the binder can improve significantly, e.g., by at least 10%, at low operating temperatures in comparison with similar material compositions without Ni-based superalloy in the binder. The following table show measured hardness parameters of samples P65 and P46A with Ni-based superalloy in the binder in comparison with samples P49 and P47A with pure Co as the binder, where the compositions of the samples are listed in Table 4.

Effects of Ni-based Superalloy (NS) in Binder

| Sample Code Name | Co or NS Binder | Hv at Room Temperature (Kg/mm²) | Ksc at room temperature (×10⁶ Pa·m^{1/2}) | Comparison |
| --- | --- | --- | --- | --- |
| P49 | Co: 10 volume % | 2186 | 6.5 | |
| P65 | NS: 10 volume % | 2532 | 6.7 | Hv is about 16% greater than that of P49 |
| P47A | Co: 15 volume % | 2160 | 6.4 | |
| P46A | NS: 15 volume % | 2364 | 6.4 | Hv is about 10% greater than that of P47A |

Notably, at high operating temperatures above 500° C., hardmetal samples with Ni-based superalloy in the binder can exhibit a material hardness that is significantly higher than that of similar hardmetal samples without having a Ni-based superalloy in the binder. In addition, Ni-based superalloy as a binder material can also improve the resistance to corrosion of the resulting hardmetals or cermets in comparison with hardmetals or cermets using the conventional cobalt as the binder.

A nickel-based superalloy may be used alone or in combination with other elements to form a desired binder matrix. Other elements that may be combined with the nickel-based superalloy to form a binder matrix include but are not limited to, another nickel-based superalloy, other non-nickel-based alloys, Re, Co, Ni, Fe, Mo, and Cr.

Rhenium as a binder material may be used to provide strong bonding of hard particles and in particular can produce a high melting point for the resulting hardmetal material. The melting point of rhenium is about 3180° C., much higher than the melting point of 1495° C. of the commonly-used cobalt as a binder material. This feature of rhenium partially contributes to the enhanced performance of hardmetals with binders using Re, e.g., the enhanced hardness and strength of the resulting hardmetals at high temperatures. Re also has other desired properties as a binder material. For example, the hardness, the transverse rapture strength, the fracture toughness, and the melting point of the hardmetals with Re in their binder matrices can be increased significantly in comparison with similar hardmetals without Re in the binder matrices. A hardness Hv over 2600 Kg/mm² has been achieved in exemplary WC-based hardmetals with Re in the binder matrices. The melting point of some exemplary WC-based hardmetals, i.e., the sintering temperature, has shown to be greater than 2200° C. In comparison, the sintering temperature for WC-based hardmetals with Co in the binders in Table 2.1 in the cited Brookes is below 1500° C. A hardmetal with a high sintering temperature allows the material to operate at a high temperature below the sintering temperature. For example, tools based on such Re-containing hardmetal materials may operate at high speeds to reduce the processing time and the overall throughput of the processing.

The use of Re as a binder material in hardmetals, however, may present limitations in practice. For example, the desirable high-temperature property of Re generally leads to a high sintering temperature for fabrication. Thus, the oven or furnace for the conventional sintering process needs to operate at or above the high sintering temperature. Ovens or furnaces capable of operating at such high temperatures, e.g., above 2200° C., can be expensive and may not be widely available for commercial use. U.S. Pat. No. 5,476,531 discloses a use of a rapid omnidirectional compaction (ROC) method to reduce the processing temperature in manufacturing WC-based hardmetals with pure Re as the binder material from 6% to 18% of the total weight of each hardmetal. This ROC process, however, is still expensive and is generally not suitable for commercial fabrication.

One potential advantage of the hardmetal compositions and the composition methods described here is that they may provide or allow for a more practical fabrication process for fabricating hardmetals with either Re or mixtures of Re with other binder materials in the binder matrices. In particular, this two-step process makes it possible to fabricate hardmetals where Re is at or more than 25% of the total weight of the binder matrix of the resulting hardmetal. Such hardmetals with Re at or more than 25% may be used to achieve a high hardness and a high material strength at high temperatures.

Another limitation of using pure Re as a binder material for hardmetals is that Re oxidizes severely in air at or above about 350° C. This poor oxidation resistance may dramatically reduce the use of pure Re as binder for any application above about 300° C. Since Ni-based superalloy has exceptionally strength and oxidation resistance under 1000° C., a mixture of a Ni-based superalloy and Re where Re is the dominant material in the binder may be used to improve the strength and oxidation resistance of the resulting hardmetal using such a mixture as the binder. On the other hand, the addition of Re into a binder primarily comprised of a Ni-based superalloy can increase the melting range of the resulting hardmetal, and improve the high temperature strength and creep resistance of the Ni-based superalloy binder.

In general, the percentage weight of the rhenium in the binder matrix should be between a several percent to essentially 100% of the total weight of the binder matrix in a hardmetal. Preferably, the percentage weight of rhenium in the binder matrix should be at or above 5%. In particular, the percentage weight of rhenium in the binder matrix may be at or above 10% of the binder matrix. In some implementations, the percentage weight of rhenium in the binder matrix may be at or above 25% of the total weight of the binder matrix of the resulting hardmetal. Hardmetals with such a high concentration of Re may be fabricated at relatively low temperatures with a two-step process described in this application.

Since rhenium is generally more expensive than other materials used in hardmetals, cost should be considered in designing binder matrices that include rhenium. Some of the examples given below reflect this consideration. In general, according to one implementation, a hardmetal composition includes dispersed hard particles having a first material, and a binder matrix having a second, different material that includes rhenium, where the hard particles are spatially dispersed in the binder matrix in a substantially uniform manner. The binder matrix may be a mixture of Re and other binder materials to reduce the total content of Re to in part reduce the overall cost of the raw materials and in part to explore the presence of other binder materials to enhance the performance of the binder matrix. Examples of binder matrices having mixtures of Re and other binder materials include, mixtures of Re and at least one Ni-based superalloy, mixtures of Re, Co and at least one Ni-based superalloy, mixtures of Re and Co, and others.

TABLE 1 lists some examples of hardmetal compositions of interest. In this table, WC-based compositions are referred to as "hardmetals" and the TiC-based compositions are referred to as "cermets." Traditionally, TiC particles bound by a mixture of Ni and Mo or a mixture of Ni and Mo₂C are cermets. Cermets as described here further include hard particles formed by mixtures of TiC and TiN, of TiC, TiN, WC, TaC, and NbC with the binder matrices formed by the mixture of Ni and Mo or the mixture of Ni and Mo$_2$C. For each hardmetal composition, three different weight percentage ranges for the given binder material in the are listed. As an example, the binder may be a mixture of a Ni-based superalloy and cobalt, and the hard particles may a mixture of WC, TiC, TaC, and NbC. In this composition, the binder may be from about 2% to about 40% of the total weight of the hardmetal. This range may be set to from about 3% to about 35% in some applications and may be further limited to a smaller range from about 4% to about 30% in other applications.

temperature of the liquid-phase sintering is between melting point of the binder material (e.g., Co at 1495° C.) and the eutectic temperature of the mixture of hardmetal (e.g., WC—Co at 1320° C.). In general, the sintering temperature of cemented carbide is in a range of 1360 to 1480° C. For new materials with low concentration of Re or a Ni-based superalloy in binder alloy, manufacture process is same as conventional cemented carbide process. The principle of liquid phase sintering in vacuum is applied in here. The sintering temperature is slightly higher than the eutectic temperature of

TABLE 1

(NS: Ni-based superalloy)

|  | Binder Composition | Composition for Hard Particles | 1$^{st}$ Binder Wt. % Range | 2$^{nd}$ Binder Wt. % Range | 3$^{rd}$ Binder Wt. % Range |
|---|---|---|---|---|---|
| Hardmetals | Re | WC | 4 to 40 | 5 to 35 | 6 to 30 |
|  |  | WC—TiC—TaC—NbC | 4 to 40 | 5 to 35 | 6 to 30 |
|  | NS | WC | 2 to 30 | 3 to 25 | 4 to 20 |
|  |  | WC—TiC—TaC—NbC | 2 to 30 | 3 to 25 | 4 to 20 |
|  | NS-Re | WC | 2 to 40 | 3 to 35 | 4 to 30 |
|  |  | WC—TiC—TaC—NbC | 2 to 40 | 3 to 35 | 4 to 30 |
|  | Re—Co | WC | 2 to 40 | 3 to 35 | 4 to 30 |
|  |  | WC—TiC—TaC—NbC | 2 to 40 | 3 to 35 | 4 to 30 |
|  | NS-Re—Co | WC | 2 to 40 | 3 to 35 | 4 to 30 |
|  |  | WC—TiC—TaC—NbC | 2 to 40 | 3 to 35 | 4 to 30 |
| Cermets | NS | Mo$_2$C—TiC | 5 to 40 | 6 to 35 | 8 to 40 |
|  |  | Mo$_2$C—TiC—TiN—WC—TaC—NbC | 5 to 40 | 6 to 35 | 8 to 40 |
|  | Re | Mo$_2$C—TiC | 10 to 55 | 12 to 50 | 15 to 45 |
|  |  | Mo$_2$C—TiC—TiN—WC—TaC—NbC | 10 to 55 | 12 to 50 | 15 to 45 |
|  | NS-Re | Mo$_2$C—TiC | 5 to 55 | 6 to 50 | 8 to 45 |
|  |  | Mo$_2$C—TiC—TiN—WC—TaC—NbC | 5 to 55 | 6 to 50 | 8 to 45 |

Fabrication of hardmetals with Re or a nickel-based superalloy in binder matrices may be carried out as follows. First, a powder with desired hard particles such as one or more carbides or carbonitrides is prepared. This powder may include a mixture of different carbides or a mixture of carbides and nitrides. The powder is mixed with a suitable binder matrix material that includes Re or a nickel-based superalloy. In addition, a pressing lubricant, e.g., a wax, may be added to the mixture.

Figure 1:
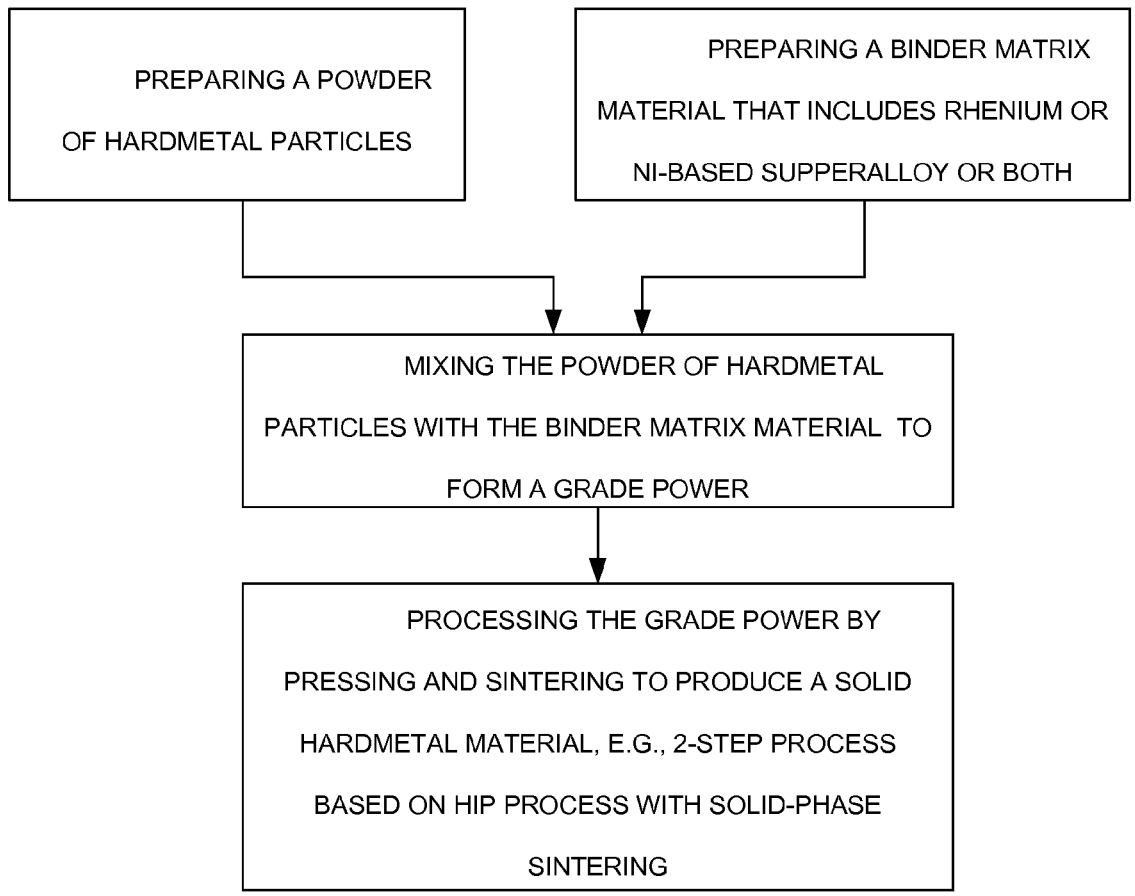
FIG. 1 shows one exemplary fabrication flow in making a hardmetal according to one implementation.

The mixture of the hard particles, the binder matrix material, and the lubricant is mixed through a milling or attriting process by milling or attriting over a desired period, e.g., hours, to fully mix the materials so that each hard particle is coated with the binder matrix material to facilitate the binding of the hard particles in the subsequent processes. The hard particles should also be coated with the lubricant material to lubricate the materials to facilitate the mixing process and to reduce or eliminate oxidation of the hard particles. Next, pressing, presintering, shaping, and final sintering are subsequently performed to the milled mixture to form the resulting hardmetal. The sintering process is a process for converting a powder material into a continuous mass by heating to a temperature that is below the melting temperature of the hard particles and may be performed after preliminary compacting by pressure. During this process, the binder material is densified to form a continuous binder matrix to bind hard particles therein. One or more additional coatings may be further formed on a surface of the resulting hardmetal to enhance the performance of the hardmetal. FIG. 1 is a flowchart for this implementation of the fabrication process.

In one implementation, the manufacture process for cemented carbides includes wet milling in solvent, vacuum drying, pressing, and liquid-phase sintering in vacuum. The binder alloy and carbide. For example, the sintering condition of P17 (25% of Re in binder alloy, by weight) is at 1700° C. for one hour in vacuum.

Figure 2:
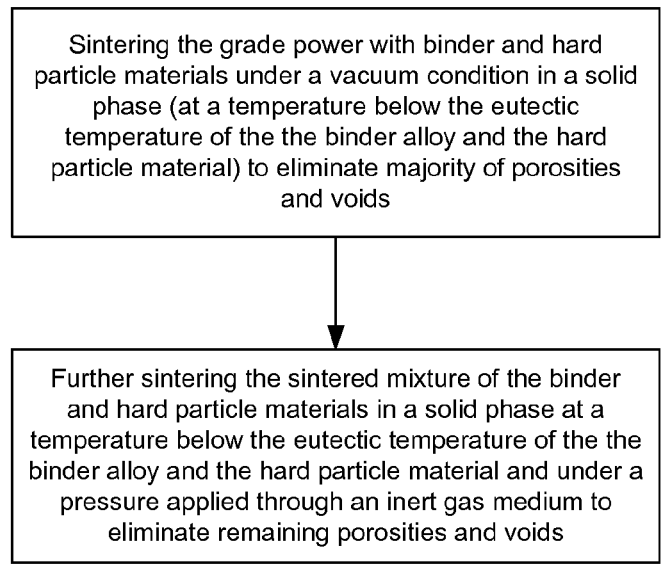
FIG. 2 shows an exemplary two-step sintering process for processing hardmetals in a solid state.

FIG. 2 shows a two-step fabrication process based on a solid-state phase sintering for fabricating various hardmetals described in this application. Examples of hardmetals that can be fabricated with this two-step sintering method include hardmetals with a high concentration of Re in the binder matrix that would otherwise require the liquid-phase sintering at high temperatures. This two-step process may be implemented at relatively low temperatures, e.g., under 2200° C., to utilize commercially feasible ovens and to produce the hardmetals at reasonably low costs. The liquid phase sintering is eliminated in this two-step process because the liquid phase sintering may not be practical due to the generally high eutectic temperatures of the binder alloy and carbide. As discussed above, sintering at such high temperatures requires ovens operating at high temperatures which may not be commercially feasible.

The first step of this two-step process is a vacuum sintering where the mixture materials for the binder matrix and the hard particles are sintered in vacuum. The mixture is initially processed by, e.g., wet milling, drying, and pressing, as performed in conventional processes for fabricating cemented carbides. This first step of sintering is performed at a temperature below the eutectic temperature of the binder alloy and the hard particle materials to remove or eliminate the interconnected porosity. The second step is a solid phase sintering at a temperature below the eutectic temperature and under a pressured condition to remove and eliminate the remaining porosities and voids left in the sintered mixture after the first step. A hot isostatic pressing (HIP) process may be used as this second step sintering. Both heat and pressure are applied to the material during the sintering to reduce the processing temperature which would otherwise be higher in absence of the pressure. A gas medium such as an inert gas may be used to apply and transmit the pressure to the sintered mixture. The pressure may be at or over 1000 bar. Application of pressure in the HIP process lowers the required processing temperature and allows for use of conventional ovens or furnaces. The temperatures of solid phase sintering and HIPping for achieving fully condensed materials are generally significantly lower than the temperatures for liquid phase sintering. For example, the sample P62 which uses pure Re as the binder may be fully densified by vacuum sintering at 2200° C. for one to two hours and then HIPping at about 2000° C. under a pressure of 30,000 PSI in the inert gas such as Ar for about one hour. Notably, the use of ultra fine hard particles with a particulate dimension less than 0.5 micron can reduce the sintering temperature for fully densifying the hardmetals (fine particles are several microns in size). For example, in making the samples P62 and P63, the use of such ultra fine WC allows for sintering temperatures to be low, e.g., around 2000° C. This two-step process is less expensive than the ROC method and may be used to commercial production.

The following sections describe exemplary hardmetal compositions and their properties based on various binder matrix materials that include at least rhenium or a nickel-based superalloy.

TABLE 2 provides a list of code names (lot numbers) for some of the constituent materials used to form the exemplary hardmetals, where H1 represents rhenium, and L1, L2, and L3 represent three exemplary commercial nickel-based superalloys. TABLE 3 further lists compositions of the above three exemplary nickel-based superalloys, Udimet720 (U720), Rene+ 95(R-95), and Udimet700(U700), respectively. TABLE 4 lists compositions of exemplary hardmetals, both with and without rhenium or a nickel-based superalloy in the binder matrices. For example, the material composition for Lot P17 primarily includes 88 grams of T32 (WC), 3 grams of I32 (TiC), 3 grams of A31 (TaC), 1.5 grams of H1 (Re) and 4.5 grams of L2 (R-95) as binder, and 2 grams of a wax as lubricant. Lot P58 represents a hardmetal with a nickel-based superalloy L2 as the only binder material without Re. These hardmetals were fabricated and tested to illustrate the effects of either or both of rhenium and a nickel-based superalloy as binder materials on various properties of the resulting hardmetals. TABLES 5-8 further provide summary information of compositions and properties of different sample lots as defined above.

Figure 3:
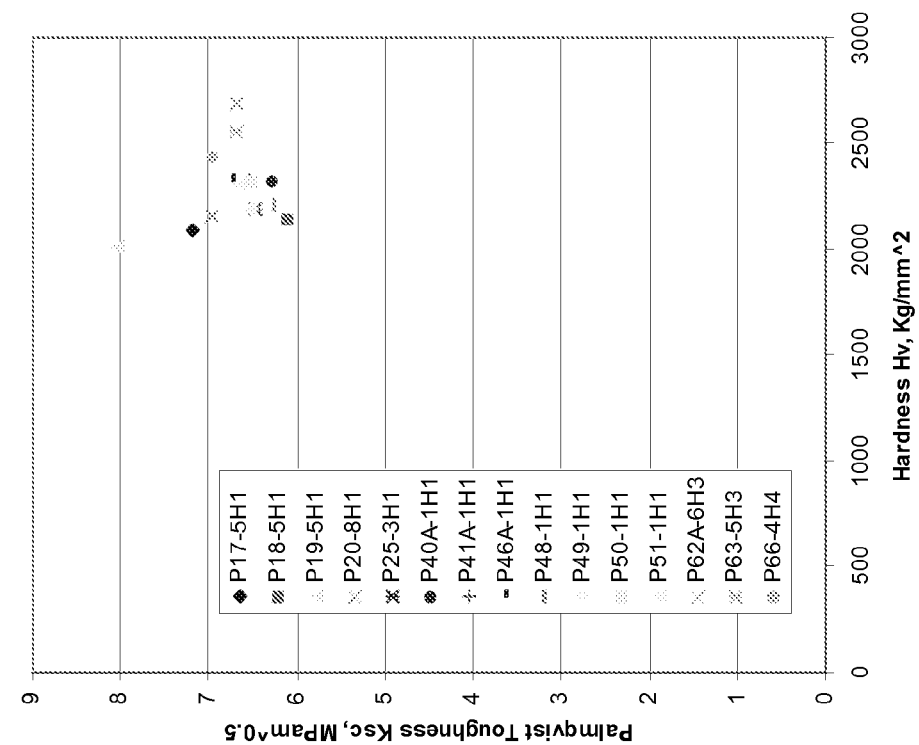
Figure 4:
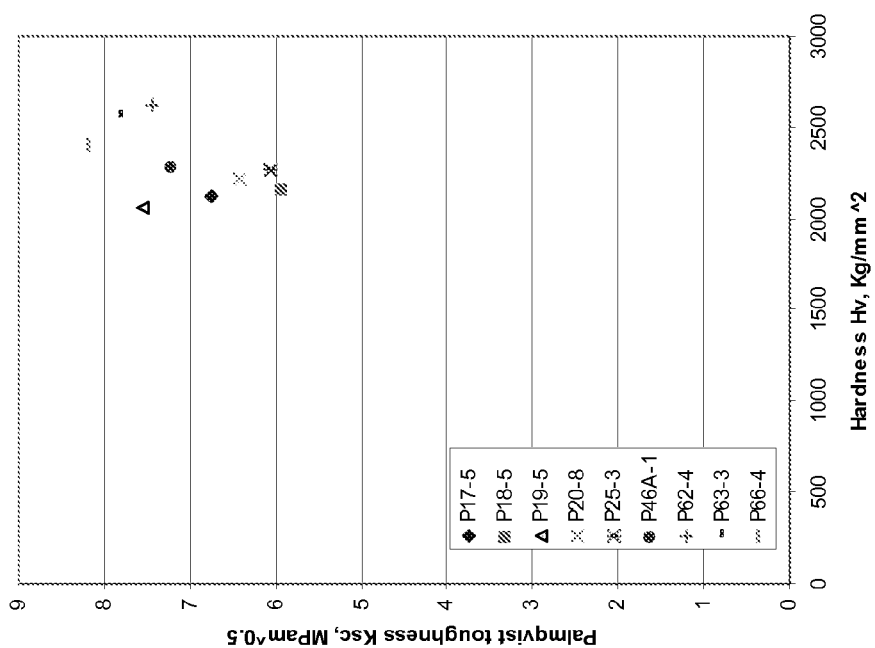
Figure 5:
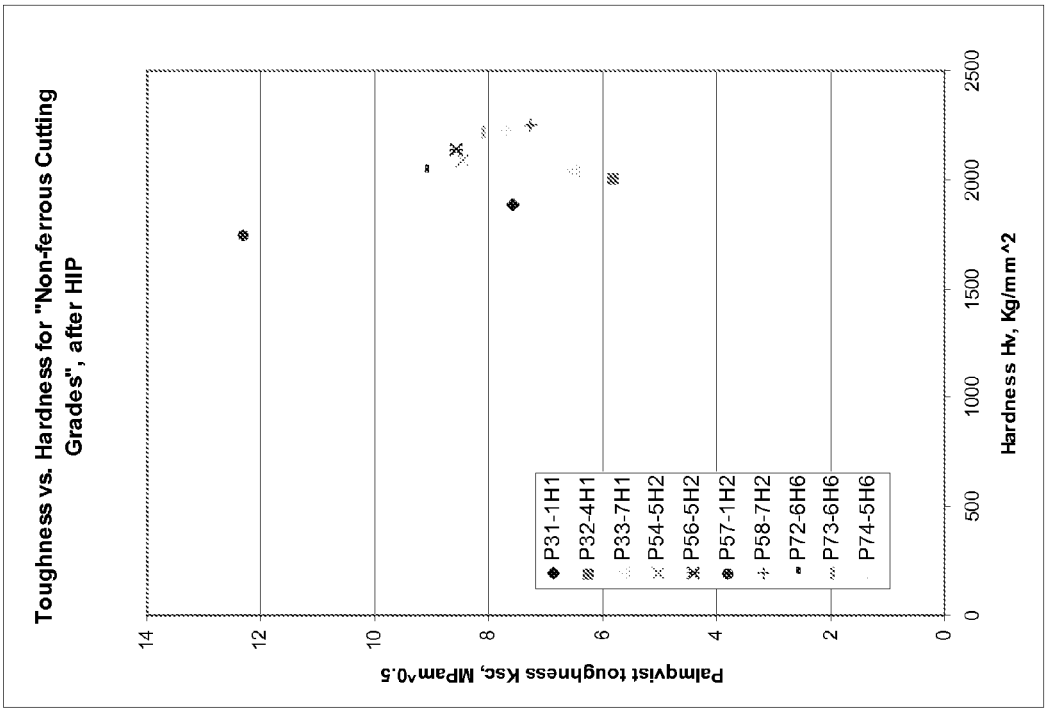
Figure 6:
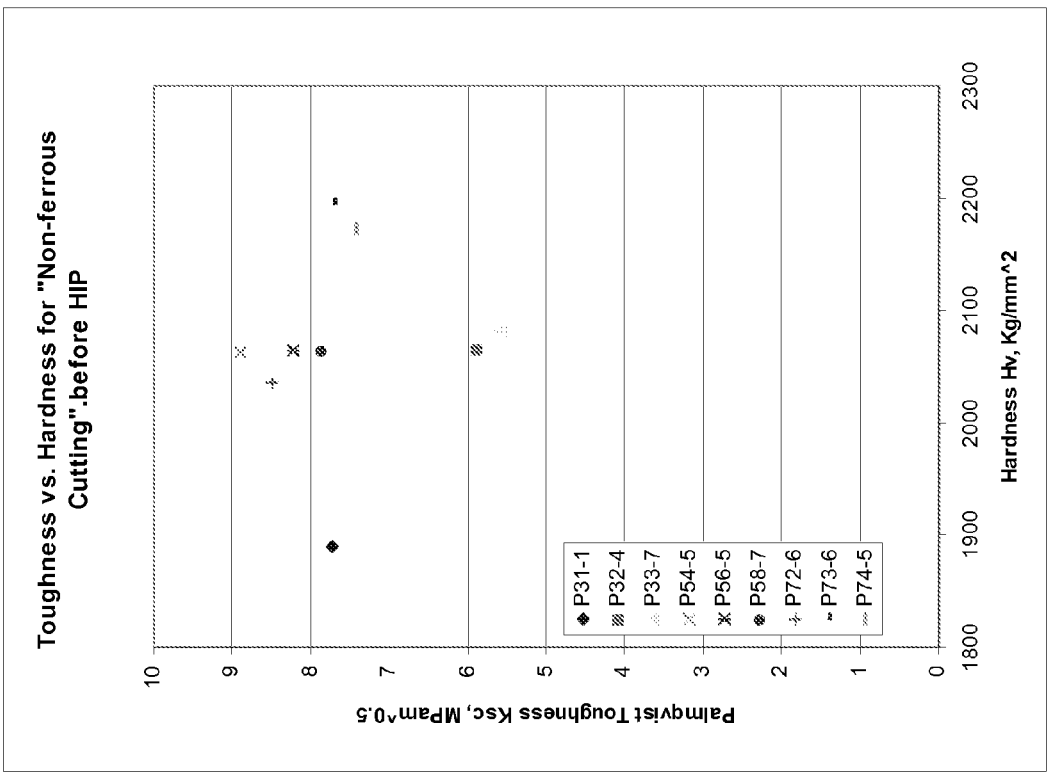
Figure 7:
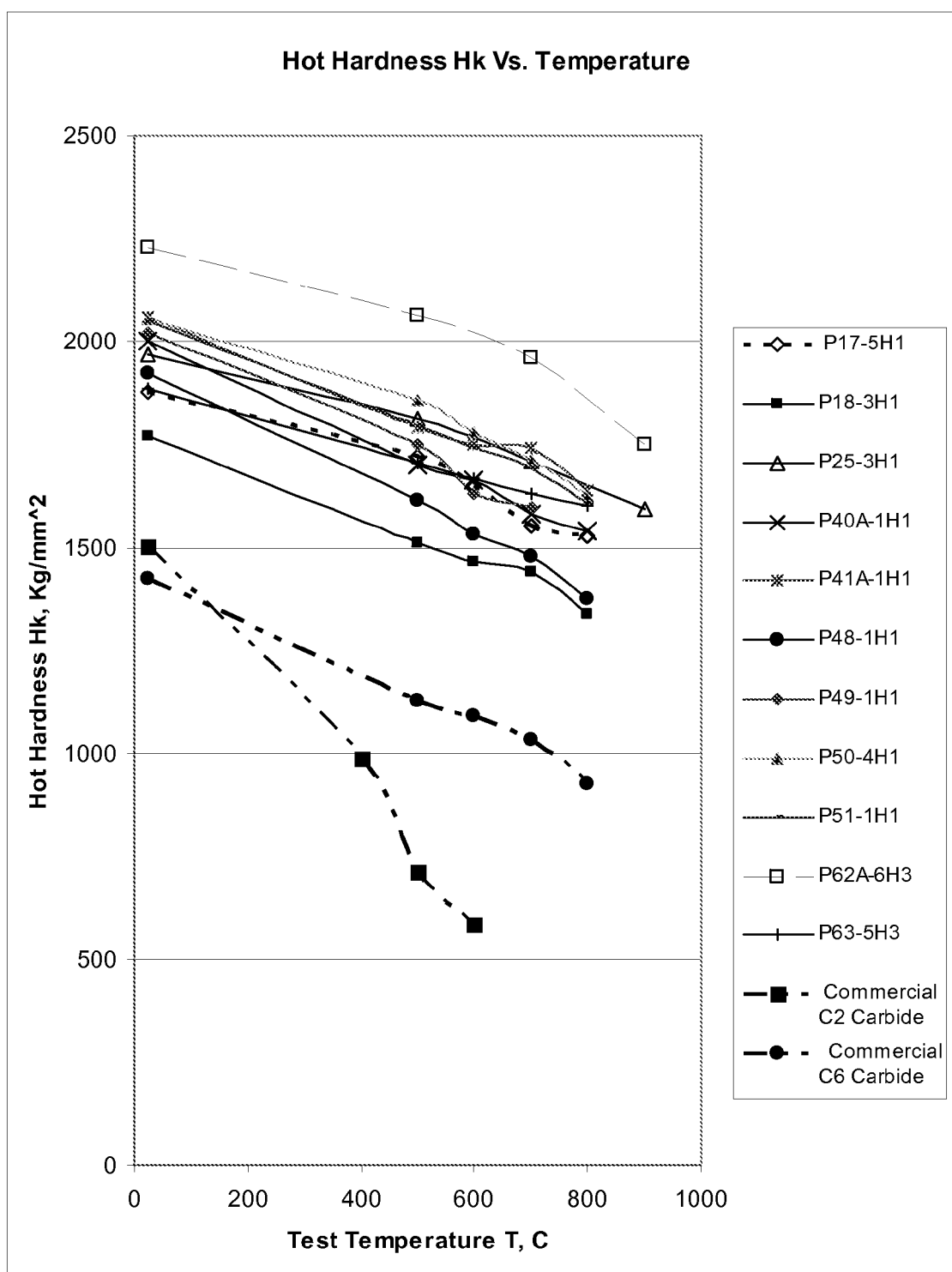
Figure 8:
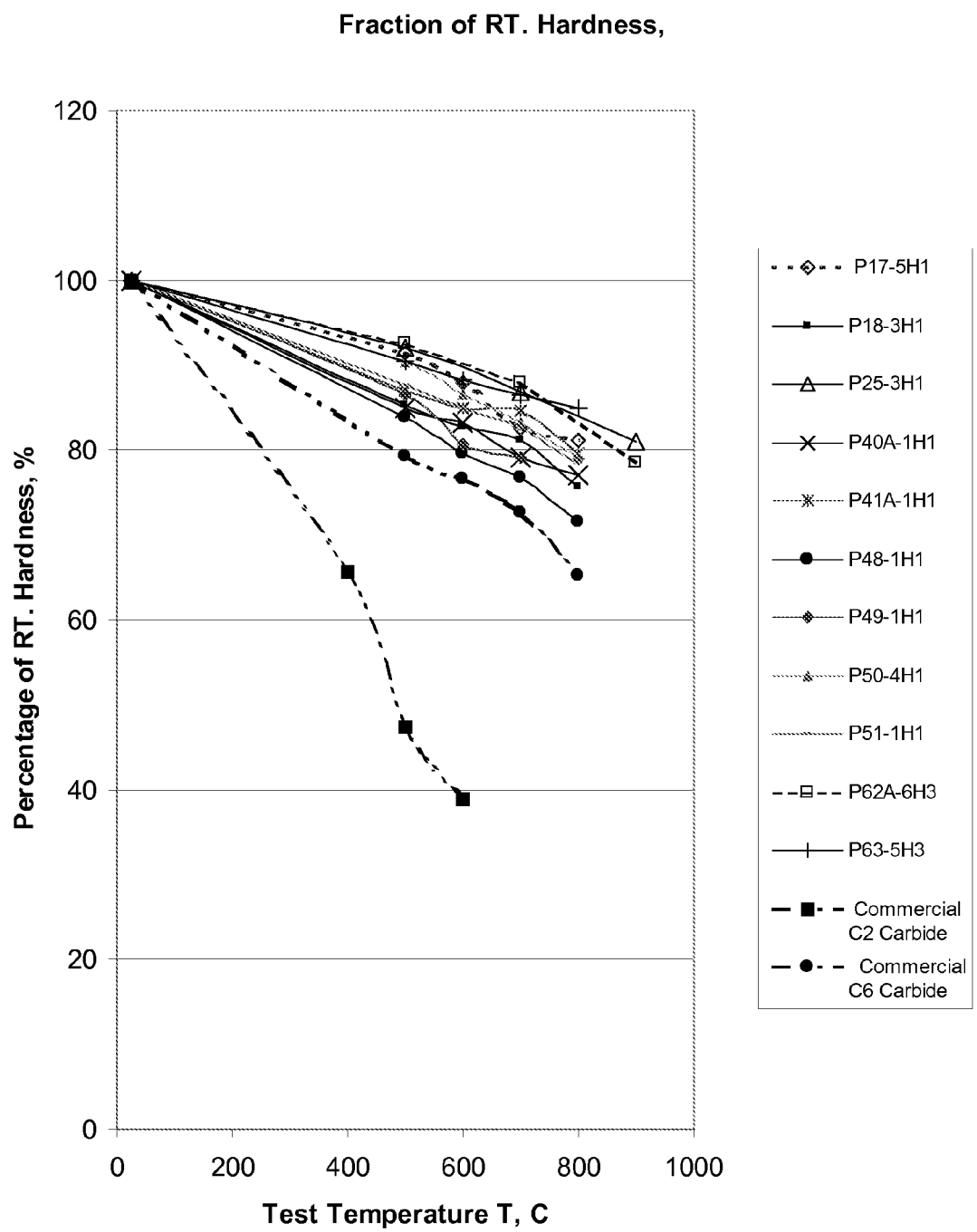

FIGS. 3 through 8 show measurements of selected hardmetal samples of this application. FIGS. 3 and 4 show measured toughness and hardness parameters of some exemplary hardmetals for the steel cutting grades. FIGS. 5 and 6 show measured toughness and hardness parameters of some exemplary hardmetals for the non-ferrous cutting grades. Measurements were performed before and after the solid-phase sintering HIP process and the data suggests that the HIP process significantly improves both the toughness and the hardness of the materials. FIG. 7 shows measurements of the hardness as a function of temperature for some samples. As a comparison, FIGS. 7 and 8 also show measurements of commercial C2 and C6 carbides under the same testing conditions, where FIG. 7 shows the measured hardness and FIG. 8 shows measured change in hardness from the value at the room temperature (RT). Clearly, the hardmetal samples based on the compositions described here outperform the commercial grade materials in terms of the hardness at high temperatures. These results demonstrate that the superior performance of binder matrices with either or both of Re and a nickel-based superalloy as binder materials in comparison with Co-based binder matrix materials.

TABLE 2

| Code | Powder Composition | Note |
|---|---|---|
| T32 | WC | Particle size 1.5 μm, from Alldyne |
| T35 | WC | Particle size 15 μm, from Alldyne |
| Y20 | Mo | Particle size 1.7–2.2 μm, from Alldyne |
| L3 | U-700 | −325 Mesh, special metal Udimet 700 |
| L1 | U-720 | −325 Mesh, Special Metal, Udimet 720 |
| L2 | Re-95 | −325 Mesh, Special Metal, Rene 95 |
| H1 | Re | −325 Mesh, Rhenium Alloy Inc. |
| I32 | TiC | from AEE, Ti-302 |
| I21 | $TiB_2$ | from AEE, Ti-201, 1–5 μm |
| A31 | TaC | from AEE, TA-301 |
| Y31 | $Mo_2C$ | from AEE, MO-301 |
| D31 | VC | from AEE, VA-301 |
| B1 | Co | from AEE, CO-101 |
| K1 | Ni | from AEE, Ni-101 |
| K2 | Ni | from AEE, Ni-102 |
| I13 | TiN | from Cerac, T-1153 |
| C21 | $ZrB_2$ | from Cerac, Z-1031 |
| Y6 | Mo | from AEE Mo + 100, 1–2 μm |
| L6 | Al | from AEE Al − 100, 1–5 μm |
| R31 | $B_4C$ | from AEE Bo-301, 3 μm |
| T3.8 | WC | Particle size 0.8 μm, Alldyne |
| T3.4 | WC | Particle size 0.4 μm, OMG |
| T3.2 | WC | Particle size 0.2 μm, OMG |

TABLE 3

| | Ni | Co | Cr | Al | Ti | Mo | Nb | W | Zr | B | C | V |
|---|---|---|---|---|---|---|---|---|---|---|---|---|
| R95 | 61.982 | 8.04 | 13.16 | 3.54 | 2.53 | 3.55 | 3.55 | 3.54 | 0.049 | | 0.059 | |
| U700 | 54.331 | 17.34 | 15.35 | 4.04 | 3.65 | 5.17 | .028 | .008 | .04 | .019 | .019 | .005 |
| U720 | 56.334 | 15.32 | 16.38 | 3.06 | 5.04 | 3.06 | 0.01 | 1.30 | .035 | .015 | .012 | .004 |

TABLE 4

| Lot No | Composition (units in grams) |
|---|---|
| P17 | H1 = 1.5, L2 = 4.5, I32 = 3, A31 = 3, T32 = 88, Wax = 2 |
| P18 | H1 = 3, L2 = 3, I32 = 3, A31 = 3, T32 = 88, Wax = 2 |
| P19 | H1 = 1.5, L3 = 4.5, I32 = 3, A31 = 3, T32 = 88, Wax = 2 |
| P20 | H1 = 3, L3 = 3, I32 = 3, A31 = 3, T32 = 88, Wax = 2 |
| P25 | H1 = 3.75, L2 = 2.25, I32 = 3, A31 = 3, T32 = 88, Wax = 2 |
| P25A | H1 = 3.75, L2 = 2.25, I32 = 3, A31 = 3, T32 = 88, Wax = 2 |

TABLE 4-continued

| Lot No | Composition (units in grams) |
|---|---|
| P31 | H1 = 3.44, B1 = 4.4, T32 = 92.16, Wax = 2 |
| P32 | H1 = 6.75, B1 = 2.88, T32 = 90.37, Wax = 2 |
| P33 | H1 = 9.93, B1 = 1.41, T32 = 88.66, Wax = 2 |
| P34 | L2 = 14.47, I32 = 69.44, Y31 = 16.09 |
| P35 | H1 = 8.77, L2 = 10.27, I32 = 65.73, Y31 = 15.23 |
| P36 | H1 = 16.66, L2 = 6.50, I32 = 62.4, Y31 = 14.56 |
| P37 | H1 = 23.80, L2 = 3.09, I32 = 59.38, Y31 = 13.76 |
| P38 | K1 = 15.51, I32 = 68.60, Y31 = 15.89 |
| P39 | K2 = 15.51, I32 = 68.60, Y31 = 15.89 |
| P40 | H1 = 7.57, L2 = 2.96, I32 = 5.32, A31 = 5.23, T32 = 78.92, Wax = 2 |
| P40A | H1 = 7.57, L2 = 2.96, I32 = 5.32, A31 = 5.23, T32 = 78.92, Wax = 2 |
| P41 | H1 = 11.1, L2 = 1.45, I32 = 5.20, A31 = 5.11, T32 = 77.14, Wax = 2 |
| P41A | H1 = 11.1, L2 = 1.45, I32 = 5.20, A31 = 5.11, T32 = 77.14, Wax = 2 |
| P42 | H1 = 9.32, L2 = 3.64, I32 = 6.55, A31 = 6.44, I21 = 0.40, R31 = 4.25, T32 = 69.40, Wax = 2 |
| P43 | H1 = 9.04, L2 = 3.53, I32 = 6.35, A31 = 6.24, I21 = 7.39, R31 = 0.22, T32 = 67.24, Wax = 2 |
| P44 | H1 = 8.96, L2 = 3.50, I32 = 14.69, A31 = 6.19, T32 = 66.67, Wax = 2 |
| P45 | H1 = 9.37, L2 = 3.66, I32 = 15.37, A31 = 6.47, Y31 = 6.51, T32 = 58.61, Wax = 2 |
| P46 | H1 = 11.40, L2 = 4.45, I32 = 5.34, A31 = 5.25, T32 = 73.55, Wax = 2 |
| P46A | H1 = 11.40, L2 = 4.45, I32 = 5.34, A31 = 5.25, T32 = 73.55, Wax = 2 |
| P47 | H1 = 11.35, B1 = 4.88, I32 = 5.32, A31 = 5.23, T32 = 73.22, Wax = 2 |
| P47A | H1 = 11.35, B1 = 4.88, I32 = 5.32, A31 = 5.23, T32 = 73.22, Wax = 2 |
| P48 | H1 = 3.75, L2 = 2.25, I32 = 5, A31 = 5, T32 = 84, Wax = 2 |
| P49 | H1 = 7.55, B1 = 3.25, I32 = 5.31, A31 = 5.21, T32 = 78.68, Wax = 2 |
| P50 | H1 = 4.83, L2 = 1.89, I32 = 5.31, A31 = 5.22, T32 = 82.75, Wax = 2 |
| P51 | H1 = 7.15, L2 = 0.93, I32 = 5.23, A31 = 5.14, T32 = 81.55, Wax = 2 |
| P52 | B1 = 8, D31 = 0.6, T3.8 = 91.4, Wax = 2 |
| P53 | B1 = 8, D31 = 0.6, T3.4 = 91.4, Wax = 2 |
| P54 | B1 = 8, D31 = 0.6, T3.2 = 91.4, Wax = 2 |
| P55 | H1 = 1.8, B1 = 7.2, D31 = 0.6, T3.4 = 90.4, Wax = 2 |
| P56 | H1 = 1.8, B1 = 7.2, D31 = 0.6, T3.2 = 90.4, Wax = 2 |
| P56A | H1 = 1.8, B1 = 7.2, D31 = 0.6, T3.2 = 90.4, Wax = 2 |
| P57 | H1 = 1.8, B1 = 7.2, T3.2 = 91, Wax = 2 |
| P58 | L2 = 7.5, D31 = 0.6, T3.2 = 91.9, Wax = 2 |
| P59 | H1 = 0.4, B1 = 3, L2 = 4.5, D31 = 0.6, T3.2 = 91.5, Wax = 2 |
| P62 | H1 = 14.48, I32 = 5.09, A31 = 5.00, T3.2 = 75.43, Wax = 2 |
| P62A | H1 = 14.48, I32 = 5.09, A31 = 5.00, T3.2 = 75.43, Wax = 2 |
| P63 | H1 = 12.47, L2 = 0.86, I32 = 5.16, A31 = 5.07, T3.2 = 76.45, Wax = 2 |
| P65 | H1 = 7.57, L2 = 2.96, I32 = 5.32, A31 = 5.23, T3.2 = 78.92, Wax = 2 |
| P65A | H1 = 7.57, L2 = 2.96, I32 = 5.32, A31 = 5.23, T3.2 = 78.92, Wax = 2 |
| P66 | H1 = 27.92, I32 = 4.91, A31 = 4.82, T3.2 = 62.35, Wax = 2 |
| P67 | H1 = 24.37, L3 = 1.62, I32 = 5.04, A31 = 4.95, T32 = 32.01, T33 = 32.01, Wax = 2 |
| P69 | L2 = 7.5, D31 = 0.4, T3.2 = 92.1, Wax = 2 |
| P70 | L1 = 7.4, D31 = 0.3, T3.2 = 92.3, Wax = 2 |
| P71 | L3 = 7.2, D31 = 0.3, T3.2 = 92.5, Wax = 2 |
| P72 | H1 = 1.8, B1 = 7.2, D31 = 0.3, T3.2 = 90.7, Wax = 2 |
| P73 | H1 = 1.8, B1 = 4.8, L2 = 2.7, D31 = 0.3, T3.2 = 90.4, Wax = 2 |
| P74 | H1 = 1.8, B1 = 3, L2 = 4.5, D31 = 0.3, T3.2 = 90.4, Wax = 2 |
| P75 | H1 = 0.8, B1 = 3, L2 = 4.5, D31 = 0.3, T3.2 = 91.4, Wax = 2 |
| P76 | H1 = 0.8, B1 = 3, L1 = 4.5, D31 = 0.3, T3.2 = 91.4, Wax = 2 |
| P77 | H1 = 0.8, B1 = 3, L3 = 4.5, D31 = 0.3, T3.2 = 91.4, Wax = 2 |
| P78 | H1 = 0.8, B1 = 4.5, L1 = 3, D31 = 0.3, T3.2 = 91.4, Wax = 2 |
| P79 | H1 = 0.8, B1 = 4.5, L3 = 3.1, D31 = 0.3, T3.2 = 91.3, Wax = 2 |

Several exemplary categories of hardmetal compositions are described below to illustrate the above general designs of the various hardmetal compositions to include either of Re and Nickel-based superalloy, or both. The exemplary categories of hardmetal compositions are defined based on the compositions of the binder matrices for the resulting hardmetals or cermets. The first category uses a binder matrix having pure Re, the second category uses a binder matrix having a Re—Co alloy, the third category uses a binder matrix having a Ni-based superalloy, and the fourth category uses a binder matrix having an alloy having a Ni-based superalloy in combination with of Re with or without Co.

In general, hard and refractory particles used in hardmetals of interest may include, but are not limited to, carbides, nitrides, carbonitrides, borides, and silicides. Some examples of Carbides include WC, TiC, TaC, HfC, NbC, $Mo_2C$, $Cr_2C_3$, VC, ZrC, $B_4C$, and SiC. Examples of Nitrides include TiN, ZrN, HfN, VN, NbN, TaN, and BN. Examples of Carbonitrides include Ti(C,N), Ta(C,N), Nb(C,N), Hf(C,N), Zr(C,N), and V(C,N). Examples of Borides include $TiB_2$, $ZrB_2$, $HfB_2$, $TaB_2$, $VB_2$, $MoB_2$, WB, and $W_2B$. In addition, examples of Silicides are $TaSi_2$, $WSi_2$, $NbSi_2$, and $MoSi_2$. The above-identified four categories of hardmetals or cermets can also use these and other hard and refractory particles.

In the first category of hardmetals based on the pure Re alloy binder matrix, the Re may be approximately from 5% to 40% by volume of all material compositions used in a hardmetal or cermet. For example, the sample with a lot No. P62 in TABLE 4 has 10% of pure Re, 70% of WC, 15% of TiC, and 5% of TaC by volume. This composition approximately corresponds to 14.48% of Re, 75.43% of WC, 5.09% of TiC and 5.0% of TaC by weight. In fabrication, the Specimen P62-4 was vacuum sintered at 2100° C. for about one hour and 2158° C. for about one hour. The density of this material is about 14.51 g/cc, where the calculated density is 14.50 g/cc. The average hardness Hv is 2627±35 $Kg/mm^2$ for 10 measurements taken at the room temperature under a load of 10 Kg. The measured surface fracture toughness $K_{SC}$ is about $7.4 \times 10^6$ Pa·m$^{1/2}$ estimated by Palmvist crack length at a load of 10 Kg.

Another example under this category is P66 in TABLE 4. This sample has about 20% of Re, 60% of WC, 15% of TiC, and 5% of TaC by volume in composition. In the weight percentage, this sample has about 27.92% of Re, 62.35% of WC, 4.91% of TiC, and 4.82% of TaC. The Specimen P66-4 was first processed with a vacuum sintering process at about 2200° C. for one hour and was then sintered in the solid-phase with a HIP process to remove porosities and voids. The density of the resulting hardmetal is about 14.40 g/cc compared to the calculated density of 15.04 g/cc. The average hardness Hv is about 2402±44 Kg/mm$^2$ for 7 different measurements taken at the room temperature under a load of 10 Kg. The surface fracture toughness $K_{SC}$ is about $8.1 \times 10^6$ Pa·m$^{1/2}$. The sample P66 and other compositions described here with a high concentration of Re with a weight percentage greater than 25%, as the sole binder material or one of two or more different binder materials in the binder, may be used for various applications at high operating temperatures and may be manufactured by using the two-step process based on solid-phase sintering.

The microstructures and properties of Re bound multiples types of hard refractory particles, such as carbides, nitrides, carbon nitrides, silicides, and borides, may provide advantages over Re-bound WC material. For example, Re bound WC—TiC—TaC may have better crater resistance in steel cutting than Re bound WC material. Another example is materials formed by refractory particles of Mo$_2$C and TiC bound in a Re binder.

For the second category with a Re—Co alloy as the binder matrix, the Re—Co alloy may be about from 5 to 40 Vol % of all material compositions used in the composition. In some implementations, the Re-to-Co ratio in the binder may vary from 0.01 to 0.99 approximately. Inclusion of Re can improve the mechanical properties of the resulting hardmetals, such as hardness, strength and toughness special at high temperature compared to Co bounded hardmetal. The higher Re content is the better high temperature properties are for most materials using such a binder matrix.

The average hardness Hv is about 1889±18 Kg/mm$^2$ at the room temperature under 10 Kg and the surface facture toughness $K_{SC}$ is about $7.7 \times 10^6$ Pa·m$^{1/2}$. In addition, the Specimen P31-1 was treated with a hot isostatic press (HIP) process at about 1600 C. /15 Ksi for about one hour after sintering. The HIP reduces or substantially eliminates the porosities and voids in the compound to increase the material density. After HIP, the measured density is about 15.25 g/cc (calculated density at 15.27 g/cc). The measured hardness Hv is about 1887±12 Kg/mm$^2$ at the room temperature under 10 Kg. The surface fracture toughness $K_{SC}$ is about $7.6 \times 10^6$ Pa·m$^{1/2}$.

Another example in this category is P32 in TABLE 4 with 5.0% of Re, 5.0% of Co, and 90% of WC in volume (6.75% of Re, 2.88% of Co and 90.38% of WC in weight). The Specimen P32-4 was vacuum sintered at 1800 C. for about one hour. The measured density is about 15.58 g/cc in comparison with the calculated density at 15.57 g/cc. The measured hardness Hv is about 2065 Kg/mm$^2$ at the room temperature under 10 Kg. The surface fracture toughness $K_{sc}$ is about $5.9 \times 10^6$ Pa·m$^{1/2}$. The Specimen P32-4 was also HIP at 1600 C /15 Ksi for about one hour after Sintering. The measured density is about 15.57 g/cc (calculated density at 15.57 g/cc). The average hardness Hv is about 2010±12 Kg/mm2 at the room temperature under 10 Kg. The surface fracture toughness $K_{SC}$ is about $5.8 \times 10^6$ Pa·m$^{1/2}$.

The third example is P33 in TABLE 4 which has 7.5% of Re, 2.5% of Co, and 90% of WC by volume and 9.93% of Re, 1.41% of Co and 88.66% of WC by weight. In fabrication, the Specimen P33-7 was vacuum sintered at 1950 C. for about one hour and was under sintering with porosities and voids. The measured density is about 15.38 g/cc (calculated density at 15.87 g/cc). The measured hardness Hv is about 2081 Kg/mm$^2$ at the room temperature under a force of 10 Kg. The surface fracture toughness Ksc is about $5.6 \times 10^6$ Pa·m$^{1/2}$. The Specimen P33-7 was HIP at 1600 C./15 Ksi for about one hour after Sintering. The measured density is about 15.82 g/cc (calculated density=15.87 g/cc). The average hardness Hv is measured at about 2039±18 Kg/mm$^2$ at the room temperature under 10 Kg. The surface fracture toughness Ksc is about $6.5 \times 10^6$ Pa·m$^{1/2}$.

TABLE 5

Re—Co alloy bound hardmetals

| | Temperature °C. | | Density g/cc | | Hv | Ksc | Grain |
|---|---|---|---|---|---|---|---|
| | Sinter | HIP | Calculated | Measured | Kg/mm$^2$ | $\times 10^6$ Pa·m$^{1/2}$ | size |
| P55-1 | 1350 | 1300 | 14.77 | 14.79 | 2047 | 8.6 | Ultra-fine |
| P56-5 | 1360 | 1300 | 14.77 | 14.72 | 2133 | 8.6 | Ultra-fine |
| P56A-4 | 1350 | 1300 | 14.77 | 14.71 | 2108 | 8.5 | Ultra-fine |
| P57-1 | 1350 | 1300 | 14.91 | 14.93 | 1747 | 12.3 | Fine |

The sample P31 in TABLE 4 is one example within this category with 2.5% of Re, 7.5% of Co, and 90% of WC by volume, and 3.44% of Re, 4.40% of Co and 92.12% of WC by weight. In fabrication, the Specimen P31-1 was vacuum sintered at 1725 C. for about one hour. slight under sintering with some porosities and voids. The density of the resulting hardmetal is about 15.16 g/cc (calculated density at 15.27 g/cc).

The samples P55, P56, P56A, and P57 in TABLE 4 are also examples for the category with a Re—Co alloy as the binder matrix. These samples have about 1.8% of Re, 7.2% of Co, 0.6% of VC except that P57 has no VC, and finally WC in balance. These different composition are made to study the effects of hardmetal grain size on Hv and Ksc. TABLE 5 lists the results.

TABLE 6

Properties of Ni-based superalloys, Ni, Re, and Co

| | Test Temp. C. | R-95 | U-700 | U720 | Nickel | Rhenium | Cobalt |
|---|---|---|---|---|---|---|---|
| Density (g/c.c.) | 21 | 8.2 | 7.9 | 8.1 | 8.9 | 21 | 8.9 |
| Melting Point (° C.) | | 1255 | 1205 | 1210 | 1450 | 3180 | 1495 |
| Elastic Modulus (Gpa) | 21 | 30.3 | 32.4 | 32.2 | 207 | 460 | 211 |
| Ultimate Tensile Strength (Mpa) | 21 | 1620 | 1410 | 1570 | 317 | 1069 | 234 |
| | 760 | 1170 | 1035 | 1455 | | | |
| | 800 | | | | | 620 | |
| | 870 | | 690 | 1150 | | | |
| | 1200 | | | | | 414 | |
| 0.2% Yield Strength (Mpa) | 21 | 1310 | 965 | 1195 | 60 | | |
| | 760 | 1100 | 825 | 1050 | | | |
| | 800 | | | | | | |
| | 870 | | 635 | | | | |
| | 1200 | | | | | | |
| Tensile Elongation (%) | 21 | 15 | 17 | 13 | 30 | >15 | |
| | 760 | 15 | 20 | 9 | | | |
| | 800 | | | | | 5 | |
| | 870 | | 27 | | | | |
| | 1200 | | | | | 2 | |
| Oxidation Resistance | | Excellent | Excellent | Excellent | Good | Poor | Good |

The third category is based on binder matrices with Ni-based superalloys from 5 to 40% in volume of all materials in the resulting hardmetal. Ni-based superalloys are a family of high temperature alloys with γ' strengthening. Three different strength alloys, Rene' 95, Udimet 720, and Udimet 700 are used as examples to demonstrate the effects of the binder strength on mechanical properties of the final hardmetals. The Ni-based superalloys have a high strength specially at elevated temperatures. Also, these alloys have good environmental resistance such as resistance to corrosion and oxidation at elevated temperature. Therefore, Ni-based superalloys can be used to increase the hardness of Ni-based superalloy bound hardmetals when compared to Cobalt bound hardmetals. Notably, the tensile strengths of the Ni-based superalloys are much stronger than the common binder material cobalt as shown by TABLE 6. This further shows that Ni-based superalloys are good binder materials for hardmetals.

One example for this category is P58 in TABLE 4 which has 7.5% of Rene' 95, 0.6% of VC, and 91.9% of WC in weight and compares to cobalt bound P54 in TABLE 4 (8% of Co, 0.6% of VC, and 91.4% of WC). The hardness of P58 is significant higher than P54 as shown in TABLE 7.

TABLE 7

Comparison of P54 and P58

| | Sintering | HIP | Hv, Kg/mm$^2$ | Ksc ×10$^6$ Pa·m$^{1/2}$ |
|---|---|---|---|---|
| P54-1 | 1350 C./1 hr | 1305° C. | 2094 | 8.8 |
| P54-2 | 1380 C./1 hr | 15KSI under Ar | 2071 | 7.8 |
| P54-3 | 1420 C./1 hr | 1 hour | 2107 | 8.5 |
| P58-1 | 1350, 1380, 1400, 1420, 1450, 1475 for 1 hour at each temperature | | 2322 | 7.0 |
| P58-3 | 1450 C./1 hr | | 2272 | 7.4 |
| P58-5 | 1500 C./1 hr | | 2259 | 7.2 |
| P58-7 | 1550 C./1 hr | | 2246 | 7.3 |

The fourth category is Ni-based superalloy plus Re as binder, e.g., approximately from 5% to 40% by volume of all materials in the resulting hardmetal or cermet. Because addition of Re increases the melting point of binder alloy of Ni-based superalloy plus Re, the processing temperature of hardmetal with Ni-based superalloy plus Re binder increases as the Re content increases. Several hardmetals with different Re concentrations are listed in TABLE 8. TABLE 9 further shows the measured properties of the hardmetals in TABLE 8.

TABLE 8

Hardmetal with a binder comprising Ni-based superalloy and Re

| | Composition, weight % | | | | | | | | Sintering Temperature ° C. |
|---|---|---|---|---|---|---|---|---|---|
| | Re | Rene95 | U-700 | U-720 | WC | TiC | TaC | Re to Binder Ratio | |
| P17 | 1.5 | 4.5 | | | 88 | 3 | 3 | 25% | 1600~1750 |
| P18 | 3 | 3.0 | | | 88 | 3 | 3 | 50% | 1600~1775 |
| P25 | 3.75 | 2.25 | | | 88 | 3 | 3 | 62.5% | 1650~1825 |
| P48 | 3.75 | 2.25 | | | 84 | 5 | 5 | 62.5% | 1650~1825 |
| P50 | 4.83 | 1.89 | | | 82.75 | 5.31 | 5.22 | 71.9% | 1675~1850 |
| P40 | 7.57 | 2.96 | | | 78.92 | 5.32 | 5.23 | 71.9% | 1675~1850 |
| P46 | 11.40 | 4.45 | | | 73.55 | 5.34 | 5.24 | 71.9% | 1675~1850 |

TABLE 8-continued

Hardmetal with a binder comprising Ni-based superalloy and Re

| | Composition, weight % | | | | | | | Sintering Temperature |
|---|---|---|---|---|---|---|---|---|
| | Re | Rene95 | U-700 | U-720 | WC | TiC | TaC | Re to Binder Ratio | ° C. |
| P51 | 7.15 | 0.93 | | | 81.55 | 5.23 | 5.14 | 88.5% | 1700~1900 |
| P41 | 11.10 | 1.45 | | | 77.14 | 5.20 | 5.11 | 88.5% | 1700~1900 |
| P63 | 12.47 | 0.86 | | | 76.45 | 5.16 | 5.07 | 93.6% | 1850~2100 |
| P19 | 1.5 | | 4.5 | | 88 | 3 | 3 | 25% | 1600~1750 |
| P20 | 3 | | 3 | | 88 | 3 | 3 | 50% | 1600~1775 |
| P67 | 24.37 | | 1.62 | | 64.02 | 5.04 | 4.95 | 93.6% | 1950~2300 |

TABLE 9

Properties of hardmetals bound by Ni-based superalloy and Re

| | Temperature, C. | | Density, g/cc | | Hv | Ksc |
|---|---|---|---|---|---|---|
| | Sinter | HIP | Calculated | Measured | Kg/mm² | ×10⁶ Pa·m^{1/2} |
| P17 | 1700 | | 14.15 | 14.18 | 2120 | 6.8 |
| P17 | 1700 | 1600 | 14.15 | 14.21 | 2092 | 7.2 |
| P18 | 1700 | | 14.38 | 14.47 | 2168 | 5.9 |
| P18 | 1700 | 1600 | 14.38 | 14.42 | 2142 | 6.1 |
| P25 | 1750 | | 14.49 | 14.41 | 2271 | 6.1 |
| P25 | 1750 | 1600 | 14.49 | 14.48 | 2193 | 6.5 |
| P48 | 1800 | 1600 | 13.91 | 13.99 | 2208 | 6.3 |
| P50 | 1800 | 1600 | 13.9 | 13.78 | 2321 | 6.5 |
| P40 | 1800 | | 13.86 | 13.82 | 2343 | |
| P40 | 1800 | 1600 | 13.86 | 13.86 | 2321 | 6.3 |
| P46 | 1800 | | 13.81 | 13.88 | 2282 | 7.1 |
| P46 | 1800 | 1725 | 13.81 | 13.82 | 2326 | 6.7 |
| P51 | 1800 | 1600 | 14.11 | 13.97 | 2309 | 6.6 |
| P41 | 1800 | 1600 | 14.18 | 14.63 | 2321 | 6.5 |
| P63 | 2000 | | 14.31 | 14.37 | 2557 | 7.9 |
| P19 | 1700 | | 14.11 | 14.11 | 2059 | 7.6 |
| P19 | 1700 | 1600 | 14.11 | | 2012 | 8.0 |
| P20 | 1725 | | 14.35 | 14.52 | 2221 | 6.4 |
| P20 | 1725 | 1600 | 14.35 | 14.35 | 2151 | 7.0 |
| P67 | 2200 | | 14.65 | 14.21 | 2113 | 8.1 |
| P67 | 2200 | 1725 | 14.65 | 14.34 | 2210 | 7.1 |

Another example under the fourth category uses a Ni-based superalloy plus Re and Co as binder which is also about 5% to 40% by volume. Exemplary compositions of hardmetals bound by Ni-based superalloy plus Re and Co are list in TABLE 10.

TABLE 10

Composition of hardmetals bound by Ni-based superalloy plus Re and Co

| | Composition, weight % | | | | | | |
|---|---|---|---|---|---|---|---|
| | Re | Co | Rene95 | U-720 | U-700 | WC | VC |
| P73 | 1.8 | 4.8 | 2.7 | | | 90.4 | 0.3 |
| P74 | 1.8 | 3 | 4.5 | | | 90.4 | 0.3 |
| P75 | 0.8 | 3 | 4.5 | | | 91.4 | 0.3 |
| P76 | 0.8 | 3 | | 4.5 | | 91.4 | 0.3 |
| P77 | 0.8 | 3 | | | 4.5 | 91.4 | 0.3 |
| P78 | 0.8 | 4.5 | | 3 | | 91.4 | 0.3 |
| P79 | 0.8 | 4.5 | | | 3.1 | 91.3 | 0.3 |

Measurements on selected samples have been performed to study properties of the binder matrices with Ni-based superalloys. In general, Ni-based superalloys not only exhibit excellent strengths at elevated temperatures but also possess outstanding resistances to oxidation and corrosion at high temperatures. Ni-based superalloys have complex microstructures and strengthening mechanisms. In general, the strengthening of Ni-based superalloys is primarily due to precipitation strengthening of γ-γ' and solid-solution strengthening. The measurements the selected samples demonstrate that Ni-based superalloys can be used as a high-performance binder materials for hardmetals.

TABLE 11 lists compositions of selected samples by their weight percentages of the total weight of the hardmetals. The WC particles in the samples are 0.2 μm in size. TABLE 12 lists the conditions for the two-step process performed and measured densities, hardness parameters, and toughness parameters of the samples. The Palmqvist fracture toughness Ksc is calculated from the total crack length of Palmqvist crack which is produced by the Vicker Indentor: Ksc=0.087*(Hv*W)^{1/2}. See, e.g., Warren and H. Matzke, Proceedings Of the International Conference On the Science of Hard Materials, Jackson, Wyoming, Aug 23-28, 1981. Hardness Hv and Crack Length are measured at a load of 10 Kg for 15 seconds. During each measurement, eight indentations were made on each specimen and the average value was used in computation of the listed data.

TABLE 11

| | Weight % | | | | | Re in Binder | Vol % Binder |
|---|---|---|---|---|---|---|---|
| | Re | Co | R-95 | WC | VC | | |
| P54 | 0 | 8 | 0 | 91.4 | 0.6 | 0 | 13.13 |
| P58 | 0 | 0 | 7.5 | 91.9 | 0.6 | 0 | 13.25 |
| P56 | 1.8 | 7.2 | 0 | 90.4 | 0.6 | 20 | 13.20 |
| P72 | 1.8 | 7.2 | 0 | 90.7 | 0.3 | 20 | 13.18 |
| P73 | 1.8 | 4.8 | 2.7 | 90.4 | 0.3 | 20 | 14.00 |
| P74 | 1.8 | 3 | 4.5 | 90.4 | 0.3 | 20 | 14.24 |

TABLE 12

| Sample Code | Sinter Condition | HIP Condition | Cal. Density g/c.c. | Measu. Density g/c.c. | Hardness, Hv Kg/mm$^2$ | Palmqvist Toughness Ksc, ×10$^6$ Pa·m$^{1/2}$ |
|---|---|---|---|---|---|---|
| P54-5 | 1360° C./1 hr | | 14.63 | 14.58 | 2062 ± 35 | 8.9 ± 0.2 |
| | 1360° C./1 hr | 1305° C./15KSI/1 hr | | 14.55 | 2090 ± 22 | 8.5 ± 0.2 |
| P58-7 | 1550° C./1 hr | | 14.50 | 14.40 | 2064 ± 12 | 7.9 ± 0.2 |
| | 1550° C./1 hr | 1305° C./15KSI/1 hr | | 14.49 | 2246 ± 23 | 7.3 ± 0.1 |
| P56-5 | 1360° C./1 hr | | 14.77 | 14.71 | 2064 ± 23 | 8.2 ± 0.1 |
| | 1360° C./1 hr | 1305° C./15KSI/1 hr | | 14.72 | 2133 ± 34 | 8.6 ± 0.2 |
| P72-6 | 1475° C./1 hr | | 14.83 | 14.77 | 2036 ± 34 | 8.5 ± 0.6 |
| | 1475° C./1 hr | 1305° C./15KSI/1 hr | | 14.91 | 2041 ± 30 | 9.1 ± 0.4 |
| P73-6 | 1475° C./1 hr | | 14.73 | 14.70 | 2195 ± 23 | 7.7 ± 0.1 |
| | 1475° C./1 hr | 1305° C./15KSI/1 hr | | 14.72 | 2217 ± 25 | 8.1 ± 0.2 |
| P74-5 | 1500° C./1 hr and 1520° C./1 hr | | 14.69 | 14.69 | 2173 ± 30 | 7.4 ± 0.3 |
| | 1500° C./1 hr and 1520° C./1 hr | 1305° C./15KSI/1 hr | | 14.74 | 2223 ± 34 | 7.7 ± 0.1 |

Among the tested samples, the sample P54 uses the conventional binder consisting of Co. The Ni-superalloy R-95 is used in the sample P58 to replace Co as the binder in the sample P54. As a result, the Hv increases from 2090 of P54 to 2246 of P58. In the sample P56, the mixture of Re and Co is used to replace Co as binder and the corresponding Hv increases from 2090 of P54 to 2133 of P56. The samples P72, P73, P74 have the same Re content but different amounts of Co and R95. The mixtures of Re, Co, and R95 are used in samples P73 and P74 to replace the binder having a mixture of Re and Co as the binder in the sample 72. The hardness Hv increases from 2041(P72) to 2217 (P73) and 2223(P74).

TABLE 13

| | Weight % | | | | | | | Re in Binder | Vol. % Binder |
|---|---|---|---|---|---|---|---|---|---|
| | Re | R-95 | Co | TiC | TaC | WC WC (2 μm) | (0.2 μm) | | |
| P17 | 1.5 | 4.5 | 0 | 3 | 3 | 88 | 0 | 25 | 8.78 |
| P18 | 3 | 3 | 0 | 3 | 3 | 88 | 0 | 50 | 7.31 |
| P25 | 3.75 | 2.25 | 0 | 3 | 3 | 88 | 0 | 62.5 | 6.57 |
| P48 | 3.75 | 2.25 | 0 | 5 | 5 | 84 | 0 | 62.5 | 6.3 |
| P50 | 4.83 | 1.89 | 0 | 5.31 | 5.22 | 82.75 | 0 | 71.9 | 6.4 |
| P51 | 7.15 | 0.93 | 0 | 5.23 | 5.14 | 81.55 | 0 | 88.5 | 6.4 |
| P49 | 7.55 | 0 | 3.25 | 5.31 | 5.21 | 78.68 | 0 | 69.9 | 10 |
| P40A | 7.57 | 2.96 | 0 | 5.32 | 5.23 | 78.92 | 0 | 71.9 | 10 |
| P63 | 12.47 | 0.86 | 0 | 5.16 | 5.07 | 0 | 76.45 | 93.6 | 10 |
| P62A | 14.48 | 0 | 0 | 5.09 | 5.00 | 0 | 75.43 | 100 | 10 |
| P66 | 27.92 | 0 | 0 | 4.91 | 4.82 | 0 | 62.35 | 100 | 20 |

Measurements on selected samples have also been performed to further study properties of the binder matrices with Re in the binder matrices. TABLE 13 lists the tested samples. The WC particles with two different particle sizes of 2 μm and 0.2 μm were used. TABLE 14 lists the conditions for the two-step process performed and the measured densities, hardness parameters, and toughness parameters of the selected samples.

TABLE 14

| Sample Code | Sinter Condition | HIP Condition | Cal. Density g/c.c. | Measu. Density g/c.c. | Hardness, Hv Kg/mm$^2$ | Palmqvist Toughness** Ksc, MPam$^{0.5}$ |
|---|---|---|---|---|---|---|
| P17-5 | 1800° C./1 hr | 1600° C./15KSI/1 hr | 14.15 | 14.21 | 2092 ± 3 | 7.2 ± 0.1 |
| P18-3 | 1800° C./1 hr | 1600° C./15KSI/1 hr | 14.38 | 14.59 | 2028 ± 88 | 6.8 ± 0.3 |
| P25-3 | 1750° C./1 hr | 1600° C./15KSI/1 hr | 14.49 | 14.48 | 2193 ± 8 | 6.5 ± 0.1 |
| P48-1 | 1800° C./1 hr | 1600° C./15KSI/1 hr | 13.91 | 13.99 | 2208 ± 12 | 6.3 ± 0.4 |
| P50-4 | 1800° C./1 hr | 1600° C./15KSI/1 hr | 13.9 | 13.8 | 2294 ± 20 | 6.3 ± 0.1 |
| P51-1 | 1800° C./1 hr | 1600° C./15KSI/1 hr | 14.11 | 13.97 | 2309 ± 6 | 6.6 ± 0.1 |
| P40A-1 | 1800° C./1 hr | 1600° C./15KSI/1 hr | 13.86 | 13.86 | 2321 ± 10 | 6.3 ± 0.1 |
| P49-1 | 1800° C./1 hr | 1600° C./15KSI/1 hr | 13.91 | 13.92 | 2186 ± 29 | 6.5 ± 0.2 |

TABLE 14-continued

| Sample Code | Sinter Condition | HIP Condition | Cal. Density g/c.c. | Measu. Density g/c.c. | Hardness, Hv Kg/mm$^2$ | Palmqvist Toughness** Ksc, MPam$^{0.5}$ |
|---|---|---|---|---|---|---|
| P62A-6 | 2200° C./1 hr | 1725° C./30KSI/1 hr | 14.5 | 14.41 | 2688 ± 22 | 6.7 ± 0.1 |
| P63-5 | 2200° C./1 hr | 1725° C./30KSI/1 hr | 14.31 | 14.37 | 2562 ± 31 | 6.7 ± 0.2 |
| P66-4 | 2200° C./1 hr | | 15.04 | 14.40 | 2402 ± 44 | 8.2 ± 0.4 |
| P66-4 | 2200° C./1 hr | 1725° C./30KSI/1 hr | 15.04 | 14.52 | | |
| P66-4 | 2200° C./1 hr | 1725° C./30KSI/1 hr + 1950° C./30KSI/1 hr | 15.04 | 14.53 | 2438 ± 47 | 6.9 ± 0.2 |
| P66-5 | 2200° C./1 hr | | 15.04 | 14.33 | 2092 ± 23 | 7.3 ± 0.3 |
| P66-5 | 2200° C./1 hr | 1725° C./30KSI/1 hr | 15.04 | 14.63 | | |
| P66-5 | 2200° C./1 hr | 1725° C./30KSI/1 hr + 1850° C./30KSI/1 hr | 15.04 | 14.66 | 2207 ± 17 | 7.1 ± 0.2 |

TABLE 15 further shows measured hardness parameters under various temperatures for the selected samples, where the Knoop hardness $H_k$ were measured under a load of 1 Kg for 15 seconds on a Nikon QM hot hardness tester and R is a ratio of $H_k$ at an elevated testing temperature over $H_k$ at 25° C. The hot hardness specimens of C2 and C6 carbides were prepared from inserts SNU434 which were purchased from MSC Co. (Melville, N.Y.).

P62A with pure Re as the binder has the highest hardness. The sample P63 with a binder composition of 94% of Re and 6% of the Ni-based superalloy R95 has the second highest hardness. The samples P40A(71.9% Re-29.1% R95), P49(69.9% Re-30.1% R95), P51(88.5% Re-11.5% R95), and P50(71.9% Re-28.1% R95) are the next group in their hardness. The sample P48 with 62.5% of Re and 37.5% of R95 in its binder

TABLE 15

(each measured value at a given temperature is an averaged value of 3 different measurements)

| Lot No. | | Testing Temperature, ° C. | | | | | | | Hv @25° |
|---|---|---|---|---|---|---|---|---|---|
| | | 25 | 400 | 500 | 600 | 700 | 800 | 900 | |
| P17-5 | Hk, Kg/mm$^2$ | 1880 ± 10 | | 1720 ± 17 | 1653 ± 25 | 1553 ± 29 | 1527 ± 6 | | 2092 ± 3 |
| | R, % | 100 | | 91 | 88 | 83 | 81 | | |
| P18-3 | Hk, Kg/mm$^2$ | 1773 ± 32 | | 1513 ± 12 | 1467 ± 21 | 1440 ± 10 | 1340 ± 16 | | 2028 ± 88 |
| | R, % | 100 | | 85 | 83 | 81 | 76 | | |
| P25-3 | Hk, Kg/mm$^2$ | 1968 ± 45 | | 1813 ± 12 | | 1710 ± 0 | | 1593 ± 5 | 2193 ± 8 |
| | R, % | 100 | | 92 | | 87 | | 81 | |
| P40A-1 | Hk, Kg/mm$^2$ | 2000 ± 35 | | 1700 ± 17 | 1663 ± 12 | 1583 ± 21 | 1540 ± 35 | | 2321 ± 10 |
| | R, % | 100 | | 85 | 83 | 79 | 77 | | |
| P48-1 | Hk, Kg/mm$^2$ | 1925 ± 25 | | 1613 ± 15 | 1533 ± 29 | 1477 ± 6 | 1377 ± 15 | | 2208 ± 12 |
| | R, % | 100 | | 84 | 80 | 77 | 72 | | |
| P49-1 | Hk, Kg/mm$^2$ | 2023 ± 32 | | 1750 ± 0 | 1633 ± 6 | 1600 ± 17 | | | 2186 ± 29 |
| | R, % | 100 | | 87 | 81 | 79 | | | |
| P50-4 | Hk, Kg/mm$^2$ | 2057 ± 25 | | 1857 ± 15 | 1780 ± 20 | 1713 ± 6 | 1627 ± 40 | | 2294 ± 20 |
| | R, % | 100 | | 90 | 87 | 83 | 79 | | |
| P51-1 | Hk, Kg/mm$^2$ | 2050 ± 26 | | 1797 ± 6 | 1743 ± 35 | 1693 ± 15 | 1607 ± 15 | | 2309 ± 6 |
| | R, % | 100 | | 88 | 85 | 83 | 78 | | |
| P62A-6 | Hk, Kg/mm$^2$ | 2228 ± 29 | | 2063 ± 25 | | 1960 ± 76 | | 1750 ± 0 | 2688 ± 22 |
| | R, % | 100 | | 93 | | 88 | | 79 | |
| P63-5 | Hk, Kg/mm$^2$ | 1887 ± 6 | | 1707 ± 35 | 1667 ± 15 | 1633 ± 6 | 1603 ± 25 | | 2562 ± 31 |
| | R, % | 100 | | | | | | | |
| C2 Carbide | Hk, Kg/mm$^2$ | 1503 ± 38 | 988 ± 9 | 711 ± 0 | 584 ± 27 | | | | 1685 ± 16 |
| | R, % | 100 | 66 | 47 | 39 | | | | |
| C6 Carbide | Hk, Kg/mm$^2$ | 1423 ± 23 | | 1127 ± 25 | 1090 ± 10 | 1033 ± 23 | 928 ± 18 | | 1576 ± 11 |
| | R, % | 100 | | 79 | 77 | 73 | 65 | | |

Inclusion of Re in the binder matrices of the hardmetals increases the melting point of binder alloys that include Co—Re, Ni superalloy-Re, Ni superalloy-Re—Co. For example, the melting point of the sample P63 is much higher than the temperature of 2200° C. used for the solid-phase sintering process. Hot hardness values of such hardmetals with Re in the binders (e.g., P17 to P63) are much higher than conventional Co bound hardmetals (C2 and C6 carbides). In particular, the above measurements reveal that an increase in the concentration of Re in the binder increases the hardness at high temperatures. Among the tested samples, the sample has the lowest hardness at high temperatures among the tested materials in part because its Re content is the lowest.

In yet another category, a hardmetal or cermet may include TiC and TiN bonded in a binder matrix having Ni and Mo or $Mo_2C$. The binder Ni of cermet can be fully or partially replaced by Re, by Re plus Co, by Ni-based superalloy, by Re plus Ni-based superalloy, and by Re plus Co and Ni-based superalloy. Samples P38 and P39 are examples of Ni-bound cermets. The sample P34 is an example of Rene95-bound Cermet. The P35, P36, P37, and P45 are Re plus Rene95 bound cermet. Compositions of P34, 35, 36, 37, 38, 39, and 45 are listed in TABLE 16.

TABLE 16

Composition of P34 to P39

| | Re | Rene95 | Ni 1 | Ni 2 | TiC | Mo₂C | WC | TaC |
|---|---|---|---|---|---|---|---|---|
| | | | | Weight % | | | | |
| P34 | | 14.47 | | | 69.44 | 16.09 | | |
| P35 | 8.77 | 10.27 | | | 65.37 | 15.23 | | |
| P36 | 16.6 | 6.50 | | | 62.40 | 14.46 | | |
| P37 | 23.8 | 3.09 | | | 59.38 | 13.76 | | |
| P38 | | | 15.51 | | 68.60 | 15.89 | | |
| P39 | | | | 15.51 | 68.60 | 15.89 | | |
| P45 | 9.37 | 3.66 | | | | 15.37 | 6.51 | 58.6 | 6.47 |

TABLES 17-29 list additional compositions with 3 exemplary composition ranges 1, 2, and 3 which may be used for different applications.

TABLE 17

Compositions that use pure Re as a binder for binding a carbide from carbides of IVb, Vb, & VIb columns of the Periodic Table or a nitride from nitrides of IVb & Vb columns

| | | Composition Range 1 | | Composition Range 2 | | Composition Range 3 | | Estimated Melting Point, ° C. |
|---|---|---|---|---|---|---|---|---|
| | | Volume % | Weight % | Volume % | Weight % | Volume % | Weight % | |
| Re Bound TiC | Re | 7.25 to 40 | 25 to 74 | 7.25 to 35 | 25 to 70 | 7.25 to 30 | 25 to 65 | 3000 to 3200 |
| | TiC | 60 to 92.75 | 26 to 75 | 65 to 92.75 | 30 to 75 | 70 to 92.75 | 35 to 75 | |
| Re Bound ZrC | Re | 3 to 40 | 9 to 68 | 4 to 35 | 12 to 63 | 5 to 30 | 14 to 58 | 3000 to 3200 |
| | ZrC | 60 to 97 | 32 to 93 | 65 to 96 | 37 to 88 | 70 to 95 | 42 to 86 | |
| Re Bound HfC | Re | 16.75 to 40 | 25 to 52 | 16.75 to 35 | 25 to 47 | 16.75 to 30 | 25 to 42 | 3000 to 3200 |
| | HfC | 60 to 83.25 | 48 to 75 | 65 to 83.25 | 53 to 75 | 70 to 83.25 | 58 to 75 | |
| Re Bound VC | Re | 3 to 40 | 11 to 72 | 4 to 35 | 14 to 67 | 5 to 30 | 17 to 62 | 2700 to 3100 |
| | VC | 60 to 97 | 28 to 89 | 65 to 96 | 33 to 86 | 70 to 95 | 38 to 83 | |
| Re Bound NbC | Re | 3 to 40 | 8 to 64 | 4 to 35 | 10 to 59 | 5 to 30 | 12 to 54 | 3000 to 3200 |
| | NbC | 60 to 97 | 36 to 92 | 65 to 96 | 41 to 90 | 70 to 95 | 46 to 88 | |
| Re Bound TaC | Re | 3 to 40 | 4 to 49 | 4 to 35 | 6 to 44 | 5 to 30 | 7 to 38 | 3000 to 3200 |
| | TaC | 60 to 97 | 51 to 96 | 65 to 96 | 56 to 94 | 70 to 95 | 62 to 93 | |
| Re Bound Cr₂C₃ | Re | 3 to 40 | 9 to 68 | 4 to 35 | 12 to 63 | 5 to 30 | 14 to 57 | 1700 to 1900 |
| | Cr₂C₃ | 60 to 97 | 32 to 91 | 65 to 96 | 37 to 88 | 70 to 95 | 43 to 86 | |
| Re Bound Mo₂C | Re | 3 to 40 | 7 to 61 | 4 to 35 | 9 to 55 | 5 to 30 | 11 to 50 | 2300 to 2600 |
| | Mo₂C | 60 to 97 | 39 to 93 | 65 to 96 | 45 to 91 | 70 to 95 | 50 to 89 | |
| Re Bound WC | Re | 20 to 40 | 25 to 47 | 20 to 35 | 25 to 42 | 20 to 30 | 25 to 37 | 2700 to 2900 |
| | WC | 60 to 80 | 53 to 75 | 65 to 80 | 58 to 75 | 70 to 80 | 63 to 75 | |
| Re Bound TiN | Re | 3 to 40 | 11 to 72 | 4 to 35 | 14 to 68 | 5 to 30 | 17 to 62 | 2900 to 3100 |
| | TiN | 60 to 97 | 28 to 89 | 65 to 96 | 32 to 86 | 70 to 95 | 38 to 83 | |
| Re Bound ZrN | Re | 3 to 40 | 8 to 66 | 4 to 35 | 11 to 61 | 5 to 30 | 13 to 55 | 2900 to 3100 |
| | ZrN | 60 to 97 | 34 to 92 | 65 to 96 | 39 to 89 | 70 to 95 | 45 to 87 | |
| Re Bound HfN | Re | 3 to 40 | 4 to 50 | 4 to 35 | 6 to 45 | 5 to 30 | 7 to 39 | 3000 to 3200 |
| | HfN | 60 to 97 | 50 to 96 | 65 to 96 | 55 to 94 | 70 to 95 | 61 to 93 | |
| Re Bound VN | Re | 3 to 40 | 9 to 70 | 4 to 35 | 13 to 65 | 5 to 30 | 16 to 62 | 2100 to 2300 |
| | VN | 60 to 97 | 30 to 91 | 65 to 96 | 35 to 87 | 70 to 95 | 38 to 84 | |
| Re Bound NbN | Re | 3 to 40 | 8 to 66 | 4 to 35 | 11 to 61 | 5 to 30 | 13 to 55 | 2300 to 2500 |
| | NbN | 60 to 97 | 34 to 92 | 65 to 96 | 39 to 89 | 70 to 95 | 45 to 87 | |
| Re Bound TaN | Re | 3 to 40 | 4 to 49 | 4 to 35 | 6 to 44 | 5 to 30 | 7 to 39 | 3000 to 3200 |
| | TaN | 60 to 97 | 51 to 96 | 65 to 96 | 56 to 94 | 70 to 95 | 61 to 93 | |

TABLE 18

Compositions that use Ni-based superalloy(NBSA) in a binder for binding a nitride from nitrides of IVb &Vb columns of the Periodic Table.

|  |  | Composition Range 1 | | Composition Range 2 | | Composition Range 3 | |
|---|---|---|---|---|---|---|---|
|  |  | Volume % | Weight % | Volume % | Weight % | Volume % | Weight % |
| NBSA—TiN | NBSA | 3 to 40 | 4 to 50 | 4 to 35 | 6 to 44 | 5 to 30 | 7 to 39 |
|  | TiN | 60 to 97 | 50 to 96 | 65 to 96 | 56 to 94 | 70 to 95 | 61 to 93 |
| NBSA—ZrN | NBSA | 3 to 40 | 3 to 42 | 4 to 35 | 4 to 37 | 5 to 30 | 5 to 32 |
|  | ZrN | 60 to 97 | 58 to 97 | 65 to 96 | 63 to 96 | 70 to 95 | 68 to 95 |
| NBSA—HfN | NBSA | 3 to 40 | 1.8 to 28 | 4 to 35 | 2.4 to 24 | 5 to 30 | 3 to 19 |
|  | HfN | 60 to 97 | 72 to 98.2 | 65 to 96 | 76 to 97.6 | 70 to 95 | 81 to 97 |
| NBSA—VN | NBSA | 3 to 40 | 4 to 47 | 4 to 35 | 5 to 42 | 5 to 30 | 7 to 36 |
|  | VN | 60 to 97 | 53 to 96 | 65 to 96 | 58 to 95 | 70 to 95 | 64 to 93 |
| NBSA—NbN | NBSA | 3 to 40 | 3 to 42 | 4 to 35 | 4 to 37 | 5 to 30 | 5 to 32 |
|  | NbN | 60 to 97 | 52 to 97 | 65 to 96 | 33 to 96 | 70 to 95 | 68 to 95 |
| NBSA—TaN | NBSA | 3 to 40 | 1.7 to 27 | 4 to 35 | 2.3 to 23 | 5 to 30 | 3 to 19 |
|  | TaN | 60 to 97 | 73 to 98.3 | 65 to 96 | 77 to 97.7 | 70 to 95 | 81 to 97 |

TABLE 19

Compositions that use Re and Ni-based superalloy (Re + NBSA) in a binder for binding a carbide from carbides of IVb, Vb, & VIb or a nitride from nitrides of IVb & Vb. The range of the binder is from 1% Re + 99% superalloy to 99% Re + 1% superalloy.

| Material |  | Composition Range 1 | | Composition Range 2 | | Composition Range 3 | |
|---|---|---|---|---|---|---|---|
|  |  | Volume % | Weight % | Volume % | Weight % | Volume % | Weight % |
| (Re + NBSA)—TiC | Re | 0.03 to 39.6 | 0.13 to 73.6 | 0.04 to 34.7 | 0.17 to 69.3 | 0.05 to 29.7 | 0.21 to 64.3 |
|  | NBSA | 0.03 to 39.6 | 0.04 to 51.1 | 0.04 to 34.7 | 0.06 to 45.9 | 0.05 to 29.7 | 0.07 to 40.4 |
|  | TiC | 60 to 97 | 26.1 to 95.1 | 65 to 96 | 30.5 to 93.6 | 70 to 95 | 35.5 to 92 |
| (Re + NBSA)—ZrC | Re | 0.03 to 39.6 | 0.09 to 67.7 | 0.04 to 34.7 | 0.13 to 62.9 | 0.05 to 29.7 | 0.16 to 57.5 |
|  | NBSA | 0.03 to 39.6 | 0.03 to 44.1 | 0.04 to 34.7 | 0.05 to 39.0 | 0.05 to 29.7 | 0.06 to 33.8 |
|  | ZrC | 60 to 97 | 32 to 96 | 65 to 96 | 37 to 95 | 70 to 95 | 42 to 94 |
| (Re + NBSA)—HfC | Re | 0.03 to 39.6 | 0.05 to 52.1 | 0.04 to 34.7 | 0.07 to 46.8 | 0.05 to 29.7 | 0.08 to 41.2 |
|  | NBSA | 0.03 to 39.6 | 0.02 to 29.2 | 0.04 to 34.7 | 0.025 to 25 | 0.05 to 29.7 | 0.03 to 21 |
|  | HfC | 60 to 97 | 47.7 to 98.1 | 65 to 96 | 53 to 97.4 | 70 to 95 | 58.6 to 96.7 |
| (Re + NBSA)—VC | Re | 0.03 to 39.6 | 0.11 to 71.5 | 0.04 to 34.7 | 0.15 to 67.0 | 0.05 to 29.7 | 0.19 to 61.8 |
|  | NBSA | 0.03 to 39.6 | 0.04 to 48.4 | 0.04 to 34.7 | 0.05 to 43.3 | 0.05 to 29.7 | 0.06 to 37.9 |
|  | VC | 60 to 97 | 28.3 to 95.6 | 65 to 96 | 32.8 to 94.2 | 70 to 95 | 38 to 92.8 |
| (Re + NBSA)—NbC | Re | 0.03 to 39.6 | 0.08 to 63.8 | 0.04 to 34.7 | 0.1 to 58.7 | 0.05 to 29.7 | 0.13 to 53.1 |
|  | NBSA | 0.03 to 39.6 | 0.03 to 39.9 | 0.04 to 34.7 | 0.04 to 35 | 0.05 to 29.7 | 0.05 to 30 |
|  | NbC | 60 to 97 | 36 to 96.9 | 65 to 96 | 41 to 95.8 | 70 to 95 | 46.6 to 94.8 |
| (Re + NBSA)—TaC | Re | 0.03 to 39.6 | 0.04 to 48.8 | 0.04 to 34.7 | 0.06 to 43.5 | 0.05 to 29.7 | 0.07 to 38 |
|  | NBSA | 0.03 to 39.6 | 0.016 to 26.5 | 0.04 to 34.7 | 0.02 to 22.6 | 0.05 to 29.7 | 0.03 to 18.9 |
|  | TaC | 60 to 97 | 51 to 98.3 | 65 to 96 | 56.3 to 97.7 | 70 to 95 | 61.8 to 97.1 |
| (Re + NBSA)—Cr$_2$C$_3$ | Re | 0.03 to 39.6 | 0.09 to 67.3 | 0.04 to 34.7 | 0.12 to 62.5 | 0.05 to 29.7 | 0.16 to 57.0 |
|  | NBSA | 0.03 to 39.6 | 0.03 to 43.6 | 0.04 to 34.7 | 0.04 to 38.6 | 0.05 to 29.7 | 0.05 to 33.4 |
|  | Cr$_2$C$_3$ | 60 to 97 | 32.4 to 96.4 | 65 to 96 | 37.3 to 95.2 | 70 to 95 | 42.8 to 94.0 |

TABLE 19-continued

Compositions that use Re and Ni-based superalloy (Re + NBSA) in a binder for binding a carbide from carbides of IVb, Vb, & VIb or a nitride from nitrides of IVb & Vb. The range of the binder is from 1% Re + 99% superalloy to 99% Re + 1% superalloy.

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + NBSA)—Mo₂C | Re | 0.03 to 39.6 | 0.07 to 60.2 | 0.04 to 34.7 | 0.1 to 55 | 0.05 to 29.7 | 0.12 to 49.3 |
| | NBSA | 0.03 to 39.6 | 0.025 to 36.3 | 0.04 to 34.7 | 0.03 to 31.6 | 0.05 to 29.7 | 0.04 to 26.9 |
| | Mo₂C | 60 to 97 | 39.6 to 97.3 | 65 to 96 | 44.8 to 96.4 | 70 to 95 | 50.5 to 95.5 |
| (Re + NBSA)—WC | Re | 0.03 to 39.6 | 0.04 to 46.9 | 0.04 to 34.7 | 0.05 to 41.7 | 0.05 to 29.7 | 0.07 to 36.3 |
| | NBSA | 0.03 to 39.6 | 0.015 to 25 | 0.04 to 34.7 | 0.02 to 21.3 | 0.05 to 29.7 | 0.025 to 17.8 |
| | WC | 0 to 97 | 52.9 to 98.4 | 65 to 96 | 58.2 to 97.9 | 70 to 95 | 63.6 to 97.3 |
| (Re + NBSA)—TiN | Re | 0.03 to 39.6 | 0.1 to 71.7 | 0.04 to 34.7 | 0.15 to 67.2 | 0.05 to 29.7 | 0.19 to 62 |
| | NBSA | 0.03 to 39.6 | 0.04 to 48.7 | 0.04 to 34.7 | 0.05 to 43.5 | 0.05 to 29.7 | 0.06 to 38 |
| | TiN | 60 to 97 | 28 to 95.6 | 65 to 96 | 32.6 to 94.1 | 70 to 95 | 37.8 to 92.7 |
| (Re + NBSA)—ZrN | Re | 0.03 to 39.6 | 0.09 to 65.3 | 0.04 to 34.7 | 0.1 to 60.3 | 0.05 to 29.7 | 0.14 to 54.8 |
| | NBSA | 0.03 to 39.6 | 0.03 to 41.4 | 0.04 to 34.7 | 0.04 to 36.5 | 0.05 to 29.7 | 0.05 to 31.4 |
| | ZrN | 60 to 97 | 34.5 to 96.7 | 65 to 96 | 39.4 to 95.6 | 70 to 95 | 45 to 94.5 |
| (Re + NBSA)—HfN | Re | 0.03 to 39.6 | 0.05 to 50 | 0.04 to 34.7 | 0.06 to 44.7 | 0.05 to 29.7 | 0.08 to 39.2 |
| | NBSA | 0.03 to 39.6 | 0.017 to 27.5 | 0.04 to 34.7 | 0.02 to 23.5 | 0.05 to 29.7 | 0.03 to 19.6 |
| | HfN | 60 to 97 | 49.8 to 98.2 | 65 to 96 | 55.1 to 97.6 | 70 to 95 | 60.7 to 97 |
| (Re + NBSA)—VN | Re | 0.03 to 39.6 | 0.1 to 69.6 | 0.04 to 34.7 | 0.14 to 65 | 0.05 to 29.7 | 0.17 to 59.6 |
| | NBSA | 0.03 to 39.6 | 0.04 to 46.2 | 0.04 to 34.7 | 0.05 to 41.1 | 0.05 to 29.7 | 0.06 to 35.8 |
| | VN | 60 to 97 | 30 to 96 | 65 to 96 | 35 to 94.7 | 70 to 95 | 40 to 93.3 |
| (Re + NBSA)—NbN | Re | 0.03 to 39.6 | 0.09 to 65.3 | 0.04 to 34.7 | 0.1 to 60.4 | 0.05 to 29.7 | 0.14 to 54.9 |
| | NBSA | 0.03 to 39.6 | 0.03 to 41.5 | 0.04 to 34.7 | 0.04 to 36.5 | 0.05 to 29.7 | 0.05 to 31.5 |
| | NbN | 60 to 97 | 34.4 to 96.7 | 65 to 96 | 39.4 to 95.6 | 70 to 95 | 45 to 94.5 |
| (Re + NBSA)—TaN | Re | 0.03 to 39.6 | 0.04 to 49.1 | 0.04 to 34.7 | 0.06 to 43.8 | 0.05 to 29.7 | 0.08 to 38.3 |
| | NBSA | 0.03 to 39.6 | 0.017 to 26.8 | 0.04 to 34.7 | 0.02 to 22.8 | 0.05 to 29.7 | 0.027 to 19 |
| | TaN | 60 to 97 | 50.7 to 98.3 | 65 to 96 | 56 to 97.7 | 70 to 95 | 61.5 to 97 |

TABLE 20

Compositions that use Re and Co (Re + Co) in a binder for binding a carbide from carbides of IVb, Vb, & VIb or a nitride from nitrides of IVb & Vb. The range of Binder is from 1% Re + 99% Co to 99% Re + 1% Co.

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + Co)—TiC | Re | 0.03 to 39.6 | 0.13 to 73.6 | 0.04 to 34.7 | 0.17 to 69.3 | 0.05 to 29.7 | 0.20 to 64.3 |
| | Co | 0.03 to 39.6 | 0.05 to 54.1 | 0.04 to 34.7 | 0.07 to 48.9 | 0.05 to 29.7 | 0.08 to 43.3 |

TABLE 20-continued

Compositions that use Re and Co (Re + Co) in a binder for
binding a carbide from carbides of IVb, Vb, & VIb or a nitride from
nitrides of IVb & Vb. The range of Binder is from 1% Re + 99% Co to 99%
Re + 1% Co.

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| | TiC | 60 to 97 | 26.1 to94.6 | 65 to 96 | 30.4 to 92.8 | 70 to 95 | 35.5 to 91 |
| (Re + Co)—ZrC | Re | 0.03 to 39.6 | 0.09 to 67.7 | 0.04 to 34.7 | 0.13 to 62.9 | 0.05 to 29.7 | 0.16 to 57.5 |
| | Co | 0.03 to 39.6 | 0.04 to 47.1 | 0.04 to 34.7 | 0.05 to 42.0 | 0.05 to 29.7 | 0.06 to 36.6 |
| | ZrC | 60 to 97 | 32 to 96 | 65 to 96 | 37 to 95 | 70 to 95 | 42 to 93 |
| (Re + Co)—HfC | Re | 0.03 to 39.6 | 0.05 to 52.1 | 0.04 to 34.7 | 0.07 to 46.8 | 0.05 to 29.7 | 0.08 to 41.2 |
| | Co | 0.03 to 39.6 | 0.02 to 31.8 | 0.04 to 34.7 | 0.028 to 27 | 0.05 to 29.7 | 0.035 to 23 |
| | HfC | 60 to 97 | 47.6 to 97.8 | 65 to 96 | 53 to 97.1 | 70 to 95 | 58.6 to 96.3 |
| (Re + Co)—VC | Re | 0.03 to 39.6 | 0.11 to 71.4 | 0.04 to 34.7 | 0.15 to 67.0 | 0.05 to 29.7 | 0.19 to 61.8 |
| | Co | 0.03 to 39.6 | 0.05 to 51.5 | 0.04 to 34.7 | 0.06 to 46.3 | 0.05 to 29.7 | 0.07 to 40.8 |
| | VC | 60 to 97 | 28.3 to 95.1 | 65 to 96 | 32.8 to 93.5 | 70 to 95 | 38 to 92 |
| (Re + Co)—NbC | Re | 0.03 to 39.6 | 0.08 to 63.8 | 0.04 to 34.7 | 0.1 to 58.7 | 0.05 to 29.7 | 0.13 to 53.1 |
| | Co | 0.03 to 39.6 | 0.03 to 42.8 | 0.04 to 34.7 | 0.04 to 37.8 | 0.05 to 29.7 | 0.05 to 32.6 |
| | NbC | 60 to 97 | 36 to 96.5 | 65 to 96 | 41 to 95.4 | 70 to 95 | 46.6 to 94.2 |
| (Re + Co)—TaC | Re | 0.03 to 39.6 | 0.04 to 48.8 | 0.04 to 34.7 | 0.06 to 43.5 | 0.05 to 29.7 | 0.07 to 38 |
| | Co | 0.03 to 39.6 | 0.018 to 28.9 | 0.04 to 34.7 | 0.02 to 24.8 | 0.05 to 29.7 | 0.03 to 20.8 |
| | TaC | 60 to 97 | 51 to 98 | 65 to 96 | 56.3 to 97.4 | 70 to 95 | 61.8 to 96.8 |
| (Re + Co)—$Cr_2C_3$ | Re | 0.03 to 39.6 | 0.09 to 67.3 | 0.04 to 34.7 | 0.12 to 62.5 | 0.05 to 29.7 | 0.15 to 57.0 |
| | Co | 0.03 to 39.6 | 0.04 to 46.6 | 0.04 to 34.7 | 0.05 to 41.5 | 0.05 to 29.7 | 0.06 to 36.1 |
| | $Cr_2C_3$ | 60 to 97 | 32.4 to 96 | 65 to 96 | 37.3 to 94.6 | 70 to 95 | 42.7 to 93.3 |
| (Re + Co)—$Mo_2C$ | Re | 0.03 to 39.6 | 0.07 to 60.2 | 0.04 to 34.7 | 0.1 to 55 | 0.05 to 29.7 | 0.12 to 49.3 |
| | Co | 0.03 to 39.6 | 0.03 to 39.2 | 0.04 to 34.7 | 0.04 to 34.3 | 0.05 to 29.7 | 0.05 to 29.4 |
| | $Mo_2C$ | 60 to 97 | 39.6 to 97 | 65 to 96 | 44.8 to 96 | 70 to 95 | 50.5 to 95 |
| (Re + Co)—WC | Re | 0.03 to 39.6 | 0.04 to 46.9 | 0.04 to 34.7 | 0.05 to 41.7 | 0.05 to 29.7 | 0.07 to 36.3 |
| | Co | 0.03 to 39.6 | 0.017 to 27.4 | 0.04 to 34.7 | 0.023 to 23.4 | 0.05 to 29.7 | 0.028 to 19.6 |
| | WC | 60 to 97 | 52.9 to98.2 | 65 to 96 | 58.2 to 97 | 70 to 95 | 63.6 to 97 |
| (Re + Co)—TiN | Re | 0.03 to 39.6 | 0.1 to 71.6 | 0.04 to 34.7 | 0.15 to 67.1 | 0.05 to 29.7 | 0.19 to 62 |
| | Co | 0.03 to 39.6 | 0.05 to 51.7 | 0.04 to 34.7 | 0.06 to 46.5 | 0.05 to 29.7 | 0.07 to 41 |
| | TiN | 60 to 97 | 28 to 95 | 65 to 96 | 32.6 to 93.4 | 70 to 95 | 37.8 to 92 |
| (Re + Co)—ZrN | Re | 0.03 to 39.6 | 0.09 to 65.3 | 0.04 to 34.7 | 0.11 to 60.3 | 0.05 to 29.7 | 0.14 to 54.8 |
| | Co | 0.03 to 39.6 | 0.035 to 44.4 | 0.04 to 34.7 | 0.046 to 39.3 | 0.05 to 29.7 | 0.056 to 34 |
| | ZrN | 60 to 97 | 34.5 to 96.3 | 65 to 96 | 39.4 to 95 | 70 to 95 | 45 to 93.8 |
| (Re + Co)—HfN | Re | 0.03 to 39.6 | 0.05 to 50 | 0.04 to 34.7 | 0.06 to 44.7 | 0.05 to 29.7 | 0.08 to 39.2 |
| | Co | 0.03 to 39.6 | 0.02 to 30 | 0.04 to 34.7 | 0.026 to 25.7 | 0.05 to 29.7 | 0.03 to 21.6 |
| | HfN | 60 to 97 | 49.8 to 98 | 65 to 96 | 55.1 to 97.3 | 70 to 95 | 60.7 to 96.6 |

TABLE 20-continued

Compositions that use Re and Co (Re + Co) in a binder for binding a carbide from carbides of IVb, Vb, & VIb or a nitride from nitrides of IVb & Vb. The range of Binder is from 1% Re + 99% Co to 99% Re + 1% Co.

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + Co)—VN | Re | 0.03 to 39.6 | 0.1 to 69.6 | 0.04 to 34.7 | 0.14 to 65 | 0.05 to 29.7 | 0.17 to 59.6 |
| | Co | 0.03 to 39.6 | 0.04 to 49.3 | 0.04 to 34.7 | 0.055 to 44 | 0.05 to 29.7 | 0.067 to 38.6 |
| | VN | 60 to 97 | 30 to 95.5 | 65 to 96 | 35 to 94 | 70 to 95 | 40 to 92.6 |
| (Re + Co)—NbN | Re | 0.03 to 39.6 | 0.09 to 65.3 | 0.04 to 34.7 | 0.11 to 60.4 | 0.05 to 29.7 | 0.14 to 54.8 |
| | Co | 0.03 to 39.6 | 0.035 to 44.5 | 0.04 to 34.7 | 0.046 to 39.4 | 0.05 to 29.7 | 0.057 to 34.1 |
| | NbN | 60 to 97 | 34.4 to 96.3 | 65 to 96 | 39.4 to 95 | 70 to 95 | 45 to 93.8 |
| (Re + Co)—TaN | Re | 0.03 to 39.6 | 0.04 to 49.1 | 0.04 to 34.7 | 0.06 to 43.8 | 0.05 to 29.7 | 0.075 to 38.3 |
| | Co | 0.03 to 39.6 | 0.019 to 29.2 | 0.04 to 34.7 | 0.025 to 25 | 0.05 to 29.7 | 0.03 to 21 |
| | TaN | 60 to 97 | 50.7 to 98 | 65 to 96 | 56 to 97.4 | 70 to 95 | 61.5 to 96.7 |

TABLE 21

Compositions that use Ni-based superalloy (NBSA) and Co in a binder for binding a carbide from carbides of IVb, Vb, & VIb or a nitride from nitrides of IVb & Vb. The range of Binder is from 1% NBSA + 99% Co to 99% NBSA + 1% Co.

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (NBSA + Co)—TiC | NBSA | 0.03 to 39.6 | 0.05 to 51.5 | 0.04 to 34.7 | 0.06 to 46.2 | 0.05 to 29.7 | 0.08 to 40.6 |
| | Co | 0.03 to 39.6 | 0.05 to 54.5 | 0.04 to 34.7 | 0.07 to 49.2 | 0.05 to 29.7 | 0.09 to 43.6 |
| | TiC | 60 to 97 | 45 to 95 | 65 to 96 | 50 to 93.6 | 70 to 95 | 56 to 92 |
| (NBSA + Co)—ZrC | NBSA | 0.03 to 39.6 | 0.04 to 44.4 | 0.04 to 34.7 | 0.05 to 39.2 | 0.05 to 29.7 | 0.06 to 57.5 |
| | Co | 0.03 to 39.6 | 0.04 to 47.4 | 0.04 to 34.7 | 0.05 to 42 | 0.05 to 29.7 | 0.07 to 34 |
| | ZrC | 60 to 97 | 52 to 96 | 65 to 96 | 57 to 95 | 70 to 95 | 63 to 94 |
| (NBSA + Co)—HfC | NBSA | 0.03 to 39.6 | 0.02 to 29 | 0.04 to 34.7 | 0.026 to 25 | 0.05 to 29.7 | 0.03 to 21 |
| | Co | 0.03 to 39.6 | 0.02 to 32 | 0.04 to 34.7 | 0.03 to 27.5 | 0.05 to 29.7 | 0.036 to 23 |
| | HfC | 60 to 97 | 68 to 98 | 65 to 96 | 72 to 97.4 | 70 to 95 | 77 to 96.8 |
| (NBSA + Co)—VC | NBSA | 0.03 to 39.6 | 0.04 to 49 | 0.04 to 34.7 | 0.06 to 44 | 0.05 to 29.7 | 0.07 to 38 |
| | Co | 0.03 to 39.6 | 0.05 to 52 | 0.04 to 34.7 | 0.06 to 47 | 0.05 to 29.7 | 0.08 to 41 |
| | VC | 60 to 97 | 48 to 96 | 65 to 96 | 53 to 93.5 | 70 to 95 | 59 to 93 |
| (NBSA + Co)—NbC | NBSA | 0.03 to 39.6 | 0.03 to 40 | 0.04 to 34.7 | 0.04 to 35 | 0.05 to 29.7 | 0.05 to 30 |
| | Co | 0.03 to 39.6 | 0.035 to 43 | 0.04 to 34.7 | 0.046 to 38 | 0.05 to 29.7 | 0.06 to 33 |
| | NbC | 60 to 97 | 57 to 97 | 65 to 96 | 62 to 96 | 70 to 95 | 67 to 95 |
| (NBSA + Co)—TaC | NBSA | 0.03 to 39.6 | 0.017 to 27 | 0.04 to 34.7 | 0.022 to 23 | 0.05 to 29.7 | 0.03 to 19 |
| | Co | 0.03 to 39.6 | 0.02 to 29 | 0.04 to 34.7 | 0.025 to 25 | 0.05 to 29.7 | 0.03 to 21 |
| | TaC | 60 to 97 | 71 to 98 | 65 to 96 | 75 to 97.8 | 70 to 95 | 79 to 97 |

TABLE 21-continued

Compositions that use Ni-based superalloy (NBSA) and Co in a
binder for binding a carbide from carbides of IVb, Vb, & VIb or a
nitride from nitrides of IVb & Vb. The range of Binder is from 1% NBSA + 99%
Co to 99% NBSA + 1% Co.

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (NBSA + Co)—Cr$_2$C$_3$ | NBSA | 0.03 to 39.6 | 0.09 to 67.3 | 0.04 to 34.7 | 0.12 to 62.5 | 0.05 to 29.7 | 0.15 to 57.0 |
| | Co | 0.03 to 39.6 | 0.04 to 44 | 0.04 to 34.7 | 0.05 to 39 | 0.05 to 29.7 | 0.06 to 34 |
| | Cr$_2$C$_3$ | 60 to 97 | 53 to 96 | 65 to 96 | 58 to 95 | 70 to 95 | 63 to 94 |
| (NBSA + Co)—Mo$_2$C | NBSA | 0.03 to 39.6 | 0.026 to 36.5 | 0.04 to 34.7 | 0.035 to 32 | 0.05 to 29.7 | 0.044 to 27 |
| | Co | 0.03 to 39.6 | 0.03 to 39 | 0.04 to 34.7 | 0.04 to 34 | 0.05 to 29.7 | 0.05 to 30 |
| | Mo$_2$C | 60 to 97 | 60 to 97 | 65 to 96 | 65 to 96 | 70 to 95 | 70 to 95.6 |
| (NBSA + Co)—WC | NBSA | 0.03 to 39.6 | 0.04 to 46.9 | 0.04 to 34.7 | 0.05 to 41.7 | 0.05 to 29.7 | 0.07 to 36.3 |
| | Co | 0.03 to 39.6 | 0.018 to 27.5 | 0.04 to 34.7 | 0.024 to 23.5 | 0.05 to 29.7 | 0.03 to 19.7 |
| | WC | 60 to 97 | 72 to 98 | 65 to 96 | 76 to 98 | 70 to 95 | 80 to 97 |
| (NBSA + Co)—TiN | NBSA | 0.03 to 39.6 | 0.4 to 49 | 0.04 to 34.7 | 0.06 to 44 | 0.05 to 29.7 | 0.07 to 38 |
| | Co | 0.03 to 39.6 | 0.05 to 52 | 0.04 to 34.7 | 0.065 to 47 | 0.05 to 29.7 | 0.08 to 41 |
| | TiN | 60 to 97 | 47 to 96 | 65 to 96 | 53 to 94 | 70 to 95 | 58 to 93 |
| (NBSA + Co)—ZrN | NBSA | 0.03 to 39.6 | 0.03 to 42 | 0.04 to 34.7 | 0.04 to 37 | 0.05 to 29.7 | 0.05 to 32 |
| | Co | 0.03 to 39.6 | 0.04 to 45 | 0.04 to 34.7 | 0.05 to 40 | 0.05 to 29.7 | 0.06 to 34 |
| | ZrN | 60 to 97 | 55 to 97 | 65 to 96 | 60 to 96 | 70 to 95 | 65 to 95 |
| (NBSA + Co)—HfN | NBSA | 0.03 to 39.6 | 0.02 to 31 | 0.04 to 34.7 | 0.027 to 27 | 0.05 to 29.7 | 0.03 to 22 |
| | Co | 0.03 to 39.6 | 0.02 to 27 | 0.04 to 34.7 | 0.024 to 23 | 0.05 to 29.7 | 0.03 to 20 |
| | HfN | 60 to 97 | 70 to 98 | 65 to 96 | 74 to 97.6 | 70 to 95 | 78 to 97 |
| (NBSA + Co)—VN | NBSA | 0.03 to 39.6 | 0.045 to 53 | 0.04 to 34.7 | 0.06 to 47 | 0.05 to 29.7 | 0.07 to 41 |
| | Co | 0.03 to 39.6 | 0.04 to 44 | 0.04 to 34.7 | 0.055 to 40 | 0.05 to 29.7 | 0.066 to 34 |
| | VN | 60 to 97 | 50 to 96 | 65 to 96 | 55 to 95 | 70 to 95 | 61 to 93 |
| (NBSA + Co)—NbN | NBSA | 0.03 to 39.6 | 0.04 to 47 | 0.04 to 34.7 | 0.05 to 41 | 0.05 to 29.7 | 0.06 to 36 |
| | Co | 0.03 to 39.6 | 0.03 to 40 | 0.04 to 34.7 | 0.04 to 35 | 0.05 to 29.7 | 0.05 to 30 |
| | NbN | 60 to 97 | 55 to 97 | 65 to 96 | 60 to 96 | 70 to 95 | 65 to 95 |
| (Re + Co)—TaN | NBSA | 0.03 to 39.6 | 0.02 to 30 | 0.04 to 34.7 | 0.026 to 26 | 0.05 to 29.7 | 0.032 to 22 |
| | Co | 0.03 to 39.6 | 0.017 to 26 | 0.04 to 34.7 | 0.023 to 23 | 0.05 to 29.7 | 0.03 to 19 |
| | TaN | 60 to 97 | 70 to 98 | 65 to 96 | 75 to 97.7 | 70 to 95 | 79 to 97 |

TABLE 22

Compositions that use Re, Ni-based superalloy (NBSA), and Co
in a binder for binding a carbide from carbides of IVb, Vb, & VIb or a
nitride from nitrides of IVb & Vb. The range of Binder is from 0.5% Re + 0.5%
Co + 99% superalloy to 99% Re + 0.5% Co + 0.5% Superalloy to 0.5% Re + 99%
Co + 0.5% Superalloy

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + Co + NBSA)—TiC | Re | 0.015 to 39.6 | 0.06 to 73.6 | 0.02 to 34.65 | 0.08 to 69.3 | 0.025 to 29.7 | 0.1 to 64.3 |
| | NBSA | 0.015 to 39.6 | 0.02 to 51.3 | 0.02 to 34.65 | 0.03 to 46.0 | 0.025 to 29.7 | 0.035 to 40.5 |

TABLE 22-continued

Compositions that use Re, Ni-based superalloy (NBSA), and Co
in a binder for binding a carbide from carbides of IVb, Vb, & VIb or a
nitride from nitrides of IVb & Vb. The range of Binder is from 0.5% Re + 0.5%
Co + 99% superalloy to 99% Re + 0.5% Co + 0.5% Superalloy to 0.5% Re + 99%
Co + 0.5% Superalloy

| Material | | Composition Range 1 | | Composition Range 2 | | Composition Range 3 | |
|---|---|---|---|---|---|---|---|
| | | Volume % | Weight % | Volume % | Weight % | Volume | Weight % |
| | Co | 0.015 to 39.6 | 0.03 to 54.3 | 0.02 to 34.65 | 0.036 to 49.0 | 0.025 to 29.7 | 0.045 to 43.5 |
| | TiC | 60 to 97 | 26 to 95 | 65 to 96 | 30 to 94 | 70 to 95 | 35 to 92 |
| (Re + Co + NBSA)—ZrC | Re | 0.015 to 39.6 | 0.05 to 67.7 | 0.02 to 34.65 | 0.06 to 62.9 | 0.025 to 29.7 | 0.08 to 57.5 |
| | NBSA | 0.015 to 39.6 | 0.017 to 44.2 | 0.02 to 34.65 | 0.022 to 39.1 | 0.025 to 29.7 | 0.028 to 33.9 |
| | Co | 0.015 to 39.6 | 0.02 to 47.2 | 0.02 to 34.65 | 0.027 to 42.0 | 0.025 to 29.7 | 0.034 to 36.7 |
| | ZrC | 60 to 97 | 32 to 96 | 65 to 96 | 37 to 95 | 70 to 95 | 43 to 94 |
| (Re + Co + NBSA)—HfC | Re | 0.015 to 39.6 | 0.025 to 52.1 | 0.02 to 34.65 | 0.034 to 46.8 | 0.025 to 29.7 | 0.042 to 41.2 |
| | NBSA | 0.015 to 39.6 | 0.009 to 29.3 | 0.02 to 34.65 | 0.012 to 25.1 | 0.025 to 29.7 | 0.015 to 21 |
| | Co | 0.015 to 39.6 | 0.01 to 31.8 | 0.02 to 34.65 | 0.014 to 27.4 | 0.025 to 29.7 | 0.018 to 23.1 |
| | HfC | 60 to 97 | 48 to 98 | 65 to 96 | 53 to 97.4 | 70 to 95 | 59 to 96.8 |
| (Re + Co + NBSA)—VC | Re | 0.015 to 39.6 | 0.06 to 71.5 | 0.02 to 34.65 | 0.08 to 67 | 0.025 to 29.7 | 0.09 to 61.8 |
| | NBSA | 0.015 to 39.6 | 0.02 to 48.6 | 0.02 to 34.65 | 0.026 to 43.4 | 0.025 to 29.7 | 0.032 to 38 |
| | Co | 0.015 to 39.6 | 0.024 to 51.7 | 0.02 to 34.65 | 0.032 to 46.4 | 0.025 to 29.7 | 0.04 to 40.9 |
| | VC | 60 to 97 | 28 to 96 | 65 to 96 | 33 to 94 | 70 to 95 | 38 to 93 |
| (Re + Co + NBSA)—NbC | Re | 0.015 to 39.6 | 0.04 to 63.8 | 0.02 to 34.65 | 0.05 to 58.7 | 0.025 to 29.7 | 0.07 to 53.1 |
| | NBSA | 0.015 to 39.6 | 0.015 to 40 | 0.02 to 34.65 | 0.02 to 35 | 0.025 to 29.7 | 0.024 to 30 |
| | Co | 0.015 to 39.6 | 0.017 to 43 | 0.02 to 34.65 | 0.023 to 37.9 | 0.025 to 29.7 | 0.03 to 32.7 |
| | NbC | 60 to 97 | 36 to 97 | 65 to 96 | 41 to 96 | 70 to 95 | 47 to 95 |
| (Re + Co + NBSA)—TaC | Re | 0.015 to 39.6 | 0.02 to 48.8 | 0.02 to 34.65 | 0.03 to 43.5 | 0.025 to 29.7 | 0.04 to 38 |
| | NBSA | 0.015 to 39.6 | 0.008 to 26.6 | 0.02 to 34.65 | 0.011 to 22.6 | 0.025 to 29.7 | 0.013 to 18.9 |
| | Co | 0.015 to 39.6 | 0.01 to 29 | 0.02 to 34.65 | 0.013 to 24.8 | 0.025 to 29.7 | 0.016 to 20.8 |
| | TaC | 60 to 97 | 51 to 98.3 | 65 to 96 | 56 to 97.7 | 70 to 95 | 61.8 to 97.2 |
| (Re + Co + NBSA)—Cr$_2$C$_3$ | Re | 0.015 to 39.6 | 0.05 to 67.3 | 0.02 to 34.65 | 0.06 to 62.5 | 0.025 to 29.7 | 0.08 to 57 |
| | NBSA | 0.015 to 39.6 | 0.017 to 43.8 | 0.02 to 34.65 | 0.022 to 38.7 | 0.025 to 29.7 | 0.027 to 33.5 |
| | Co | 0.015 to 39.6 | 0.02 to 46.8 | 0.02 to 34.65 | 0.027 to 41.6 | 0.025 to 29.7 | 0.033 to 36.2 |
| | Cr$_2$C$_3$ | 60 to 97 | 32 to 96 | 65 to 96 | 37 to 95 | 70 to 95 | 43 to 94 |
| (Re + Co + NBSA)—Mo$_2$C | Re | 0.015 to 39.6 | 0.03 to 60.2 | 0.02 to 34.65 | 0.05 to 55 | 0.025 to 29.7 | 0.06 to 49 |
| | NBSA | 0.015 to 39.6 | 0.013 to 36.4 | 0.02 to 34.65 | 0.017 to 31.7 | 0.025 to 29.7 | 0.02 to 27 |
| | Co | 0.015 to 39.6 | 0.015 to 39.3 | 0.02 to 34.65 | 0.02 to 34 | 0.025 to 29.7 | 0.025 to 29 |
| | Mo$_2$C | 60 to 97 | 39 to 97 | 65 to 96 | 45 to 96 | 70 to 95 | 50 to 95.6 |
| (Re + Co + NBSA)—WC | Re | 0.015 to 39.6 | 0.02 to 46.9 | 0.02 to 34.65 | 0.027 to 41.7 | 0.025 to 29.7 | 0.034 to 36.3 |
| | NBSA | 0.015 to 39.6 | 0.008 to 25.1 | 0.02 to 34.65 | 0.01 to 21.3 | 0.025 to 29.7 | 0.013 to 17.8 |
| | Co | 0.015 to 39.6 | 0.009 to 27.5 | 0.02 to 34.65 | 0.012 to 23.5 | 0.025 to 29.7 | 0.015 to 19.6 |
| | WC | 60 to 97 | 53 to 98 | 65 to 96 | 58 to 97.8 | 70 to 95 | 64 to 97.4 |

TABLE 22-continued

Compositions that use Re, Ni-based superalloy (NBSA), and Co in a binder for binding a carbide from carbides of IVb, Vb, & VIb or a nitride from nitrides of IVb & Vb. The range of Binder is from 0.5% Re + 0.5% Co + 99% superalloy to 99% Re + 0.5% Co + 0.5% Superalloy to 0.5% Re + 99% Co + 0.5% Superalloy

| Material | | | Composition Range 1 | | Composition Range 2 | | Composition Range 3 | |
|---|---|---|---|---|---|---|---|---|
| | | | Volume % | Weight % | Volume % | Weight % | Volume % | Weight % |
| (Re + Co + NBSA)—TiN | | Re | 0.015 to 39.6 | 0.06 to 71.6 | 0.02 to 34.65 | 0.08 to 67.2 | 0.025 to 29.7 | 0.1 to 62 |
| | | NBSA | 0.015 to 39.6 | 0.02 to 51.9 | 0.02 to 34.65 | 0.027 to 43.6 | 0.025 to 29.7 | 0.032 to 38.2 |
| | | Co | 0.015 to 39.6 | 0.025 to 51.9 | 0.02 to 34.65 | 0.03 to 46.6 | 0.025 to 29.7 | 0.04 to 41 |
| | | TiN | 60 to 97 | 28 to 96 | 65 to 96 | 33 to 94 | 70 to 95 | 38 to 93 |
| (Re + Co + NBSA)—ZrN | | Re | 0.015 to 39.6 | 0.04 to 65.3 | 0.02 to 34.65 | 0.06 to 60.3 | 0.025 to 29.7 | 0.07 to 54.8 |
| | | NBSA | 0.015 to 39.6 | 0.016 to 41.6 | 0.02 to 34.65 | 0.02 to 36.6 | 0.025 to 29.7 | 0.025 to 31.5 |
| | | Co | 0.015 to 39.6 | 0.02 to 44.6 | 0.02 to 34.65 | 0.025 to 40 | 0.025 to 29.7 | 0.03 to 34 |
| | | ZrN | 60 to 97 | 34 to 97 | 65 to 96 | 39 to 96 | 70 to 95 | 45 to 95 |
| Re + Co + NBSA—HfN | | Re | 0.015 to 39.6 | 0.02 to 50 | 0.02 to 34.65 | 0.03 to 45 | 0.025 to 29.7 | 0.04 to 39 |
| | | NBSA | 0.015 to 39.6 | 0.009 to 27.5 | 0.02 to 34.65 | 0.011 to 23.5 | 0.025 to 29.7 | 0.014 to 20 |
| | | Co | 0.015 to 39.6 | 0.01 to 30 | 0.02 to 34.65 | 0.013 to 25.8 | 0.025 to 29.7 | 0.017 to 22 |
| | | HfN | 60 to 97 | 50 to 98 | 65 to 96 | 55 to 97.6 | 70 to 95 | 61 to 97 |
| Re + Co + NBSA—VN | | Re | 0.015 to 39.6 | 0.05 to 60 | 0.02 to 34.65 | 0.07 to 65 | 0.025 to 29.7 | 0.09 to 60 |
| | | NBSA | 0.015 to 39.6 | 0.02 to 46.4 | 0.02 to 34.65 | 0.024 to 41.2 | 0.025 to 29.7 | 0.03 to 36 |
| | | Co | 0.015 to 39.6 | 0.02 to 49 | 0.02 to 34.65 | 0.03 to 44 | 0.025 to 29.7 | 0.04 to 39 |
| | | VN | 60 to 97 | 30 to 96 | 65 to 96 | 35 to 95 | 70 to 95 | 40 to 93 |
| Re + Co + NBSA—NbN | | Re | 0.015 to 39.6 | 0.04 to 65 | 0.02 to 34.65 | 0.06 to 60 | 0.025 to 29.7 | 0.07 to 55 |
| | | NBSA | 0.015 to 39.6 | 0.016 to 42 | 0.02 to 34.65 | 0.02 to 37 | 0.025 to 29.7 | 0.025 to 32 |
| | | Co | 0.015 to 39.6 | 0.02 to 45 | 0.02 to 34.65 | 0.025 to 39.5 | 0.025 to 29.7 | 0.03 to 34 |
| | | NbN | 60 to 97 | 34 to 97 | 65 to 96 | 39 to 96 | 70 to 95 | 45 to 95 |
| Re + Co + NBSA—TaN | | Re | 0.015 to 39.6 | 0.02 to 49 | 0.02 to 34.65 | 0.03 to 44 | 0.025 to 29.7 | 0.04 to 38 |
| | | NBSA | 0.015 to 39.6 | 0.008 to 27 | 0.02 to 34.65 | 0.011 to 23 | 0.025 to 29.7 | 0.014 to 19 |
| | | Co | 0.015 to 39.6 | 0.01 to 29 | 0.02 to 34.65 | 0.013 to 25 | 0.025 to 29.7 | 0.016 to 21 |
| | | TaN | 60 to 97 | 51 to 98.3 | 65 to 96 | 56 to 97.7 | 70 to 95 | 61.5 to 97.1 |

TABLE 23

Compositions that use Re for binding WC + TiC or WC + TaC or WC + TiC + TaC

| Material | | | Composition Range 1 | | Composition Range 2 | | Composition Range 3 | |
|---|---|---|---|---|---|---|---|---|
| | | | Volume % | Weight % | Volume % | Weight % | Volume % | Weight % |
| Re - WC + TiC | | Re | 3 to 40 | 4 to 54 | 4 to 35 | 5 to 49 | 5 to 30 | 7 to 43 |
| | | WC | 40 to 96 | 40 to 96 | 43 to 94.5 | 44 to 94 | 45 to 93 | 48 to 93 |
| | | TiC | 1 to 48 | 0.3 to 21 | 1.5 to 43 | 0.5 to 19 | 2 to 45 | 0.6 to 18 |
| Re - WC + TaC | | Re | 3 to 40 | 4 to 48 | 4 to 35 | 5 to 42 | 5 to 30 | 7 to 37 |
| | | WC | 50 to 96.5 | 44 to 96 | 55 to 95 | 49 to 94 | 60 to 93.5 | 55 to 92 |
| | | TaC | 0.5 to 24 | 0.5 to 21 | 1 to 22 | 1 to 19 | 1.5 to 18 | 1.5 to 18 |
| Re - WC + TiC + TaC | | Re | 3 to 40 | 4 to 48 | 4 to 35 | 5 to 43 | 5 to 30 | 7 to 38 |
| | | WC | 40 to 95.5 | 36 to 95 | 45 to 93 | 41 to 93 | 50 to 90 | 48 to 90 |
| | | TiC | 1 to 48 | 0.3 to 22 | 2 to 45 | 0.6 to 20 | 3 to 42 | 0.9 to 18 |
| | | TaC | 0.5 to 20 | 0.5 to 25 | 1 to 18 | 0.8 to 22 | 2 to 15 | 2 to 17 |

TABLE 24

Compositions that use Ni-based superalloy (NBSA) for binding
WC + TiC or WC + TaC or WC + TiC + TaC

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| NBSA - | NBSA | 3 to 40 | 1.5 to 31 | 4 to 35 | 2 to 26 | 5 to 30 | 3 to 23 |
| WC + TiC | WC | 40 to 96 | 60 to 98 | 43 to 94.5 | 63 to 97 | 45 to 93 | 66 to 96.5 |
| | TiC | 1 to 48 | 0.3 to 25 | 1.5 to 43 | 0.5 to 22 | 2 to 45 | 0.6 to 20 |
| NBSA - | NBSA | 3 to 40 | 1.5 to 26 | 4 to 35 | 2 to 22 | 5 to 30 | 3 to 18 |
| WC + TaC | WC | 50 to 96.5 | 63 to 98 | 55 to 95 | 67 to 97 | 60 to 93.5 | 71 to 96 |
| | TaC | 0.5 to 24 | 0.5 to 26 | 1 to 22 | 1 to 23 | 1.5 to 18 | 1.5 to 21 |
| NBSA - | NBSA | 3 to 40 | 1.5 to 26 | 4 to 35 | 2 to 22 | 5 to 30 | 3 to 19 |
| WC + TiC + TaC | WC | 40 to 95.5 | 51 to 98 | 45 to 93 | 56 to 96 | 50 to 90 | 61 to 94 |
| | TiC | 1 to 48 | 0.4 to 23 | 2 to 45 | 0.8 to 21 | 3 to 42 | 1 to 19 |
| | TaC | 0.5 to 20 | 0.6 to 26 | 1 to 18 | 1 to 23 | 2 to 15 | 2 to 18 |

TABLE 25

Compositions that use Re and Ni-based superalloy (NBSA) in a
binder for binding WC + TiC or WC + TaC or WC + TiC + TaC

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + NBSA) - | Re | 0.03 to 39.6 | 0.04 to 52 | 0.04 to 34.65 | 0.06 to 48 | 0.05 to 29.7 | 0.07 to 45 |
| WC + TiC | NBSA | 0.03 to 39.6 | 0.015 to 29 | 0.04 to 34.65 | 0.02 to 26 | 0.05 to 29.7 | 0.026 to 23 |
| | WC | 40 to 96 | 40 to 98 | 43 to 94.5 | 44 to 97 | 45 to 93 | 48 to 96.6 |
| | TiC | 1 to 48 | 0.3 to 24 | 1.5 to 45 | 0.5 to 22 | 2 to 42 | 0.6 to 21 |
| (Re + NBSA) - | Re | 0.03 to 39.6 | 0.04 to 47 | 0.04 to 34.65 | 0.055 to 42 | 0.05 to 29.7 | 0.07 to 37 |
| WC + TaC | NBSA | 0.03 to 39.6 | 0.015 to 25 | 0.04 to 34.65 | 0.02 to 22 | 0.05 to 29.7 | 0.025 to 18 |
| | WC | 50 to 96.5 | 44 to 98 | 55 to 95 | 50 to 97 | 60 to 93 | 55 to 95.5 |
| | TaC | 0.5 to 22 | 0.5 to 24 | 1 to 20 | 1 to 21.5 | 2 to 18 | 2 to 19 |
| (Re + NBSA) - | Re | 0.03 to 39.6 | 0.04 to 53 | 0.04 to 34.65 | 0.06 to 47 | 0.05 to 29.7 | 0.07 to 41 |
| WC + TiC + TaC | NBSA | 0.03 to 39.6 | 0.015 to 30 | 0.04 to 34.65 | 0.02 to 25 | 0.05 to 29.7 | 0.026 to 21 |
| | WC | 40 to 95.5 | 40 to 98 | 45 to 93 | 46 to 96 | 50 to 90 | 51 to 94 |
| | TiC | 1 to 48 | 0.3 to 23 | 2 to 45 | 0.6 to 21 | 3 to 42 | 0.9 to 19 |
| | TaC | 0.5 to 20 | 0.4 to 26 | 1 to 18 | 0.8 to 23 | 2 to 15 | 2 to 18 |

TABLE 26

Compositions that use Re and Co in a binder for binding WC + TiC
or WC + TaC or WC + TiC + TaC

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + Co) - | Re | 0.03 to 39.6 | 0.04 to 53 | 0.04 to 34.65 | 0.055 to 48 | 0.05 to 29.7 | 0.07 to 43 |
| WC + TiC | Co | 0.03 to 39.6 | 0.017 to 31 | 0.04 to 34.65 | 0.023 to 28 | 0.05 to 29.7 | 0.03 to 26 |
| | WC | 40 to 96 | 40 to 98 | 43 to 94.5 | 44 to 97 | 45 to 93 | 48 to 96 |
| | TiC | 1 to 48 | 0.3 to 23 | 1.5 to 45 | 0.5 to 22 | 2 to 42 | 0.6 to 21 |

TABLE 26-continued

Compositions that use Re and Co in a binder for binding WC + TiC
or WC + TaC or WC + TiC + TaC

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + Co) - WC + TaC | Re | 0.03 to 39.6 | 0.04 to 47 | 0.04 to 34.65 | 0.055 to 42 | 0.05 to 29.7 | 0.07 to 37 |
| | Co | 0.03 to 39.6 | 0.017 to 28 | 0.04 to 34.65 | 0.023 to 24 | 0.05 to 29.7 | 0.03 to 20 |
| | WC | 50 to 96.5 | 44 to 98 | 55 to 95 | 50 to 97 | 60 to 93 | 55 to 95 |
| | TaC | 0.5 to 22 | 0.5 to 24 | 1 to 20 | 1 to 21 | 2 to 18 | 2 to 19 |
| (Re + Co) - WC + TiC + TaC | Re | 0.03 to 39.6 | 0.04 to 53 | 0.04 to 34.65 | 0.06 to 47 | 0.05 to 29.7 | 0.07 to 41 |
| | Co | 0.03 to 39.6 | 0.017 to 33 | 0.04 to 34.65 | 0.023 to 28 | 0.05 to 29.7 | 0.03 to 23 |
| | WC | 40 to 95.5 | 40 to 98 | 45 to 93 | 46 to 96 | 50 to 90 | 51 to 94 |
| | TiC | 1 to 48 | 0.3 to 23 | 2 to 45 | 0.6 to 21 | 3 to 42 | 0.9 to 19 |
| | TaC | 0.5 to 20 | 0.4 to 26 | 1 to 18 | 0.8 to 23 | 2 to 15 | 2 to 18 |

TABLE 27

Compositions that use Co and Ni-based superalloy (NBSA) in a
binder for binding WC + TiC or WC + TaC or WC + TiC + TaC

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Co + NBSA) - WC + TiC | Co | 0.03 to 39.6 | 0.018 to 33 | 0.04 to 34.65 | 0.024 to 29 | 0.05 to 29.7 | 0.03 to 25 |
| | NBSA | 0.03 to 39.6 | 0.015 to 29 | 0.04 to 34.65 | 0.02 to 26 | 0.05 to 29.7 | 0.03 to 23 |
| | WC | 40 to 96 | 58 to 98 | 43 to 94.5 | 61 to 97 | 45 to 93 | 64 to 96.7 |
| | TiC | 1 to 48 | 0.3 to 24 | 1.5 to 45 | 0.5 to 22 | 2 to 42 | 0.7 to 21 |
| (Co + NBSA) - WC + TaC | Co | 0.03 to 39.6 | 0.018 to 28 | 0.04 to 34.65 | 0.024 to 24 | 0.05 to 29.7 | 0.03 to 20 |
| | NBSA | 0.03 to 39.6 | 0.015 to 25 | 0.04 to 34.65 | 0.02 to 22 | 0.05 to 29.7 | 0.025 to 18 |
| | WC | 50 to 96.5 | 61 to 98 | 55 to 95 | 65 to 97 | 60 to 93 | 69 to 95 |
| | TaC | 0.5 to 22 | 0.5 to 24 | 1 to 20 | 1 to 21.5 | 2 to 18 | 2 to 19 |
| (Co + NBSA) - WC + TiC + TaC | Co | 0.03 to 39.6 | 0.018 to 33 | 0.04 to 34.65 | 0.024 to 28 | 0.05 to 29.7 | 0.03 to 23 |
| | NBSA | 0.03 to 39.6 | 0.015 to 30 | 0.04 to 34.65 | 0.02 to 25 | 0.05 to 29.7 | 0.026 to 21 |
| | WC | 40 to 95.5 | 57 to 98 | 45 to 93 | 62 to 96 | 50 to 90 | 67 to 94 |
| | TiC | 1 to 48 | 0.4 to 23 | 2 to 45 | 0.7 to 21 | 3 to 42 | 1 to 19 |
| | TaC | 0.5 to 20 | 0.6 to 26 | 1 to 18 | 1 to 23 | 2 to 15 | 2 to 18 |

TABLE 28

Compositions that use Re, Ni-based superalloy (NBSA), and Co in a binder for binding WC + TiC or WC + TaC or WC + TiC + TaC. The range of Binder is from 0.5% Re + 99.5% superalloy to 99.5% Re + 0.5% Superalloy to 0.5% Re + 0.5% Superalloy + 99% Co.

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + Co NBSA) - WC + TiC | Re | 0.015 to 39.8 | 0.02 to 54 | 0.02 to 34.8 | 0.027 to 48 | 0.025 to 29.9 | 0.035 to 43 |
| | NBSA | 0.015 to 39.8 | 0.008 to 29 | 0.02 to 34.8 | 0.01 to 26 | 0.025 to 29.9 | 0.13 to 24 |
| | Co | 0 to 39.6 | 0 to 32 | 0 to 34.7 | 0 to 29 | 0 to 29.8 | 0 to 26 |
| | WC | 40 to 96 | 40 to 98 | 43 to 94.5 | 44 to 97 | 45 to 93 | 48 to 96 |
| | TiC | 1 to 48 | 0.3 to 24 | 1.5 to 45 | 0.5 to 22 | 2 to 42 | 0.6 to 21 |
| (Re + Co + NBSA) - WC + TaC | Re | 0.015 to 39.8 | 0.02 to 47 | 0.02 to 34.8 | 0.027 to 42 | 0.025 to 29.9 | 0.034 to 37 |
| | NBSA | 0.015 to 39.8 | 0.008 to 26 | 0.02 to 34.8 | 0.01 to 22 | 0.025 to 29.9 | 0.13 to 18 |
| | Co | 0 to 39.6 | 0 to 28 | 0 to 34.7 | 0 to 24 | 0 to 29.8 | 0 to 20 |
| | WC | 50 to 96.5 | 45 to 98 | 55 to 95 | 50 to 97 | 60 to 93 | 55 to 95 |
| | TaC | 0.5 to 22 | 0.5 to 24 | 1 to 20 | 0.9 to 21 | 2 to 18 | 1.8 to 19 |
| (Re + NBSA + Co) - WC + TiC + TaC | Re | 0.015 to 39.8 | 0.02 to 65 | 0.02 to 34.8 | 0.027 to 58 | 0.025 to 29.9 | 0.034 to 51 |
| | NBSA | 0.015 to 39.8 | 0.008 to 41 | 0.02 to 34.8 | 0.01 to 34 | 0.025 to 29.9 | 0.13 to 28 |
| | Co | 0 to 39.6 | 0 to 44 | 0 to 34.7 | 0 to 37 | 0 to 29.8 | 0 to 31 |
| | WC | 35 to 85 | 35 to 93 | 40 to 80 | 41 to 88 | 40 to 75 | 47 to 83 |
| | TiC | 1 to 50 | 0.3 to 25 | 2 to 45 | 0.6 to 22 | 3 to 40 | 0.9 to 18 |
| | TaC | 0.5 to 25 | 0.4 to 26 | 1 to 22 | 0.8 to 24 | 2 to 20 | 1.6 to 21 |

TABLE 29

Additional Material Samples and Their Compositions

| Lot No. | Re | R95 | Co | U700 | U720 | Ni | WC | TiC | TaC | VC | Mo$_2$C | TiN |
|---|---|---|---|---|---|---|---|---|---|---|---|---|
| | | | | | Composition in Weight % | | | | | | | |
| P80 | 0 | 0 | 14.28 | | | | 74.15 | 5.835 | 5.733 | | | |
| P81 | 0.736 | 0 | 13.904 | | | | 73.84 | 5.811 | 5.709 | | | |
| P82 | 0.707 | 6.026 | 7.3694 | | | | 74.31 | 5.847 | 5.744 | | | |
| P83 | 0.679 | 12.82 | 0 | | | | 74.83 | 5.889 | 5.785 | | | |
| P84 | 1.45 | 5.903 | 7.1237 | | | | 73.98 | 5.822 | 5.719 | | | |
| P85 | 3.06 | 5.532 | 6.7027 | | | | 73.27 | 5.766 | 5.665 | | | |
| P86 | 1.45 | 5.903 | 7.1237 | | | | 36.99 | 5.822 | 5.719 | | | |
| P87 | 1.063 | 4.126 | 5.4174 | | | | 78.14 | 5.676 | 5.576 | | | |
| P88 | 1.861 | 7.57 | 9.1372 | | | | 69.59 | 5.974 | 5.869 | | | |
| P89 | 1.368 | 5.572 | 6.7242 | | | | 80.31 | 3.004 | 3.023 | | | |
| P99 | 0 | 0 | | | | 5.5 | 15 | 29 | 10 | | 9.5 | 20 |
| P100 | 4.8 | | | | | 4.65 | 14.5 | 28.1 | 9.7 | | 9.5 | 19.4 |
| P101 | 4.8 | 4.65 | | | | | 14.5 | 28.1 | 9.7 | | 9.5 | 19.4 |
| P102 | 4.8 | 10 | | | | | 14.5 | 28.1 | 9.7 | | 9.5 | 19.4 |
| P103 | 9.6 | 20 | | | | | 11.25 | 21.65 | 7.5 | 7.1 | | 14.9 |
| P104 | 7.2 | 15 | | | | | 12.8 | 25 | 8.6 | 8.1 | | 17.3 |
| P105 | 15 | 7.5 | | | | | 13.6 | 26.35 | 9.05 | 8.9 | | 18.1 |
| P106 | 14.49 | 0 | 0 | | | | 74.415 | 5.092 | 6.003 | | | |
| P107 | 15.101 | 0 | 0 | | | | 66.875 | 7.076 | 10.95 | | | |
| P108 | 11.796 | 0.7485 | 0.437 | | | | 75.727 | 5.182 | 6.109 | | | |
| P109 | 12.303 | 0.7807 | 0.456 | | | | 68.105 | 7.206 | 11.15 | | | |
| P110 | 9.5724 | 1.4017 | 0.761 | | | | 76.812 | 5.256 | 6.196 | | | |
| P111 | 9.9896 | 1.4628 | 0.794 | | | | 69.124 | 7.314 | 11.32 | | | |
| P112 | 6.9929 | 2.1369 | 1.16 | | | | 78.07 | 5.342 | 6.298 | | | |
| P113 | 14.131 | 4.3182 | 2.343 | | | | 67.447 | 5.398 | 6.363 | | | |
| P114 | 21.418 | 6.545 | 3.552 | | | | 56.602 | 5.454 | 6.43 | | | |
| P115 | 3.8745 | 3.0258 | 1.642 | | | | 79.591 | 5.446 | 6.421 | | | |
| P116 | 7.988 | 6.2383 | 3.385 | | | | 70.155 | 5.614 | 6.619 | | | |

TABLE 29-continued

Additional Material Samples and Their Compositions

| Lot No. | Re | R95 | Co | U700 | U720 | Ni | WC | TiC | TaC | VC | Mo₂C | TiN |
|---|---|---|---|---|---|---|---|---|---|---|---|---|
| P117 | 12.363 | 9.6552 | 5.24 | | | | 60.119 | 5.793 | 6.829 | | | |
| P118 | 1.8824 | 3.5833 | 1.961 | | | | 80.561 | 5.513 | 6.499 | | | |
| P119 | 2.8849 | 5.4917 | 3.006 | | | | 76.345 | 5.632 | 6.64 | | | |
| P120 | 5.0264 | 9.5681 | 5.237 | | | | 67.339 | 5.888 | 6.941 | | | |
| P121 | 13.157 | 0.5708 | 0 | | | | 75.078 | 5.138 | 6.057 | | | |
| P122 | 5.294 | 2.0672 | 0 | | | | 81.057 | 5.316 | 6.266 | | | |
| | | | | | Weight % | | | | | | | |
| P123 | 19.908 | 5.9798 | 1.976 | | | | 60.41 | 5.382 | 6.344 | | | |
| P124 | 20.68 | 9.9386 | 2.736 | | | | 54.464 | 5.59 | 6.59 | | | |
| P125 | 1.5492 | 3.0246 | 0.833 | | | | 82.731 | 5.444 | 6.418 | | | |
| P126 | 8.4621 | 13.217 | 3.639 | | | | 61.723 | 5.948 | 7.011 | | | |
| P127 | 12.191 | 13.964 | 3.844 | | | | 61.702 | 3.808 | 4.49 | | | |
| P128 | 11.906 | 0.5166 | 0 | | | | 86.99 | | | 0.604 | | |
| P129 | 1.6752 | 2.0169 | 1.9524 | | | | 93.77 | | | 0.599 | | |
| P130 | 11.97 | 8.0334 | 8.085 | | | | 71.33 | | | 0.6 | | |
| P131 | 1.4372 | 3.8162 | 3.7765 | | | | 90.39 | | | 0.596 | | |
| P132 | 6.6223 | 1.3705 | 1.3191 | | | | 90.1 | | | 0.605 | | |
| P133 | 5.505 | 1.7196 | 1.6331 | | | | 90.55 | | | 0.609 | | |
| P134 | 11.43 | 5.0212 | 4.8443 | | | | 78.11 | | | 0.613 | | |
| P135 | 1.644 | 2.3344 | 2.571 | | | | 79.98 | 3.151 | 10.32 | | | |
| P136 | 3.6545 | 5.1371 | 5.657 | | | | 73.439 | 0 | 12.11 | | | |
| P137 | 4.4642 | 6.3916 | 7.039 | | | | 69.776 | 0 | 12.33 | | | |
| P138 | 4.899 | 6.5757 | 7.241 | | | | 69.279 | 1.435 | 10.57 | | | |
| P139 | 6.5381 | 7.902 | 8.702 | | | | 64.651 | 1.459 | 10.75 | | | |
| P140 | 3.0601 | 5.5324 | 6.703 | | | | 73.274 | 5.766 | 5.665 | | | |
| P141 | 2.9261 | 5.2902 | 6.409 | | | | 71.233 | 3.308 | 10.83 | | | |
| P142 | 5.0649 | 6.1371 | 7.419 | | | | 67.113 | 3.337 | 10.93 | | | |
| A | 13.853 | 0.2847 | 0.314 | | | | 74.887 | 5.125 | 5.538 | | | |
| B | 2.7327 | 5.0305 | 0 | | | | 81.358 | 5.488 | 5.391 | | | |
| C | 3.0601 | 5.5324 | 6.703 | | | | 73.274 | 5.766 | 5.665 | | | |
| D | 1.8803 | 3.5793 | 1.988 | | | | 81.637 | 5.507 | 5.41 | | | |
| E | 7.7737 | 9.4819 | 0 | | | | 71.578 | 5.633 | 5.534 | | | |
| P144 | 0.6786 | 12.821 | 0 | | | | 74.827 | 5.889 | 5.785 | | | |
| P145 | 0.6437 | 5.663 | 0 | | | | 80.041 | 3.194 | 10.46 | | | |
| P146 | 1.8837 | 5.3941 | 0 | | | | 81.786 | 5.517 | 5.42 | | | |
| P147 | 2.3479 | 5.1953 | 0 | | | | 81.552 | 5.501 | 5.404 | | | |
| P148 | 1.5479 | 8.462 | 0 | | | | 76.038 | 3.264 | 10.69 | | | |
| P149 | 1.6376 | 15.347 | 0 | | | | 68.255 | 3.453 | 11.11 | | | |
| J | 25.75 | | | 2.5 | | | 14.5 | 24.1 | 8.5 | | 8 | 16.65 |
| K | 11.671 | 0.4143 | 0.3935 | 0 | 0 | | 86.92 | | | 0.605 | | |
| L | 2.6826 | 5.5683 | 0 | 0 | 0 | | 91.32 | | | 0.43 | | |
| M | 3.5669 | 0 | 14.235 | 0 | 0 | | 81.75 | | | 0.452 | | |
| N | 0 | 7.5039 | 0 | 0 | 0 | | 92.06 | | | 0.44 | | |
| O | 12.515 | 0 | 0 | 0 | 0.2541 | | 86.63 | | | 0.601 | | |
| P | 1.7969 | | 0 | 0 | 6.9309 | | 90.68 | | | 0.597 | | |
| Q | 0 | | 0 | 0 | 7.4214 | | 91.98 | | | 0.602 | | |
| S | 8.371 | | 0 | 0 | 5.3814 | | 85.67 | | | 0.579 | | |
| T | 1.6967 | | 0 | 4.681 | 0 | | 92.98 | | | 0.645 | | |
| U | 3.9002 | | 0 | 0 | 3.8684 | | 91.6 | | | 0.636 | | |
| P150 | 0 | | 0 | | 14.847 | | 84.68 | | | 0.469 | | |
| P151 | 0 | | 3.2554 | | 11.851 | | 84.38 | | | 0.51 | | |
| P152 | 1.5219 | | 3.225 | | 11.153 | | 83.59 | | | 0.505 | | |
| P153 | 12.451 | | 1.2899 | | 4.6957 | | 81.09 | | | 0.478 | | |
| P154 | 2.6486 | | 2.9933 | | 7.6052 | | 54.464 | | | 0.509 | | |
| P155 | 0 | | 0 | | 11.55 | | 82.731 | | | 0.414 | | |
| P156 | 1.1019 | | 3.5804 | | 6.2338 | | 61.723 | | | 0.671 | | |
| P157 | 0 | | 3.761 | | 6.5607 | | 86.24 | | | 0.675 | | |
| P158 | 0 | | 0 | | 9.9898 | | 88.04 | | | 0.512 | | |
| P159 | 0.9437 | | 3.0766 | | 5.5161 | | 88.41 | | | 0.502 | | |
| P160 | 0 | | 3.0946 | | 5.9144 | | 89 | | | 0.505 | | |
| P161 | 0 | | 0 | | 8.7552 | | 89.5 | | | 0.506 | | |
| P162 | 2.967 | | 5.6892 | 0.6379 | 0.654 | | 89.817 | | | 0.2346 | | |
| P163 | 0.581 | | 8.1942 | 0.9297 | 0.8972 | | 89.156 | | | 0.2413 | | |
| P164 | 2.16 | | 7.569 | 0.8669 | 0.8333 | | 88.331 | | | 0.2391 | | |
| P165 | 2.801 | | 6.7279 | 1.976 | 2.026 | | 86.226 | | | 0.2422 | | |
| P166 | 2.797 | | 8.3834 | 1.2603 | 1.2361 | | 86.082 | | | 0.2418 | | |
| P167 | 2.789 | | 11.13 | 0 | 0 | | 85.84 | | | 0.2411 | | |

The following TABLES 30-41 list exemplary cermet compositions with 3 exemplary composition ranges 1, 2, and 3 which may be used for different applications.

TABLE 30

Compositions that use Re as a binder for binding TiC + Mo$_2$C, or TiN + Mo$_2$C, or TiC + TiN + Mo$_2$C, or TiC + TiN + Mo$_2$C + WC + TaC + VC + Cr$_2$C$_3$

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| Re - | Re | 3 to 30 | 9.5 to 65 | 4 to 27 | 13 to 60 | 5 to 25 | 15 to 58 |
| TiC + Mo$_2$C | TiC | 43 to 97 | 19 to 88 | 48 to 92 | 23 to 79 | 51 to 90 | 25 to 75 |
| | Mo$_2$C | 0 to 27 | 0 to 38 | 0 to 26 | 0 to 36 | 0 to 24 | 0 to 33 |
| Re - | Re | 3 to 30 | 9 to 63 | 4 to 27 | 12 to 58 | 5 to 25 | 15 to 56 |
| TiN + Mo$_2$C | TiN | 43 to 97 | 21 to 89 | 48 to 92 | 25 to 81 | 51 to 90 | 27 to 76 |
| | Mo$_2$C | 0 to 27 | 0 to 36 | 0 to 26 | 0 to 34 | 0 to 24 | 0 to 31 |
| Re - | Re | 3 to 30 | 9 to 64 | 4 to 27 | 12 to 60 | 5 to 25 | 15 to 58 |
| TiC + TiN + Mo$_2$C | TiC | 0.3 to 93.7 | 0.2 to 84 | 0.4 to 91.6 | 0.3 to 79 | 0.5 to 89.5 | 0.35 to 74 |
| | TiN | 0.3 to 93.7 | 0.3 to 85 | 0.4 to 91.6 | 0.4 to 80 | 0.5 to 89.5 | 0.5 to 76 |
| | Mo$_2$C | 0 to 27 | 0 to 36 | 0 to 26 | 0 to 34 | 0 to 24 | 0 to 31 |
| Re - | Re | 3 to 30 | 6 to 65 | 4 to 27 | 9 to 61 | 5 to 25 | 11 to 65 |
| TiC + TiN + Mo$_2$C + | TiC | 0.3 to 93.5 | 0.1 to 83 | 0.4 to 91.3 | 0.2 to 78 | 0.5 to 89.1 | 0.3 to 74 |
| WC + TaC + VC + | TiN | 0.3 to 93.5 | 0.15 to 85 | 0.4 to 91.3 | 0.2 to 80 | 0.5 to 89.1 | 0.3 to 76 |
| Cr$_2$C$_3$ | Mo$_2$C | 0 to 28 | 0 to 25 | 0 to 26 | 0 to 25 | 0 to 24 | 0 to 24 |
| | WC | 0.1 to 20 | 0.15 to 39 | 0.15 to 15 | 0.25 to 32 | 0.2 to 12 | 0.35 to 28 |
| | TaC | 0.1 to 15 | 0.15 to 30 | 0.15 to 12 | 0.25 to 25 | 0.2 to 10 | 0.3 to 22 |
| | VC | 0 to 15 | 0 to 11 | 0 to 12 | 0 to 10 | 0 to 10 | 0 to 9 |
| | Cr$_2$C$_3$ | 0 to 15 | 0 to 16 | 0 to 12 | 0 to 14 | 0 to 10 | 0 to 12 |

TABLE 31

Compositions that use Ni-based superalloy (NBSA) as a binder for binding TiC + Mo$_2$C, or TiN + Mo$_2$C, or TiC + TiN + Mo$_2$C, or TiC + TiN + Mo$_2$C + WC + TaC + VC + Cr$_2$C$_3$

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| NBSA - | NBSA | 3 to 30 | 4 to 41 | 4 to 27 | 5 to 37 | 5 to 25 | 6 to 34 |
| TiC + Mo$_2$C | TiC | 43 to 94 | 30 to 90 | 48 to 92 | 35 to 87 | 51 to 90 | 37 to 84 |
| | Mo$_2$C | 3 to 27 | 4 to 40 | 4 to 26 | 6 to 39 | 5 to 24 | 8 to 36 |
| NBSA — | NBSA | 3 to 30 | 4 to 38 | 4 to 27 | 5 to 34 | 5 to 25 | 6 to 32 |
| TiN + Mo$_2$C | TiN | 43 to 94 | 32 to 91 | 48 to 92 | 37 to 88 | 51 to 90 | 40 to 85 |
| | Mo$_2$C | 3 to 27 | 4 to 38 | 4 to 26 | 6 to 37 | 5 to 24 | 7 to 34 |
| NBSA - | NBSA | 3 to 30 | 4 to 40 | 4 to 27 | 5 to 36 | 5 to 25 | 6 to 34 |
| TiC + TiN + Mo$_2$C | TiC | 0.3 to 93.7 | 0.2 to 90 | 0.4 to 91.6 | 0.3 to 86 | 0.5 to 89.5 | 0.4 to 83 |
| | TiN | 0.3 to 93.7 | 0.3 to 91 | 0.4 to 91.6 | 0.4 to 88 | 0.5 to 89.5 | 0.5 to 85 |
| | Mo$_2$C | 3 to 27 | 4 to 38 | 4 to 26 | 6 to 37 | 5 to 24 | 8 to 34 |
| NBSA - | NBSA | 3 to 30 | 2 to 40 | 4 to 27 | 4 to 36 | 5 to 25 | 5 to 34 |
| TiC + TiN + Mo$_2$C + | TiC | 0.3 to 93.3 | 0.15 to 90 | 0.4 to 91.3 | 0.2 to 86 | 0.5 to 89.3 | 0.3 to 83 |
| WC + TaC + | TiN | 0.3 to 93.3 | 0.25 to 90 | 0.4 to 91.3 | 0.35 to 87 | 0.5 to 89.3 | 0.45 to 84 |
| VC + Cr$_2$C$_3$ | Mo$_2$C | 3 to 27 | 4 to 25 | 4 to 26 | 6 to 26 | 5 to 24 | 8 to 25.5 |
| | WC | 0.1 to 20 | 0.25 to 42 | 0.15 to 15 | 0.4 to 34 | 0.2 to 12 | 0.5 to 29 |
| | TaC | 0.1 to 15 | 0.25 to 36 | 0.15 to 12 | 0.4 to 30 | 0.2 to 10 | 0.5 to 26 |
| | VC | 0 to 15 | 0 to 14 | 0 to 12 | 0 to 12 | 0 to 10 | 0 to 10 |
| | Cr$_2$C$_3$ | 0 to 15 | 0 to 18 | 0 to 12 | 0 to 15 | 0 to 10 | 0 to 13 |

TABLE 32

Compositions that use Re and Ni-based superalloy (NBSA) in a binder for binding TiC + $Mo_2C$, or TiN + $Mo_2C$, or TiC + TiN + $Mo_2C$, or TiC + TiN + $Mo_2C$ + WC + TaC + VC + $Cr_2C_3$

| Material | | | Composition Range 1 | | Composition Range 2 | | Composition Range 3 | |
|---|---|---|---|---|---|---|---|---|
| | | | Volume % | Weight % | Volume % | Weight % | Volume % | Weight % |
| (Re + NBSA) - TiC + TiN + $Mo_2C$ | | Re | 0.03 to 29.7 | 0.1 to 64 | 0.04 to 26.73 | 0.13 to 60 | 0.05 to 24.75 | 0.16 to 57 |
| | | NBSA | 0.03 to 29.7 | 0.03 to 40 | 0.04 to 26.73 | 0.05 to 36 | 0.05 to 24.75 | 0.06 to 34 |
| | | TiC | 0 to 94 | 0 to 90 | 0 to 92 | 0 to 87 | 0 to 90 | 0 to 84 |
| | | TiN | 0 to 94 | 0 to 91 | 0 to 92 | 0 to 88 | 0 to 90 | 0 to 85 |
| | | $Mo_2C$ | 3 to 27 | 3 to 38 | 4 to 26 | 4 to 37 | 5 to 24 | 5 to 34 |
| (Re + NBSA) - TiC + TiN + $Mo_2C$ + WC + TaC + VC + $Cr_2C_3$ | | Re | 0.03 to 29.7 | 0.06 to 64 | 0.04 to 26.73 | 0.1 to 60 | 0.05 to 24.75 | 0.12 to 57 |
| | | NBSA | 0.03 to 29.7 | 0.02 to 40 | 0.04 to 26.73 | 0.03 to 36 | 0.05 to 24.75 | 0.04 to 34 |
| | | TiC | 0.3 to 93.5 | 0.15 to 89 | .40 to 91.3 | 0.2 to 86 | 0.5 to 89.1 | 0.3 to 83 |
| | | TiN | 0.3 to 93.5 | 0.15 to 90 | .40 to 91.3 | 0.2 to 87 | 0.5 to 89.1 | 0.3 to 84 |
| | | $Mo_2C$ | 3 to 28 | 3 to 26 | 4 to 26 | 4 to 26 | 5 to 24 | 5 to 25.5 |
| | | WC | 0.1 to 20 | 0.15 to 42 | 0.15 to 15 | 0.25 to 35 | 0.2 to 12 | 0.35 to 29 |
| | | TaC | 0.1 to 15 | 0.15 to 33 | 0.15 to 12 | 0.25 to 28 | 0.2 to 10 | 0.3 to 24 |
| | | VC | 0 to 15 | 0 to 16 | 0 to 12 | 0 to 13 | 0 to 10 | 0 to 11 |
| | | $Cr_2C_3$ | 0 to 15 | 0 to 18 | 0 to 12 | 0 to 15 | 0 to 10 | 0 to 13 |

TABLE 33

Compositions that use Re and Ni in a binder for binding TiC + $Mo_2C$, or TiN + $Mo_2C$, or TiC + TiN + $Mo_2C$, or TiC + TiN + $Mo_2C$ + WC + TaC + VC + $Cr_2C_3$

| Material | | | Composition Range 1 | | Composition Range 2 | | Composition Range 3 | |
|---|---|---|---|---|---|---|---|---|
| | | | Volume % | Weight % | Volume % | Weight % | Volume % | Weight % |
| (Re + Ni) – TiC + TiN + $Mo_2C$ | | Re | 0.03 to 29.7 | 0.1 to 64 | 0.04 to 26.73 | 0.13 to 60 | 0.05 to 24.75 | 0.16 to 57 |
| | | Ni | 0.03 to 29.7 | 0.04 to 42 | 0.04 to 26.73 | 0.05 to 38 | 0.05 to 24.75 | 0.06 to 36 |
| | | TiC | 0 to 94 | 0 to 90 | 0 to 92 | 0 to 87 | 0 to 90 | 0 to 83 |
| | | TiN | 0 to 94 | 0 to 91 | 0 to 92 | 0 to 88 | 0 to 90 | 0 to 85 |
| | | $Mo_2C$ | 3 to 27 | 3 to 38 | 4 to 26 | 4 to 37 | 5 to 24 | 5 to 34 |
| (Re + Ni) – TiC + TiN + $Mo_2C$ + WC + TaC + VC + $Cr_2C_3$ | | Re | 0.03 to 29.7 | 0.06 to 64 | 0.04 to 26.73 | 0.1 to 60 | 0.05 to 24.75 | 0.12 to 57 |
| | | Ni | 0.03 to 29.7 | 0.03 to 42 | 0.04 to 26.73 | 0.04 to 39 | 0.05 to 24.75 | 0.05 to 36 |
| | | TiC | 0.3 to 93.5 | 0.15 to 89 | .40 to 91.3 | 0.2 to 85 | 0.5 to 89.1 | 0.3 to 82 |
| | | TiN | 0.3 to 93.5 | 0.15 to 90 | .40 to 91.3 | 0.2 to 87 | 0.5 to 89.1 | 0.3 to 83 |
| | | $Mo_2C$ | 3 to 28 | 3 to 26 | 4 to 26 | 4 to 26 | 5 to 24 | 5 to 25.5 |
| | | WC | 0.1 to 20 | 0.15 to 42 | 0.15 to 15 | 0.25 to 35 | 0.2 to 12 | 0.35 to 29 |
| | | TaC | 0.1 to 15 | 0.15 to 33 | 0.15 to 12 | 0.25 to 28 | 0.2 to 10 | 0.3 to 24 |
| | | VC | 0 to 15 | 0 to 16 | 0 to 12 | 0 to 13 | 0 to 10 | 0 to 11 |
| | | $Cr_2C_3$ | 0 to 15 | 0 to 18 | 0 to 12 | 0 to 15 | 0 to 10 | 0 to 13 |

TABLE 34

Compositions that use Re and Co in a binder for binding TiC + Mo₂C, or TiN + Mo₂C, or TiC + TiN + Mo₂C, or TiC + TiN + Mo₂C + WC + TaC + VC + Cr₂C₃

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| Re + Co – TiC + TiN + Mo₂C | Re | 0.03 to 29.7 | 0.1 to 64 | 0.04 to 26.73 | 0.13 to 60 | 0.05 to 24.75 | 0.16 to 57 |
| | Co | 0.03 to 29.7 | 0.04 to 43 | 0.04 to 26.73 | 0.05 to 39 | 0.05 to 24.75 | 0.06 to 36 |
| | TiC | 0 to 94 | 0 to 90 | 0 to 92 | 0 to 87 | 0 to 90 | 0 to 83 |
| | TiN | 0 to 94 | 0 to 91 | 0 to 92 | 0 to 88 | 0 to 90 | 0 to 85 |
| | Mo₂C | 3 to 27 | 3 to 38 | 4 to 26 | 4 to 37 | 5 to 24 | 5 to 34 |
| Re + Co – TiC + TiN + Mo₂C + WC + TaC + VC + Cr₂C₃ | Re | 0.03 to 29.7 | 0.06 to 64 | 0.04 to 26.73 | 0.1 to 60 | 0.05 to 24.75 | 0.12 to 57 |
| | Co | 0.03 to 29.7 | 0.03 to 43 | 0.04 to 26.73 | 0.04 to 39 | 0.05 to 24.75 | 0.05 to 36 |
| | TiC | 0.3 to 93.5 | 0.15 to 89 | .40 to 91.3 | 0.2 to 85 | 0.5 to 89.1 | 0.3 to 82 |
| | TiN | 0.3 to 93.5 | 0.15 to 90 | .40 to 91.3 | 0.2 to 87 | 0.5 to 89.1 | 0.3 to 83 |
| | Mo₂C | 3 to 28 | 3 to 26 | 4 to 26 | 4 to 26 | 5 to 24 | 5 to 25.5 |
| | WC | 0.1 to 20 | 0.15 to 42 | 0.15 to 15 | 0.25 to 34 | 0.2 to 12 | 0.35 to 29 |
| | TaC | 0.1 to 15 | 0.15 to 32 | 0.15 to 12 | 0.25 to 27 | 0.2 to 10 | 0.3 to 24 |
| | VC | 0 to 15 | 0 to 16 | 0 to 12 | 0 to 13 | 0 to 10 | 0 to 11 |
| | Cr₂C₃ | 0 to 15 | 0 to 18 | 0 to 12 | 0 to 15 | 0 to 10 | 0 to 13 |

TABLE 35

Compositions that use Ni-based superalloy (NBSA) and Co in a binder for binding TiC + Mo₂C, or TiN + Mo₂C, or TiC + TiN + Mo₂C, or TiC + TiN + Mo₂C + WC + TaC + VC + Cr₂C₃

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (NBSA + Co) – TiC + TiN + Mo₂C | NBSA | 0.03 to 29.7 | 0.04 to 40 | 0.04 to 26.73 | 0.05 to 37 | 0.05 to 24.75 | 0.06 to 34 |
| | Co | 0.03 to 29.7 | 0.04 to 43 | 0.04 to 26.73 | 0.06 to 39 | 0.05 to 24.75 | 0.07 to 37 |
| | TiC | 0 to 94 | 0 to 90 | 0 to 92 | 0 to 87 | 0 to 90 | 0 to 84 |
| | TiN | 0 to 94 | 0 to 91 | 0 to 92 | 0 to 88 | 0 to 90 | 0 to 86 |
| | Mo₂C | 3 to 27 | 4 to 38 | 4 to 26 | 6 to 37 | 5 to 24 | 7 to 34 |
| (NBSA + Co) – TiC + TiN + Mo₂C + WC + TaC + VC + Cr₂C₃ | NBSA | 0.03 to 29.7 | 0.02 to 40 | 0.04 to 26.73 | 0.03 to 36 | 0.05 to 24.75 | 0.05 to 34 |
| | Co | 0.03 to 29.7 | 0.03 to 43 | 0.04 to 26.73 | 0.04 to 39 | 0.05 to 24.75 | 0.05 to 36 |
| | TiC | 0.3 to 93.5 | 0.15 to 89 | .40 to 91.3 | 0.2 to 86 | 0.5 to 89.1 | 0.3 to 83 |
| | TiN | 0.3 to 93.5 | 0.25 to 90 | .40 to 91.3 | 0.35 to 87 | 0.5 to 89.1 | 0.45 to 84 |
| | Mo₂C | 3 to 28 | 4 to 26 | 4 to 26 | 6 to 26 | 5 to 24 | 7 to 25.5 |
| | WC | 0.1 to 20 | 0.25 to 42 | 0.15 to 15 | 0.38 to 35 | 0.2 to 12 | 0.5 to 29 |
| | TaC | 0.1 to 15 | 0.23 to 33 | 0.15 to 12 | 0.35 to 28 | 0.2 to 10 | 0.47 to 24 |
| | VC | 0 to 15 | 0 to 16 | 0 to 12 | 0 to 13 | 0 to 10 | 0 to 11 |
| | Cr₂C₃ | 0 to 15 | 0 to 18 | 0 to 12 | 0 to 15 | 0 to 10 | 0 to 13 |

TABLE 36

Compositions that use Ni-based superalloy (NBSA) and Ni in a binder for binding TiC + Mo$_2$C, or TiN + Mo$_2$C, or TiC + TiN + Mo$_2$C, or TiC + TiN + Mo$_2$C + WC + TaC + VC + Cr$_2$C$_3$

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (NBSA + Ni) – TiC + TiN + Mo$_2$C | NBSA | 0.03 to 29.7 | 0.04 to 40 | 0.04 to 26.73 | 0.05 to 37 | 0.05 to 24.75 | 0.06 to 34 |
| | Ni | 0.03 to 29.7 | 0.04 to 43 | 0.04 to 26.73 | 0.055 to 39 | 0.05 to 24.75 | 0.07 to 36 |
| | TiC | 0 to 94 | 0 to 90 | 0 to 92 | 0 to 88 | 0 to 90 | 0 to 85 |
| | TiN | 0 to 94 | 0 to 91 | 0 to 92 | 0 to 89 | 0 to 90 | 0 to 86 |
| | Mo$_2$C | 3 to 27 | 4 to 38 | 4 to 26 | 6 to 37 | 5 to 24 | 7 to 34 |
| (NBSA + Ni) – TiC + TiN + Mo$_2$C + WC + TaC + VC + Cr$_2$C$_3$ | NBSA | 0.03 to 29.7 | 0.02 to 40 | 0.04 to 26.73 | 0.035 to 36 | 0.05 to 24.75 | 0.05 to 34 |
| | Ni | 0.03 to 29.7 | 0.03 to 43 | 0.04 to 26.73 | 0.04 to 39 | 0.05 to 24.75 | 0.05 to 36 |
| | TiC | 0.3 to 93.5 | 0.15 to 89 | .40 to 91.3 | 0.2 to 86 | 0.5 to 89.1 | 0.3 to 83 |
| | TiN | 0.3 to 93.5 | 0.25 to 90 | .40 to 91.3 | 0.35 to 87 | 0.5 to 89.1 | 0.45 to 84 |
| | Mo$_2$C | 3 to 28 | 4 to 26 | 4 to 26 | 6 to 26 | 5 to 24 | 7 to 25.5 |
| | WC | 0.1 to 20 | 0.25 to 42 | 0.15 to 15 | 0.38 to 35 | 0.2 to 12 | 0.5 to 29 |
| | TaC | 0.1 to 15 | 0.23 to 33 | 0.15 to 12 | 0.35 to 28 | 0.2 to 10 | 0.47 to 24 |
| | VC | 0 to 15 | 0 to 16 | 0 to 12 | 0 to 13 | 0 to 10 | 0 to 11 |
| | Cr$_2$C$_3$ | 0 to 15 | 0 to 18 | 0 to 12 | 0 to 15 | 0 to 10 | 0 to 13 |

TABLE 37

Compositions that use Re, Co, and Ni-based superalloy (NBSA) in a binder for binding TiC and Mo$_2$C, or TiN and Mo$_2$C, or TiC, TiN, and Mo$_2$C, or TiC, TiN, Mo$_2$C, WC, TaC, VC, and Cr$_2$C$_3$

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + NBSA + Co) – TiC + TiN + Mo$_2$C | Re | 0.03 to 29.4 | 0.1 to 64 | 0.04 to 26.46 | 0.13 to 60 | 0.05 to 24.5 | 0.16 to 57 |
| | NBSA | 0.03 to 29.4 | 0.035 to 40 | 0.04 to 26.46 | 0.045 to 36 | 0.05 to 24.5 | 0.055 to 34 |
| | Co | 0.03 to 29.4 | 0.04 to 42 | 0.04 to 26.46 | 0.05 to 39 | 0.05 to 24.5 | 0.06 to 36 |
| | TiC | 0 to 94 | 0 to 90 | 0 to 92 | 0 to 88 | 0 to 90 | 0 to 84 |
| | TiN | 0 to 94 | 0 to 91 | 0 to 92 | 0 to 88 | 0 to 90 | 0 to 85 |
| | Mo$_2$C | 3 to 27 | 3 to 38 | 4 to 26 | 4 to 37 | 5 to 24 | 5 to 34 |
| (Re + NBSA + Co) – TiC + TiN + Mo$_2$C + WC + TaC + VC + Cr$_2$C$_3$ | Re | 0.03 to 29.4 | 0.06 to 63 | 0.04 to 26.46 | 0.1 to 60 | 0.05 to 24.5 | 0.13 to 57 |
| | NBSA | 0.03 to 29.4 | 0.02 to 39 | 0.0 to 26.46 | 0.03 to 36 | 0.05 to 24.5 | 0.04 to 33 |
| | Co | 0.03 to 29.4 | 0.03 to 42 | 0.04 to 26.46 | 0.04 to 39 | 0.05 to 24.5 | 0.05 to 36 |
| | TiC | 0.3 to 93.5 | 0.15 to 89 | 0.4 to 91.3 | 0.2 to 86 | 0.5 to 89.1 | 0.3 to 83 |
| | TiN | 0.3 to 93.5 | 0.15 to 90 | 0.4 to 91.3 | 0.2 to 87 | 0.5 to 89.1 | 0.3 to 84 |
| | Mo$_2$C | 3 to 28 | 3 to 26 | 4 to 26 | 4 to 26 | 5 to 24 | 5 to 25.5 |
| | WC | 0.1 to 20 | 0.15 to 42 | 0.15 to 15 | 0.25 to 35 | 0.2 to 12 | 0.35 to 29 |
| | TaC | 0.1 to 15 | 0.15 to 33 | 0.15 to 12 | 0.25 to 28 | 0.2 to 10 | 0.3 to 24 |
| | VC | 0 to 15 | 0 to 16 | 0 to 12 | 0 to 13 | 0 to 10 | 0 to 11 |
| | Cr$_2$C$_3$ | 0 to 15 | 0 to 18 | 0 to 12 | 0 to 15 | 0 to 10 | 0 to 13 |

TABLE 38

Compositions that use Re, Ni, and Ni-based superalloy (NBSA) in a binder for binding TiC + Mo$_2$C, or TiN + Mo$_2$C, or TiC + TiN + Mo$_2$C, or TiC + TiN + Mo$_2$C + WC + TaC + VC + Cr$_2$C$_3$

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + NBSA + Ni) – TiC + TiN + Mo$_2$C | Re | 0.03 to 29.4 | 0.1 to 63 | 0.04 to 26.46 | 0.13 to 60 | 0.05 to 24.5 | 0.16 to 57 |
| | NBSA | 0.03 to 29.4 | 0.035 to 40 | 0.04 to 26.46 | 0.045 to 36 | 0.05 to 24.5 | 0.055 to 33 |
| | Ni | 0.03 to 29.4 | 0.04 to 42 | 0.04 to 26.46 | 0.05 to 38 | 0.05 to 24.5 | 0.06 to 36 |
| | TiC | 0 to 94 | 0 to 90 | 0 to 92 | 0 to 87 | 0 to 90 | 0 to 84 |
| | TiN | 0 to 94 | 0 to 91 | 0 to 92 | 0 to 88 | 0 to 90 | 0 to 85 |
| | Mo$_2$C | 3 to 27 | 3 to 38 | 4 to 26 | 4 to 37 | 5 to 24 | 5 to 34 |
| (Re + NBSA + Ni) – TiC + TiN + Mo$_2$C + WC + TaC + VC + Cr$_2$C$_3$ | Re | 0.03 to 29.4 | 0.06 to 63 | 0.04 to 26.46 | 0.1 to 60 | 0.05 to 24.5 | 0.13 to 57 |
| | NBSA | 0.03 to 29.4 | 0.02 to 39 | 0.04 to 26.46 | 0.03 to 36 | 0.05 to 24.5 | 0.04 to 33 |
| | Ni | 0.03 to 29.4 | 0.03 to 42 | 0.04 to 26.46 | 0.04 to 38 | 0.05 to 24.5 | 0.05 to 36 |
| | TiC | 0.3 to 93.5 | 0.15 to 89 | 0.4 to 91.3 | 0.2 to 86 | 0.5 to 89.1 | 0.3 to 83 |
| | TiN | 0.3 to 93.5 | 0.15 to 90 | 0.4 to 91.3 | 0.2 to 87 | 0.5 to 89.1 | 0.3 to 84 |
| | Mo$_2$C | 3 to 28 | 3 to 26 | 4 to 26 | 4 to 26 | 5 to 24 | 5 to 25.5 |
| | WC | 0.1 to 20 | 0.15 to 42 | 0.15 to 15 | 0.25 to 35 | 0.2 to 12 | 0.35 to 29 |
| | TaC | 0.1 to 15 | 0.15 to 33 | 0.15 to 12 | 0.25 to 28 | 0.2 to 10 | 0.3 to 24 |
| | VC | 0 to 15 | 0 to 16 | 0 to 12 | 0 to 13 | 0 to 10 | 0 to 11 |
| | Cr$_2$C$_3$ | 0 to 15 | 0 to 18 | 0 to 12 | 0 to 15 | 0 to 10 | 0 to 13 |

TABLE 39

Compositions that use Re, Ni, and Co in a binder for binding TiC + Mo$_2$C, or TiN + Mo$_2$C, or TiC + TiN + Mo$_2$C, or TiC + TiN + Mo$_2$C + WC + TaC + VC + Cr$_2$C$_3$

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + Ni + Co) – TiC + TiN + Mo$_2$C | Re | 0.03 to 29.4 | 0.1 to 63 | 0.04 to 26.46 | 0.13 to 60 | 0.05 to 24.5 | 0.16 to 57 |
| | Ni | 0.03 to 29.4 | 0.04 to 42 | 0.04 to 26.46 | 0.05 to 38 | 0.05 to 24.5 | 0.06 to 36 |
| | Co | 0.03 to 29.4 | 0.04 to 42 | 0.04 to 26.46 | 0.05 to 39 | 0.05 to 24.5 | 0.06 to 36 |
| | TiC | 0 to 94 | 0 to 90 | 0 to 92 | 0 to 87 | 0 to 90 | 0 to 83 |
| | TiN | 0 to 94 | 0 to 91 | 0 to 92 | 0 to 88 | 0 to 90 | 0 to 85 |
| | Mo$_2$C | 3 to 27 | 3 to 38 | 4 to 26 | 4 to 37 | 5 to 24 | 5 to 34 |
| (Re + Ni + Co) – TiC + TiN + Mo$_2$C + WC + TaC + VC + Cr$_2$C$_3$ | Re | 0.03 to 29.4 | 0.06 to 63 | 0.04 to 26.46 | 0.1 to 60 | 0.05 to 24.5 | 0.13 to 57 |
| | Ni | 0.03 to 29.4 | 0.025 to 42 | 0.04 to 26.46 | 0.04 to 38 | 0.05 to 24.5 | 0.05 to 36 |
| | Co | 0.03 to 29.4 | 0.03 to 42 | 0.04 to 26.46 | 0.04 to 39 | 0.05 to 24.5 | 0.05 to 36 |
| | TiC | 0.3 to 93.5 | 0.15 to 89 | 0.4 to 91.3 | 0.2 to 85 | 0.5 to 89.1 | 0.3 to 82 |
| | TiN | 0.3 to 93.5 | 0.15 to 90 | 0.4 to 91.3 | 0.2 to 87 | 0.5 to 89.1 | 0.3 to 83 |
| | Mo$_2$C | 3 to 28 | 3 to 26 | 4 to 26 | 4 to 26 | 5 to 24 | 5 to 25.5 |
| | WC | 0.1 to 20 | 0.15 to 42 | 0.15 to 15 | 0.25 to 35 | 0.2 to 12 | 0.35 to 29 |
| | TaC | 0.1 to 15 | 0.15 to 33 | 0.15 to 12 | 0.25 to 28 | 0.2 to 10 | 0.3 to 24 |
| | VC | 0 to 15 | 0 to 16 | 0 to 12 | 0 to 13 | 0 to 10 | 0 to 11 |
| | Cr$_2$C$_3$ | 0 to 15 | 0 to 18 | 0 to 12 | 0 to 15 | 0 to 10 | 0 to 13 |

TABLE 40

Compositions that use Co, Ni, and Ni-based superalloy (NBSA) in a
binder for binding TiC + Mo₂C, or TiN + Mo₂C, or TiC + TiN + Mo₂C, or
TiC + TiN + Mo₂C + WC + TaC + VC + Cr₂C₃

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (NBSA + Ni + Co) – TiC + TiN + Mo₂C | NBSA | 0.03 to 29.4 | 0.04 to 40 | 0.04 to 26.46 | 0.5 to 36 | 0.05 to 24.5 | 0.06 to 34 |
| | Ni | 0.03 to 29.4 | 0.04 to 42 | 0.04 to 26.46 | 0.055 to 39 | 0.05 to 24.5 | 0.07 to 37 |
| | Co | 0.03 to 29.4 | 0.04 to 43 | 0.04 to 26.46 | 0.055 to 39 | 0.05 to 24.5 | 0.07 to 36 |
| | TiC | 0 to 94 | 0 to 90 | 0 to 92 | 0 to 87 | 0 to 90 | 0 to 84 |
| | TiN | 0 to 94 | 0 to 91 | 0 to 92 | 0 to 88 | 0 to 90 | 0 to 85 |
| | Mo₂C | 3 to 27 | 4 to 38 | 4 to 26 | 5 to 37 | 5 to 24 | 7 to 34 |
| (NBSA + Ni + Co) – TiC + TiN + Mo₂C + WC + TaC + VC + Cr₂C₃ | NBSA | 0.03 to 29.4 | 0.025 to 40 | 0.04 to 26.46 | 0.035 to 36 | 0.05 to 24.5 | 0.05 to 33 |
| | Ni | 0.03 to 29.4 | 0.025 to 42 | 0.04 to 26.46 | 0.04 to 38 | 0.05 to 24.5 | 0.05 to 36 |
| | Co | 0.03 to 29.4 | 0.03 to 42 | 0.04 to 26.46 | 0.04 to 39 | 0.05 to 24.5 | 0.05 to 36 |
| | TiC | 0.3 to 93.5 | 0.15 to 89 | 0.4 to 91.3 | 0.2 to 86 | 0.5 to 89.1 | 0.3 to 83 |
| | TiN | 0.3 to 93.5 | 0.25 to 90 | 0.4 to 91.3 | 0.35 to 87 | 0.5 to 89.1 | 0.45 to 84 |
| | Mo₂C | 3 to 28 | 4 to 26 | 4 to 26 | 6 to 26 | 5 to 24 | 7 to 25.5 |
| | WC | 0.1 to 20 | 0.25 to 42 | 0.15 to 15 | 0.35 to 35 | 0.2 to 12 | 0.5 to 29 |
| | TaC | 0.1 to 15 | 0.25 to 33 | 0.15 to 12 | 0.35 to 28 | 0.2 to 10 | 0.45 to 24 |
| | VC | 0 to 15 | 0 to 16 | 0 to 12 | 0 to 13 | 0 to 10 | 0 to 11 |
| | Cr₂C₃ | 0 to 15 | 0 to 18 | 0 to 12 | 0 to 15 | 0 to 10 | 0 to 13 |

TABLE 41

Compositions that use Re, Ni, Co, and Ni-based superalloy (NBSA) in a
binder for binding TiC + Mo₂C, or TiN + Mo₂C, or TiC + TiN + Mo₂C, or
TiC + TiN + Mo₂C + WC + TaC + VC + Cr₂C₃

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| (Re + NBSA + Ni + Co) – TiC + TiN + Mo₂C | Re | 0.03 to 29.1 | 0.1 to 63 | 0.04 to 26.19 | 0.13 to 59 | 0.05 to 24.25 | 0.16 to 57 |
| | NBSA | 0.03 to 29.1 | 0.035 to 39 | 0.04 to 26.19 | 0.45 to 36 | 0.05 to 24.25 | 0.055 to 33 |
| | Ni | 0.03 to 29.1 | 0.04 to 42 | 0.04 to 26.19 | 0.05 to 38 | 0.05 to 24.25 | 0.06 to 36 |
| | Co | 0.03 to 29.1 | 0.04 to 42 | 0.04 to 26.19 | 0.5 to 38 | 0.05 to 24.25 | 0.06 to 36 |
| | TiC | 0 to 94 | 0 to 90 | 0 to 92 | 0 to 87 | 0 to 90 | 0 to 84 |
| | TiN | 0 to 94 | 0 to 91 | 0 to 92 | 0 to 88 | 0 to 90 | 0 to 85 |
| | Mo₂C | 3 to 27 | 3 to 38 | 4 to 26 | 4 to 37 | 5 to 24 | 5 to 34 |
| (Re + NBSA + Ni + Co) – TiC + TiN + Mo₂C + WC + TaC + VC + Cr₂C₃ | Re | 0.03 to 29.1 | 0.06 to 63 | 0.04 to 26.19 | 0.1 to 59 | 0.05 to 24.25 | 0.12 to 56 |
| | NBSA | 0.03 to 29.1 | 0.02 to 39 | 0.04 to 26.19 | 0.03 to 35 | 0.05 to 24.25 | 0.04 to 33 |
| | Ni | 0.03 to 29.1 | 0.025 to 42 | 0.04 to 26.19 | 0.035 to 38 | 0.05 to 24.25 | 0.05 to 35 |
| | Co | 0.03 to 29.1 | 0.025 to 42 | 0.04 to 26.19 | 0.03 to 38 | 0.05 to 24.25 | 0.05 to 36 |
| | TiC | 0.3 to 93.5 | 0.15 to 89 | 0.4 to 91.3 | 0.2 to 86 | 0.5 to 89.1 | 0.3 to 83 |
| | TiN | 0.3 to 93.5 | 0.15 to 90 | 0.4 to 91.3 | 0.2 to 87 | 0.5 to 89.1 | 0.3 to 84 |
| | Mo₂C | 3 to 28 | 3 to 26 | 4 to 26 | 4 to 26 | 5 to 24 | 5 to 25.5 |
| | WC | 0.1 to 20 | 0.15 to 42 | 0.15 to 15 | 0.25 to 35 | 0.2 to 12 | 0.3 to 29 |

TABLE 41-continued

Compositions that use Re, Ni, Co, and Ni-based superalloy (NBSA) in a binder for binding TiC + Mo$_2$C, or TiN + Mo$_2$C, or TiC + TiN + Mo$_2$C, or TiC + TiN + Mo$_2$C + WC + TaC + VC + Cr$_2$C$_3$

| Material | | Composition Range 1 | | Composition Range 2 | | Composition Range 3 | |
|---|---|---|---|---|---|---|---|
| | | Volume % | Weight % | Volume % | Weight % | Volume % | Weight % |
| | TaC | 0.1 to 15 | 0.15 to 33 | 0.15 to 12 | 0.2 to 28 | 0.2 to 10 | 0.3 to 24 |
| | VC | 0 to 15 | 0 to 16 | 0 to 12 | 0 to 13 | 0 to 10 | 0 to 11 |
| | Cr$_2$C$_3$ | 0 to 15 | 0 to 18 | 0 to 12 | 0 to 15 | 0 to 10 | 0 to 13 |

The following TABLES 42-51 list additional examples of various compositions with 3 exemplary composition ranges 1, 2, and 3 which may be used for different applications. Similar to some compositions described above, some compositions in TABLES 42-51 may be particularly useful for applications at high temperatures as indicated in the last row under "estimated melting points."

As described above, binder matrix materials with rhenium, a nickel-based superalloy or a combination of both can enhance material performance at high temperatures. Tungsten is typically used as a constituent element in various hard particles such as carbides, nitrides, carbonitrides, borides, and silicides. When used as a binder matrix material, either alone or in combination with other metals, tungsten can significantly raise the melting point of the final hardmetal materials to the range of about 2500 to about 3500° C. Hence, hardmetals using W-based binder matrix materials can be used in applications at high temperatures that may not be possible with other materials. Notably, certain compositions that use a binder matrix based on tungsten (W) shown in TABLES 43-48 show expected high melting points around 3500° C.

For the compositions made of nitrides bound by rhenium and cobalt in TABLE 47, each nitride may be substituted by a combination of a nitride and carbide as the hard particle material. A material under this design includes hard particles comprising at least one nitride from nitrides of IVB and VB columns in the periodic table and one carbide from carbides of IVB, VB and VIB columns in the periodic table, and a binder matrix that binds the hard particles and comprises rhenium and cobalt.

TABLE 42

Re bound a Boride from Borides of IVb, Vb, & VIb or a Silicide from Silicides of IVb, Vb & VIb

| | | Composition Range 1 | | Composition Range 2 | | Composition Range 3 | | Estimated Melting |
|---|---|---|---|---|---|---|---|---|
| | | Volume % | Weight % | Volume % | Weight % | Volume % | Weight % | Point, ° C. |
| Re Bound TiB$_2$ | Re | 3 to 40 | 12.5 to 76 | 4 to 35 | 16 to 71 | 5 to 30 | 20 to 67 | 2700 to 3000 |
| | TiB$_2$ | 60 to 97 | 24 to 87.5 | 65 to 96 | 29 to 84 | 70 to 95 | 33 to 80 | |
| Re Bound ZrB$_2$ | Re | 3 to 40 | 9.5 to 70 | 4 to 35 | 12.5 to 65 | 5 to 30 | 15 to 60 | 2800 to 3000 |
| | ZrB$_2$ | 60 to 97 | 30 to 90.5 | 65 to 96 | 35 to 87.5 | 70 to 95 | 40 to 85 | |
| Re Bound HfB$_2$ | Re | 3 to 40 | 5.5 to 55.5 | 4 to 35 | 7 to 50 | 5 to 30 | 9 to 44.5 | 3000 to 3200 |
| | HfB$_2$ | 60 to 97 | 44.5 to 94.5 | 65 to 96 | 50 to 93 | 70 to 95 | 55.5 to 91 | |
| Re Bound VB$_2$ | Re | 3 to 40 | 11 to 73 | 4 to 35 | 14.5 to 69 | 5 to 30 | 18 to 64 | 2000 to 2500 |
| | VB$_2$ | 60 to 97 | 27 to 89 | 65 to 96 | 31 to 85.5 | 70 to 95 | 36 to 82 | |
| Re Bound NbB$_2$ | Re | 3 to 40 | 8 to 66 | 4 to 35 | 11 to 61 | 5 to 30 | 13 to 55.5 | 2800 to 3100 |
| | NbB$_2$ | 60 to 97 | 34 to 92 | 65 to 96 | 39 to 89 | 70 to 95 | 44.5 to 87 | |
| Re Bound TaB$_2$ | Re | 3 to 40 | 5 to 53 | 4 to 35 | 6.5 to 47 | 5 to 30 | 8 to 42 | 3000 to 3200 |
| | TaB$_2$ | 60 to 97 | 47 to 95 | 65 to 96 | 53 to 93.5 | 70 to 95 | 58 to 92 | |
| Re Bound Cr$_3$B$_2$ | Re | 3 to 40 | 9.5 to 69.5 | 4 to 35 | 12.5 to 65 | 5 to 30 | 15 to 60 | 1800 to 2200 |
| | Cr$_3$B$_2$ | 60 to 97 | 30.5 to 90.5 | 65 to 96 | 35 to 87.5 | 70 to 95 | 40 to 85 | |

TABLE 42-continued

Re bound a Boride from Borides of IVb, Vb, & VIb or a Silicide from Silicides of IVb, Vb & VIb

|  |  | Composition Range 1 | | Composition Range 2 | | Composition Range 3 | | Estimated Melting |
|---|---|---|---|---|---|---|---|---|
|  |  | Volume % | Weight % | Volume % | Weight % | Volume % | Weight % | Point, ° C. |
| Re Bound MoB$_2$ | Re | 3 to 40 | 7.5 to 64 | 4 to 35 | 10 to 59 | 5 to 30 | 12.5 to 54 | 2000 to 2400 |
|  | MoB$_2$ | 60 to 97 | 36 to 92.5 | 65 to 96 | 41 to 90 | 70 to 95 | 46 to 87.5 |  |
| Re Bound WB | Re | 3 to 40 | 4 to 47 | 4 to 35 | 5 to 41 | 5 to 30 | 6.5 to 36 | 2700 to 3000 |
|  | WB | 60 to 97 | 53 to 96 | 65 to 96 | 59 to 95 | 70 to 95 | 64 to 93.5 |  |
| Re Bound W$_2$B | Re | 3 to 40 | 4 to 47 | 4 to 35 | 5 to 41 | 5 to 30 | 6.5 to 36 | 2600 to 2900 |
|  | W$_2$B | 60 to 97 | 53 to 96 | 65 to 96 | 59 to 95 | 70 to 95 | 64 to 93.5 |  |
| Re Bound Ti$_5$Si$_3$ | Re | 3 to 40 | 13 to 77 | 4 to 35 | 17 to 72 | 5 to 30 | 20 to 68 | 2000 to 2400 |
|  | Ti$_5$Si$_3$ | 60 to 97 | 23 to 87 | 65 to 96 | 28 to 83 | 70 to 95 | 32 to 80 |  |
| Re Bound Zr$_6$Si$_5$ | Re | 3 to 40 | 10 to 72 | 4 to 35 | 14 to 67 | 5 to 30 | 17 to 62 | 2100 to 2500 |
|  | Zr$_6$Si$_5$ | 60 to 97 | 28 to 90 | 65 to 96 | 33 to 86 | 70 to 95 | 38 to 83 |  |
| Re Bound NbSi$_2$ | Re | 3 to 40 | 9 to 69 | 4 to 35 | 12 to 64 | 5 to 30 | 15 to 59 | 1800 to 2200 |
|  | NbSi$_2$ | 60 to 97 | 31 to 91 | 65 to 96 | 36 to 88 | 70 to 95 | 41 to 85 |  |
| Re Bound TaSi$_2$ | Re | 3 to 40 | 7 to 62 | 4 to 35 | 9 to 57 | 5 to 30 | 12 to 51 | 2200 to 2600 |
|  | TaSi$_2$ | 60 to 97 | 38 to 93 | 65 to 96 | 43 to 91 | 70 to 95 | 49 to 88 |  |
| Re Bound MoSi$_2$ | Re | 3 to 40 | 9 to 69 | 4 to 35 | 12 to 64 | 5 to 30 | 15 to 59 | 1800 to 2200 |
|  | MoSi$_2$ | 60 to 97 | 31 to 91 | 65 to 96 | 36 to 88 | 70 to 95 | 41 to 85 |  |
| Re Bound WSi$_2$ | Re | 3 to 40 | 6 to 60 | 4 to 35 | 9 to 55 | 5 to 30 | 11 to 49 | 1800 to 2200 |
|  | WSi$_2$ | 60 to 97 | 40 to 94 | 65 to 96 | 45 to 91 | 70 to 95 | 51 to 89 |  |

TABLE 43

W bound a carbide from carbides of IVb, Vb, & VIb or a nitride from nitrides of IVb & Vb.

|  |  | Composition Range 1 | | Composition Range 2 | | Composition Range 3 | | Estimated Melting |
|---|---|---|---|---|---|---|---|---|
|  |  | Volume % | Weight % | Volume % | Weight % | Volume % | Weight % | Point, ° C. |
| W Bound TiC | W | 3 to 40 | 11 to 72 | 4 to 35 | 25.02 to 70 | 5 to 30 | 25.02 to 65 | 3000 to 3300 |
|  | TiC | 60 to 97 | 28 to 89 | 65 to 96 | 30 to 74.98 | 70 to 95 | 35 to 74.98 |  |
| W Bound ZrC | W | 3 to 40 | 8 to 66 | 4 to 35 | 11 to 61 | 5 to 30 | 13 to 56 | 3200 to 3500 |
|  | ZrC | 60 to 97 | 34 to 92 | 65 to 96 | 39 to 89 | 70 to 95 | 44 to 87 |  |
| W Bound HfC | W | 3 to 40 | 4 to 50 | 4 to 35 | 6 to 45 | 5 to 30 | 7 to 40 | 3300 to 3500 |
|  | HfC | 60 to 97 | 50 to 96 | 65 to 96 | 55 to 64 | 70 to 95 | 60 to 93 |  |
| W Bound VC | W | 3 to 40 | 10 to 70 | 4 to 35 | 13 to 65 | 5 to 30 | 16 to 60 | 2700 to 3300 |
|  | VC | 60 to 97 | 30 to 90 | 65 to 96 | 35 to 87 | 70 to 95 | 40 to 84 |  |
| W Bound NbC | W | 3 to 40 | 7 to 62 | 4 to 35 | 9 to 57 | 5 to 30 | 11 to 51 | 3000 to 3500 |
|  | NbC | 60 to 97 | 38 to 93 | 65 to 96 | 43 to 91 | 70 to 95 | 49 to 89 |  |
| W Bound TaC | W | 3 to 40 | 4 to 47 | 4 to 35 | 5 to 42 | 5 to 30 | 7 to 36 | 3300 to 3500 |
|  | TaC | 60 to 97 | 53 to 96 | 65 to 96 | 58 to 95 | 70 to 95 | 64 to 93 |  |
| W Bound Cr$_2$C$_3$ | W | 3 to 40 | 8 to 66 | 4 to 35 | 11 to 61 | 5 to 30 | 13 to 55 | 1700 to 2100 |
|  | Cr$_2$C$_3$ | 60 to 97 | 34 to 92 | 65 to 96 | 39 to 89 | 70 to 95 | 45 to 87 |  |
| W Bound Mo$_2$C | W | 3 to 40 | 6 to 59 | 4 to 35 | 8 to 53 | 5 to 30 | 10 to 48 | 2400 to 2600 |
|  | Mo$_2$C | 60 to 97 | 41 to 94 | 65 to 96 | 47 to 93 | 70 to 95 | 52 to 90 |  |

TABLE 43-continued

W bound a carbide from carbides of IVb, Vb, & VIb or a nitride from nitrides of IVb & Vb.

| | | Composition Range 1 | | Composition Range 2 | | Composition Range 3 | | Estimated Melting Point, °C. |
|---|---|---|---|---|---|---|---|---|
| | | Volume % | Weight % | Volume % | Weight % | Volume % | Weight % | |
| W Bound WC | W WC | 3 to 40 | 4 to 45 | 4 to 35 | 5 to 40 | 5 to 30 | 6 to 35 | 2800 to 3000 |
| | | 60 to 97 | 55 to 96 | 65 to 96 | 60 to 95 | 70 to 95 | 65 to 94 | |
| W Bound TiN | W TiN | 3 to 40 | 11 to 72 | 4 to 35 | 14 to 68 | 5 to 30 | 16 to 60 | 2800 to 3300 |
| | | 60 to 97 | 28 to 89 | 65 to 96 | 32 to 86 | 70 to 95 | 40 to 84 | |
| W Bound ZrN | W ZrN | 3 to 40 | 8 to 64 | 4 to 35 | 10 to 59 | 5 to 30 | 12 to 53 | 2900 to 3300 |
| | | 60 to 97 | 36 to 92 | 65 to 96 | 41 to 90 | 70 to 95 | 47 to 88 | |
| W Bound HfN | W HfN | 3 to 40 | 4 to 48 | 4 to 35 | 6 to 43 | 5 to 30 | 7 to 37 | 3200 to 3500 |
| | | 60 to 97 | 52 to 96 | 65 to 96 | 57 to 94 | 70 to 95 | 63 to 93 | |
| W Bound VN | W VN | 3 to 40 | 9 to 68 | 4 to 35 | 12 to 63 | 5 to 30 | 15 to 58 | 2000 to 2400 |
| | | 60 to 97 | 32 to 91 | 65 to 96 | 37 to 88 | 70 to 95 | 42 to 85 | |
| W Bound NbN | W NbN | 3 to 40 | 8 to 64 | 4 to 35 | 10 to 59 | 5 to 30 | 12 to 53 | 2200 to 2600 |
| | | 60 to 97 | 36 to 92 | 65 to 96 | 41 to 90 | 70 to 95 | 47 to 88 | |
| W Bound TaN | W TaN | 3 to 40 | 4 to 47 | 4 to 35 | 5 to 42 | 5 to 30 | 7 to 37 | 3000 to 3500 |
| | | 60 to 97 | 53 to 96 | 65 to 96 | 58 to 95 | 70 to 95 | 63 to 93 | |

TABLE 44

W bound a Boride from Borides of IVb, Vb, & VIb or a Silicide from Silicides of IVb, Vb & Vib

| | | Composition Range 1 | | Composition Range 2 | | Composition Range 3 | | Estimated Melting Point, °C. |
|---|---|---|---|---|---|---|---|---|
| | | Volume % | Weight % | Volume % | Weight % | Volume % | Weight % | |
| W Bound $TiB_2$ | W $TiB_2$ | 3 to 40 | 12 to 74 | 4 to 35 | 15 to 70 | 5 to 30 | 18 to 65 | 2700 to 3000 |
| | | 60 to 97 | 26 to 88 | 65 to 96 | 30 to 85 | 70 to 95 | 35 to 82 | |
| W Bound $ZrB_2$ | W $ZrB_2$ | 3 to 40 | 9 to 68 | 4 to 35 | 12 to 63 | 5 to 30 | 14 to 58 | 2800 to 3000 |
| | | 60 to 97 | 32 to 91 | 65 to 96 | 37 to 88 | 70 to 95 | 42 to 86 | |
| W Bound $HfB_2$ | W $HfB_2$ | 3 to 40 | 5 to 54 | 4 to 35 | 7 to 48 | 5 to 30 | 8 to 42 | 3000 to 3400 |
| | | 60 to 97 | 46 to 95 | 65 to 96 | 52 to 93 | 70 to 95 | 58 to 92 | |
| W Bound $VB_2$ | W $VB_2$ | 3 to 40 | 10 to 72 | 4 to 35 | 14 to 67 | 5 to 30 | 17 to 62 | 2000 to 2500 |
| | | 60 to 97 | 28 to 90 | 65 to 96 | 33 to 86 | 70 to 95 | 38 to 83 | |
| W Bound $NbB_2$ | W $NbB_2$ | 3 to 40 | 8 to 64 | 4 to 35 | 10 to 59 | 5 to 30 | 12 to 53 | 2900 to 3400 |
| | | 60 to 97 | 36 to 92 | 65 to 96 | 41 to 90 | 70 to 95 | 47 to 88 | |
| W Bound $TaB_2$ | W $TaB_2$ | 3 to 40 | 5 to 51 | 4 to 35 | 6 to 45 | 5 to 30 | 7 to 40 | 3100 to 3400 |
| | | 60 to 97 | 49 to 95 | 65 to 96 | 55 to 94 | 70 to 95 | 60 to 93 | |
| W Bound $Cr_3B_2$ | W $Cr_3B_2$ | 3 to 40 | 9 to 68 | 4 to 35 | 12 to 63 | 5 to 30 | 14 to 58 | 1800 to 2200 |
| | | 60 to 97 | 32 to 91 | 65 to 96 | 37 to 88 | 70 to 95 | 42 to 86 | |
| W Bound $MoB_2$ | W $MoB_2$ | 3 to 40 | 7 to 62 | 4 to 35 | 9 to 57 | 5 to 30 | 12 to 52 | 2000 to 2400 |
| | | 60 to 97 | 38 to 93 | 65 to 96 | 43 to 91 | 70 to 95 | 48 to 88 | |
| W Bound WB | W WB | 3 to 40 | 4 to 45 | 4 to 35 | 5 to 39 | 5 to 30 | 6 to 34 | 2700 to 3000 |
| | | 60 to 97 | 55 to 96 | 65 to 96 | 61 to 95 | 70 to 95 | 66 to 94 | |
| W Bound $W_2B$ | W $W_2B$ | 3 to 40 | 3 to 44 | 4 to 35 | 5 to 38 | 5 to 30 | 6 to 33 | 2600 to 2900 |
| | | 60 to 97 | 56 to 97 | 65 to 96 | 62 to 95 | 70 to 95 | 67 to 94 | |
| W Bound $Ti_5Si_3$ | W $Ti_5Si_3$ | 3 to 40 | 12 to 75 | 4 to 35 | 16 to 71 | 5 to 30 | 19 to 66 | 2000 to 2400 |
| | | 60 to 97 | 25 to 88 | 65 to 96 | 29 to 84 | 70 to 95 | 34 to 81 | |
| W Bound $Zr_6Si_5$ | W $Zr_6Si_5$ | 3 to 40 | 10 to 70 | 4 to 35 | 13 to 65 | 5 to 30 | 16 to 60 | 2100 to 2500 |
| | | 60 to 97 | 30 to 90 | 65 to 96 | 35 to 87 | 70 to 95 | 40 to 84 | |

TABLE 44-continued

W bound a Boride from Borides of IVb, Vb, & VIb or a Silicide
from Silicides of IVb, Vb & Vib

| | | Composition Range 1 | | Composition Range 2 | | Composition Range 3 | | Estimated Melting |
|---|---|---|---|---|---|---|---|---|
| | | Volume % | Weight % | Volume % | Weight % | Volume % | Weight % | Point, ° C. |
| W Bound NbSi$_2$ | W | 3 to 40 | 9 to 67 | 4 to 35 | 11 to 62 | 5 to 30 | 14 to 57 | 1800 to 2200 |
| | NbSi$_2$ | 60 to 97 | 33 to 91 | 65 to 96 | 38 to 89 | 70 to 95 | 43 to 86 | |
| W Bound TaSi$_2$ | W | 3 to 40 | 7 to 60 | 4 to 35 | 9 to 55 | 5 to 30 | 11 to 49 | 2200 to 2600 |
| | TaSi$_2$ | 60 to 97 | 40 to 93 | 65 to 96 | 45 to 91 | 70 to 95 | 51 to 89 | |
| W Bound MoSi$_2$ | W | 3 to 40 | 9 to 67 | 4 to 35 | 11 to 62 | 5 to 30 | 14 to 57 | 1800 to 2200 |
| | MoSi$_2$ | 60 to 97 | 31 to 91 | 65 to 96 | 38 to 89 | 70 to 95 | 43 to 86 | |
| W Bound WSi$_2$ | W | 3 to 40 | 6 to 58 | 4 to 35 | 8 to 53 | 5 to 30 | 10 to 47 | 1800 to 2200 |
| | WSi$_2$ | 60 to 97 | 42 to 94 | 65 to 96 | 47 to 92 | 70 to 95 | 43 to 90 | |

TABLE 45

Re and W (Re + W) bound a carbide from carbides of IVb, Vb, &
VIb or a nitride from nitrides of IVb & Vb. The range of Binder is
from 1% Re + 99% W to 99% Re + 1% W.

| | | Composition Range 1 | | Composition Range 2 | | Composition Range 3 | | Estimated Melting |
|---|---|---|---|---|---|---|---|---|
| | | Volume % | Weight % | Volume % | Weight % | Volume % | Weight % | Point, ° C. |
| Re + W Bound TiC | Re | 0.03 to 39.6 | 0.12 to 73 | 0.04 to 34.7 | 0.15 to 69 | 0.05 to 29.7 | 0.19 to 64 | 2900 to 3300 |
| | W | 0.03 to 39.6 | 0.1 to 72 | 0.04 to 34.7 | 0.14 to 67 | 0.05 to 29.7 | 0.17 to 62 | |
| | TiC | 60 to 97 | 26 to 89 | 65 to 96 | 30 to 86 | 70 to 95 | 35 to 83 | |
| Re + W Bound ZrC | Re | 0.03 to 39.6 | 0.09 to 67 | 0.04 to 34.7 | 0.12 to 63 | 0.05 to 29.7 | 0.15 to 57 | 3000 to 3400 |
| | W | 0.03 to 39.6 | 0.08 to 66 | 0.04 to 34.7 | 0.11 to 61 | 0.05 to 29.7 | 0.13 to 55 | |
| | ZrC | 60 to 97 | 32 to 92 | 65 to 96 | 37 to 89 | 70 to 95 | 42 to 87 | |
| Re + W Bound HfC | Re | 0.03 to 39.6 | 0.05 to 52 | 0.04 to 34.7 | 0.07 to 47 | 0.05 to 29.7 | 0.08 to 41 | 3100 to 3500 |
| | W | 0.03 to 39.6 | 0.05 to 50 | 0.04 to 34.7 | 0.06 to 45 | 0.05 to 29.7 | 0.07 to 39 | |
| | HfC | 60 to 97 | 48 to 95 | 65 to 96 | 53 to 94 | 70 to 95 | 58 to 93 | |
| Re + W Bound VC | Re | 0.03 to 39.6 | 0.11 to 71 | 0.14 to 67 | 0.15 to 67.0 | 0.17 to 62 | 0.19 to 61.8 | 2700 to 3000 |
| | W | 0.03 to 39.6 | 0.1 to 69 | 0.13 to 65 | 0.06 to 46.3 | 0.15 to 60 | 0.07 to 40.8 | |
| | VC | 60 to 97 | 28 to 90 | 33 to 87 | 32.8 to 93.5 | 70 to 95 | 38 to 84 | |
| Re + W Bound NbC | Re | 0.03 to 39.6 | 0.08 to 64 | 0.04 to 34.7 | 0.1 to 59 | 0.05 to 29.7 | 0.13 to 53 | 3200 to 3500 |
| | W | 0.03 to 39.6 | 0.07 to 56 | 0.04 to 34.7 | 0.09 to 56 | 0.05 to 29.7 | 0.11 to 51 | |
| | NbC | 60 to 97 | 36 to 93 | 65 to 96 | 41 to 91 | 70 to 95 | 47 to 88 | |
| Re + W Bound TaC | Re | 0.03 to 39.6 | 0.04 to 49 | 0.04 to 34.7 | 0.06 to 43 | 0.05 to 29.7 | 0.07 to 38 | 3100 to 3500 |
| | W | 0.03 to 39.6 | 0.04 to 47 | 0.04 to 34.7 | 0.05 to 41 | 0.05 to 29.7 | 0.07 to 36 | |
| | TaC | 60 to 97 | 51 to 96 | 65 to 96 | 56 to 95 | 70 to 95 | 62 to 93 | |
| Re + W Bound Cr$_2$C$_3$ | Re | 0.03 to 39.6 | 0.09 to 67 | 0.04 to 34.7 | 0.12 to 62 | 0.05 to 29.7 | 0.14 to 57 | 1700 to 1900 |
| | W | 0.03 to 39.6 | 0.08 to 65 | 0.04 to 34.7 | 0.11 to 60 | 0.05 to 29.7 | 0.13 to 55 | |
| | Cr$_2$C$_3$ | 60 to 97 | 32 to 92 | 65 to 96 | 37 to 89 | 70 to 95 | 43 to 87 | |
| Re + W Bound Mo$_2$C | Re | 0.03 to 39.6 | 0.07 to 60 | 0.04 to 34.7 | 0.09 to 55 | 0.05 to 29.7 | 0.11 to 49 | 2400 to 2600 |
| | W | 0.03 to 39.6 | 0.06 to 58 | 0.04 to 34.7 | 0.08 to 53 | 0.05 to 29.7 | 0.1 to 47 | |
| | Mo$_2$C | 60 to 97 | 39 to 94 | 65 to 96 | 45 to 92 | 70 to 95 | 50 to 90 | |

TABLE 45-continued

Re and W (Re + W) bound a carbide from carbides of IVb, Vb, &
VIb or a nitride from nitrides of IVb & Vb. The range of Binder is
from 1% Re + 99% W to 99% Re + 1% W.

|  |  | Composition Range 1 | | Composition Range 2 | | Composition Range 3 | | Estimated Melting |
|---|---|---|---|---|---|---|---|---|
|  |  | Volume % | Weight % | Volume % | Weight % | Volume % | Weight % | Point, °C. |
| Re + W Bound WC | Re | 0.03 to 39.6 | 0.04 to 47 | 0.04 to 34.7 | 0.05 to 42 | 0.05 to 29.7 | 0.07 to 36 | 2700 to 2900 |
|  | W | 0.03 to 39.6 | 0.04 to 45 | 0.04 to 34.7 | 0.05 to 40 | 0.05 to 29.7 | 0.06 to 34 |  |
|  | WC | 60 to 97 | 53 to 96 | 65 to 96 | 58 to 95 | 70 to 95 | 63 to 94 |  |
| Re + W Bound TiN | Re | 0.03 to 39.6 | 0.1 to 71 | 0.04 to 34.7 | 0.14 to 67 | 0.05 to 29.7 | 0.17 to 62 | 2900 to 3200 |
|  | W | 0.03 to 39.6 | 0.1 to 70 | 0.04 to 34.7 | 0.13 to 65 | 0.05 to 29.7 | 0.16 to 60 |  |
|  | TiN | 60 to 97 | 28 to 90 | 65 to 96 | 32 to 87 | 70 to 95 | 38 to 84 |  |
| Re + W Bound ZrN | Re | 0.03 to 39.6 | 0.08 to 65 | 0.04 to 34.7 | 0.11 to 60 | 0.05 to 29.7 | 0.13 to 55 | 2900 to 3200 |
|  | W | 0.03 to 39.6 | 0.08 to 63 | 0.04 to 34.7 | 0.1 to 58 | 0.05 to 29.7 | 0.12 to 53 |  |
|  | ZrN | 60 to 97 | 34 to 92 | 65 to 96 | 39 to 90 | 70 to 95 | 45 to 88 |  |
| Re + W Bound HfN | Re | 0.03 to 39.6 | 0.05 to 50 | 0.04 to 34.7 | 0.06 to 45 | 0.05 to 29.7 | 0.08 to 39 | 3100 to 3400 |
|  | W | 0.03 to 39.6 | 0.04 to 48 | 0.04 to 34.7 | 0.06 to 43 | 0.05 to 29.7 | 0.07 to 37 |  |
|  | HfN | 60 to 97 | 50 to 96 | 65 to 96 | 55 to 95 | 70 to 95 | 61 to 93 |  |
| Re + W Bound VN | Re | 0.03 to 39.6 | 0.1 to 69 | 0.04 to 34.7 | 0.13 to 65 | 0.05 to 29.7 | 0.16 to 59 | 2100 to 2300 |
|  | W | 0.03 to 39.6 | 0.09 to 67 | 0.04 to 34.7 | 0.12 to 63 | 0.05 to 29.7 | 0.14 to 57 |  |
|  | VN | 60 to 97 | 30 to 91 | 65 to 96 | 35 to 88 | 70 to 95 | 40 to 86 |  |
| Re + W Bound NbN | Re | 0.03 to 39.6 | 0.08 to 65 | 0.04 to 34.7 | 0.11 to 60 | 0.05 to 29.7 | 0.13 to 55 | 2300 to 2500 |
|  | W | 0.03 to 39.6 | 0.08 to 63 | 0.04 to 34.7 | 0.1 to 58 | 0.05 to 29.7 | 0.12 to 53 |  |
|  | NbN | 60 to 97 | 35 to 92 | 65 to 96 | 39 to 90 | 70 to 95 | 45 to 88 |  |
| Re + W Bound TaN | Re | 0.03 to 39.6 | 0.04 to 49 | 0.04 to 34.7 | 0.06 to 44 | 0.05 to 29.7 | 0.07 to 38 | 2900 to 3400 |
|  | W | 0.03 to 39.6 | 0.04 to 47 | 0.04 to 34.7 | 0.05 to 42 | 0.05 to 29.7 | 0.07 to 36 |  |
|  | TaN | 60 to 97 | 51 to 96 | 65 to 96 | 56 to 95 | 70 to 95 | 61 to 93 |  |

TABLE 46

Re and W (Re + W) bound a boride from borides of IVb, Vb, & VIb
or a silicide from silicides of IVb & Vb. The range of Binder is from
1% Re + 99% W to 99% Re + 1% W

|  |  | Composition Range 1 | | Composition Range 2 | | Composition Range 3 | | Estimated Melting |
|---|---|---|---|---|---|---|---|---|
|  |  | Volume % | Weight % | Volume % | Weight % | Volume % | Weight % | Point, °C. |
| Re + W Bound TiB$_2$ | Re | 0.03 to 39.6 | 0.13 to 75 | 0.04 to 34.7 | 0.16 to 71 | 0.05 to 29.7 | 0.2 to 66 | 2900 to 3100 |
|  | W | 0.03 to 39.6 | 0.12 to 73 | 0.04 to 34.7 | 0.15 to 69 | 0.05 to 29.7 | 0.18 to 64 |  |
|  | TiB$_2$ | 60 to 97 | 24 to 88 | 65 to 96 | 29 to 85 | 70 to 95 | 33 to 82 |  |
| Re + W Bound ZrB$_2$ | Re | 0.03 to 39.6 | 0.1 to 69 | 0.04 to 34.7 | 0.13 to 64 | 0.05 to 29.7 | 0.16 to 59 | 2900 to 3100 |
|  | W | 0.03 to 39.6 | 0.09 to 67 | 0.04 to 34.7 | 0.12 to 63 | 0.05 to 29.7 | 0.14 to 57 |  |
|  | ZrB$_2$ | 60 to 97 | 30 to 91 | 65 to 96 | 35 to 88 | 70 to 95 | 40 to 86 |  |
| Re + W Bound HfB$_2$ | Re | 0.03 to 39.6 | 0.05 to 54 | 0.04 to 34.7 | 0.07 to 50 | 0.05 to 29.7 | 0.09 to 44 | 3100 to 3300 |
|  | W | 0.03 to 39.6 | 0.05 to 53 | 0.04 to 34.7 | 0.07 to 48 | 0.05 to 29.7 | 0.08 to 42 |  |
|  | HfB$_2$ | 60 to 97 | 44 to 95 | 65 to 96 | 50 o 93 | 70 to 95 | 55 to 92 |  |

TABLE 46-continued

Re and W (Re + W) bound a boride from borides of IVb, Vb, & VIb
or a silicide from silicides of IVb & Vb. The range of Binder is from
1% Re + 99% W to 99% Re + 1% W

| | | Composition Range 1 | | Composition Range 2 | | Composition Range 3 | | Estimated Melting Point, °C. |
|---|---|---|---|---|---|---|---|---|
| | | Volume % | Weight % | Volume % | Weight % | Volume % | Weight % | |
| Re + W Bound VB$_2$ | Re | 0.03 to 39.6 | 0.11 to 73 | 0.14 to 67 | 0.15 to 68 | 0.17 to 62 | 0.18 to 63 | 2000 to 2200 |
| | W | 0.03 to 39.6 | 0.1 to 71 | 0.13 to 65 | 0.13 to 66 | 0.15 to 60 | 0.16 to 61 | |
| | VB$_2$ | 60 to 97 | 27 to 90 | 33 to 87 | 31 to 86 | 70 to 95 | 36 to 84 | |
| Re + W Bound NbB$_2$ | Re | 0.03 to 39.6 | 0.08 to 65 | 0.04 to 34.7 | 0.1 to 61 | 0.05 to 29.7 | 0.13 to 55 | 2900 to 3100 |
| | W | 0.03 to 39.6 | 0.08 to 63 | 0.04 to 34.7 | 0.1 to 58 | 0.05 to 29.7 | 0.12 to 53 | |
| | NbB$_2$ | 60 to 97 | 34 to 92 | 65 to 96 | 39 to 90 | 70 to 95 | 44 to 88 | |
| Re + W Bound TaB$_2$ | Re | 0.03 to 39.6 | 0.05 to 52 | 0.04 to 34.7 | 0.07 to 47 | 0.05 to 29.7 | 0.08 to 41 | 3100 to 3300 |
| | W | 0.03 to 39.6 | 0.05 to 50 | 0.04 to 34.7 | 0.06 to 39 | 0.05 to 29.7 | 0.07 to 39 | |
| | TaB$_2$ | 60 to 97 | 47 to 96 | 65 to 96 | 53 to 94 | 70 to 95 | 58 to 93 | |
| Re + W Bound Cr$_3$B$_2$ | Re | 0.03 to 39.6 | 0.1 to 69 | 0.04 to 34.7 | 0.13 to 64 | 0.05 to 29.7 | 0.16 to 59 | 1900 to 2100 |
| | W | 0.03 to 39.6 | 0.09 to 67 | 0.04 to 34.7 | 0.12 to 62 | 0.05 to 29.7 | 0.14 to 57 | |
| | Cr$_3$B$_2$ | 60 to 97 | 32 to 91 | 65 to 96 | 35 to 88 | 70 to 95 | 40 to 86 | |
| Re + W Bound MoB$_2$ | Re | 0.03 to 39.6 | 0.08 to 64 | 0.04 to 34.7 | 0.1 to 59 | 0.05 to 29.7 | 0.13 to 53 | 2000 to 2200 |
| | W | 0.03 to 39.6 | 0.07 to 62 | 0.04 to 34.7 | 0.09 to 57 | 0.05 to 29.7 | 0.11 to 51 | |
| | MoB$_2$ | 60 to 97 | 36 to 93 | 65 to 96 | 41 to 91 | 70 to 95 | 46 to 88 | |
| Re + W Bound WB | Re | 0.03 to 39.6 | 0.04 to 46 | 0.04 to 34.7 | 0.05 to 41 | 0.05 to 29.7 | 0.07 to 36 | 2800 to 2900 |
| | W | 0.03 to 39.6 | 0.04 to 44 | 0.04 to 34.7 | 0.05 to 39 | 0.05 to 29.7 | 0.06 to 34 | |
| | WB | 60 to 97 | 53 to 96 | 65 to 96 | 57 to 95 | 70 to 95 | 64 to 94 | |
| Re + W Bound W$_2$B | Re | 0.03 to 39.6 | 0.04 to 45 | 0.04 to 34.7 | 0.05 to 40 | 0.05 to 29.7 | 0.06 to 35 | 2700 to 2900 |
| | W | 0.03 to 39.6 | 0.03 to 43 | 0.04 to 34.7 | 0.05 to 38 | 0.05 to 29.7 | 0.06 to 33 | |
| | W$_2$B | 60 to 97 | 54 to 97 | 65 to 96 | 60 to 95 | 70 to 95 | 65 to 94 | |
| Re + W Bound Ti$_5$Si$_3$ | Re | 0.03 to 39.6 | 0.13 to 76 | 0.04 to 34.7 | 0.17 to 72 | 0.05 to 29.7 | 0.21 to 67 | 2000 to 2200 |
| | W | 0.03 to 39.6 | 0.12 to 74 | 0.04 to 34.7 | 0.16 to 70 | 0.05 to 29.7 | 0.19 to 65 | |
| | Ti$_5$Si$_3$ | 60 to 97 | 24 to 88 | 65 to 96 | 28 to 84 | 70 to 95 | 32 to 81 | |
| Re + W Bound Zr$_6$Si$_5$ | Re | 0.03 to 39.6 | 0.11 to 71 | 0.04 to 34.7 | 0.14 to 67 | 0.05 to 29.7 | 0.17 to 61 | 2100 to 2400 |
| | W | 0.03 to 39.6 | 0.1 to 69 | 0.04 to 34.7 | 0.13 to 65 | 0.05 to 29.7 | 0.15 to 59 | |
| | Zr$_6$Si$_5$ | 60 to 97 | 28 to 90 | 65 to 96 | 33 to 87 | 70 to 95 | 38 to 84 | |
| Re + W Bound NbSi$_2$ | Re | 0.03 to 39.6 | 0.09 to 68 | 0.04 to 34.7 | 0.12 to 64 | 0.05 to 29.7 | 0.15 to 58 | 1900 to 2100 |
| | W | 0.03 to 39.6 | 0.09 to 66 | 0.04 to 34.7 | 0.11 to 62 | 0.05 to 29.7 | 0.14 to 56 | |
| | NbSi$_2$ | 60 to 97 | 31 to 91 | 65 to 96 | 36 to 89 | 70 to 95 | 41 to 86 | |
| Re + W Bound TaSi$_2$ | Re | 0.03 to 39.6 | 0.07 to 62 | 0.04 to 34.7 | 0.09 to 57 | 0.05 to 29.7 | 0.12 to 51 | 2300 to 2500 |
| | W | 0.03 to 39.6 | 0.07 to 60 | 0.04 to 34.7 | 0.09 to 54 | 0.05 to 29.7 | 0.11 to 49 | |
| | TaSi$_2$ | 60 to 97 | 38 to 93 | 65 to 96 | 43 to 91 | 70 to 95 | 49 to 89 | |
| Re + W Bound MoSi$_2$ | Re | 0.03 to 39.6 | 0.1 to 69 | 0.04 to 34.7 | 0.12 to 64 | 0.05 to 29.7 | 0.15 to 58 | 1900 to 2100 |
| | W | 0.03 to 39.6 | 0.09 to 67 | 0.04 to 34.7 | 0.11 to 62 | 0.05 to 29.7 | 0.14 to 56 | |
| | MoSi$_2$ | 60 to 97 | 31 to 91 | 65 to 96 | 36 to 89 | 70 to 95 | 41 to 86 | |
| Re + W Bound WSi$_2$ | Re | 0.03 to 39.6 | 0.07 to 60 | 0.04 to 34.7 | 0.09 to 54 | 0.05 to 29.7 | 0.11 to 49 | 1900 to 2100 |
| | W | 0.03 to 39.6 | 0.06 to 58 | 0.04 to 34.7 | 0.08 to 52 | 0.05 to 29.7 | 0.1 to 47 | |
| | WSi$_2$ | 60 to 97 | 40 to 94 | 65 to 96 | 45 to 92 | 70 to 95 | 51 to 90 | |

TABLE 47

Re and Co (Re + Co) bound a carbide from carbides of IVb, Vb, & VIb or a nitride from nitrides of IVb & Vb. The range of Binder is from 1% Re + 99% Co to 99% Re + 1% Co.

| | | Composition Range 1 | | Composition Range 2 | | Composition Range 3 | | Estimated Melting Point, ° C. |
|---|---|---|---|---|---|---|---|---|
| | | Volume % | Weight % | Volume % | Weight % | Volume % | Weight % | |
| Re + Co Bound TiC | Re | 0.03 to 39.6 | 0.12 to 74 | 0.04 to 34.7 | 0.17 to 69 | 0.05 to 29.7 | 0.2 to 64 | 1400 to 3200 |
| | Co | 0.03 to 39.6 | 0.05 to 54 | 0.04 to 34.7 | 0.07 to 49 | 0.05 to 29.7 | 0.08 to 43 | |
| | TiC | 60 to 97 | 26 to 95 | 65 to 96 | 30 to 93 | 70 to 95 | 35 to 91 | |
| Re + Co Bound ZrC | Re | 0.03 to 39.6 | 0.09 to 68 | 0.04 to 34.7 | 0.13 to 63 | 0.05 to 29.7 | 0.16 to 57 | 1400 to 3200 |
| | Co | 0.03 to 39.6 | 0.04 to 47 | 0.04 to 34.7 | 0.05 to 42 | 0.05 to 29.7 | 0.06 to 37 | |
| | ZrC | 60 to 97 | 32 to 96 | 65 to 96 | 37 to 95 | 70 to 95 | 42 to 93 | |
| Re + Co Bound HfC | Re | 0.03 to 39.6 | 0.05 to 52 | 0.04 to 34.7 | 0.07 to 47 | 0.05 to 29.7 | 0.08 to 41 | 1400 to 3200 |
| | Co | 0.03 to 39.6 | 0.02 to 32 | 0.04 to 34.7 | 0.03 to 27 | 0.05 to 29.7 | 0.04 to 23 | |
| | HfC | 60 to 97 | 48 to 98 | 65 to 96 | 53 to 97 | 70 to 95 | 59 to 96 | |
| Re + Co Bound VC | Re | 0.03 to 39.6 | 0.11 to 71 | 0.14 to 67 | 0.15 to 67.0 | 0.17 to 62 | 0.19 to 62 | 1400 to 2900 |
| | Co | 0.03 to 39.6 | 0.05 to 51 | 0.13 to 65 | 0.06 to 46 | 0.15 to 60 | 0.07 to 41 | |
| | VC | 60 to 97 | 28 to 95 | 33 to 87 | 33 to 94 | 70 to 95 | 38 to 92 | |
| Re + Co Bound NbC | Re | 0.03 to 39.6 | 0.08 to 64 | 0.04 to 34.7 | 0.1 to 59 | 0.05 to 29.7 | 0.13 to 53 | 1400 to 3200 |
| | Co | 0.03 to 39.6 | 0.03 to 43 | 0.04 to 34.7 | 0.04 to 38 | 0.05 to 29.7 | 0.05 to 33 | |
| | NbC | 60 to 97 | 36 to 97 | 65 to 96 | 41 to 95 | 70 to 95 | 47 to 94 | |
| Re + Co Bound TaC | Re | 0.03 to 39.6 | 0.04 to 49 | 0.04 to 34.7 | 0.06 to 43 | 0.05 to 29.7 | 0.07 to 38 | 1400 to 3200 |
| | Co | 0.03 to 39.6 | 0.02 to 29 | 0.04 to 34.7 | 0.024 to 25 | 0.05 to 29.7 | 0.03 to 21 | |
| | TaC | 60 to 97 | 51 to 98 | 65 to 96 | 56 to 97 | 70 to 95 | 62 to 97 | |
| Re + Co Bound Cr₂C₃ | Re | 0.03 to 39.6 | 0.09 to 67 | 0.04 to 34.7 | 0.12 to 62 | 0.05 to 29.7 | 0.15 to 57 | 1400 to 1900 |
| | Co | 0.03 to 39.6 | 0.04 to 47 | 0.04 to 34.7 | 0.05 to 41 | 0.05 to 29.7 | 0.06 to 36 | |
| | Cr₂C₃ | 60 to 97 | 32 to 96 | 65 to 96 | 37 to 95 | 70 to 95 | 43 to 93 | |
| Re + Co Bound Mo₂C | Re | 0.03 to 39.6 | 0.07 to 60 | 0.04 to 34.7 | 0.09 to 55 | 0.05 to 29.7 | 0.11 to 49 | 1400 to 2600 |
| | Co | 0.03 to 39.6 | 0.03 to 39 | 0.04 to 34.7 | 0.04 to 34 | 0.05 to 29.7 | 0.05 to 29 | |
| | Mo₂C | 60 to 97 | 40 to 97 | 65 to 96 | 45 to 96 | 70 to 95 | 50 to 95 | |
| Re + Co Bound WC | Re | 0.03 to 39.6 | 0.04 to 47 | 0.04 to 34.7 | 0.05 to 42 | 0.05 to 29.7 | 0.07 to 36 | 1400 to 2900 |
| | Co | 0.03 to 39.6 | 0.017 to 27 | 0.04 to 34.7 | 0.023 to 23 | 0.05 to 29.7 | 0.028 to 20 | |
| | WC | 60 to 97 | 53 to 96 | 65 to 96 | 58 to 95 | 70 to 95 | 63 to 94 | |
| Re + Co Bound TiN | Re | 0.03 to 39.6 | 0.11 to 71 | 0.04 to 34.7 | 0.15 to 67 | 0.05 to 29.7 | 0.19 to 62 | 1400 to 3200 |
| | Co | 0.03 to 39.6 | 0.05 to 52 | 0.04 to 34.7 | 0.06 to 46 | 0.05 to 29.7 | 0.07 to 41 | |
| | TiN | 60 to 97 | 28 to 95 | 65 to 96 | 33 to 93 | 70 to 95 | 38 to 92 | |
| Re + Co Bound ZrN | Re | 0.03 to 39.6 | 0.08 to 65 | 0.04 to 34.7 | 0.11 to 60 | 0.05 to 29.7 | 0.14 to 55 | 1400 to 3200 |
| | Co | 0.03 to 39.6 | 0.04 to 44 | 0.04 to 34.7 | 0.05 to 39 | 0.05 to 29.7 | 0.06 to 34 | |
| | ZrN | 60 to 97 | 34 to 96 | 65 to 96 | 39 to 95 | 70 to 95 | 45 to 94 | |
| Re + Co Bound HfN | Re | 0.03 to 39.6 | 0.05 to 50 | 0.04 to 34.7 | 0.06 to 45 | 0.05 to 29.7 | 0.08 to 39 | 1400 to 3200 |
| | Co | 0.03 to 39.6 | 0.019 to 30 | 0.04 to 34.7 | 0.026 to 26 | 0.05 to 29.7 | 0.032 to 22 | |
| | HfN | 60 to 97 | 50 to 98 | 65 to 96 | 55 to 97 | 70 to 95 | 61 to 97 | |
| Re + Co Bound VN | Re | 0.03 to 39.6 | 0.1 to 70 | 0.04 to 34.7 | 0.14 to 65 | 0.05 to 29.7 | 0.17 to 60 | 1400 to 2300 |
| | Co | 0.03 to 39.6 | 0.04 to 49 | 0.04 to 34.7 | 0.05 to 44 | 0.05 to 29.7 | 0.07 to 39 | |
| | VN | 60 to 97 | 30 to 96 | 65 to 96 | 35 to 94 | 70 to 95 | 40 to 93 | |

TABLE 47-continued

Re and Co (Re + Co) bound a carbide from carbides of IVb, Vb, & VIb or a nitride from nitrides of IVb & Vb. The range of Binder is from 1% Re + 99% Co to 99% Re + 1% Co.

|  |  | Composition Range 1 | | Composition Range 2 | | Composition Range 3 | | Estimated Melting |
|---|---|---|---|---|---|---|---|---|
|  |  | Volume % | Weight % | Volume % | Weight % | Volume % | Weight % | Point, °C. |
| Re + Co Bound NbN | Re | 0.03 to 39.6 | 0.08 to 65 | 0.04 to 34.7 | 0.11 to 60 | 0.05 to 29.7 | 0.14 to 55 | 1400 to 2500 |
|  | Co | 0.03 to 39.6 | 0.04 to 45 | 0.04 to 34.7 | 0.05 to 39 | 0.05 to 29.7 | 0.06 to 34 |  |
|  | NbN | 60 to 97 | 34 to 96 | 65 to 96 | 39 to 95 | 70 to 95 | 45 to 94 |  |
| Re + Co Bound TaN | Re | 0.03 to 39.6 | 0.04 to 49 | 0.04 to 34.7 | 0.06 to 44 | 0.05 to 29.7 | 0.07 to 38 | 1400 to 3200 |
|  | Co | 0.03 to 39.6 | 0.02 to 29 | 0.04 to 34.7 | 0.025 to 25 | 0.05 to 29.7 | 0.03 to 21 |  |
|  | TaN | 60 to 97 | 51 to 98 | 65 to 96 | 56 to 97 | 70 to 95 | 62 to 98 |  |

TABLE 48

Re and Co (Re + Co) bound a boride from borides of IVb, Vb, & VIb or a silicide from silicides of IVb & Vb. The range of Binder is from 1% Re + 99% Co to 99% Re + 1% Co.

|  |  | Composition Range 1 | | Composition Range 2 | | Composition Range 3 | | Estimated Melting |
|---|---|---|---|---|---|---|---|---|
|  |  | Volume % | Weight % | Volume % | Weight % | Volume % | Weight % | Point, °C. |
| Re + Co Bound $TiB_2$ | Re | 0.03 to 39.6 | 0.13 to 75 | 0.04 to 34.7 | 0.18 to 71 | 0.05 to 29.7 | 0.22 to 66 | 1400 to 3100 |
|  | Co | 0.03 to 39.6 | 0.05 to 56 | 0.04 to 34.7 | 0.07 to 51 | 0.05 to 29.7 | 0.08 to 45 |  |
|  | $TiB_2$ | 60 to 97 | 24 to 34 | 65 to 96 | 29 to 92 | 70 to 95 | 34 to 90 |  |
| Re + Co Bound $ZrB_2$ | Re | 0.03 to 39.6 | 0.1 to 69 | 0.04 to 34.7 | 0.13 to 64 | 0.05 to 29.7 | 0.17 to 59 | 1400 to 3100 |
|  | Co | 0.03 to 39.6 | 0.04 to 49 | 0.05 to 34.7 | 0.05 to 44 | 0.05 to 29.7 | 0.07 to 38 |  |
|  | $ZrB_2$ | 60 to 97 | 30 to 96 | 65 to 96 | 35 to 94 | 70 to 95 | 40 to 93 |  |
| Re + Co Bound $HfB_2$ | Re | 0.03 to 39.6 | 0.06 to 55 | 0.04 to 34.7 | 0.08 to 50 | 0.05 to 29.7 | 0.09 to 44 | 1400 to 3200 |
|  | Co | 0.03 to 39.6 | 0.2 to 34 | 0.04 to 34.7 | 0.03 to 30 | 0.05 to 29.7 | 0.04 to 25 |  |
|  | $HfB_2$ | 60 to 97 | 45 to 98 | 65 to 96 | 50 o 97 | 70 to 95 | 56 to 96 |  |
| Re + Co Bound $VB_2$ | Re | 0.03 to 39.6 | 0.12 to 73 | 0.14 to 67 | 0.16 to 69 | 0.17 to 62 | 0.2 to 63 | 1400 to 2200 |
|  | Co | 0.03 to 39.6 | 0.05 to 53 | 0.13 to 65 | 0.06 to 48 | 0.15 to 60 | 0.08 to 42 |  |
|  | $VB_2$ | 60 to 97 | 27 to 95 | 33 to 87 | 31 to 93 | 70 to 95 | 36 to 91 |  |
| Re + Co Bound $NbB_2$ | Re | 0.03 to 39.6 | 0.09 to 66 | 0.04 to 34.7 | 0.12 to 61 | 0.05 to 29.7 | 0.14 to 55 | 1400 to 3100 |
|  | Co | 0.03 to 39.6 | 0.04 to 45 | 0.04 to 34.7 | 0.05 to 40 | 0.05 to 29.7 | 0.06 to 34 |  |
|  | $NbB_2$ | 60 to 97 | 34 to 96 | 65 to 96 | 39 to 95 | 70 to 95 | 45 to 94 |  |
| Re + Co Bound $TaB_2$ | Re | 0.03 to 39.6 | 0.05 to 52 | 0.04 to 34.7 | 0.07 to 47 | 0.05 to 29.7 | 0.08 to 41 | 1400 to 3300 |
|  | Co | 0.03 to 39.6 | 0.02 to 32 | 0.04 to 34.7 | 0.03 to 27 | 0.05 to 29.7 | 0.035 to 23 |  |
|  | $TaB_2$ | 60 to 97 | 48 to 98 | 65 to 96 | 53 to 97 | 70 to 95 | 58 to 96 |  |
| Re + Co Bound $Cr_3B_2$ | Re | 0.03 to 39.6 | 0.1 to 69 | 0.04 to 34.7 | 0.13 to 65 | 0.05 to 29.7 | 0.17 to 59 | 1400 to 2100 |
|  | Co | 0.03 to 39.6 | 0.04 to 49 | 0.04 to 34.7 | 0.05 to 44 | 0.05 to 29.7 | 0.07 to 38 |  |
|  | $Cr_3B_2$ | 60 to 97 | 30 to 96 | 65 to 96 | 35 to 93 | 70 to 95 | 41 to 93 |  |
| Re + Co Bound $MoB_2$ | Re | 0.03 to 39.6 | 0.08 to 64 | 0.04 to 34.7 | 0.1 to 59 | 0.05 to 29.7 | 0.13 to 53 | 1400 to 2200 |
|  | Co | 0.03 to 39.6 | 0.03 to 43 | 0.04 to 34.7 | 0.04 to 38 | 0.05 to 29.7 | 0.05 to 33 |  |
|  | $MoB_2$ | 60 to 97 | 36 to 97 | 65 to 96 | 41 to 95 | 70 to 95 | 46 to 94 |  |

TABLE 48-continued

Re and Co (Re + Co) bound a boride from borides of IVb, Vb, &
VIb or a silicide from silicides of IVb & Vb. The range of Binder is
from 1% Re + 99% Co to 99% Re + 1% Co.

| | | Composition Range 1 | | Composition Range 2 | | Composition Range 3 | | Estimated Melting |
|---|---|---|---|---|---|---|---|---|
| | | Volume % | Weight % | Volume % | Weight % | Volume % | Weight % | Point, ° C. |
| Re + Co Bound WB | Re | 0.03 to 39.6 | 0.04 to 46 | 0.04 to 34.7 | 0.05 to 41 | 0.05 to 29.7 | 0.07 to 36 | 1400 to 2900 |
| | Co | 0.03 to 39.6 | 0.017 to 27 | 0.04 to 34.7 | 0.022 to 23 | 0.05 to 29.7 | 0.028 to 19 | |
| | WB | 60 to 97 | 53 to 98 | 65 to 96 | 59 to 98 | 70 to 95 | 64 to 97 | |
| Re + Co Bound W$_2$B | Re | 0.03 to 39.6 | 0.04 to 45 | 0.04 to 34.7 | 0.05 to 40 | 0.05 to 29.7 | 0.06 to 35 | 1400 to 2900 |
| | Co | 0.03 to 39.6 | 0.016 to 26 | 0.04 to 34.7 | 0.021 to 22 | 0.05 to 29.7 | 0.027 to 19 | |
| | W$_2$B | 60 to 97 | 55 to 98 | 65 to 96 | 60 to 98 | 70 to 95 | 65 to 97 | |
| Re + Co Bound Ti$_5$Si$_3$ | Re | 0.03 to 39.6 | 0.14 to 76 | 0.04 to 34.7 | 0.18 to 72 | 0.05 to 29.7 | 0.23 to 67 | 1400 to 2200 |
| | Co | 0.03 to 39.6 | 0.06 to 57 | 0.04 to 34.7 | 0.07 to 52 | 0.05 to 29.7 | 0.09 to 47 | |
| | Ti$_5$Si$_3$ | 60 to 97 | 24 to 94 | 65 to 96 | 28 to 92 | 70 to 95 | 32 to 90 | |
| Re + Co Bound Zr$_6$Si$_5$ | Re | 0.03 to 39.6 | 0.11 to 71 | 0.04 to 34.7 | 0.15 to 67 | 0.05 to 29.7 | 0.19 to 62 | 1400 to 2400 |
| | Co | 0.03 to 39.6 | 0.05 to 51 | 0.04 to 34.7 | 0.06 to 46 | 0.05 to 29.7 | 0.07 to 41 | |
| | ZrN | 60 to 97 | 28 to 95 | 65 to 96 | 33 to 94 | 70 to 95 | 38 to 92 | |
| Re + Co Bound NbSi$_2$ | Re | 0.03 to 39.6 | 0.1 to 69 | 0.04 to 34.7 | 0.13 to 64 | 0.05 to 29.7 | 0.16 to 58 | 1400 to 2100 |
| | Co | 0.03 to 39.6 | 0.04 to 48 | 0.04 to 34.7 | 0.05 to 43 | 0.05 to 29.7 | 0.06 to 37 | |
| | NbSi$_2$ | 60 to 97 | 31 to 96 | 65 to 96 | 36 to 94 | 70 to 95 | 41 to 93 | |
| Re + Co Bound TaSi$_2$ | Re | 0.03 to 39.6 | 0.07 to 62 | 0.04 to 34.7 | 0.1 to 57 | 0.05 to 29.7 | 0.12 to 51 | 1400 to 2500 |
| | Co | 0.03 to 39.6 | 0.03 to 41 | 0.04 to 34.7 | 0.04 to 36 | 0.05 to 29.7 | 0.05 to 31 | |
| | TaSi$_2$ | 60 to 97 | 38 to 97 | 65 to 96 | 43 to 96 | 70 to 95 | 49 to 95 | |
| Re + Co Bound MoSi$_2$ | Re | 0.03 to 39.6 | 0.1 to 69 | 0.04 to 34.7 | 0.13 to 64 | 0.05 to 29.7 | 0.16 to 59 | 1400 to 2100 |
| | Co | 0.03 to 39.6 | 0.04 to 48 | 0.04 to 34.7 | 0.05 to 43 | 0.05 to 29.7 | 0.07 to 38 | |
| | MoSi$_2$ | 60 to 97 | 31 to 96 | 65 to 96 | 36 to 94 | 70 to 95 | 41 to 93 | |
| Re + Co Bound WSi$_2$ | Re | 0.03 to 39.6 | 0.07 to 60 | 0.04 to 34.7 | 0.09 to 55 | 0.05 to 29.7 | 0.11 to 49 | 1400 to 2100 |
| | Co | 0.03 to 39.6 | 0.03 to 39 | 0.04 to 34.7 | 0.04 to 34 | 0.05 to 29.7 | 0.046 to 29 | |
| | WSi$_2$ | 60 to 97 | 40 to 97 | 65 to 96 | 45 to 96 | 70 to 95 | 51 to 95 | |

TABLE 49

Re and Mo (Re + Mo) bound a carbide from carbides of IVb, Vb, &
VIb. The range of Binder is from 1% Re + 99% Mo to 99% Re + 1% Mo.

| | | Composition Range 1 | | Composition Range 2 | | Composition Range 3 | | Estimated Melting |
|---|---|---|---|---|---|---|---|---|
| | | Volume % | Weight % | Volume % | Weight % | Volume % | Weight % | Point, ° C. |
| Re + Mo Bound TiC | Re | 0.03 to 39.6 | 0.12 to 74 | 0.04 to 34.7 | 0.16 to 69 | 0.05 to 29.7 | 0.2 to 64 | 2600 to 3200 |
| | Mo | 0.03 to 39.6 | 0.06 to 57 | 0.04 to 34.7 | 0.07 to 52 | 0.05 to 29.7 | 0.09 to 46 | |
| | TiC | 60 to 97 | 26 to 94 | 65 to 96 | 30 to 92 | 70 to 95 | 35 to 90 | |
| Re + Mo Bound ZrC | Re | 0.03 to 39.6 | 0.09 to 68 | 0.04 to 34.7 | 0.13 to 63 | 0.05 to 29.7 | 0.16 to 57 | 2600 to 3200 |
| | Mo | 0.03 to 39.6 | 0.04 to 50 | 0.04 to 34.7 | 0.06 to 45 | 0.05 to 29.7 | 0.07 to 39 | |
| | ZrC | 60 to 97 | 32 to 95 | 65 to 96 | 37 to 94 | 70 to 95 | 42 to 92 | |
| Re + Mo Bound HfC | Re | 0.03 to 39.6 | 0.05 to 52 | 0.04 to 34.7 | 0.07 to 47 | 0.05 to 29.7 | 0.08 to 41 | 2600 to 3200 |
| | Mo | 0.03 to 39.6 | 0.02 to 34 | 0.04 to 34.7 | 0.03 to 30 | 0.05 to 29.7 | 0.04 to 25 | |
| | HfC | 60 to 97 | 48 to 98 | 65 to 96 | 53 to 97 | 70 to 95 | 59 to 96 | |

TABLE 49-continued

Re and Mo (Re + Mo) bound a carbide from carbides of IVb, Vb, & VIb. The range of Binder is from 1% Re + 99% Mo to 99% Re + 1% Mo.

|  |  | Composition Range 1 | | Composition Range 2 | | Composition Range 3 | | Estimated Melting |
|---|---|---|---|---|---|---|---|---|
|  |  | Volume % | Weight % | Volume % | Weight % | Volume % | Weight % | Point, °C. |
| Re + Mo Bound VC | Re | 0.03 to 39.6 | 0.11 to 71 | 0.14 to 67 | 0.15 to 67.0 | 0.17 to 62 | 0.18 to 62 | 2600 to 2900 |
|  | Mo | 0.03 to 39.6 | 0.05 to 55 | 0.13 to 65 | 0.07 to 49 | 0.15 to 60 | 0.08 to 44 |  |
|  | VC | 60 to 97 | 28 to 95 | 33 to 87 | 33 to 93 | 70 to 95 | 38 to 91 |  |
| Re + Mo Bound NbC | Re | 0.03 to 39.6 | 0.08 to 64 | 0.04 to 34.7 | 0.1 to 59 | 0.05 to 29.7 | 0.13 to 53 | 2600 to 3200 |
|  | Mo | 0.03 to 39.6 | 0.04 to 46 | 0.04 to 34.7 | 0.05 to 41 | 0.05 to 29.7 | 0.06 to 35 |  |
|  | NbC | 60 to 97 | 36 to 96 | 65 to 96 | 41 to 95 | 70 to 95 | 47 to 94 |  |
| Re + Mo Bound TaC | Re | 0.03 to 39.6 | 0.04 to 49 | 0.04 to 34.7 | 0.06 to 43 | 0.05 to 29.7 | 0.07 to 38 | 2600 to 3200 |
|  | Mo | 0.03 to 39.6 | 0.02 to 31 | 0.04 to 34.7 | 0.028 to 27 | 0.05 to 29.7 | 0.03 to 22 |  |
|  | TaC | 60 to 97 | 51 to 98 | 65 to 96 | 56 to 97 | 70 to 95 | 62 to 96 |  |
| Re + Mo Bound $Cr_2C_3$ | Re | 0.03 to 39.6 | 0.09 to 67 | 0.04 to 34.7 | 0.12 to 62 | 0.05 to 29.7 | 0.15 to 57 | 1700 to 1900 |
|  | Mo | 0.03 to 39.6 | 0.04 to 50 | 0.04 to 34.7 | 0.06 to 45 | 0.05 to 29.7 | 0.07 to 39 |  |
|  | $Cr_2C_3$ | 60 to 97 | 32 to 95 | 65 to 96 | 37 to 94 | 70 to 95 | 43 to 92 |  |
| Re + Mo Bound $Mo_2C$ | Re | 0.03 to 39.6 | 0.07 to 60 | 0.04 to 34.7 | 0.09 to 55 | 0.05 to 29.7 | 0.11 to 49 | 2500 to 2600 |
|  | Mo | 0.03 to 39.6 | 0.03 to 42 | 0.04 to 34.7 | 0.04 to 37 | 0.05 to 29.7 | 0.05 to 32 |  |
|  | $Mo_2C$ | 60 to 97 | 40 to 97 | 65 to 96 | 45 to 96 | 70 to 95 | 50 to 95 |  |
| Re + Mo Bound WC | Re | 0.03 to 39.6 | 0.04 to 47 | 0.04 to 34.7 | 0.05 to 42 | 0.05 to 29.7 | 0.07 to 36 | 2600 to 2900 |
|  | Mo | 0.03 to 39.6 | 0.019 to 30 | 0.04 to 34.7 | 0.026 to 26 | 0.05 to 29.7 | 0.032 to 22 |  |
|  | WC | 60 to 97 | 53 to 98 | 65 to 96 | 58 to 97 | 70 to 95 | 64 to 97 |  |

TABLE 50

Re and Ni (Re + Ni) bound a carbide from carbides of IVb, Vb, & VIb. The range of Binder is from 1% Re + 99% Ni to 99% Re + 1% Ni.

|  |  | Composition Range 1 | | Composition Range 2 | | Composition Range 3 | | Estimated Melting |
|---|---|---|---|---|---|---|---|---|
|  |  | Volume % | Weight % | Volume % | Weight % | Volume % | Weight % | Point, °C. |
| Re + Ni Bound TiC | Re | 0.03 to 39.6 | 0.12 to 74 | 0.04 to 34.7 | 0.17 to 69 | 0.05 to 29.7 | 0.2 to 64 | 1400 to 3200 |
|  | Ni | 0.03 to 39.6 | 0.05 to 54 | 0.04 to 34.7 | 0.06 to 49 | 0.05 to 29.7 | 0.08 to 43 |  |
|  | TiC | 60 to 97 | 26 to 95 | 65 to 96 | 30 to 93 | 70 to 95 | 35 to 91 |  |
| Re + Ni Bound ZrC | Re | 0.03 to 39.6 | 0.09 to 68 | 0.04 to 34.7 | 0.13 to 63 | 0.05 to 29.7 | 0.16 to 57 | 1400 to 3200 |
|  | Ni | 0.03 to 39.6 | 0.04 to 47 | 0.04 to 34.7 | 0.05 to 42 | 0.05 to 29.7 | 0.06 to 36 |  |
|  | ZrC | 60 to 97 | 32 to 96 | 65 to 96 | 37 to 95 | 70 to 95 | 42 to 93 |  |
| Re + Ni Bound HfC | Re | 0.03 to 39.6 | 0.05 to 52 | 0.04 to 34.7 | 0.07 to 47 | 0.05 to 29.7 | 0.08 to 41 | 1400 to 3200 |
|  | Co | 0.03 to 39.6 | 0.02 to 31 | 0.04 to 34.7 | 0.027 to 27 | 0.05 to 29.7 | 0.034 to 23 |  |
|  | HfC | 60 to 97 | 48 to 98 | 65 to 96 | 53 to 97 | 70 to 95 | 59 to 96 |  |
| Re + Ni Bound VC | Re | 0.03 to 39.6 | 0.11 to 71 | 0.14 to 67 | 0.15 to 67.0 | 0.17 to 62 | 0.19 to 62 | 1400 to 2900 |
|  | Ni | 0.03 to 39.6 | 0.04 to 51 | 0.13 to 65 | 0.06 to 46 | 0.15 to 60 | 0.07 to 40 |  |
|  | VC | 60 to 97 | 28 to 95 | 33 to 87 | 33 to 94 | 70 to 95 | 38 to 92 |  |
| Re + Ni Bound NbC | Re | 0.03 to 39.6 | 0.08 to 64 | 0.04 to 34.7 | 0.1 to 59 | 0.05 to 29.7 | 0.13 to 53 | 1400 to 3200 |
|  | Ni | 0.03 to 39.6 | 0.03 to 43 | 0.04 to 34.7 | 0.04 to 37 | 0.05 to 29.7 | 0.05 to 32 |  |
|  | NbC | 60 to 97 | 36 to 97 | 65 to 96 | 41 to 95 | 70 to 95 | 47 to 94 |  |

TABLE 50-continued

Re and Ni (Re + Ni) bound a carbide from carbides of IVb, Vb, & VIb. The range of Binder is from 1% Re + 99% Ni to 99% Re + 1% Ni.

|  |  | Composition Range 1 | | Composition Range 2 | | Composition Range 3 | | Estimated Melting |
|---|---|---|---|---|---|---|---|---|
|  |  | Volume % | Weight % | Volume % | Weight % | Volume % | Weight % | Point, ° C. |
| Re + Ni Bound TaC | Re | 0.03 to 39.6 | 0.04 to 49 | 0.04 to 34.7 | 0.06 to 43 | 0.05 to 29.7 | 0.07 to 38 | 1400 to 3200 |
|  | Ni | 0.03 to 39.6 | 0.018 to 29 | 0.04 to 34.7 | 0.024 to 25 | 0.05 to 29.7 | 0.03 to 21 |  |
|  | TaC | 60 to 97 | 51 to 98 | 65 to 96 | 56 to 97 | 70 to 95 | 62 to 97 |  |
| Re + Ni Bound $Cr_2C_3$ | Re | 0.03 to 39.6 | 0.09 to 67 | 0.04 to 34.7 | 0.12 to 62 | 0.05 to 29.7 | 0.15 to 57 | 1400 to 1900 |
|  | Ni | 0.03 to 39.6 | 0.04 to 46 | 0.04 to 34.7 | 0.05 to 41 | 0.05 to 29.7 | 0.06 to 36 |  |
|  | $Cr_2C_3$ | 60 to 97 | 32 to 96 | 65 to 96 | 37 to 95 | 70 to 95 | 43 to 93 |  |
| Re + Ni Bound $Mo_2C$ | Re | 0.03 to 39.6 | 0.07 to 60 | 0.04 to 34.7 | 0.09 to 55 | 0.05 to 29.7 | 0.11 to 49 | 1400 to 2600 |
|  | Ni | 0.03 to 39.6 | 0.03 to 39 | 0.04 to 34.7 | 0.04 to 34 | 0.05 to 29.7 | 0.05 to 29 |  |
|  | $Mo_2C$ | 60 to 97 | 40 to 97 | 65 to 96 | 45 to 96 | 70 to 95 | 50 to 95 |  |
| Re + Ni Bound WC | Re | 0.03 to 39.6 | 0.04 to 47 | 0.04 to 34.7 | 0.06 to 42 | 0.05 to 29.7 | 0.07 to 36 | 1400 to 2900 |
|  | Ni | 0.03 to 39.6 | 0.017 to 27 | 0.04 to 34.7 | 0.022 to 23 | 0.05 to 29.7 | 0.028 to 19 |  |
|  | WC | 60 to 97 | 53 to 98 | 65 to 96 | 58 to 98 | 70 to 95 | 64 to 97 |  |

TABLE 51

Re and Cr (Re + Cr) bound a carbide from carbides of IVb, Vb, & VIb. The range of Binder is from 1% Re + 99% Cr to 99% Re + 1% Cr.

|  |  | Composition Range 1 | | Composition Range 2 | | Composition Range 3 | | Estimated Melting |
|---|---|---|---|---|---|---|---|---|
|  |  | Volume % | Weight % | Volume % | Weight % | Volume % | Weight % | Point, ° C. |
| Re + Cr Bound TiC | Re | 0.03 to 39.6 | 0.13 to 74 | 0.04 to 34.7 | 0.17 to 69 | 0.05 to 29.7 | 0.2 to 64 | 1800 to 3200 |
|  | Cr | 0.03 to 39.6 | 0.04 to 48 | 0.04 to 34.7 | 0.05 to 43 | 0.05 to 29.7 | 0.06 to 39 |  |
|  | TiC | 60 to 97 | 26 to 96 | 65 to 96 | 30 to 94 | 70 to 95 | 36 to 93 |  |
| Re + Cr Bound ZrC | Re | 0.03 to 39.6 | 0.1 to 68 | 0.04 to 34.7 | 0.13 to 63 | 0.05 to 29.7 | 0.16 to 57 | 1800 to 3200 |
|  | Cr | 0.03 to 39.6 | 0.03 to 41 | 0.04 to 34.7 | 0.04 to 36 | 0.05 to 29.7 | 0.05 to 32 |  |
|  | ZrC | 60 to 97 | 32 to 97 | 65 to 96 | 37 to 95 | 70 to 95 | 42 to 94 |  |
| Re + Cr Bound HfC | Re | 0.03 to 39.6 | 0.05 to 52 | 0.04 to 34.7 | 0.07 to 47 | 0.05 to 29.7 | 0.09 to 41 | 1800 to 3200 |
|  | Cr | 0.03 to 39.6 | 0.017 to 27 | 0.04 to 34.7 | 0.022 to 23 | 0.05 to 29.7 | 0.027 to 19 |  |
|  | HfC | 60 to 97 | 48 to 98 | 65 to 96 | 53 to 98 | 70 to 95 | 59 to 97 |  |
| Re + Cr Bound VC | Re | 0.03 to 39.6 | 0.11 to 71 | 0.14 to 67 | 0.15 to 67.0 | 0.17 to 62 | 0.19 to 62 | 1800 to 2900 |
|  | Cr | 0.03 to 39.6 | 0.04 to 46 | 0.13 to 65 | 0.05 to 41 | 0.15 to 60 | 0.06 to 35 |  |
|  | VC | 60 to 97 | 28 to 96 | 33 to 87 | 33 to 95 | 70 to 95 | 38 to 93 |  |
| Re + Cr Bound NbC | Re | 0.03 to 39.6 | 0.08 to 64 | 0.04 to 34.7 | 0.1 to 59 | 0.05 to 29.7 | 0.13 to 53 | 1800 to 3200 |
|  | Cr | 0.03 to 39.6 | 0.026 to 37 | 0.04 to 34.7 | 0.034 to 33 | 0.05 to 29.7 | 0.04 to 28 |  |
|  | NbC | 60 to 97 | 36 to 97 | 65 to 96 | 41 to 96 | 70 to 95 | 47 to 95 |  |
| Re + Cr Bound TaC | Re | 0.03 to 39.6 | 0.04 to 49 | 0.04 to 34.7 | 0.06 to 43 | 0.05 to 29.7 | 0.07 to 38 | 1800 to 3200 |
|  | Cr | 0.03 to 39.6 | 0.015 to 25 | 0.04 to 34.7 | 0.019 to 21 | 0.05 to 29.7 | 0.024 to 17 |  |
|  | TaC | 60 to 97 | 51 to 98 | 65 to 96 | 56 to 98 | 70 to 95 | 62 to 97 |  |
| Re + Cr Bound $Cr_2C_3$ | Re | 0.03 to 39.6 | 0.09 to 67 | 0.04 to 34.7 | 0.12 to 62 | 0.05 to 29.7 | 0.16 to 57 | 1800 to 1900 |
|  | Cr | 0.03 to 39.6 | 0.03 to 41 | 0.04 to 34.7 | 0.04 to 36 | 0.05 to 29.7 | 0.05 to 31 |  |
|  | $Cr_2C_3$ | 60 to 97 | 32 to 97 | 65 to 96 | 37 to 96 | 70 to 95 | 43 to 95 |  |

TABLE 51-continued

Re and Cr (Re + Cr) bound a carbide from carbides of IVb, Vb, & VIb. The range of Binder is from 1% Re + 99% Cr to 99% Re + 1% Cr.

| | | Composition Range 1 | | Composition Range 2 | | Composition Range 3 | | Estimated Melting |
|---|---|---|---|---|---|---|---|---|
| | | Volume % | Weight % | Volume % | Weight % | Volume % | Weight % | Point, ° C. |
| Re + Cr Bound Mo$_2$C | Re | 0.03 to 39.6 | 0.07 to 60 | 0.04 to 34.7 | 0.09 to 55 | 0.05 to 29.7 | 0.11 to 49 | 1800 to 2600 |
| | Cr | 0.03 to 39.6 | 0.023 to 34 | 0.04 to 34.7 | 0.03 to 29 | 0.05 to 29.7 | 0.037 to 25 | |
| | Mo$_2$C | 60 to 97 | 40 to 98 | 65 to 96 | 45 to 97 | 70 to 95 | 50 to 96 | |
| Re + Cr Bound WC | Re | 0.03 to 39.6 | 0.04 to 47 | 0.04 to 34.7 | 0.05 to 42 | 0.05 to 29.7 | 0.07 to 36 | 1800 to 2900 |
| | Cr | 0.03 to 39.6 | 0.014 to 23 | 0.04 to 34.7 | 0.018 to 20 | 0.05 to 29.7 | 0.023 to 16 | |
| | WC | 60 to 97 | 53 to 98.6 | 65 to 96 | 58 to 98 | 70 to 95 | 64 to 97.6 | |

The above compositions for hardmetals or cermets may be used for a variety of applications. For example, a material as described above may be used to form a wear part in a tool that cuts, grinds, or drills a target object by using the wear part to remove the material of the target object. Such a tool may include a support part made of a different material, such as a steel. The wear part is then engaged to the support part as an insert. The tool may be designed to include multiple inserts engaged to the support part. For example, some mining drills may include multiple button bits made of a hardmetal material. Examples of such a tool includes a drill, a cutter such as a knife, a saw, a grinder, and a drill. Alternatively, hardmetals descried here may be used to form the entire head of a tool as the wear part for cutting, drilling or other machining operations. The hardmetal particles may also be used to form abrasive grits for polishing or grinding various materials. In addition, such hardmetals may also be used to construct housing and exterior surfaces or layers for various devices to meet specific needs of the operations of the devices or the environmental conditions under which the devices operate.

More specifically, the hardmetals described here may be used to manufacture cutting tools for machining metals, alloys, composite materials, plastic materials, wooden materials, and others. The cutting tools may include indexable inserts for turning, milling, boring and drilling, drills, end mills, reamers, taps, hobs and milling cutters. Since the temperature of the cutting edge of such tools may be higher than 500° C. during machining, the hardmetal compositions for high-temperature operating conditions described above may have special advantages when used in such cutting tools, e.g., extended tool life and improved productivity by such tools by increasing the cutting speed.

The hardmetals described here may be used to manufacture tools for wire drawing, extrusion, forging and cold heading. Also as mold and Punch for powder process. In addition, such hardmetals may be used as wear-resistant material for rock drilling and mining.

The hardmetal materials described in this application may be fabricated in bulk forms or as coatings on metal surfaces. Coatings with such new hardmetal materials may be advantageously used to form a hard layer on a metal surface to achieve desired hardness that would otherwise be difficult to achieve with the underlying metal material. Bulk hardmetal materials based on the compositions in this application may be expensive and hence the use of coatings on less expensive metals with lower hardness may be used to reduce the costs of various components or parts with high hardness.

A number of powder processes for producing commercial hardmetals may be used to manufacture the hardmetals of this application. As an example, a binder alloy with Re higher than 85% in weight may be fabricated by the process of solid phase sintering to eliminate open porosities then HIP replaces liquid phase sintering.

FIG. 9 shows a flowchart for several fabrication methods for materials or structures from the above hardmetal compositions. As illustrated, alloy powders for the binders and the hard particle powders may be mixed with a milling liquid in a wet mixing process with or without a lubricant (e.g., wax). The fabrication flows on the left hand side of FIG. 9 are for fabricating hardmetals with lubricated wet mixing. The mixture is first dried by vacuum drying or spray drying process to produce lubricated grade powder. Next, the lubricated grade power is shaped into a bulky material via pill pressing, extruding, or cold isostatic press (CIP) and shaping. The CIP is a process to consolidate powder by isostatic pressure. The bulky material is then heated to remove the lubricant and is sintered in a presintering process. Next, the material may be processed via several different processes. For example, the material may be processed via a liquid phase sintering in vacuum or hydrogen and then further processed by a HIP process to form the final hardmetal parts. Alternatively, the material after the presintering may go through a solid phase sintering to eliminate open porosity and then a HIP process to form the final hardmetal parts.

When alloy powders for the binders and the hard particle powders are mixed without the lubricant, the unlubricated grade power after the drying process may be processed in two different ways to form the final hardmetal parts. The first way as illustrated simply uses hot pressing to complete the fabrication. The second way uses a thermal spray forming process to form the grade powder on a metal substrate in vacuum. Next, the metal substrate is removed to leave the structure by the thermal spray forming as a free-standing material as the final hardmetal part. In addition, the free-standing material may be further processed by a HIP process to reduce the porosities if needed.

In forming a hardmetal coating on a metal surface, a thermal spray process may be used under a vacuum condition to produce large parts coated with hardmetal materials. For example, surfaces of steel parts and tools may be coated to improve their hardness and thus performance. FIG. 10 shows an exemplary flow chart of a thermal spray process.

Various thermal spray processes are known for coating metal surfaces. For example, the ASM Handbook Vol. 7 (P408, 1998) describes the thermal spray as a family of particulate/droplet consolidation processes capable of forming metals, ceramics, intermetallics, composites, and polymers into coatings or freestanding structures. During the process, powder, wire, or rods can be injected into combustion or arc-heated jets, where they are heated, melted or softened, accelerated, and directed toward the surface, or substrate, being coated. On impact at the substrate, the particles or droplets rapidly solidify, cool, contract, and incrementally build up to form a deposit on a target surface. The thin "splats" may undergo high cooling rates, e.g., in excess of $10^6$ K/s for metals.

A thermal spray process may use chemical (combustion) or electrical (plasma or arc) energy to heat feed materials injected into hot-gas jets to create a stream of molten droplets that are accelerated and directed toward the substrates being coated. Various thermal spray processes are shown in FIG. 3 and 4 in ASM Handbook Vol. 7, pages 409-410.

Various details of thermal spray processes are described in "Spray Forming" by Lawley et al. and "Thermal Spray Forming of Materials" by Knight et al., which are published in ASM Handbook, Volume 7, Powder Metal Technologies and Application (1998), from pages 396 to 407, and pages 408 to 419, respectively.

In various applications, selected hardmetal compositions described here can be used to maintain high material strength and hardness at high temperatures at or above 1500° C. For example, certain high-power engines operate at such high temperatures such as various jet and rocket engines used in various flying devices and vehicles. More specifically, jet and rocket nozzles, including non-erosive nozzle throats and low-erosive nozzle throats, in these and other engines may be partially or entirely made of the selected hardmetal materials described in this application.

For example, hardmetals based on one or more of (1) one or more carbides, (2) one or more nitrides, (3) one or more borides and (4) a combination of two or more of (1), (2) and (3) with a binder material which is either pure Re or a composite binder material with Re as one component. The melting points of various carbides, nitrides, and borides in this application are above 2400° C. Examples of suitable carbides for the present high-temperature hardmetal materials include TaC, HfC, NbC, ZrC, TiC, WC, VC, $Al_4C_3$, $ThC_2$, $Mo_2C$, SiC and $B_4C$. Examples of suitable nitrides for the present high-temperature hardmetal materials include HfN, TaN, BN, ZrN, and TiN. Examples of suitable borides for the present high-temperature hardmetal materials include $HfB_2$, $ZrB_2$, $TaB_2$, $TiB_2$, $NbB_2$, and WB. Two examples of the composite binder material with Re as one component are (1) W and Re and (2) Ta and Re.

In the binder material compositions described in this application, Rhenium can be used in a binder material to achieve certain properties. For example, addition of Re into W in a binder material can improve the mechanical properties, such as the ductility, of the W—Re alloy binder material over W without Re. As another example, addition of Re into Mo in a binder material can improve the mechanical properties (e.g., ductility) of the Mo—Re alloy binder material over Mo without Re. As yet another example, addition of Re into Cr in a binder material can improve the mechanical properties (e.g., ductility) of the Cr—Re alloy binder material over Cr without Re.

Molybdenum can also be added in a binder material to improve the properties of the binder material. Adding Mo into a Ni-bound TiC material forms a Ni—Mo-bound TiC material and can improve the ductility and toughness of the Ni—Mo-bound TiC material over the Ni-bound TiC material. In hardmetals using Ni-based superalloy binder materials, Mo can be added to the Ni-based superalloy binder material. For example, Mo can be added to the Ni-based superalloy-bound TiC to improve the ductility and toughness of Ni-based superalloy-Mo-bound TiC over Ni-based superalloy-bound TiC.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations and examples are disclosed. However, it is understood that variations and enhancements may be made.

What is claimed is:

1. A friction stir welding tool head, comprising:
a shoulder; and
a pin engaged to the shoulder,
wherein at least one part of each of the shoulder and the pin comprises:
a first material comprising:
at least one silicide from a group consisting of $Ti_5Si_3$, $Zr_6Si_5$, $Zr_3Si_2$, $Zr_4Si_3$, ZrSi, $HfSi_2$, $NbSi_2$, $TaSi_2$, $Mo_3Si_2$, $MoSi_2$, $W_3Si_2$, and $WSi_2$; and
at least one of or a combination of at least one carbide from a group consisting of TaC, HfC, NbC, ZrC, TiC, WC, VC, $Al_4C_3$, $ThC_2$, $Mo_2C$, SiC, $B_4C$ and $Cr_2C_3$, at least one nitride, and at least one boride from a group consisting of $VB_2$, $Cr_3B_2$, $HfB_2$, $ZrB_2$, $TaB_2$, $TiB_2$, $NbB_2$, and WB; and
a second material to bind the first material, the second material comprising at least rhenium.

2. The head as in claim 1, wherein the second material further comprises W.

3. The head as in claim 1, wherein the second material further comprises Ta.

4. A friction stir welding tool head, comprising:
a shoulder; and
a pin engaged to the shoulder, wherein at least one part of each of the shoulder and the pin comprises:
a first material comprising:
at least one silicide from a group consisting of $Ti_5Si_3$, $Zr_6Si_5$, $Zr_3Si_2$, $Zr_4Si_3$, ZrSi, $HfSi_2$, $NbSi_2$, $TaSi_2$, $Mo_3Si_2$, $MoSi_2$, $W_3Si_2$, and $WSi_2$; and
at least one of or a combination of at least one carbide, at least one nitride from a group consisting of HfN, TaN, BN, ZrN, TiN, VN, SiN and NbN, and at least one boride from a group consisting of $VB_2$, $Cr_3B_2$, $HfB_2$, $ZrB_2$, $TaB_2$, $TiB_2$, $NbB_2$, and WB; and
a second material to bind the first material, the second material comprising at least rhenium, 5. The head as in claim 4, wherein the second material further comprises W.

6. The head as in claim 4, wherein the second material further comprises Ta.

7. A friction stir welding tool head, comprising:
a shoulder; and
a pin engaged to the shoulder, wherein at least one part of each of the shoulder and the pin comprises:
a first material comprising:
at least one silicide from a group consisting of $Ti_5Si_3$, $Zr_6Si_5$, $Zr_3Si_2$, $Zr_4Si_3$, ZrSi, $HfSi_2$, $NbSi_2$, $TaSi_2$, $Mo_3Si_2$, $MoSi_2$, $W_3Si_2$, and $WSi_2$; and
at least one of or a combination of at least one carbide, at least one nitride, and at least one boride; and
a second material to bind the first material, the second material comprising at least rhenium, and a nickel-based superalloy.

8. The head as in claim 7, wherein the second material further comprises cobalt.

9. A friction stir welding tool head, comprising:
a shoulder; and
a pin engaged to the shoulder, wherein at least one part of each of the shoulder and the pin comprises:
a first material comprising at least one silicide from a group consisting of $Ti_5Si_3$, $Zr_6Si_5$, $Zr_3Si_2$, $Zr_4Si_3$, ZrSi, $HfSi_2$, $NbSi_2$, $TaSi_2$, $Mo_3Si_2$, $MoSi_2$, $W_3Si_2$, and $WSi_2$, and a second material to bind the first material, the second material comprising at least rhenium.

10. A friction stir welding tool head, comprising:
a shoulder; and
a pin engaged to the shoulder, wherein at least one part of each of the shoulder and the pin comprises:
a first material comprising:
at least one silicide from a group consisting of $Ti_5Si_3$, $Zr_6Si_5$, $Zr_3Si_2$, $Zr_4Si_3$, ZrSi, $HfSi_2$, $NbSi_2$, $TaSi_2$, $Mo_3Si_2$, $MoSi_2$, $W_3Si_2$, and $WSi_2$; and
at least one of or a combination of at least one carbide, at least one nitride, and at least one boride from a group consisting of $VB_2$, $Cr_3B_2$, $HfB_2$, $ZrB_2$, $TaB_2$, $TiB_2$, $NbB_2$, and WB; and
a second material to bind the first material, the second material comprising at least rhenium.

11. A friction stir welding tool head, comprising:
a shoulder; and
a pin engaged to the shoulder, wherein at least one part of each of the shoulder and the pin comprises:
a first material comprising at least one silicide from a group consisting of $Ti_5Si_3$, $Zr_6Si_5$, $Zr_3Si_2$, $Zr_4Si_3$, ZrSi, $HfSi_2$, $NbSi_2$, $TaSi_2$, $Mo_3Si_2$, $MoSi_2$, $W_3Si_2$, and $WSi_2$, and a second material to bind the first material, the second material comprising at least a Ni-based superalloy.

12. The head as in claim 11, wherein the first material comprises at least one of tungsten carbide and titanium carbide.

13. The head as in claim 11, wherein the first material comprises:
hard particles comprising at least one of TaC, HfC, NbC, ZrC, TiC, WC, VC, $Al_4C_3$, $ThC_2$, $Mo_2C$, SiC, $B_4C$ and $Cr_2C_3$.

14. The head as in claim 13, wherein the hard particles are less than 75% of a total weight of the material.

15. The head as in claim 13, wherein the second material further comprises W.

16. The head as in claim 13, wherein the second material further comprises Ta.

17. The head as in claim 13, wherein the second material further comprises Mo.

18. The head as in claim 13, wherein the second material further comprises Cr.

19. The head as in claim 13, wherein the hard particles further comprise at least one of HfN, TaN, BN, ZrN, TiN, VN, SiN and NbN.

20. The head as in claim 19, wherein the second material further comprises W.

21. The head as in claim 19, wherein the second material further comprises Ta.

22. The head as in claim 13, wherein the hard particles further comprise at least one of $HfB_2$, $ZrB_2$, $TaB_2$, $TiB_2$, $NbB_2$, and WB.

23. The head as in claim 22, wherein the second material further comprises W.

24. The head as in claim 22, wherein the second material further comprises Ta.

25. The head as in claim 11, wherein the first material comprises:
hard particles comprising at least one of HfN, TaN, BN, ZrN, TiN, VN, SiN and NbN.

26. The head as in claim 25, wherein the second material further comprises W.

27. The head as in claim 25, wherein the second material further comprises Ta.

28. The head as in claim 25, wherein the hard particles further comprise at least one of $VB_2$, $Cr_3B_2$, $HfB_2$, $ZrB_2$, $TaB_2$, $TiB_2$, $NbB_2$, and WB.

29. The head as in claim 28, wherein the second material further comprises W.

30. The head as in claim 28, wherein the second material further comprises Ta.

31. The head as in claim 11, wherein the second material further comprises Mo.

32. The head as in claim 11, wherein the second material further comprises Cr.

33. The head as in claim 11, wherein the second material further comprises cobalt.

34. The head as in claim 11, wherein the first material comprises at least one boride consisting of $VB_2$, $Cr_3B_2$, $HfB_2$, $ZrB_2$, $TaB_2$, $TiB_2$, $NbB_2$, and WB.

* * * * *